(12) United States Patent
Deshpande et al.

(10) Patent No.: US 10,284,862 B2
(45) Date of Patent: May 7, 2019

(54) SIGNALING INDICATIONS AND CONSTRAINTS

(71) Applicant: Sharp Kabushiki Kaisha, Osaka-shi, Osaka (JP)

(72) Inventors: Sachin G. Deshpande, Camas, WA (US); Kiran Misra, Camas, WA (US); Christopher A. Segall, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 223 days.

(21) Appl. No.: 14/904,622

(22) PCT Filed: Jul. 14, 2014

(86) PCT No.: PCT/JP2014/003725
§ 371 (c)(1),
(2) Date: Jan. 12, 2016

(87) PCT Pub. No.: WO2015/008479
PCT Pub. Date: Jan. 22, 2015

(65) Prior Publication Data
US 2016/0191926 A1 Jun. 30, 2016

Related U.S. Application Data

(60) Provisional application No. 61/847,427, filed on Jul. 17, 2013, provisional application No. 61/846,058, (Continued)

(51) Int. Cl.
*H04N 19/187* (2014.01)
*H04N 19/105* (2014.01)
(Continued)

(52) U.S. Cl.
CPC ......... *H04N 19/187* (2014.11); *H04N 19/105* (2014.11); *H04N 19/174* (2014.11);
(Continued)

(58) Field of Classification Search
CPC .. H04N 19/187; H04N 19/105; H04N 19/174; H04N 19/30; H04N 19/597; H04N 19/70
(Continued)

(56) References Cited

U.S. PATENT DOCUMENTS

2006/0126744 A1* 6/2006 Peng .................. H03M 7/4006
375/240.26
2008/0219354 A1* 9/2008 Segall ................. H04N 19/176
375/240.23
(Continued)

FOREIGN PATENT DOCUMENTS

WO 2014/104725 A1 7/2014
WO 2015/002891 A1 1/2015

OTHER PUBLICATIONS

Official Communication issued in International Patent Application No. PCT/JP2014/003725, dated Sep. 9, 2014.
(Continued)

*Primary Examiner* — Richard T Torrente
(74) *Attorney, Agent, or Firm* — Keating & Bennett, LLP

(57) ABSTRACT

This invention introduces modification to a syntax signaled in slice segment header related to inter-layer prediction. A syntax optimization is proposed where if syntax element NumActiveRefLayerPics is equal to syntax element NumDirectRefLayers[nuh_layer_id] then the inter_layer_pred_idc[i] syntax elements are not signaled. In this case the value of inter_layer_pred_idc[i] syntax elements is inferred based on other syntax elements already signaled.

2 Claims, 58 Drawing Sheets

Related U.S. Application Data filed on Jul. 14, 2013, provisional application No. 61/846,064, filed on Jul. 14, 2013.

(51) Int. Cl.
*H04N 19/174* (2014.01)
*H04N 19/30* (2014.01)
*H04N 19/597* (2014.01)
*H04N 19/70* (2014.01)
*H04N 19/463* (2014.01)

(52) U.S. Cl.
CPC .......... *H04N 19/30* (2014.11); *H04N 19/463* (2014.11); *H04N 19/597* (2014.11); *H04N 19/70* (2014.11)

(58) Field of Classification Search
USPC ..................................... 375/240.12
See application file for complete search history.

(56) References Cited

U.S. PATENT DOCUMENTS

| | | | | |
|---|---|---|---|---|
| 2013/0003864 A1* | 1/2013 | Sullivan | ............... | H04N 19/44 375/240.25 |
| 2014/0003493 A1* | 1/2014 | Chen | ............... | H04N 19/70 375/240.02 |
| 2014/0016701 A1* | 1/2014 | Chen | ............... | H04N 19/105 375/240.14 |
| 2014/0301456 A1* | 10/2014 | Wang | ............... | H04N 19/70 375/240.12 |
| 2015/0010051 A1* | 1/2015 | Chen | ............... | H04N 19/105 375/240.02 |
| 2015/0071356 A1* | 3/2015 | Kim | ............... | H04N 19/513 375/240.16 |
| 2015/0271524 A1* | 9/2015 | Zhang | ............... | H04N 19/597 375/240.16 |

OTHER PUBLICATIONS

Kang et al., "MV-HEVC/SHVC HLS: On Signaling of Inter-Layer RPS in Slice Segment Header", Joint Collaborative Team on Video Coding (JCT-VC) of ITU-T SG 16 WP 3 and ISO/IEC JTC 1/SC 291WG 11, JCTVC-N0154, Jul. 25-Aug. 2, 2013, pp. 1-3.

Xu et al., "MV-HEVC/SHVC HLS: On Inter-Layer Prediction Related Syntax", Joint Collaborative Team on Video Coding (JCT-VC) of ITU-T SG 16 WP 3 and ISO/IEC JTC 1/SC 29/WG 11, JCTVC-N0081, Jul. 25-Aug. 2, 2013, pp. 1-8.

He et al., "On SHVC High Level Syntax", Joint Collaborative Team on Video Coding (JCT-VC) of ITU-T SG 16 WP 3 and ISO/IEC JTC 1/SC 29/WG 11, JCTVC-N0217, Jul. 25-Aug. 2, 2013, pp. 1-7.

Deshpande, "Comments on SHVC and MV-HEVC", Joint Collaborative Team on Video Coding (JCT-VC) of ITU-T SG 16 WP 3 and ISO/IEC JTC 1/SC 29/WG 11, JCTVC-N0195, Jul. 25-Aug. 2, 2013, pp. 1-7.

Suehring et al., "Tile Boundary Alignment and Inter-Layer Prediction Constraints for SHVC and MV-HEVC", Joint Collaborative Team on Video Coding (JCT-VC) of ITU-T SG 16 WP 3 and ISO/IEC JTC 1/SC 29/WG 11, JCTVC-M0464, Apr. 18-26, 2013, 6 pages.

Tech et al., "MV-HEVC Draft Text 4", Joint Collaborative Team on 3D Video Coding Extension Development of ITU-T SG 16 WP 3 and ISO/IEC JTC 1/SC 29/WG 11, JCT3V-D1004_v4, Apr. 20-26, 2013, 63 pages.

Chen et al., "SHVC Working Draft 2", Joint Collaborative Team on Video Coding (JCT-VC) of ITU-T SG16 WP3 and ISO/IEC JTC1/SC29/WG11, JCTVC-M1008_v3, Apr. 18-26, 2013, 67 pages.

Hannuksela et al., "Draft Text for Multiview Extension of High Efficiency Video Coding (HEVC)", Joint Collaborative Team on Video Coding (JCT-VC) of ITU-T SG16 WP3 and ISO/IEC JTC1/SC29/WG11, JCTVC-L0452-spec-text-r1, Oct. 10-19, 2012, 34 pages.

Chen et al., "SHVC Draft Text 1", Joint Collaborative Team on Video Coding (JCT-VC) of ITU-T SG16 WP3 and ISO/IEC JTC1/SC29/WG11, JCTVC-L1008, Jan. 14-23, 2013, 3 pages.

Tech et al., "MV-HEVC Draft Text 3 (ISO/IEC 23008-2201x/PDAM2)", Joint Collaborative Team on 3D Video Coding Extension Development of ITU-T SG 16 WP 3 and ISO/IEC JTC 1/SC 29/WG 11, JCT3V-C1004_d3, Jan. 17-23, 2013, 34 pages.

Hannuksela et al., "Common Specification Text for Scalable and Multi-View Extensions (revision of JCTVC-L0188 straw-man text)", Joint Collaborative Team on Video Coding (JCT-VC) of ITU-T SG 16 WP 3 and ISO/IEC JTC 1/SC 29/WG 11, Jctvc-L0452r1, Jan. 14-23, Jan. 17-23, 2013, 2 pages.

Hannuksela et al., "Test Model for Scalable Extensions of High Efficiency Video Coding (HEVC)", Joint Collaborative Team on Video Coding (JCT-VC) of ITU-T SG16 WP3 and ISO/IEC JTC1/SC29/WG11, JCTVC-L0453-spec-text, Oct. 10-19, 2012, 51 pages.

Hannuksela et al., "Test Model for Scalable Extensions of High Efficiency Video Coding (HEVC)", Joint Collaborative Team on Video Coding (JCT-VC) of ITU-T SG16 WP3 and ISO/IEC JTC1/SC29/WG11, JCTVC-L0453-spec-text_r1, Oct. 10-19, 2012, 51 pages.

Bross et al., "High Efficiency Video Coding (HEVC) Text Specification Draft 10 (for FDIS & Last Call)", Joint Collaborative Team on Video Coding (JCT-VC) of ITU-T SG 16 WP 3 and ISO/IEC JTC 1/SC 29/WG 11, JCTVC-L1003_v34, Jan. 14-23, 2013, 310 pages.

Bross et al., "High Efficiency Video Coding (HEVC) Text Specification Draft 7", Joint Collaborative Team on Video Coding (JCT-VC) of ITU-T SG16 WP3 and ISO/IEC JTC1/SC29/WG11, JCTVC-I1003_d9, Apr. 27-May 7, 2012, 280 pages.

Kazui et al., "AHG11: Proposed Text for Sub-Picture Based CPB Operation", Joint Collaborative Team on Video Coding (JCT-VC) of ITU-T SG 16 WP 3 and ISO/IEC JTC 1/SC 29/WG 11, JCTVC-10333, Apr. 27-May 7, 2012, pp. 1-2.

* cited by examiner

[Fig. 2]
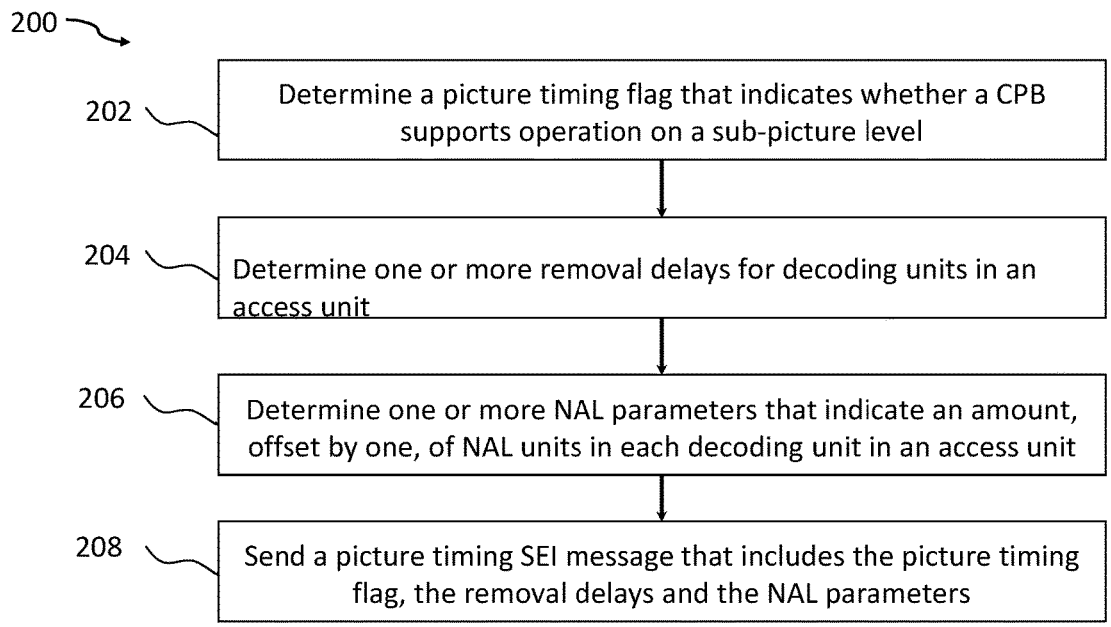
FIG.2
[Fig. 3]
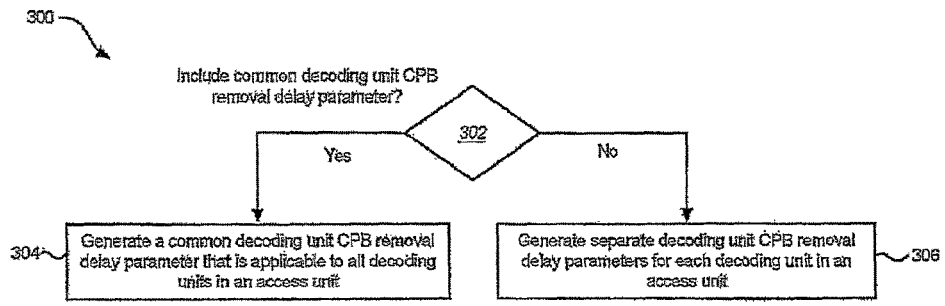

| nal_unit_header(){ | Descriptor |
|---|---|
| forbidden_zero_bit | f(1) |
| nal_unit_type | u(6) |
| nuh_reserved_zero_6bits | u(6) |
| nuh_temporal_id_plus1 | u(3) |
| } | |

NAL UNIT HEADER SYNTAX

| nal_unit_header(){ | Descriptor |
|---|---|
| forbidden_zero_bit | f(1) |
| nal_unit_type | u(6) |
| layer_id_plus1 | u(6) |
| nuh_temporal_id_plus1 | u(3) |
| } | |

NAL UNIT HEADER SYNTAX

| nal_unit_header(){ | Descriptor |
|---|---|
| forbidden_zero_bit | f(1) |
| nal_unit_type | u(6) |
| layer_id | u(6) |
| nuh_temporal_id_plus1 | u(3) |
| } | |

NAL UNIT HEADER SYNTAX

| nal_unit( NumBytesInNALunit ) { | Descriptor |
|---|---|
|   nal_unit_header() | |
|   NumBytesInRBSP = 0 | |
|   for( i=2; i < NumBytesInNALunit; i++) { | |
|     if( i+2 < NumBytesInNALunit && next_bits( 24 ) == 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

GENERAL NAL UNIT SYNTAX

| vps_extension() { | Descriptor |
|---|---|
| while( !byte_aligned() ) | |
|   vps_extension_byte_alignment_reserved_zero_bit | u(1) |
| // scalability type and layer_id partitioning method | |
| scalability_type | u(4) |
| for( i = 0; i < MaxDim( scalability_type ); i++) | |
|   layer_id_dim_len[ i ] | u(3) |
| // layer specific information | |
| for( i = 0; i <= max_num_layers_minus1; i++) { | |
|   vps_layer_id[ i ] | u(6) |
| // layer dependency | |
|   num_direct_ref_layers[ i ] | u(6) |
|   for( j = 0; j < num_direct_ref_layers[ i ]; j++) | |
|     ref_layer_id[ i ][ j ] | u(6) |
| } | |
| } | |

Existing video parameter set extension syntax

| scalability_type | MaxDim(scalability_type) | Scalability dimensions |
|---|---|---|
| 0 | 1 | none (base HEVC) |
| 1 | 2 | spatial and quality |
| 2 | 3 | spatial, quality, unspecified |
| 3 | 4 | spatial, quality, unspecified, unspecified |
| 4 | 2 | multiview and depth |
| 5 | 3 | multiview, depth, unspecified |
| 6 | 4 | multiview, depth, unspecified, unspecified |
| 7 | 4 | multiview, spatial, quality and depth |
| 8 | 5 | multiview, spatial, quality, depth, unspecified |
| 9 | 6 | multiview, spatial, quality, depth, unspecified, unspecified |
| 10...15 | reserved | reserved |

Existing Scalability Types

| vps_extension( ) { | Descriptor |
|---|---|
| while( !byte_aligned( ) ) | |
|   vps_extension_byte_alignment_reserved_zero_bit | u(1) |
| // Scalability map and layer_id_plus1 mapping method | |
| for (i=0;i<=max_num_layers_minus1_bits; i++) { | |
|   scalability_map[i] | u(3) |
| } | |
| // layer specific information | |
| for( i = 0; i <= max_num_layers_minus1; i++ ) { | |
|   vps_layer_id[ i ] | u(6) |
| // layer dependency | |
|   num_direct_ref_layers[ i ] | u(6) |
|   for( j =0; j < num_direct_ref_layers[ i ]; j++ ) | |
|     ref_layer_id[ i ][ j ] | u(6) |
| } | |
| } | |

Video parameter set extension syntax

| Scalability_map[ i ] | Scalability dimension |
|---|---|
| 0 | none (base HEVC) |
| 1 | spatial |
| 2 | quality |
| 3 | depth |
| 4 | multiview |
| 5 | unspecified |
| 6, 7 | reserved |

Scalability Map Syntax

| vps_extension( ) { | Descriptor |
|---|---|
| while( !byte_aligned( ) ) | |
|   vps_extension_byte_alignment_reserved_zero_bit | u(1) |
| // scalability map and layer_id_plus1 mapping method | |
| num_scalability_dimensions_minus1 | u(3) |
| for(i=0;i<=num_scalability_dimensions_minus1; i++) { | |
|   scalability_map[i] | u(3) |
|   num_bits_for_scalability_map[i] | u(3) |
| } | |
| // layer specific information | |
| for( i = 0; i <= max_num_layers_minus1; i++ ) { | |
|   vps_layer_id[ i ] | u(6) |
| // layer dependency | |
|   num_direct_ref_layers[ i ] | u(6) |
|   for( j =0; j < num_direct_ref_layers[ i ]; j++ ) | |
|     ref_layer_id[ i ][ j ] | u(6) |
| } | |
| } | |

Video parameter set extension syntax

| vps_extension( ) { | Descriptor |
|---|---|
| while( !byte_aligned( ) ) | |
| vps_extension_byte_alignment_reserved_zero_bit | u(1) |
| // layer specific information | |
| for( i = 1; i <= vps_max_layers_minus1; i++ ) { | |
| // mapping of layer ID to scalability dimension IDs | |
| num_dimensions_minus1[i] | u(4) |
| for( j = 0; j <= num_dimensions_minus1; j++ ) { | |
| dimension_type[i][j] | u(4) |
| dimension_id[i][j] | u(8) |
| } | |
| // layer dependency | |
| num_direct_ref_layers[i] | u(6) |
| for( j = 0; j < num_direct_ref_layers[i]; j++ ) | |
| ref_layer_id[i][j] | u(6) |
| } | |
| } | |

Existing video parameter set extension syntax

| dimension_type[i][j] | dimension_id[i][j] |
|---|---|
| 0 | view order idx |
| 1 | depth flag |
| 2 | dependency ID |
| 3 | quality ID |
| 4..15 | reserved |

Existing Dimension Type, Dimension ID Syntax

| vps_extension( ) { | Descriptor |
|---|---|
| while( !byte_aligned( ) ) | |
| vps_extension_byte_alignment_reserved_zero_bit | u(1) |
| // layer specific information | |
| for( i = 1; i <= max_num_layers_minus1; i++ ) { | |
| // mask signalling scalability types that are present for this layer ID | |
| scalability_mask | u(8) |
| for( j = 0; j <= num_scalability_types[i]; j++ ) { | |
| scalability_id[j] | u(8) |
| } | |
| // layer dependency | |
| num_direct_ref_layers[i] | u(6) |
| for( j = 0; j < num_direct_ref_layers[i]; j++ ) | |
| ref_layer_id[i][j] | u(6) |
| } | |
| } | |

Video parameter set extension syntax

| scalability_mask_bit[k] | Scalability dimension |
|---|---|
| 0 | spatial |
| 1 | quality |
| 2 | depth |
| 3 | multiview |
| 4-15 | Reserved |

Scalability Map Syntax

| video_parameter_set_rbsp() { | Descriptor |
|---|---|
| video_parameter_set_id | u(4) |
| vps_temporal_id_nesting_flag | u(1) |
| reserved_zero_2bits | u(2) |
| max_num_layers_minus1 //reserved_zero_6bits | u(6) |
| vps_max_sub_layers_minus1 | u(3) |
| profile_level( 1, vps_max_sub_layers_minus1 ) | |
| next_essential_info_byte_offset //reserved_zero_12bits | u(12) |
| for( i = 0; i <= vps_max_sub_layers_minus1; i++ ) { | |
|   vps_max_dec_pic_buffering[ i ] | ue(v) |
|   vps_max_num_reorder_pics[ i ] | ue(v) |
|   vps_max_latency_increase[ i ] | ue(v) |
| } | |
| num_hrd_parameters | ue(v) |
| for( i = 0; i < num_hrd_parameters; i++ ) { | |
|   if( i > 0 ) | |
|     op_point( i ) | |
|   hrd_parameters( i == 0, vps_max_sub_layers_minus1 ) | |
| } | |
| bit_equal_to_one | u(1) |
| scalability_mask | u(8) |
| for( i = 0; i <= max_num_layers_minus1; i++ ) { | |
|   vps_extension_data() | |
| } | |
| vps_extension_flag | u(1) |
| if( vps_extension_flag ) | |
|   while( more_rbsp_data() ) | |
|     vps_extension_data_flag | u(1) |
| rbsp_trailing_bits() | |
| } | |
| } | |

Video parameter set extension syntax

| vps_extension_data() { | Descriptor |
|---|---|
| vps_extension_type | u(2) |
| layer_id | u(6) |
| layer_max_sub_layers_minus1 | u(3) |
| new_profile_level_flag | u(1) |
| if ( new_profile_level_flag == 0 ) { | |
| profile_reference_layer_id | u(6) |
| } | |
| else { | |
| profile_level( 1, layer_max_sub_layers_minus1 ) | |
| } | |
| for( j = 0; j <= num_scalability_types; j++ ) { | |
| scalable_id[ j ] | u(8) |
| } | |
| num_reference_layers | u(6) |
| for( n = 0; n < num_reference_layers; n++ ) | |
| direct_coding_dependency_layer_id_plus1[ n ] | u(6) |
| } | |

| vps_extension ( ) { | Descriptor |
|---|---|
| while ( ! byte_aligned( ) ) | |
| vps_extension_byte_alignment_reserved_zero_bit | u(1) |
| avc_base_codec_flag | u(1) |
| scalability_mask | u(16) |
| for ( i = 0; i < NumScalabilityType; i++ ) { | |
| dimension_id_len_minus1[ i ] | u(3) |
| } | |
| vps_nuh_layer_id_present_flag | u(1) |
| // layer specific information | |
| for ( i = 1; i <= vps_max_layers_minus1; i++ ) | |
| //mapping of layer ID to scalability dimension IDs | |
| if ( vps_nuh_layer_id_present_flag ) | |
| layer_id_in_nuh[ i ] | u(6) |
| for ( j = 0; j < NumScalabilityTypes; j++ ) | |
| dimension_id[ i ][ j ] | u(v8) |
| } | |
| for( i = 1; i <= vps_max_layers_minus1; i++ ) | |
| profile_tier_level( 1, vps_max_sub_layers_minus1 ) | |
| for ( i = 1; i <= vps_max_layers_minus1; i++ ) { | |
| //layer dependency | |
| num_direct_ref_layers[ i ] | u(6) |
| for ( j = 0; j < num_direct_ref_layers[ i ]; j++ ) | |
| ref_layer_id[ i ][ j ] | u(6) |
| } | |
| } | |

Video Parameter Set Extension Syntax

| scalability_mask's k'th bit | Scalability dimension |
|---|---|
| 0 | spatial |
| 1 | quality |
| 2 | depth |
| 3 | multiview |
| 4-15 | Reserved |

Scalability_mask Syntax

| vps_extension() { | Descriptor |
|---|---|
| while( !byte_aligned() ) | |
|   vps_extension_byte_alignment_reserved_one_bit | u(1) |
| avc_base_codec_flag | u(1) |
| scalability_mask | u(16) |
| for( i = 0; i <NumScalabilityTypes; i++) { | |
|   dimension_id_len_minus1[ i ] | u(3) |
| } | |
| vps_nuh_layer_id_present_flag | u(1) |
| // layer specific information | |
| for( i = 1; i <= vps_max_layers_minus1; i++) { | |
|   // mapping of layer ID to scalability dimension IDs | |
|   if( vps_nuh_layer_id_present_flag ) | |
|     layer_id_in_nuh[ i ] | u(6) |
|   for( j = 0; j <= num_dimensions_minus1; j++ ) | |
|     dimension_id[ i ][ j ] | u(v) |
| } | |
| for( i = 1; i <= vps_max_layers_minus1 ; i++ ) | |
|   profile_tier_level( 1, vps_max_sub_layers_minus1 ) | |
| layer_dependency_information_pattern | u(v) |
| for( i = 1; i <= NumDepLayers; i++) { | |
|   // layer dependency information signaling | |
|   num_direct_ref_layers[ i ] | u(6) |
|   for( j = 0; j < num_direct_ref_layers[ i ]; j++ ) | |
|     ref_layer_id[ i ][ j ] | u(6) |
| } | |
| } | |

Video Parameter Set Extension Syntax

| | Descriptor |
|---|---|
| vps_extension() { | |
| while( !byte_aligned() ) | |
| vps_extension_byte_alignment_reserved_one_bit | u(1) |
| avc_base_codec_flag | u(1) |
| scalability_mask | u(16) |
| for( i = 0; i <NumScalabilityTypes; i++ ) { | |
| dimension_id_len_minus1[ i ] | u(3) |
| } | |
| vps_nuh_layer_id_present_flag | u(1) |
| // layer specific information | |
| for( i = 1; i <= vps_max_layers_minus1; i++ ) { | |
| // mapping of layer ID to scalability dimension IDs | |
| if( vps_nuh_layer_id_present_flag ) | |
| layer_id_in_nuh[ i ] | u(6) |
| for( j = 0; j <= num_dimensions_minus1; j++ ) | |
| dimension_id[ i ][ j ] | u(v) |
| } | |
| for( i = 1; i <= vps_max_layers_minus1 ; i++ ) | |
| profile_tier_level( 1, vps_max_sub_layers_minus1 ) | |
| for( i = 1; i <= vps_max_layers_minus1; i++ ) { | |
| // layer dependency information signaling | |
| layer_dependency_flag[i] | u(1) |
| if(layer_dependency_flag[i]) { | |
| num_direct_ref_layers[ i ] | u(6) |
| for( j = 0; j < num_direct_ref_layers[ i ]; j++ ) | |
| ref_layer_id[ i ][ j ] | u(6) |
| } | |
| } | |
| } | |

Video Parameter Set Extension Syntax

| vps_extension() { | Descriptor |
|---|---|
| while( !byte_aligned( ) ) | |
| vps_extension_byte_alignment_reserved_one_bit | u(1) |
| avc_base_codec_flag | u(1) |
| scalability_mask | u(16) |
| for( i = 0; i <NumScalabilityTypes; i++ ) { | |
| dimension_id_len_minus1[ i ] | u(3) |
| } | |
| vps_nuh_layer_id_present_flag | u(1) |
| // layer specific information | |
| for( i = 1; i <= vps_max_layers_minus1; i++ ) { | |
| // mapping of layer ID to scalability dimension IDs | |
| if( vps_nuh_layer_id_present_flag ) | |
| layer_id_in_nuh[ i ] | u(6) |
| for( j = 0; j <= num_dimensions_minus1; j++ ) | |
| dimension_id[ i ][ j ] | u(v) |
| } | |
| for( i = 1; i <= vps_max_layers_minus1 ; i++ ) | |
| profile_tier_level( 1, vps_max_sub_layers_minus1 ) | |
| for( i = 1; i <= vps_max_layers_minus1; i++ ) { | |
| // layer dependency information signaling | |
| layer_dependency_map[i] | u(v) |
| } | |
| } | |

Video Parameter Set Extension Syntax

| vps_extension() { | Descriptor |
|---|---|
|   while( !byte_aligned( ) ) | |
|     vps_extension_byte_alignment_reserved_one_bit | u(1) |
|   avc_base_codec_flag | u(1) |
|   scalability_mask | u(16) |
|   for( i = 0; i <NumScalabilityTypes; i++) { | |
|     dimension_id_len_minus1[ i ] | u(3) |
|   } | |
|   vps_nuh_layer_id_present_flag | u(1) |
|   // layer specific information | |
|   for( i = 1; i <= vps_max_layers_minus1; i++ ) { | |
|     // mapping of layer ID to scalability dimension IDs | |
|     if( vps_nuh_layer_id_present_flag ) | |
|       layer_id_in_nuh[ i ] | u(6) |
|     for( j = 0; j <= num_dimensions_minus1; j++ ) | |
|       dimension_id[ i ][ j ] | u(v) |
|   } | |
|   for( i = 1; i <= vps_max_layers_minus1 ; i++ ) | |
|     profile_tier_level( 1, vps_max_sub_layers_minus1 ) | |
|   layer_dependency_information_pattern | u(v) |
|   for( i = 1; i <= NumDepLayers; i++ ) | |
|     layer_dependency_map[i] | u(v) |
| } | |

Video Parameter Set Extension Syntax

| vps_extension( ) { | Descriptor |
|---|---|
|   while( !byte_aligned( ) ) | |
|     vps_extension_byte_alignment_reserved_one_bit | u(1) |
|   avc_base_codec_flag | u(1) |
|   scalability_mask | u(16) |
|   for( i = 0; i <NumScalabilityTypes; i++) { | |
|     dimension_id_len_minus1[ i ] | u(3) |
|   } | |
|   vps_nuh_layer_id_present_flag | u(1) |
|   // layer specific information | |
|   for( i = 1; i <= vps_max_layers_minus1; i++ ) { | |
|     // mapping of layer ID to scalability dimension IDs | |
|     if( vps_nuh_layer_id_present_flag ) | |
|       layer_id_in_nuh[ i ] | u(6) |
|     for( j = 0; j <= num_dimensions_minus1; j++) | |
|       dimension_id[ i ][ j ] | u(v) |
|   } | |
|   for( i = 1; i <= vps_max_layers_minus1 ; i++) | |
|     profile_tier_level( 1, vps_max_sub_layers_minus1 ) | |
|   layer_dependency_information_pattern | u(v) |
|   for( i = 1; i <= vps_max_layers_minus1; i++ ) { | |
|     if(layer_dependency_information_pattern(i)) { | |
|     // layer dependency information signaling | |
|     num_direct_ref_layers[ i ] | u(6) |
|     for( j = 0; j < num_direct_ref_layers[ i ]; j++ ) | |
|       ref_layer_id[ i ][ j ] | u(6) |
|     } | |
|   } | |
| } | |

Video Parameter Set Extension Syntax

| vps_extension( ) { | Descriptor |
|---|---|
|   while( !byte_aligned( ) ) | |
|     vps_extension_byte_alignment_reserved_one_bit | u(1) |
|   avc_base_codec_flag | u(1) |
|   scalability_mask | u(16) |
|   for( i = 0; i <NumScalabilityTypes; i++) { | |
|     dimension_id_len_minus1[ i ] | u(3) |
|   } | |
|   vps_nuh_layer_id_present_flag | u(1) |
|   // layer specific information | |
|   for( i = 1; i <= vps_max_layers_minus1; i++) { | |
|     // mapping of layer ID to scalability dimension IDs | |
|     if( vps_nuh_layer_id_present_flag) | |
|       layer_id_in_nuh[ i ] | u(6) |
|     for( j = 0; j <= num_dimensions_minus1; j++) | |
|       dimension_id[ i ][ j ] | u(v) |
|   } | |
|   for( i = 1; i <= vps_max_layers_minus1 ; i++) | |
|     profile_tier_level( 1, vps_max_sub_layers_minus1 ) | |
|   layer_dependency_information_pattern | u(v) |
|   for( i = 1; i <= vps_max_layers_minus1; i++) { | |
|     if(layer_dependency_information_pattern(i)) { | |
|       layer_dependency_map[i] | u(v) |
|   } | |
| } | |

Video Parameter Set Extension Syntax

| vps_extension() { | Descriptor |
|---|---|
| while( !byte_aligned( ) ) | |
|    vps_extension_byte_alignment_reserved_one_bit | u(1) |
| avc_base_layer_flag | u(1) |
| splitting_flag | u(1) |
| for( i = 0, NumScalabilityTypes = 0; i < 16; i++ ) { | |
|    scalability_mask[ i ] | u(1) |
|    NumScalabilityTypes += scalability_mask[ i ] | |
| } | |
| for( j = 0; j <NumScalabilityTypes; j++ ) | |
|    dimension_id_len_minus1[ j ] | u(3) |
| ... | |
| num_output_layer_sets | ue(v) |
| for( i = 0; i < num_output_layer_sets; i++ ) { | |
|    output_layer_set_idx[ i ] | ue(v) |
|    lsIdx = output_layer_set_idx[ i ] | |
|    for( j = 0 ; j <= vps_max_layer_id; j++ ) | |
|      if( layer_id_included_flag[ lsIdx ][ j ] ) | |
|        output_layer_flag[ lsIdx ][ j ] | u(1) |
| } | |
| num_op_dpb_info_parameters | ue(v) |
| for( i = 0; i < num_op_dpb_info_parameters; i++ ) { | |
|    operation_point_layer_set_idx[i] | ue(v) |
|    for( j = 0; j <= vps_max_layer_id; j++ ) | |
|      op_dpb_info_parameters(j) | |
| } | |
| for( i = 1; i <= vps_max_layers_minus1; i++ ) { | |
|    for( j = 0; j < i; j++ ) | |
|      direct_dependency_flag[ i ][ j ] | u(1) |
| } | |

| vps_extension( ) { | Descriptor |
|---|---|
| while( !byte_aligned( ) ) | |
| vps_extension_byte_alignment_reserved_one_bit | u(1) |
| avc_base_layer_flag | u(1) |
| splitting_flag | u(1) |
| for( i = 0, NumScalabilityTypes = 0; i < 16; i++) { | |
| scalability_mask[ i ] | u(1) |
| NumScalabilityTypes += scalability_mask[ i ] | |
| } | |
| for( j = 0; j < NumScalabilityTypes; j++) | |
| dimension_id_len_minus1[ j ] | u(3) |
| ... | |
| num_output_layer_sets | ue(v) |
| for( i = 0; i < num_output_layer_sets; i++) { | |
| output_layer_set_idx[ i ] | ue(v) |
| lsIdx = output_layer_set_idx[ i ] | |
| for( j = 0 ; j <= vps_max_layer_id; j++) | |
| if( layer_id_included_flag[ lsIdx ][ j ] ) | |
| output_layer_flag[ lsIdx ][ j ] | u(1) |
| } | |
| num_op_dpb_info_parameters | ue(v) |
| for( i = 0; i < num_op_dpb_info_parameters; i++) { | |
| operation_point_layer_set_idx[i] | ue(v) |
| for( j = 0; j <= vps_max_layer_id; j++) | |
| op_dpb_info_parameters(i,j) | |
| } | |
| for( i = 1; i <= vps_max_layers_minus1; i++) { | |
| for( j = 0; j < i; j++) | |
| direct_dependency_flag[ i ][ j ] | u(1) |
| } | |

| op_dpb_info_parameters(j) { | |
|---|---|
| vps_max_sub_layers_minus1[ j ] | u(3) |
| vps_sub_layer_ordering_info_present_flag[ j ] | u(1) |
| for( k = ( vps_sub_layer_ordering_info_present_flag[ j ] ? 0 : vps_max_sub_layers_minus1[ j ] ); k <= vps_max_sub_layers_minus1[ j ]; k++) { | |
| vps_max_dec_pic_buffering_minus1[ j ][ k ] | ue(v) |
| vps_max_num_reorder_pics[ j ][ k ] | ue(v) |
| vps_max_latency_increase_plus1[ j ][ k ] | ue(v) |
| } | |
| } | |

| op_dpb_info_parameters( id, j ) { | |
|---|---|
| vps_max_sub_layers_minus1[ id ][ j ] | u(3) |
| vps_sub_layer_ordering_info_present_flag[ id ][ j ] | u(1) |
| for( k = ( vps_sub_layer_ordering_info_present_flag[ id ][ j ] ? 0 : vps_max_sub_layers_minus1[ id ][ j ] ); k <= vps_max_sub_layers_minus1[ id ][ j ]; k++ ) { | |
| vps_max_dec_pic_buffering_minus1[ id ][ j ][ k ] | ue(v) |
| vps_max_num_reorder_pics[ id ][ j ][ k ] | ue(v) |
| vps_max_latency_increase_plus1[ id ][ j ][ k ] | ue(v) |
| } | |
| } | |

| vps_extension( ) { | Descriptor |
|---|---|
| while( !byte_aligned( ) ) | |
| vps_extension_byte_alignment_reserved_one_bit | u(1) |
| avc_base_layer_flag | u(1) |
| splitting_flag | u(1) |
| for( i = 0, NumScalabilityTypes = 0; i < 16; i++ ) { | |
| scalability_mask[ i ] | u(1) |
| NumScalabilityTypes += scalability_mask[ i ] | |
| } | |
| for( j = 0; j < NumScalabilityTypes; j++ ) | |
| dimension_id_len_minus1[ j ] | u(3) |
| ... | |
| num_output_layer_sets | ue(v) |
| for( i = 0; i < num_output_layer_sets; i++ ) { | |
| output_layer_set_idx[ i ] | ue(v) |
| lsIdx = output_layer_set_idx[ i ] | |
| for( j = 0 ; j <= vps_max_layer_id; j++ ) | |
| if( layer_id_included_flag[ lsIdx ][ j ] ) | |
| output_layer_flag[ lsIdx ][ j ] | u(1) |
| } | |
| num_dpb_info_parameters | ue(v) |
| for( i = 0; i < num_dpb_info_parameters; i++ ) { | |
| output_point_layer_set_idx[ i ] | ue(v) |
| opIsIdx = output_point_layer_set_idx[ i ] | |
| for( j = 0 ; j <= vps_max_layer_id; j++ ) | |
| oop_dpb_info_parameters(j) | |
| } | |
| for( i = 1; i <= vps_max_layers_minus1; i++ ) | |
| for( j = 0; j < i; j++ ) | |
| direct_dependency_flag[ i ][ j ] | u(1) |
| } | |

| oop_dpb_info_parameters(j) { | |
|---|---|
| vps_max_sub_layers_minus1[ j ] | u(3) |
| vps_sub_layer_ordering_info_present_flag[ j ] | u(1) |
| for( k = ( vps_sub_layer_ordering_info_present_flag[ j ] ? 0 : vps_max_sub_layers_minus1[ j ] ); k <= vps_max_sub_layers_minus1[ j ]; k++ ) { | |
| vps_max_dec_pic_buffering_minus1[ j ][ k ] | ue(v) |
| vps_max_num_reorder_pics[ j ][ k ] | ue(v) |
| vps_max_latency_increase_plus1[ j ][ k ] | ue(v) |
| } | |
| } | |

| oop_dpb_info_parameters() { | |
|---|---|
| vps_max_sub_layers_minus1 | u(3) |
| vps_sub_layer_ordering_info_present_flag | u(1) |
| for( k = ( vps_sub_layer_ordering_info_present_flag ? 0 : vps_max_sub_layers_minus1 ); k <= vps_max_sub_layers_minus1; k++ ) { | |
| vps_max_dec_pic_buffering_minus1 [ k ] | ue(v) |
| vps_max_num_reorder_pics [ k ] | ue(v) |
| vps_max_latency_increase_plus1 [ k ] | ue(v) |
| } | |
| } | |

| num_dpb_info_parameters | ue(v) |
|---|---|
| for( i = 0; i < num_dpb_info_parameters; i++ ) { | |
| output_point_layer_set_idx[i] | ue(v) |
| oplsIdx=output_point_layer_set_idx[i] | |
| for( j = 0; j <= vps_max_layer_id; j++ ) | |
| oop_dpb_info_parameters() | |
| } | |

| oop_dpb_info_parameters( id, j ) { | |
|---|---|
| vps_max_sub_layers_minus1[ id ][ j ] | u(3) |
| vps_sub_layer_ordering_info_present_flag[ id ][ j ] | u(1) |
| for( k = ( vps_sub_layer_ordering_info_present_flag[ id ][ j ] ? 0 : vps_max_sub_layers_minus1[ id ][ j ] ); k <= vps_max_sub_layers_minus1[ id ][ j ]; k++ ) { | |
| vps_max_dec_pic_buffering_minus1[ id ][ j ][ k ] | ue(v) |
| vps_max_num_reorder_pics[ id ][ j ][ k ] | ue(v) |
| vps_max_latency_increase_plus1[ id ][ j ][ k ] | ue(v) |
| } | |
| } | |

FIG. 41

| | |
|---|---|
| num_dpb_info_parameters | ue(v) |
| for( i = 0; i < num_dpb_info_parameters; i++ ) { | |
| output_point_layer_set_idx[i] | ue(v) |
| oplsIdx=output_point_layer_set_idx[i] | |
| for( j = 0; j <= vps_max_layer_id; j++ ) | |
| oop_dpb_info_parameters(oplsIdx,j) | |
| } | |

FIG. 42

| | |
|---|---|
| num_dpb_info_parameters | ue(v) |
| for( i = 0; i < num_dpb_info_parameters; i++ ) { | |
| output_point_layer_set_idx[i] | ue(v) |
| oplsIdx=output_point_layer_set_idx[i] | |
| for( j = 0; j <= vps_max_layer_id; j++ ) | |
| oop_dpb_info_parameters(i,j) | |
| } | |

FIG. 43

| vps_extension( ) { | Descriptor |
|---|---|
| while( !byte_aligned( ) ) | |
| vps_extension_byte_alignment_reserved_one_bit | u(1) |
| avc_base_layer_flag | u(1) |
| splitting_flag | u(1) |
| for( i = 0, NumScalabilityTypes = 0; i < 16; i++ ) { | |
| scalability_mask[ i ] | u(1) |
| NumScalabilityTypes += scalability_mask[ i ] | |
| } | |
| for( j = 0; j <NumScalabilityTypes; j++ ) | |
| dimension_id_len_minus1[ j ] | u(3) |
| ... | |
| for( i = 1; i <= vps_max_layers_minus1; i++ ) { | |
| for( j = 0; j < i; j++ ) | |
| direct_dependency_flag[ i ][ j ] | u(1) |
| for( i = 1; i <= vps_max_layers_minus1; i++ ) { | |
| layer_dpb_info(i) | |
| } | |
| } | |

| layer_dpb_info (i) { | |
|---|---|
| vps_max_sub_layers_minus1[ i ] | u(3) |
| vps_sub_layer_ordering_info_present_flag[ i ] | u(1) |
| for( k = ( vps_sub_layer_ordering_info_present_flag[ i ] ? 0 : vps_max_sub_layers_minus1[ i ] ); k <= vps_max_sub_layers_minus1[ i ]; k++ ) { | |
| vps_max_dec_pic_buffering_minus1[ i ][ k ] | ue(v) |
| vps_max_num_reorder_pics[ i ][ k ] | ue(v) |
| vps_max_latency_increase_plus1[ i ][ k ] | ue(v) |
| } | |
| } | |

| oop_dpb_info_parameters(id) / op_dpb_info_parameters( id)/ layer_dpb_info(id) { | |
|---|---|
| vps_sub_layer_ordering_info_present_flag[id] | u(1) |
| for( i = ( vps_sub_layer_ordering_info_present_flag ? 0 : vps_max_sub_layers_minus1 ); i <= vps_max_sub_layers_minus1; i++ ) { | |
| vps_max_dec_pic_buffering_minus1[id][ i ] | ue(v) |
| vps_max_num_reorder_pics[id][ i ] | ue(v) |
| vps_max_latency_increase_plus1[id][ i ] | ue(v) |
| } | |
| } | |

BASE LAYER

SPS+

PPS+

ENHANCEMENT LAYER 0

SPS+

PPS+

ENHANCEMENT LAYER 1

SPS+

PPS+

ENHANCEMENT LAYER 2

SPS+

PPS+

[Fig. 46]

PRIOR ART

[Fig. 47]

PRIOR ART

Illustration where only a subset of reference layer pictures
is used for inter-layer sample value prediction.

[Fig. 52]

*Illustration where a subset of reference layer pictures with TemporalId
less than equal to t being used for inter-layer sample value prediction*

[Fig. 53]

*Illustration where a subset of reference layer pictures with NALU type belonging to a pre-determined subset "N" is used for inter-layer sample value prediction*

| | Descriptor |
|---|---|
| vps_extension( ) { | |
|   while( !byte_aligned( ) ) | |
|     vps_extension_byte_alignment_reserved_one_bit | u(1) |
|   avc_base_layer_flag | u(1) |
|   splitting_flag | u(1) |
|   for( i = 0, NumScalabilityTypes = 0; i < 16; i++ ) { | |
|     scalability_mask[ i ] | u(1) |
|     NumScalabilityTypes += scalability_mask[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 0; i <= vps_max_layers_minus1; i++) { | |
|     if( vps_nuh_layer_id_present_flag && i > 0 ) [Ed. (JB): syntax is not compatible with SHVC, or use of splitting_flag.] | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
|   } | |
|   for( i = 1; i <= vps_max_layers_minus1; i++) | |
|     for( j = 0; j < i; j++) | |
|       direct_dependency_flag[ i ][ j ] | u(1) |
|   for( i = 0; i< vps_max_layers_minus1; i++ ) | |
|     max_tid_il_ref_pics_plus1[ i ] | u(3) |
|   vps_number_layer_sets_minus1 | u(10) |
|   vps_num_profile_tier_level_minus1 | u(6) |
|   for( i = 1; i <= vps_num_profile_tier_level_minus1; i ++ ) { | |
|     vps_profile_present_flag[ i ] | u(1) |
|     if( !vps_profile_present_flag[ i ] ) | |
|       profile_ref_minus1[ i ] | u(6) |
|     profile_tier_level( vps_profile_present_flag[ i ], vps_max_sub_layers_minus1 ) | |
|   } | |
|   numOutputLayerSets = vps_number_layer_sets_minus1 + 1 | |
|   more_output_layer_sets_than_default_flag | u(1) |
|   if( more_output_layer_sets_than_default_flag ) { | |
|     num_add_output_layer_sets_minus1 | u(10) |
|     numOutputLayerSets += num_add_output_layer_sets_minus1 + 1 | |
|   } | |

| | |
|---|---|
| if( numOutputLayerSets > 1 ) | |
|   default_one_target_output_layer_flag | u(1) |
|   for( i = 1; i < numOutputLayerSets; i++ ) { | |
|     if( i > vps_number_layer_sets_minus1 ) { | |
|       output_layer_set_idx_minus1[ i ] | u(v) |
|       lsIdx = output_layer_set_idx_minus1[ i ] + 1 | |
|       for( j = 0 ; j < NumLayersInIdList[ lsIdx ] − 1; j++) | |
|         output_layer_flag[ i ][ j ] | u(1) |
|     } | |
|     profile_level_tier_idx[ i ] | u(v) |
|   } | |
| max_one_active_ref_layer_flag | u(1) |
| direct_dep_type_len_minus2 | ue(v) |
| for( i = 1; i <= vps_max_layers_minus1; i++ ) | |
|   for( j = 0; j < i; j++ ) | |
|     if( direct_dependency_flag[ i ][ j ] ) | |
|       direct_dependency_type[ i ][ j ] | u(v) |
| single_layer_for_non_irap_flag | u(1) |
| } | |

| | Descriptor |
|---|---|
| slice_segment_header( ) { | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   ... | |
|   if( sps_temporal_mvp_enabled_flag ) | |
|     slice_temporal_mvp_enabled_flag | u(1) |
|   } | |
|   if( nuh_layer_id > 0 && NumDirectRefLayers[ nuh_layer_id ] > 0 ) { | |
|     inter_layer_pred_enabled_flag | u(1) |
|     if( inter_layer_pred_enabled_flag && NumDirectRefLayers[ nuh_layer_id ] > 1) { | |
|       if( !max_one_active_ref_layer_flag ) | |
|         num_inter_layer_ref_pics_minus1 | u(v) |
|       for( i = 0; i < NumActiveRefLayerPics; i++ ) | |
|         inter_layer_pred_layer_idc[ i ] | u(v) |
|     } | |
|   } | |
|   if( NumSamplePredRefLayers[ nuh_layer_id ] > 0 && NumActiveRefLayerPics > 0 ) | |
|     inter_layer_sample_pred_only_flag | u(1) |
|   ... | |
|   byte_alignment() | |
| } | |

| vps_extension( ) { | Descriptor |
|---|---|
| while( !byte_aligned( ) ) | |
| vps_extension_byte_alignment_reserved_one_bit | u(1) |
| avc_base_layer_flag | u(1) |
| splitting_flag | u(1) |
| ... | u(1) |
| for( i = 0; i< vps_max_layers_minus1; i++ ) | |
| max_tid_il_ref_pics_plus1[ i ] | u(3) |
| for( i = 0; i< vps_max_layers_minus1; i++ ) | |
| no_sub_layer_non_ref_inter_layer_sample_pred_flag[ i ] | u(1) |
| ... | |

| vps_extension( ) { | Descriptor |
|---|---|
| while( !byte_aligned( ) ) | |
| vps_extension_byte_alignment_reserved_one_bit | u(1) |
| avc_base_layer_flag | u(1) |
| splitting_flag | u(1) |
| ... | u(1) |
| for( i = 0; i< vps_max_layers_minus1; i++ ) | |
| max_tid_il_ref_pics_plus1[ i ] | u(3) |
| for( i = 0; i< vps_max_layers_minus1; i++ ) | |
| for(j=0;j< max_tid_il_ref_pics_plus1[ i ];j++) | |
| no_sub_layer_non_ref_inter_layer_sample_pred_tid_flag[ i ][ j ] | u(1) |
| ... | |

| vps_extension( ) { | Descriptor |
|---|---|
| while( !byte_aligned( ) ) | |
| vps_extension_byte_alignment_reserved_one_bit | u(1) |
| avc_base_layer_flag | u(1) |
| splitting_flag | u(1) |
| ... | u(1) |
| for( i = 0; i< vps_max_layers_minus1; i++ ) | |
| max_tid_il_ref_pics_plus1[ i ] | u(3) |
| for( i = 0; i< vps_max_layers_minus1; i++ ) | |
| for(j=0;j< 7;j++) | |
| no_sub_layer_non_ref_inter_layer_sample_pred_tid_flag[ i ][ j ] | u(1) |
| ... | |

| vps_extension( ) { | Descriptor |
|---|---|
| while( !byte_aligned( ) ) | |
| vps_extension_byte_alignment_reserved_one_bit | u(1) |
| avc_base_layer_flag | u(1) |
| splitting_flag | u(1) |
| ... | u(1) |
| for( i = 0; i< vps_max_layers_minus1; i++ ) | |
| max_tid_il_ref_pics_plus1[ i ] | u(3) |
| for( i = 0; i< vps_max_layers_minus1; i++ ) | |
| no_sub_layer_non_ref_inter_layer_sample_pred_tid_flag[ i ] | u(1) |
| ... | |

| vps_extension( ) { | Descriptor |
|---|---|
| while( !byte_aligned( ) ) | |
| vps_extension_byte_alignment_reserved_one_bit | u(1) |
| avc_base_layer_flag | u(1) |
| splitting_flag | u(1) |
| ... | u(1) |
| for( i = 0; i< vps_max_layers_minus1; i++ ) | |
| max_tid_il_ref_pics_plus1[ i ] | u(3) |
| for( i = 0; i< vps_max_layers_minus1; i++ ) | |
| if(!max_tid_il_ref_pics_plus1[ i ]) | |
| no_sub_layer_non_ref_inter_layer_sample_pred_tid_flag[ i ] | u(1) |
| ... | |

| vps_extension( ) { | Descriptor |
|---|---|
| while( !byte_aligned( ) ) | |
| vps_extension_byte_alignment_reserved_one_bit | u(1) |
| avc_base_layer_flag | u(1) |
| splitting_flag | u(1) |
| ... | u(1) |
| for( i = 0; i< vps_max_layers_minus1; i++ ) | |
| max_tid_il_ref_pics_plus1[ i ] | u(3) |
| for( i = 0; i< vps_max_layers_minus1; i++ ) | |
| if(max_tid_il_ref_pics_plus1[ i ]!=0) | |
| no_sub_layer_non_ref_inter_layer_sample_pred_tid_flag[ i ] | u(1) |
| ... | |

| vps_extension( ) { | Descriptor |
|---|---|
| while( !byte_aligned( ) ) | |
| vps_extension_byte_alignment_reserved_one_bit | u(1) |
| avc_base_layer_flag | u(1) |
| splitting_flag | u(1) |
| ... | u(1) |
| for( i = 0; i< vps_max_layers_minus1; i++ ) | |
| max_tid_il_ref_pics_plus1[ i ] | u(3) |
| for( i = 0; i< vps_max_layers_minus1; i++ ) | |
| for(j=0;j<= ((max_tid_il_ref_pics_plus1[ i ]==7) ? vps_max_sub_layers_minus1: max_tid_il_ref_pics_plus1[ i ]-1;j++) | |
| no_sub_layer_non_ref_inter_layer_sample_pred_tid_flag[ i ][ j ] | u(1) |
| ... | |

| Level | Max luma reference layer MC sample rate MaxRefLyrMCLumaSr (samples/sec) |
|---|---|
| 1 | 276 480 |
| 2 | 1 843 200 |
| 2.1 | 3 686 400 |
| 3 | 8 294 400 |
| 3.1 | 16 588 800 |
| 4 | 33 423 360 |
| 4.1 | 66 846 720 |
| 5 | 133 693 440 |
| 5.1 | 267 386 880 |
| 5.2 | 534 773 760 |
| 6 | 534 773 760 |
| 6.1 | 1 069 547 520 |
| 6.2 | 2 139 095 040 |

| Level: | | | | 1 | 2 | 2.1 | 3 | 3.1 | 4 | 4.1 |
|---|---|---|---|---|---|---|---|---|---|---|
| Max luma picture size (samples): | | | | 36 864 | 122 880 | 245 760 | 552 960 | 983 040 | 2 228 224 | 2 228 224 |
| Max luma sample rate (samples/sec) | | | | 552 960 | 3 686 400 | 7 372 800 | 16 588 800 | 33 177 600 | 66 846 720 | 133 693 440 |
| Max reference layer MC luma sample rate (samples/sec) | | | | 276 480 | 1 843 200 | 3 686 400 | 8 294 400 | 16 588 800 | 33 423 360 | 66 846 720 |
| Format nickname | Luma width | Luma height | Luma picture size | | | | | | | |
| SQCIF | 128 | 96 | 16 384 | 16.9 | 112.5 | 150.0 | 150.0 | 150.0 | 150.0 | 150.0 |
| QCIF | 176 | 144 | 36 864 | 7.5 | 50.0 | 100.0 | 150.0 | 150.0 | 150.0 | 150.0 |
| QVGA | 320 | 240 | 81 920 | - | 22.5 | 45.0 | 101.3 | 150.0 | 150.0 | 150.0 |
| 525 SIF | 352 | 240 | 98 304 | - | 18.8 | 37.5 | 84.4 | 150.0 | 150.0 | 150.0 |
| CIF | 352 | 288 | 122 880 | - | 15.0 | 30.0 | 67.5 | 135.0 | 150.0 | 150.0 |
| 525 HHR | 352 | 480 | 196 608 | - | - | 18.8 | 42.2 | 84.4 | 150.0 | 150.0 |
| 625 HHR | 352 | 576 | 221 184 | - | - | 16.7 | 37.5 | 75.0 | 150.0 | 150.0 |
| Q720p | 640 | 360 | 245 760 | - | - | 15.0 | 33.8 | 67.5 | 135.0 | 150.0 |
| VGA | 640 | 480 | 327 680 | - | - | - | 25.3 | 50.6 | 102.0 | 150.0 |
| 525 4SIF | 704 | 480 | 360 448 | - | - | - | 23.0 | 46.0 | 92.7 | 150.0 |
| 525 SD | 720 | 480 | 393 216 | - | - | - | 21.1 | 42.2 | 85.0 | 150.0 |
| 4CIF | 704 | 576 | 405 504 | - | - | - | 20.5 | 40.9 | 82.4 | 150.0 |
| 625 SD | 720 | 576 | 442 368 | - | - | - | 18.8 | 37.5 | 75.6 | 150.0 |
| 480p (16:9) | 864 | 480 | 458 752 | - | - | - | 18.1 | 36.2 | 72.9 | 145.7 |
| SVGA | 800 | 600 | 532 480 | - | - | - | 15.6 | 31.2 | 62.8 | 125.5 |
| QHD | 960 | 540 | 552 960 | - | - | - | 15.0 | 30.0 | 60.4 | 120.9 |
| XGA | 1024 | 768 | 786 432 | - | - | - | - | 21.1 | 42.5 | 85.0 |
| 720p HD | 1280 | 720 | 983 040 | - | - | - | - | 16.9 | 34.0 | 68.0 |
| 4VGA | 1280 | 960 | 1 228 800 | - | - | - | - | - | 27.2 | 54.4 |
| SXGA | 1280 | 1024 | 1 310 720 | - | - | - | - | - | 25.5 | 51.0 |
| 525 16SIF | 1408 | 960 | 1 351 680 | - | - | - | - | - | 24.7 | 49.5 |
| 16CIF | 1408 | 1152 | 1 622 016 | - | - | - | - | - | 20.6 | 41.2 |
| 4SVGA | 1600 | 1200 | 1 945 600 | - | - | - | - | - | 17.2 | 34.4 |
| 1080 HD | 1920 | 1080 | 2 088 960 | - | - | - | - | - | 16.0 | 32.0 |
| 2Kx1K | 2048 | 1024 | 2 097 152 | - | - | - | - | - | 15.9 | 31.9 |
| 2Kx1080 | 2048 | 1080 | 2 228 224 | - | - | - | - | - | 15.0 | 30.0 |
| 4XGA | 2048 | 1536 | 3 145 728 | - | - | - | - | - | - | - |
| 16VGA | 2560 | 1920 | 4 915 200 | - | - | - | - | - | - | - |
| 3616x1536 (2.35:1) | 3616 | 1536 | 5 603 328 | - | - | - | - | - | - | - |
| 3672x1536 (2.39:1) | 3680 | 1536 | 5 701 632 | - | - | - | - | - | - | - |
| 3840x2160 (4*HD) | 3840 | 2160 | 8 355 840 | - | - | - | - | - | - | - |
| 4Kx2K | 4096 | 2048 | 8 388 608 | - | - | - | - | - | - | - |
| 4096x2160 | 4096 | 2160 | 8 912 896 | - | - | - | - | - | - | - |
| 4096x2304 (16:9) | 4096 | 2304 | 9 437 184 | - | - | - | - | - | - | - |
| 7680x4320 | 7680 | 4320 | 33 423 360 | - | - | - | - | - | - | - |
| 8192x4096 | 8192 | 4096 | 33 554 432 | - | - | - | - | - | - | - |
| 8192x4320 | 8192 | 4320 | 35 651 584 | - | - | - | - | - | - | - |

| Level: | | | | 5 | 5.1 | 5.2 | 6 | 6.1 | 6.2 |
|---|---|---|---|---|---|---|---|---|---|
| Max luma picture size (samples): | | | | 8 912 896 | 8 912 896 | 8 912 896 | 35 651 584 | 35 651 584 | 35 651 584 |
| Max luma sample rate (samples/sec) | | | | 267 386 880 | 534 773 760 | 1 069 547 520 | 1 069 547 520 | 2 139 095 040 | 4 278 190 080 |
| Max refrence layer MC luma sample rate (samples/sec) | | | | 133 693 440 | 267 386 880 | 534 773 760 | 534 773 760 | 1 069 547 520 | 2 139 095 040 |
| Format nickname | Luma width | Luma height | Luma picture size | | | | | | |
| SQCIF | 128 | 96 | 16 384 | 150.0 | 150.0 | 150.0 | 150.0 | 150.0 | 150.0 |
| QCIF | 176 | 144 | 36 864 | 150.0 | 150.0 | 150.0 | 150.0 | 150.0 | 150.0 |
| QVGA | 320 | 240 | 81 920 | 150.0 | 150.0 | 150.0 | 150.0 | 150.0 | 150.0 |
| 525 SIF | 352 | 240 | 98 304 | 150.0 | 150.0 | 150.0 | 150.0 | 150.0 | 150.0 |
| CIF | 352 | 288 | 122 880 | 150.0 | 150.0 | 150.0 | 150.0 | 150.0 | 150.0 |
| 525 HHR | 352 | 480 | 196 608 | 150.0 | 150.0 | 150.0 | 150.0 | 150.0 | 150.0 |
| 625 HHR | 352 | 576 | 221 184 | 150.0 | 150.0 | 150.0 | 150.0 | 150.0 | 150.0 |
| Q720p | 640 | 360 | 245 760 | 150.0 | 150.0 | 150.0 | 150.0 | 150.0 | 150.0 |
| VGA | 640 | 480 | 327 680 | 150.0 | 150.0 | 150.0 | 150.0 | 150.0 | 150.0 |
| 525 4SIF | 704 | 480 | 360 448 | 150.0 | 150.0 | 150.0 | 150.0 | 150.0 | 150.0 |
| 525 SD | 720 | 480 | 393 216 | 150.0 | 150.0 | 150.0 | 150.0 | 150.0 | 150.0 |
| 4CIF | 704 | 576 | 405 504 | 150.0 | 150.0 | 150.0 | 150.0 | 150.0 | 150.0 |
| 625 SD | 720 | 576 | 442 368 | 150.0 | 150.0 | 150.0 | 150.0 | 150.0 | 150.0 |
| 480p (16:9) | 864 | 480 | 458 752 | 150.0 | 150.0 | 150.0 | 150.0 | 150.0 | 150.0 |
| SVGA | 800 | 600 | 532 480 | 150.0 | 150.0 | 150.0 | 150.0 | 150.0 | 150.0 |
| QHD | 960 | 540 | 552 960 | 150.0 | 150.0 | 150.0 | 150.0 | 150.0 | 150.0 |
| XGA | 1024 | 768 | 786 432 | 150.0 | 150.0 | 150.0 | 150.0 | 150.0 | 150.0 |
| 720p HD | 1280 | 720 | 983 040 | 136.0 | 150.0 | 150.0 | 150.0 | 150.0 | 150.0 |
| 4VGA | 1280 | 960 | 1 228 800 | 108.8 | 150.0 | 150.0 | 150.0 | 150.0 | 150.0 |
| SXGA | 1280 | 1024 | 1 310 720 | 102.0 | 150.0 | 150.0 | 150.0 | 150.0 | 150.0 |
| 525 16SIF | 1408 | 960 | 1 351 680 | 98.9 | 150.0 | 150.0 | 150.0 | 150.0 | 150.0 |
| 16CIF | 1408 | 1152 | 1 622 016 | 82.4 | 150.0 | 150.0 | 150.0 | 150.0 | 150.0 |
| 4SVGA | 1600 | 1200 | 1 945 600 | 68.7 | 137.4 | 150.0 | 150.0 | 150.0 | 150.0 |
| 1080 HD | 1920 | 1080 | 2 088 960 | 64.0 | 128.0 | 150.0 | 150.0 | 150.0 | 150.0 |
| 2Kx1K | 2048 | 1024 | 2 097 152 | 63.8 | 127.5 | 150.0 | 150.0 | 150.0 | 150.0 |
| 2Kx1080 | 2048 | 1080 | 2 228 224 | 60.0 | 120.0 | 150.0 | 150.0 | 150.0 | 150.0 |
| 4XGA | 2048 | 1536 | 3 145 728 | 42.5 | 85.0 | 150.0 | 150.0 | 150.0 | 150.0 |
| 16VGA | 2560 | 1920 | 4 915 200 | 27.2 | 54.4 | 108.8 | 108.8 | 150.0 | 150.0 |
| 3616x1536 (2.35:1) | 3616 | 1536 | 5 603 328 | 23.9 | 47.7 | 95.4 | 95.4 | 150.0 | 150.0 |
| 3672x1536 (2.39:1) | 3680 | 1536 | 5 701 632 | 23.4 | 46.9 | 93.8 | 93.8 | 150.0 | 150.0 |
| 3840x2160 (4*HD) | 3840 | 2160 | 8 355 840 | 16.0 | 32.0 | 64.0 | 64.0 | 128.0 | 150.0 |
| 4Kx2K | 4096 | 2048 | 8 388 608 | 15.9 | 31.9 | 63.8 | 63.8 | 127.5 | 150.0 |
| 4096x2160 | 4096 | 2160 | 8 912 896 | 15.0 | 30.0 | 60.0 | 60.0 | 120.0 | 150.0 |
| 4096x2304 (16:9) | 4096 | 2304 | 9 437 184 | - | - | - | 56.7 | 113.3 | 150.0 |
| 4096x3072 | 4096 | 3072 | 12 582 912 | - | - | - | 42.5 | 85.0 | 150.0 |
| 7680x4320 | 7680 | 4320 | 33 423 360 | - | - | - | 16.0 | 32.0 | 64.0 |
| 8192x4096 | 8192 | 4096 | 33 554 432 | - | - | - | 15.9 | 31.9 | 63.8 |
| 8192x4320 | 8192 | 4320 | 35 651 584 | - | - | - | 15.0 | 30.0 | 60.0 |

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     if( num_extra_slice_header_bits > 0 ) | |
|       discardable_flag | u(1) |
|     for( i = 1; i < num_extra_slice_header_bits ; i++ ) | |
|       slice_reserved_flag[ i ] | u(1) |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( nal_unit_type != IDR_W_RADL && nal_unit_type != IDR_N_LP ) { | |
|       slice_pic_order_cnt_lsb | u(v) |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else if( num_short_term_ref_pic_sets > 1 ) | |
|         short_term_ref_pic_set_idx | u(v) |
|       if( long_term_ref_pics_present_flag ) { | |
|         if( num_long_term_ref_pics_sps > 0 ) | |
|           num_long_term_sps | ue(v) |
|           num_long_term_pics | ue(v) |
|         for( i = 0; i < num_long_term_sps + num_long_term_pics; i++ ) { | |
|           if( i < num_long_term_sps ) { | |
|             if( num_long_term_ref_pics_sps > 1 ) | |
|               lt_idx_sps[ i ] | u(v) |
|           } else { | |
|             poc_lsb_lt[ i ] | u(v) |
|             used_by_curr_pic_lt_flag[ i ] | u(1) |
|           } | |
|           delta_poc_msb_present_flag[ i ] | u(1) |

| | |
|---|---|
| if( delta_poc_msb_present_flag[ i ] ) | |
|     delta_poc_msb_cycle_lt[ i ] | ue(v) |
|   } | |
| } | |
| if( sps_temporal_mvp_enabled_flag ) | |
|   slice_temporal_mvp_enabled_flag | u(1) |
| } | |
| if( nuh_layer_id > 0 && NumDirectRefLayers[ nuh_layer_id ] > 0 ) { | |
|   inter_layer_pred_enabled_flag | u(1) |
|   if( inter_layer_pred_enabled_flag && NumDirectRefLayers[ nuh_layer_id ] > 1 ) { | |
|     if( !max_one_active_ref_layer_flag ) | |
|       num_inter_layer_ref_pics_minus1 | u(v) |
|     for( i = 0; i < NumActiveRefLayerPics; i++ ) | |
|       inter_layer_pred_layer_idc[ i ] | u(v) |
|     } | |
|   } | |
| if( NumSamplePredRefLayers[ nuh_layer_id ] > 0 && NumActiveRefLayerPics > 0 ) | |
|   inter_layer_sample_pred_only_flag | u(1) |
| if( sample_adaptive_offset_enabled_flag ) { | |
|   slice_sao_luma_flag | u(1) |
|   slice_sao_chroma_flag | u(1) |
| } | |
| if( slice_type == P || slice_type == B ) { | |
|   num_ref_idx_active_override_flag | u(1) |
|   if( num_ref_idx_active_override_flag ) { | |
|     num_ref_idx_l0_active_minus1 | ue(v) |
|     if( slice_type == B ) | |
|       num_ref_idx_l1_active_minus1 | ue(v) |
|   } | |
|   if( lists_modification_present_flag && NumPocTotalCurr > 1 ) | |
|     ref_pic_lists_modification( ) | |
|   if( slice_type == B ) | |
|     mvd_l1_zero_flag | u(1) |
|   if( cabac_init_present_flag ) | |
|     cabac_init_flag | u(1) |
|   if( slice_temporal_mvp_enabled_flag ) { | |
|     if( nuh_layer_id > 0 && NumActiveMotionPredRefLayers > 0 ) | |
|       alt_collocated_indication_flag | u(1) |
|     if( alt_collocated_indication_flag ) | |

| | |
|---|---|
| if( NumActiveMotionPredRefLayers > 1 ) | |
|     collocated_ref_layer_idx | ue(v) |
| else { | |
|     if( slice_type == B ) | |
|         collocated_from_l0_flag | u(1) |
|     if( ( collocated_from_l0_flag && num_ref_idx_l0_active_minus1 > 0 ) \|\|<br>        ( !collocated_from_l0_flag && num_ref_idx_l1_active_minus1 > 0 ) ) | |
|         collocated_ref_idx | ue(v) |
|     } | |
| } | |
| if( ( weighted_pred_flag && slice_type == P ) \|\|<br>    ( weighted_bipred_flag && slice_type == B ) ) | |
|     pred_weight_table( ) | |
|     five_minus_max_num_merge_cand | ue(v) |
| } | |
| slice_qp_delta | se(v) |
| if( pps_slice_chroma_qp_offsets_present_flag ) { | |
|     slice_cb_qp_offset | se(v) |
|     slice_cr_qp_offset | se(v) |
| } | |
| if( deblocking_filter_override_enabled_flag ) | |
|     deblocking_filter_override_flag | u(1) |
| if( deblocking_filter_override_flag ) { | |
|     slice_deblocking_filter_disabled_flag | u(1) |
|     if( !slice_deblocking_filter_disabled_flag ) { | |
|         slice_beta_offset_div2 | se(v) |
|         slice_tc_offset_div2 | se(v) |
|     } | |
| } | |
| if( pps_loop_filter_across_slices_enabled_flag &&<br>    ( slice_sao_luma_flag \|\| slice_sao_chroma_flag \|\|<br>    !slice_deblocking_filter_disabled_flag ) ) | |
|     slice_loop_filter_across_slices_enabled_flag | u(1) |
| } | |
| if( tiles_enabled_flag \|\| entropy_coding_sync_enabled_flag ) { | |
|     num_entry_point_offsets | ue(v) |
|     if( num_entry_point_offsets > 0 ) { | |
|         offset_len_minus1 | ue(v) |
|         for( i = 0; i < num_entry_point_offsets; i++ ) | |
|             entry_point_offset_minus1[ i ] | u(v) |
|     } | |

[Fig. 63D]

| } | |
|---|---|
| if( slice_segment_header_extension_present_flag ) { | |
|    slice_segment_header_extension_length | ue(v) |
|    for( i = 0; i < slice_segment_header_extension_length; i++) | |
|      slice_segment_header_extension_data_byte[ i ] | u(8) |
| } | |
| byte_alignment( ) | |
| } | |
| | |

| vps_extension( ) { | Descriptor |
|---|---|
|   while( !byte_aligned( ) ) | |
|     vps_extension_byte_alignment_reserved_one_bit | u(1) |
|   avc_base_layer_flag | u(1) |
|   splitting_flag | u(1) |
|   for( i = 0, NumScalabilityTypes = 0; i < 16; i++ ) { | |
|     scalability_mask[ i ] | u(1) |
|     NumScalabilityTypes += scalability_mask[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 0; i <= vps_max_layers_minus1; i++ ) { | |
|     if( vps_nuh_layer_id_present_flag && i > 0 ) | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
|   } | |
|   for( i = 1; i <= vps_max_layers_minus1; i++ ) | |
|     for( j = 0; j < i; j++ ) | |
|       direct_dependency_flag[ i ][ j ] | u(1) |
|   for( i = 0; i < vps_max_layers_minus1; i++ ) | |
|     max_tid_il_ref_pics_plus1[ i ] | u(3) |
|   vps_number_layer_sets_minus1 | u(10) |
|   vps_num_profile_tier_level_minus1 | u(6) |
|   for( i = 1; i <= vps_num_profile_tier_level_minus1; i++ ) { | |
|     vps_profile_present_flag[ i ] | u(1) |
|     if( !vps_profile_present_flag[ i ] ) | |
|       profile_ref_minus1[ i ] | u(6) |
|     profile_tier_level( vps_profile_present_flag[ i ], vps_max_sub_layers_minus1 ) | |

| | |
|---|---|
| } | |
| numOutputLayerSets = vps_number_layer_sets_minus1 + 1 | |
| more_output_layer_sets_than_default_flag | u(1) |
| if( more_output_layer_sets_than_default_flag ) { | |
|    num_add_output_layer_sets_minus1 | u(10) |
|    numOutputLayerSets += num_add_output_layer_sets_minus1 + 1 | |
| } | |
| if( numOutputLayerSets > 1 ) | |
|    default_one_target_output_layer_flag | u(1) |
| for( i = 1; i < numOutputLayerSets; i++ ) { | |
|    if( i > vps_number_layer_sets_minus1 ) { | |
|      output_layer_set_idx_minus1[ i ] | u(v) |
|      lsIdx = output_layer_set_idx_minus1[ i ] + 1 | |
|      for( j = 0 ; j < NumLayersInIdList[ lsIdx ] − 1; j++) | |
|        output_layer_flag[ i ][ j ] | u(1) |
|    } | |
|    profile_level_tier_idx[ i ] | u(v) |
| } | |
| max_one_active_ref_layer_flag | u(1) |
| direct_dep_type_len_minus2 | ue(v) |
| for( i = 1; i <= vps_max_layers_minus1; i++ ) | |
|    for( j = 0; j < i; j++ ) | |
|      if( direct_dependency_flag[ i ][ j ] ) | |
|        direct_dependency_type[ i ][ j ] | u(v) |
| single_layer_for_non_irap_flag | u(1) |
| } | |

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   ... | |
|     if( sps_temporal_mvp_enabled_flag ) | |
|       slice_temporal_mvp_enabled_flag | u(1) |
|     } | |
|   if( nuh_layer_id > 0 && NumDirectRefLayers[ nuh_layer_id ] > 0 ) { | |
|     inter_layer_pred_enabled_flag | u(1) |
|     if( inter_layer_pred_enabled_flag && NumDirectRefLayers[ nuh_layer_id ] > 1) { | |
|       if( !max_one_active_ref_layer_flag ) | |
|         num_inter_layer_ref_pics_minus1 | u(v) |
|       if(NumActiveRefLayerPics!=NumDirectRefLayers[ nuh_layer_id ] ) { | |
|         for( i = 0; i < NumActiveRefLayerPics; i++ ) | |
|           inter_layer_pred_layer_idc[ i ] | u(v) |
|       } | |
|     } | |
|   } | |
|   if( NumSamplePredRefLayers[ nuh_layer_id ] > 0 && NumActiveRefLayerPics > 0 ) | |
|     inter_layer_sample_pred_only_flag | u(1) |
|   ... | |
|   byte_alignment( ) | |
| } | |

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   ... | |
|     if( sps_temporal_mvp_enabled_flag ) | |
|       slice_temporal_mvp_enabled_flag | u(1) |
|   } | |
|   if( nuh_layer_id > 0 && NumDirectRefLayers[ nuh_layer_id ] > 0 ) { | |
|     inter_layer_pred_enabled_flag | u(1) |
|     if( inter_layer_pred_enabled_flag && NumDirectRefLayers[ nuh_layer_id ] > 1) { | |
|       if( !max_one_active_ref_layer_flag ) | |
|         num_inter_layer_ref_pics_minus1 | u(v) |
|       for( i = (NumActiveRefLayerPics==NumDirectRefLayers[ nuh_layer_id ]) ? NumActiveRefLayerPics : 0); i < NumActiveRefLayerPics; i++ ) | |
|         inter_layer_pred_layer_idc[ i ] | u(v) |
|     } | |
|   } | |
|   if( NumSamplePredRefLayers[ nuh_layer_id ] > 0 && NumActiveRefLayerPics > 0 ) | |
|     inter_layer_sample_pred_only_flag | u(1) |
|   ... | |
|   byte_alignment( ) | |
| } | |

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   ... | |
|     if( sps_temporal_mvp_enabled_flag ) | |
|       slice_temporal_mvp_enabled_flag | u(1) |
|   } | |
|   if( nuh_layer_id > 0 && NumDirectRefLayers[ nuh_layer_id ] > 0 ) { | |
|     inter_layer_pred_enabled_flag | u(1) |
|     if( inter_layer_pred_enabled_flag && NumDirectRefLayers[ nuh_layer_id ] > 1) { | |
|       if( !max_one_active_ref_layer_flag ) | |
|         num_inter_layer_ref_pics_minus1 | u(v) |
|       for( i = 0; i < NumDirectRefLayers[ nuh_layer_id ]; i++ ) | |
|         inter_layer_pred_layer_mask[ i ] | u(1) |
|     } | |
|   } | |
|   if( NumSamplePredRefLayers[ nuh_layer_id ] > 0 && NumActiveRefLayerPics > 0 ) | |
|     inter_layer_sample_pred_only_flag | u(1) |
|   ... | |
|   byte_alignment( ) | |
| } | |

[Fig. 69]
FIG. 69
max_one_active_ref_layer_flag = 0
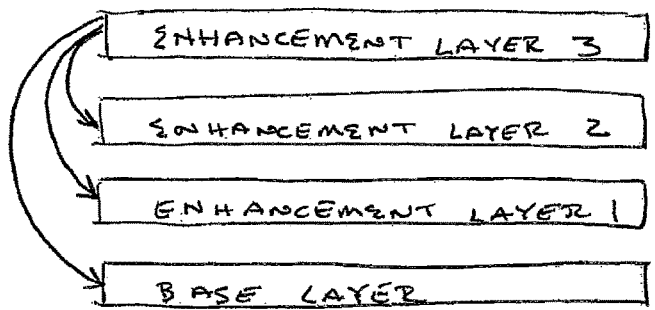
max_one_active_ref_layer_flag = 1
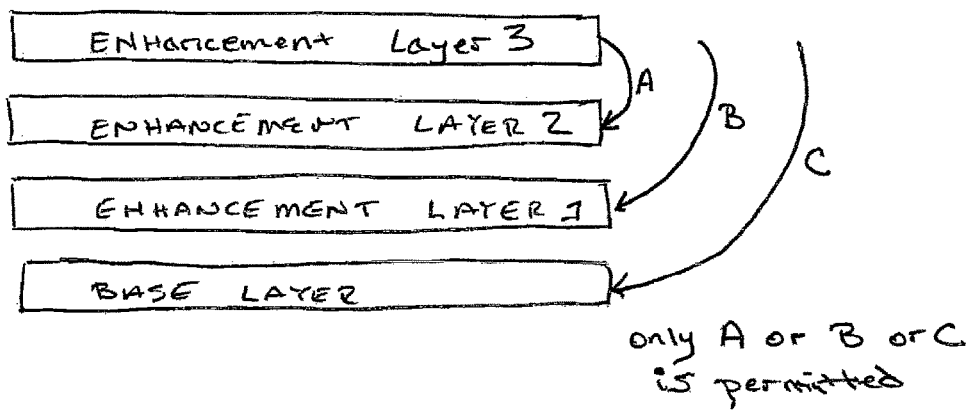
only A or B or C is permitted

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   ... | |
|     if( sps_temporal_mvp_enabled_flag ) | |
|       slice_temporal_mvp_enabled_flag | u(1) |
|   } | |
|   if(ilp_slice_signaling_enabled_flag) { | |
|     if( nuh_layer_id > 0 && NumDirectRefLayers[ nuh_layer_id ] > 0 ) { | |
|       inter_layer_pred_enabled_flag | u(1) |
|       if( inter_layer_pred_enabled_flag && NumDirectRefLayers[ nuh_layer_id ] > 1) { | |
|         if( !max_one_active_ref_layer_flag ) | |
|           num_inter_layer_ref_pics_minus1 | u(v) |
|         for( i = 0; i < NumActiveRefLayerPics; i++ ) | |
|           inter_layer_pred_layer_idc[ i ] | u(v) |
|       } | |
|     } | |
|   } | |
|   if( NumSamplePredRefLayers[ nuh_layer_id ] > 0 && NumActiveRefLayerPics > 0 ) | |
|     inter_layer_sample_pred_only_flag | u(1) |
|   ... | |
|   byte_alignment( ) | |
| } | |

FIG. 71

| vps_extension( ) { | Descriptor |
|---|---|
| while( !byte_aligned( ) ) | |
| vps_extension_byte_alignment_reserved_one_bit | u(1) |
| avc_base_layer_flag | u(1) |
| splitting_flag | u(1) |
| for( i = 0, NumScalabilityTypes = 0; i < 16; i++ ) { | |
| scalability_mask[ i ] | u(1) |
| NumScalabilityTypes += scalability_mask[ i ] | |
| } | |
| for( j = 0; j < ( NumScalabilityTypes − splitting_flag ); j++ ) | |
| dimension_id_len_minus1[ j ] | u(3) |
| vps_nuh_layer_id_present_flag | u(1) |
| for( i = 1; i <= vps_max_layers_minus1; i++ ) { | |
| if( vps_nuh_layer_id_present_flag ) | |
| layer_id_in_nuh[ i ] | u(6) |
| if( !splitting_flag ) | |
| for( j = 0; j < NumScalabilityTypes; j++ ) | |
| dimension_id[ i ][ j ] | u(v) |
| } | |
| for( i = 1; i <= vps_max_layers_minus1; i++ ) | |
| for( j = 0; j < i; j++ ) | |
| direct_dependency_flag[ i ][ j ] | u(1) |
| for( i = 0; i< vps_max_layers_minus1; i++ ) | |
| max_tid_il_ref_pics_plus1[ i ] | u(3) |
| if(nuh_layer_id>0) | |
| ilp_slice_signaling_enabled_flag | u(1) |
| ..... | |

| vps_extension( ) { | Descriptor |
|---|---|
|   while( !byte_aligned( ) ) | |
|     vps_extension_byte_alignment_reserved_one_bit | u(1) |
|   avc_base_layer_flag | u(1) |
|   splitting_flag | u(1) |
|   for( i = 0, NumScalabilityTypes = 0; i < 16; i++ ) { | |
|     scalability_mask[ i ] | u(1) |
|     NumScalabilityTypes += scalability_mask[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 1; i <= vps_max_layers_minus1; i++ ) { | |
|     if( vps_nuh_layer_id_present_flag ) | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
|   } | |
|   for( i = 1; i <= vps_max_layers_minus1; i++ ) | |
|     for( j = 0; j < i; j++ ) | |
|       direct_dependency_flag[ i ][ j ] | u(1) |
|   for( i = 0; i < vps_max_layers_minus1; i++ ) | |
|     max_tid_il_ref_pics_plus1[ i ] | u(3) |
|   ilp_slice_signaling_enabled_flag | u(1) |
|   ..... | |

| seq_parameter_set_rbsp( ) { | Descriptor |
|---|---|
| sps_video_parameter_set_id | u(4) |
| sps_max_sub_layers_minus1 | u(3) |
| sps_temporal_id_nesting_flag | u(1) |
| profile_tier_level( sps_max_sub_layers_minus1 ) | |
| sps_seq_parameter_set_id | ue(v) |
| chroma_format_idc | ue(v) |
| ... | |
| scaling_list_enabled_flag | u(1) |
| if( scaling_list_enabled_flag ) { | |
| sps_scaling_list_data_present_flag | u(1) |
| if( sps_scaling_list_data_present_flag ) | |
| scaling_list_data( ) | |
| } | |
| amp_enabled_flag | u(1) |
| sample_adaptive_offset_enabled_flag | u(1) |
| pcm_enabled_flag | u(1) |
| if(nuh_layer_id>0) | |
| ilp_slice_signaling_enabled_flag | u(1) |
| ... | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

| pic_parameter_set_rbsp() { | Descriptor |
|---|---|
| pps_pic_parameter_set_id | ue(v) |
| pps_seq_parameter_set_id | ue(v) |
| dependent_slice_segments_enabled_flag | u(1) |
| output_flag_present_flag | u(1) |
| num_extra_slice_header_bits | u(3) |
| sign_data_hiding_enabled_flag | u(1) |
| cabac_init_present_flag | u(1) |
| num_ref_idx_l0_default_active_minus1 | ue(v) |
| num_ref_idx_l1_default_active_minus1 | ue(v) |
| init_qp_minus26 | se(v) |
| pps_loop_filter_across_slices_enabled_flag | u(1) |
| .... | |
| if(nuh_layer_id>0) | |
|    ilp_slice_signaling_enabled_flag | u(1) |
| .... | |
| pps_extension_flag | u(1) |
| if( pps_extension_flag ) | |
|    while( more_rbsp_data( ) ) | |
|       pps_extension_data_flag | u(1) |
| rbsp_trailing_bits( ) | |
| } | |

SIGNALING INDICATIONS AND CONSTRAINTS

CROSS-REFERENCE TO RELATED APPLICATIONS

None.

TECHNICAL FIELD

The present disclosure relates generally to electronic devices.

BACKGROUND ART

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

The increasing popularity of digital media has presented several problems. For example, efficiently representing high-quality digital media for storage, transmittal and rapid playback presents several challenges. As can be observed from this discussion, systems and methods that represent digital media efficiently with improved performance may be beneficial.

The foregoing and other objectives, features, and advantages of the invention will be more readily understood upon consideration of the following detailed description of the invention, taken in conjunction with the accompanying drawings.

SUMMARY OF INVENTION

One embodiment of the present invention discloses a method for decoding video from a bitstream comprising: (a) decoding a plurality of pictures, each of said picture belonging to a different one of a plurality of layers and having the same temporal time in a corresponding decoded said video; (b) where each of said pictures of said video includes at least one slice; (c) where each of said at least one slice is characterized that it is decoded independently of the other said at least one slice of the same picture; (d) receiving a video parameter set extension syntax providing information used for said decoding of video sequence containing said at least one slice; (e) receiving a slice segment header syntax providing information used for said decoding of said at least one slice; (f) said information of said slice segment header syntax and said information in said video parameter set extension both used to derive a number of active reference layer pictures for the corresponding slice; (g) said information of said video parameter set extension syntax used to derive a number of direct reference layers for the corresponding said layer; (h) wherein when said number of active reference layer pictures for the said corresponding slice is different from said number of direct reference layers for the layer said corresponding slice belongs to then said bitstream signals inter layer prediction layer indicator.

Another embodiment of the present invention discloses a method for decoding video from a bitstream comprising: (a) decoding a plurality of pictures, each of said picture belonging to a different one of a plurality of layers and having the same temporal time in a corresponding decoded said video; (b) where each of said pictures of said video includes at least one slice; (c) where each of said at least one slice is characterized that it is decoded independently of the other said at least one slice of the same layer; (d) receiving a video parameter set extension syntax providing information used for said decoding of video sequence containing said at least one slice; (e) said information of said video parameter set extension syntax used to derive a number of direct reference layers for the corresponding said layer; (f) said information of said video parameter set extension syntax used to determine if additional syntax is provided in the slice segment header related to inter layer reference signaling information which indicates pictures from which of the direct reference layers for the corresponding said layer may be used as active reference layer pictures for the said picture corresponding to said slice.

BRIEF DESCRIPTION OF DRAWINGS

FIG. 2 is a flow diagram illustrating one configuration of a method for sending a message.

FIG. 3 is a flow diagram illustrating one configuration of a method for determining one or more removal delays for decoding units in an access unit.

FIG. 13A illustrates different NAL Unit header syntax.

FIG. 13B illustrates different NAL Unit header syntax.

FIG. 13C illustrates different NAL Unit header syntax.

FIG. 14 illustrates a general NAL Unit syntax.
FIG. 15 illustrates an existing video parameter set.
FIG. 16 illustrates existing scalability types.
FIG. 17 illustrates an exemplary video parameter set.
FIG. 18 illustrates an exemplary scalability map syntax.
FIG. 19 illustrates an exemplary video parameter set.
FIG. 20 illustrates an existing video parameter set.
FIG. 21 illustrates an existing dimension type, dimension id syntax.
FIG. 22 illustrates an exemplary video parameter set.
FIG. 23 illustrates an exemplary scalability map syntax.
FIG. 24 illustrates an exemplary video parameter set.
FIG. 25 illustrates an exemplary video parameter set.
FIG. 26 illustrates an exemplary video parameter set.
FIG. 27 illustrates an exemplary scalability mask syntax.
FIG. 28 illustrates an exemplary video parameter set extension syntax.
FIG. 29 illustrates an exemplary video parameter set extension syntax.
FIG. 30 illustrates an exemplary video parameter set extension syntax.
FIG. 31 illustrates an exemplary video parameter set extension syntax.
FIG. 32 illustrates an exemplary video parameter set extension syntax.
FIG. 33 illustrates an exemplary video parameter set extension syntax.
FIG. 34A illustrates an exemplary video parameter extension syntax.
FIG. 34B illustrates an exemplary video parameter extension syntax.
FIG. 35A illustrates an exemplary op_dpb_info_parameters(j) syntax.
FIG. 35B illustrates an exemplary op_dpb_info_parameters(j) syntax.
FIG. 36 illustrates another exemplary video parameter extension syntax.
FIG. 37 illustrates another exemplary oop_dpb_info_parameters(j) syntax.
FIG. 38 illustrates another exemplary oop_dpb_info_parameters(j) syntax.
FIG. 39 illustrates an exemplary num_dpb_info_parameters syntax.
FIG. 40 illustrates another exemplary oop_dpb_info_parameters(j) syntax.
FIG. 41 illustrates another exemplary num_dpb_info_parameters syntax.
FIG. 42 illustrates another exemplary num_dpb_info_parameters syntax.
FIG. 43 illustrates another exemplary video parameter extension syntax and layer_dpb_info(i).
FIG. 44 illustrates an exemplary oop_dpb_info_parameters and layer_dpb_info(i) syntax.
FIG. 45 illustrates a base layer and enhancement layers.
FIG. 48 illustrates a picture with column and row boundaries.
FIG. 49 illustrates a picture with slices.
FIG. 53A illustrates an exemplary vps extension syntax.
FIG. 53B illustrates an exemplary vps extension syntax.
FIG. 53C illustrates an exemplary slice segment header syntax.
FIG. 54 illustrates an exemplary vps extension syntax.
FIG. 55 illustrates an exemplary vps extension syntax.
FIG. 56 illustrates an exemplary vps extension syntax.
FIG. 57 illustrates an exemplary vps extension syntax.
FIG. 58 illustrates an exemplary vps extension syntax.
FIG. 58 A illustrates an exemplary vps extension syntax.
FIG. 59 illustrates an exemplary vps extension syntax.
FIG. 60 illustrates a table of sample rates.
FIG. 61 illustrates a table of sample rates.
FIG. 62 illustrates a table of sample rates.
FIG. 63A illustrate an exemplary slide segment header syntax.
FIG. 63B illustrate an exemplary slide segment header syntax.
FIG. 63C illustrate an exemplary slide segment header syntax.
FIG. 65A illustrate an exemplary vps extension syntax.
FIG. 65B illustrate an exemplary vps extension syntax.
FIG. 66 illustrates an exemplary slice segment header syntax.
FIG. 67 illustrates an exemplary slice segment header syntax.
FIG. 68 illustrates an exemplary slice segment header syntax.
FIG. 69 illustrates an exemplary base layer and enhancement layer with permitted relationships.
FIG. 70 illustrates an exemplary slice segment header.
FIG. 71 illustrates an exemplary vps extension syntax.
FIG. 71A illustrates an exemplary vps extension syntax.
FIG. 72 illustrates an exemplary sequence parameter set syntax.
FIG. 73 illustrates an exemplary picture parameter set syntax.

DESCRIPTION OF EMBODIMENTS

Figure 1A:
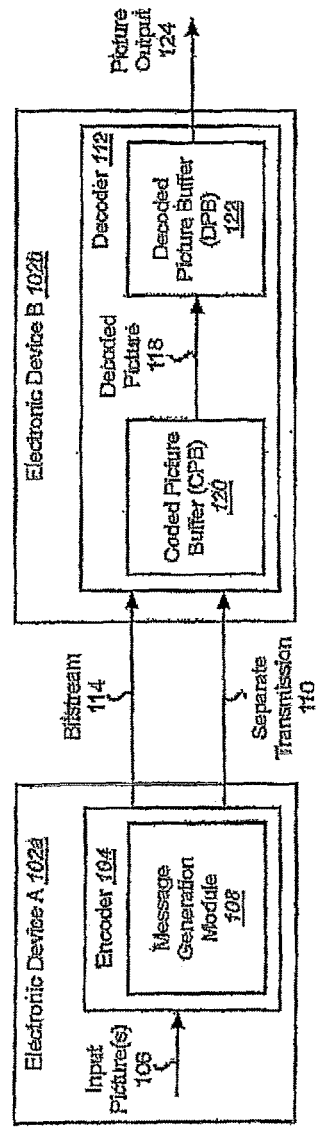
FIG. 1A is a block diagram illustrating an example of one or more electronic devices in which systems and methods for sending a message and buffering a bitstream may be implemented.

An electronic device for sending a message is described. The electronic device includes a processor and instructions stored in memory that is in electronic communication with the processor. The electronic device determines, when a Coded Picture Buffer (CPB) supports operation on a sub-picture level, whether to include a common decoding unit CPB removal delay parameter in a picture timing Supplemental Enhancement Information (SEI) message. The electronic device also generates, when the common decoding unit CPB removal delay parameter is to be included in the picture timing SEI message (or some other SEI message or some other parameter set e.g. picture parameter set or sequence parameter set or video parameter set or adaptation parameter set), the common decoding unit CPB removal delay parameter, wherein the common decoding unit CPB removal delay parameter is applicable to all decoding units in an access unit from the CPB. The electronic device also generates, when the common decoding unit CPB removal delay parameter is not to be included in the picture timing SEI message, a separate decoding unit CPB removal delay parameter for each decoding unit in the access unit. The electronic device also sends the picture timing SEI message with the common decoding unit CPB removal delay parameter or the decoding unit CPB removal delay parameters.

The common decoding unit CPB removal delay parameter may specify an amount of sub-picture clock ticks to wait after removal from the CPB of an immediately preceding decoding unit before removing from the CPB a current decoding unit in the access unit associated with the picture timing SEI message.

Furthermore, when a decoding unit is a first decoding unit in an access unit, the common decoding unit CPB removal delay parameter may specify an amount of sub-picture clock ticks to wait after removal from the CPB of a last decoding unit in an access unit associated with a most recent buffering period SEI message in a preceding access unit before removing from the CPB the first decoding unit in the access unit associated with the picture timing SEI message.

In contrast, when the decoding unit is a non-first decoding unit in an access unit, the common decoding unit CPB removal delay parameter may specify an amount of sub-picture clock ticks to wait after removal from the CPB of a preceding decoding unit in the access unit associated with the picture timing SEI message before removing from the CPB a current decoding unit in the access unit associated with the picture timing SEI message.

The decoding unit CPB removal delay parameters may specify an amount of sub-picture clock ticks to wait after removal from the CPB of the last decoding unit before removing from the CPB an i-th decoding unit in the access unit associated with the picture timing SEI message.

The electronic device may calculate the decoding unit CPB removal delay parameters according to a remainder of a modulo $2^{(cpb\_removal\_delay\_length\_minus1+1)}$ counter where cpb_removal_delay_length_minus1+1 is a length of a common decoding unit CPB removal delay parameter.

The electronic device may also generate, when the CPB supports operation on an access unit level, a picture timing SEI message including a CPB removal delay parameter that specifies how many clock ticks to wait after removal from the CPB of an access unit associated with a most recent buffering period SEI message in a preceding access unit before removing from the CPB the access unit data associated with the picture timing SEI message.

The electronic device may also determine whether the CPB supports operation on a sub-picture level or an access unit level. This may include determining a picture timing flag that indicates whether a Coded Picture Buffer (CPB) provides parameters supporting operation on a sub-picture level based on a value of the picture timing flag. The picture timing flag may be included in the picture timing SEI message.

Determining whether to include a common decoding unit CPB removal delay parameter may include setting a common decoding unit CPB removal delay flag to 1 when the common decoding unit CPB removal delay parameter is to be included in the picture timing SEI message. It may also include setting the common decoding unit CPB removal delay flag to 0 when the common decoding unit CPB removal delay parameter is not to be included in the picture timing SEI message. The common decoding unit CPB removal delay flag may be included in the picture timing SEI message.

The electronic device may also generate, when the CPB supports operation on a sub-picture level, separate network abstraction layer (NAL) units related parameters that indicate an amount, offset by one, of NAL units for each decoding unit in an access unit. Alternatively, or in addition to, the electronic device may generate a common NAL parameter that indicates an amount, offset by one, of NAL units common to each decoding unit in an access unit.

An electronic device for buffering a bitstream is also described. The electronic device includes a processor and instructions stored in memory that is in electronic communication with the processor. The electronic device determines that a CPB signals parameters on a sub-picture level for an access unit. The electronic device also determines, when a received picture timing Supplemental Enhancement Information (SEI) message comprises the common decoding unit Coded Picture Buffer (CPB) removal delay flag, a common decoding unit CPB removal delay parameter applicable to all decoding units in the access unit. The electronic device also determines, when the picture timing SEI message does not comprise the common decoding unit CPB removal delay flag, a separate decoding unit CPB removal delay parameter for each decoding unit in the access unit. The electronic device also removes decoding units from the CPB using the common decoding unit CPB removal delay parameter or the separate decoding unit CPB removal delay parameters. The electronic device also decodes the decoding units in the access unit.

In one configuration, the electronic device determines that a picture timing flag is set in the picture timing SEI message. The electronic device may also set a CPB removal delay parameter, cpb_removal_delay, according to $$\text{cpb\_removal\_delay} = \frac{\left(\sum_{i=0}^{\text{num\_decoding\_units\_minus 1}} \text{du\_cpb\_removal\_delay}[i]\right) * t_{c,sub}}{t_c}$$

where du_cpb_removal_delay[i] are the decoding unit CPB removal delay parameters, $t_c$ is a clock tick, $t_{c,sub}$ is a sub-picture clock tick, num_decoding_units_minus1 is an amount of decoding units in the access unit offset by one, and i is an index.

Alternatively, the electronic device may set a CPB removal delay parameter, cpb_removal_delay, and du_cpb_removal_delay[num_decoding_units_minus1] so as to satisfy the equation $$-1 \le \left[\text{cpb\_removal\_delay} * t_c - \left(\sum_{i=0}^{\text{num\_decoding\_units\_minus 1}} \text{du\_cpb\_removal\_delay}[i]\right) * t_{c,sub}\right] \le 1$$

where du_cpb_removal_delay[i] are the decoding unit CPB removal delay parameters, $t_c$ is a clock tick, $t_{c,sub}$ is a sub-picture clock tick, num_decoding_units_minus1 is an amount of decoding units in the access unit offset by one, and i is an index.

Alternatively, the electronic device may set a CPB removal delay parameter, cpb_removal_delay, and du_cpb_removal_delay[num_decoding_units_minus1] according to cpb_removal_delay*$t_c$=du_cpb_removal_delay[num_decoding_units_minus1]*$t_{c,sub}$ where du_cpb_removal_delay[num_decoding_units_minus1] is the decoding unit CPB removal delay parameter for the num_decoding_units_minus1'th decoding unit, $t_c$ is a clock tick, $t_{c,sub}$ is a sub-picture clock tick, num_decoding_units_minus1 is an amount of decoding units in the access unit offset by one.

In one configuration, the electronic device determines that a picture timing flag is set in the picture timing SEI message. The electronic device may also set CPB removal delay parameters, cpb_removal_delay, and du_cpb_removal_delay[num_decoding_units_minus1] so as to satisfy the equation: $-1<=(cpb\_removal\_delay*t_c-du\_cpb\_removal\_delay[num\_decoding\_units\_minus1]*t_{c,sub})<=1$ where du_cpb_removal_delay[num_decoding_units_minus1] is the decoding unit CPB removal delay parameter for the num_decoding_units_minus1'th decoding unit, $t_c$ is a clock tick, $t_{c,sub}$ is a sub-picture clock tick, num_decoding_units_minus1 is an amount of decoding units in the access unit offset by one.

A ClockDiff variable may be defined as ClockDiff=(num_units_in_tick−(num_units_in_sub_tick*(num_decoding_units_minus1+1))/time_scale) where num_units_in_tick is number of time units of a clock operating at the frequency time_scale Hz that corresponds to one increment of a clock tick counter, num_units_in_sub_tick is number of time units of a clock operating at the frequency time_scale Hz that corresponds to one increment of a sub-picture clock tick counter, num_decoding_units_minus1+1 is an amount of decoding units in the access unit, and time_scale is the number of time units that pass in one second.

When a low delay hypothetical reference decoder (HRD) flag (e.g., low_delay_hrd_flag) is set to 1, $t_{r,n}(m)<t_{af}(m)$, a picture timing flag is set to 1, the CPB is operating at sub-picture level and ClockDiff is greater than zero, the removal time for decoding unit m, $t_r(m)$ is determined according to: $t_r(m)=t_{r,n}(m)+t_{c\_sub}*Ceil((t_{af}(m)-t_{r,n}(m))/t_{c\_sub})+ClockDiff$ where $t_{r,n}(m)$ is the nominal removal time of the decoding unit m, $t_{c\_sub}$ is a sub-picture clock tick, Ceil( ) is a ceiling function and $t_{af}(m)$ is final arrival time of decoding unit m.

When a low delay hypothetical reference decoder (HRD) flag (e.g., low_delay_hrd_flag) is set to 1, $t_{r,n}(n)<t_{af}(n)$, a picture timing flag is set to 1, the CPB is operating at an access unit level and ClockDiff is greater than zero, the removal time for access unit n, $t_r(n)$ is determined according to: $t_r(n)=t_{r,n}(n)+t_c*Ceil((t_{af}(n)-t_{r,n}(n))/t_c)-ClockDiff$ where $t_{r,n}(n)$ is the nominal removal time of the access unit n, $t_c$ is a clock tick, Ceil( ) is a ceiling function and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the last decoding unit m of access unit, $t_r(m)$ according to: $t_r(m)=t_{r,n}(m)+max((t_{c\_sub}*Ceil((t_{af}(m)-t_{r,n}(m))\ t_{c\_sub})), (t_c*Ceil((t_{af}(n)-t_{r,n}(n))/t_c)))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{r,n}(n)+max((t_{c\_sub}*Ceil((t_{af}(m)-t_{r,n}(m))/t_{c\_sub})), (t_c*Ceil((t_{af}(n)-t_{r,n}(n))/t_c)))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the last decoding unit m of access unit, $t_r(m)$ according to: $t_r(m)=t_{r,n}(m)+min((t_{c\_sub}*Ceil((t_{af}(m)-t_{r,n}(m))/t_{c\_sub})), (t_c*Ceil((t_{af}(n)-t_{r,n}(n))/t_c)))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{r,n}(n)+min((t_{c\_sub}*Ceil((t_{af}(m)-t_{r,n}(m))/t_{c\_sub})), (t_c*Ceil((t_{af}(n)-t_{r,n}(n))/t_c)))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the last decoding unit m of access unit, $t_r(m)$ according to: $t_r(m)=t_{r,n}(m)+(t_c*Ceil((t_{af}(n)-t_{r,n}(n))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{r,n}(n)+(t_c*Ceil((t_{af}(n)-t_{r,n}(n))/t_c))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for a decoding unit m which is not the last decoding unit is set as $t_r(m)=t_{af}(m)$, where $t_{af}(m)$ is a final arrival time of decoding unit m. When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for a decoding unit m which is the last decoding unit m of access unit, $t_r(m)$ according to: $t_r(m)=t_{r,n}(m)+(t_{c\_sub}*Ceil((t_{af}(m)-t_{r,n}(m))/t_{c\_sub}))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick, $t_{af}(n)$ is a final arrival time of access unit n, and $t_{af}(m)$ is a final arrival time of last decoding unit m in the access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for a decoding unit m which is not the last decoding unit is set as $t_r(m)=t_{af}(m)$, where $t_{af}(m)$ is a final arrival time of decoding unit m. When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for a decoding unit m which is the last decoding unit m of access unit, $t_r(m)$ according to: $t_r(m)=t_{r,n}(m)+(t_c*\text{Ceil}((t_{af}(m)-t_{r,n}(m))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick, $t_{af}(n)$ is a final arrival time of access unit n, and $t_{af}(m)$ is a final arrival time of last decoding unit m in the access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for a decoding unit m is set as $t_r(m)=t_{af}(m)$ where $t_{r,n}(m)$ is the nominal removal time of the decoding unit m, $t_{c\_sub}$ is sub-picture clock tick, Ceil( ) is a ceiling function, $t_{af}(m)$ is a final arrival time of decoding unit m, $t_{r,n}(n)$ is the nominal removal time of the access unit n, $t_c$ is clock tick $t_{af}(n)$ is a final arrival time of access unit n, and $t_{af}(m)$ is a final arrival time of decoding unit m in the access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{af}(n)$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

Additionally in some cases a flag may be sent in part of the bitstream to signal which of the above alternative equations are used for deciding the removal time of the decoding units and removal time of the access unit. In one case the flag may be called du_au_cpb_alignment_mode_flag. If du_au_cpb_alignment_mode_flag is 1 then the equations above which align the operation of CPB which operates in sub-picture based mode with the CPB which operates in the access unit mode are used. If du_au_cpb_alignment_mode_flag is 0 then the equations above which do not align the operation of CPB which operates in sub-picture based mode with the CPB which operates in the access unit mode are used.

In once case the flag du_au_cpb_alignment_mode_flag may be signaled in the video usability information (VUI). In another case the flag du_au_cpb_alignment_mode_flag may be sent in picture timing SEI message. In yet another case the flag du_au_cpb_alignment_mode_flag may be sent in some other normative part of the bitstream. One example of modified syntax and semantics in accordance with the systems and methods disclosed herein is given in Table (0) as follows.

TABLE 0

```
pic_timing( payloadSize ) {
    if( CpbDpbDelaysPresentFlag ) {
```

TABLE 0-continued

```
        cpb_removal_delay
        dpb_output_delay
        if( sub_pic_cpb_params_present_flag ) {
            num_decoding_units_minus1
            du_au_cpb_alignment_mode_flag
            for( i = 0; i <= num_decoding_units_minus1; i++ ) {
                num_nalus_in_du_minus1[ i ]
                du_cpb_removal_delay[ i ]
            }
        }
    }
}
```

It should be noted that different symbols (names) than those used above for various variables may be used. For example $t_r(n)$ of access unit n may be called CpbRemovalTime(n), $t_r(m)$ of decoding unit n may be called CpbRemovalTime(m), $t_{c\_sub}$ may be called ClockSubTick, $t_c$ may be called ClockTick, $t_{af}(n)$ of access unit m may be called FinalArrivalTime(n) of access unit n, $t_{af}(m)$ of decoding unit m may be called FinalArrivalTime(m), $t_{r,n}(n)$ may be called NominalRemovalTime(n) of the access unit n, $t_{r,n}(m)$ may be called NominalRemovalTime(m) of the decoding unit m.

A method for sending a message by an electronic device is also described. The method includes determining, when a Coded Picture Buffer (CPB) supports operation on a sub-picture level, whether to include a common decoding unit CPB removal delay parameter in a picture timing Supplemental Enhancement Information (SEI) message. The method also includes generating, when the common decoding unit CPB removal delay parameter is to be included in the picture timing SEI message, the common decoding unit CPB removal delay parameter, wherein the common decoding unit CPB removal delay parameter is applicable to all decoding units in an access unit from the CPB. The method also includes generating, when the common decoding unit CPB removal delay parameter is not to be included in the picture timing SEI message, a separate decoding unit CPB removal delay parameter for each decoding unit in the access unit. The method also includes sending the picture timing SEI message with the common decoding unit CPB removal delay parameter or the decoding unit CPB removal delay parameters.

A method for buffering a bitstream by an electronic device is also described. The method includes determining that a CPB signals parameters on a sub-picture level for an access unit. The method also includes determining, when a received picture timing Supplemental Enhancement Information (SEI) message comprises the common decoding unit Coded Picture Buffer (CPB) removal delay flag, a common decoding unit CPB removal delay parameter applicable to all decoding units in the access unit. The method also includes determining, when the picture timing SEI message does not comprise the common decoding unit CPB removal delay flag, a separate decoding unit CPB removal delay parameter for each decoding unit in the access unit. The method also includes removing decoding units from the CPB using the common decoding unit CPB removal delay parameter or the separate decoding unit CPB removal delay parameters. The method also includes decoding the decoding units in the access unit.

The systems and methods disclosed herein describe electronic devices for sending a message and buffering a bitstream. For example, the systems and methods disclosed herein describe buffering for bitstreams starting with sub-picture parameters. In some configurations, the systems and methods disclosed herein may describe signaling sub-picture based Hypothetical Reference Decoder (HRD) parameters. For instance, the systems and methods disclosed herein describe modification to a picture timing Supplemental Enhancement Information (SEI) message. The systems and methods disclosed herein (e.g., the HRD modification) may result in more compact signaling of parameters when each sub-picture arrives and is removed from CPB at regular intervals.

Furthermore, when the sub-picture level CPB removal delay parameters are present, the Coded Picture Buffer (CPB) may operate at access unit level or sub-picture level. The present systems and methods may also impose a bitstream constraint so that the sub-picture level based CPB operation and the access unit level CPB operation result in the same timing of decoding unit removal. Specifically the timing of removal of last decoding unit in an access unit when operating in sub-picture mode and the timing of removal of access unit when operating in access unit mode will be the same.

It should be noted that although the term "hypothetical" is used in reference to an HRD, the HRD may be physically implemented. For example, "HRD" may be used to describe an implementation of an actual decoder. In some configurations, an HRD may be implemented in order to determine whether a bitstream conforms to High Efficiency Video Coding (HEVC) specifications. For instance, an HRD may be used to determine whether Type I bitstreams and Type II bitstreams conform to HEVC specifications. A Type I bitstream may contain only Video Coding Layer (VCL) Network Access Layer (NAL) units and filler data NAL units. A Type II bitstream may contain additional other NAL units and syntax elements.

Joint Collaborative Team on Video Coding (JCTVC) document JCTVC-I0333 includes sub-picture based HRD and supports picture timing SEI messages. This functionality has been incorporated into the High Efficiency Video Coding (HEVC) Committee Draft (JCTVC-I1003), incorporated by reference herein in its entirety. B. Bros, W-J. Han, J-R. Ohm, G. J. Sullivan, Wang, and T-. Wiegand, "High efficiency video coding (HEVC) text specification draft 10 (for DFIS & Last Call)," JCTVC-L1003_v34, Geneva, January 2013 is hereby incorporated by reference herein in its entirety. B. Bros, W-J. Han, J-R. Ohm, G. J. Sullivan, Wang, and T-. Wiegand, "High efficiency video coding (HEVC) text specification draft 10," JCTVC-L1003, Geneva, January 2013 is hereby incorporated by reference herein in its entirety.

One example of modified syntax and semantics in accordance with the systems and methods disclosed herein is given in Table (1) as follows.

TABLE 1

```
pic_timing( payloadSize ) {
    if( CpbDpbDelaysPresentFlag ) {
        cpb_removal_delay
        dpb_output_delay
        if( sub_pic_cpb_params_present_flag ) {
            num_decoding_units_minus1
            common_du_cpb_removal_delay_flag
            if(common_du_cpb_removal_delay_flag) {
                common_du_cpb_removal_delay
            }
            for( i = 0; i <= num_decoding_units_minus1; i++ ) {
                num_nalus_in_du_minus1[ i ]
                if(!common_du_cpb_removal_delay_flag)
                    du_cpb_removal_delay[ i ]
            }
        }
    }
}
```

TABLE 1-continued

```
    }
}
```

Examples regarding buffering period SEI message semantics in accordance with the systems and methods disclosed herein are given as follows. In particular, additional detail regarding the semantics of the modified syntax elements are given as follows. When NalHrdBpPresentFlag or VclHrdBpPresentFlag are equal to 1, a buffering period SEI message can be associated with any access unit in the bitstream, and a buffering period SEI message may be associated with each IDR access unit, with each CRA access unit, and with each access unit associated with a recovery point SEI message. For some applications, the frequent presence of a buffering period SEI message may be desirable. A buffering period is specified as the set of access units between two instances of the buffering period SEI message in decoding order.

'seq_parameter_set_id' specifies the sequence parameter set that contains the sequence HRD attributes. The value of seq_parameter_set_id may be equal to the value of seq_parameter_set_id in the picture parameter set referenced by the primary coded picture associated with the buffering period SEI message. The value of seq_parameter_set_id may be in the range of 0 to 31, inclusive.

'initial_cpb_removal_delay'[SchedSelIdx] specifies the delay for the SchedSelIdx-th CPB between the time of arrival in the CPB of the first bit of the coded data associated with the access unit associated with the buffering period SEI message and the time of removal from the CPB of the coded data associated with the same access unit, for the first buffering period after HRD initialization. The syntax element has a length in bits given by initial_cpb_removal_delay_length_minus1+1. It is in units of a 90 kHz clock. initial_cpb_removal_delay[SchedSelIdx] may not be equal to 0 and may not exceed 90000*(CpbSize[SchedSelIdx]÷BitRate[SchedSelIdx]), the time-equivalent of the CPB size in 90 kHz clock units.

'initial_cpb_removal_delay_offset'[SchedSelIdx] is used for the SchedSelIdx-th CPB in combination with the cpb_removal_delay to specify the initial delivery time of coded access units to the CPB. initial_cpb_removal_delay_offset [SchedSelIdx] is in units of a 90 kHz clock. The initial_cpb_removal_delay_offset[SchedSelIdx] syntax element is a fixed length code whose length in bits is given by initial_cpb_removal_delay_length_minus1+1. This syntax element is not used by decoders and is needed only for the delivery scheduler (HSS) (e.g., as specified in Annex C of JCTVC-I1003).

Over the entire coded video sequence, the sum of initial_cpb_removal_delay[SchedSelIdx] and initial_cpb_removal_delay_offset[SchedSelIdx] may be constant for each value of SchedSelIdx.

'initial_du_cpb_removal_delay'[SchedSelIdx] specifies the delay for the SchedSelIdx-th CPB between the time of arrival in the CPB of the first bit of the coded data associated with the first decoding unit in the access unit associated with the buffering period SEI message and the time of removal from the CPB of the coded data associated with the same decoding unit, for the first buffering period after HRD initialisation. The syntax element has a length in bits given by initial_cpb_removal_delay_length_minus1+1. It is in units of a 90 kHz clock. initial_du_cpb_removal_delay [SchedSelIdx] may not be equal to 0 and may not exceed 90000*(CpbSize[SchedSelIdx]÷BitRate[SchedSelIdx]), the time-equivalent of the CPB size in 90 kHz clock units.

'initial_du_cpb_removal_delay_offset'[SchedSelIdx] is used for the SchedSelIdx-th CPB in combination with the cpb_removal_delay to specify the initial delivery time of decoding units to the CPB. initial_cpb_removal_delay_offset[SchedSelIdx] is in units of a 90 kHz clock. The initial_du_cpb_removal_delay_offset[SchedSelIdx] syntax element is a fixed length code whose length in bits is given by initial_cpb_removal_delay_length_minus1+1. This syntax element is not used by decoders and is needed only for the delivery scheduler (HSS) (e.g., as specified in Annex C of JCTVC-I1003).

Over the entire coded video sequence, the sum of initial_du_cpb_removal_delay[SchedSelIdx] and initial_du_cpb_removal_delay_offset[SchedSelIdx] may be constant for each value of SchedSelIdx.

Examples regarding picture timing SEI message semantics in accordance with the systems and methods disclosed herein are given as follows. In particular, additional detail regarding the semantics of the modified syntax elements are given as follows.

The syntax of the picture timing SEI message is dependent on the content of the sequence parameter set that is active for the coded picture associated with the picture timing SEI message. However, unless the picture timing SEI message of an Instantaneous Decoding Refresh (IDR) access unit is preceded by a buffering period SEI message within the same access unit, the activation of the associated sequence parameter set (and, for IDR pictures that are not the first picture in the bitstream, the determination that the coded picture is an IDR picture) does not occur until the decoding of the first coded slice Network Abstraction Layer (NAL) unit of the coded picture. Since the coded slice NAL unit of the coded picture follows the picture timing SEI message in NAL unit order, there may be cases in which it is necessary for a decoder to store the raw byte sequence payload (RBSP) containing the picture timing SEI message until determining the parameters of the sequence parameter that will be active for the coded picture, and then perform the parsing of the picture timing SEI message.

The presence of picture timing SEI message in the bitstream is specified as follows. If CpbDpbDelaysPresentFlag is equal to 1, one picture timing SEI message may be present in every access unit of the coded video sequence. Otherwise (CpbDpbDelaysPresentFlag is equal to 0), no picture timing SEI messages may be present in any access unit of the coded video sequence.

'cpb_removal_delay' specifies how many clock ticks (see subclause E.2.1 of JCTVC-I1003) to wait after removal from the CPB of the access unit associated with the most recent buffering period SEI message in a preceding access unit before removing from the buffer the access unit data associated with the picture timing SEI message. This value is also used to calculate an earliest possible time of arrival of access unit data into the CPB for the HSS, as specified in Annex C of JCTVC-I1003. The syntax element is a fixed length code whose length in bits is given by cpb_removal_delay_length_minus1+1. The cpb_removal_delay is the remainder of a modulo $2^{(cpb\_removal\_delay\_length\_minus1+1)}$ counter.

The value of cpb_removal_delay_length_minus1 that determines the length (in bits) of the syntax element cpb_removal_delay is the value of cpb_removal_delay_length_minus1 coded in the sequence parameter set that is active for the primary coded picture associated with the picture timing SEI message, although cpb_removal_delay specifies a number of clock ticks relative to the removal time of the preceding access unit containing a buffering period SEI message, which may be an access unit of a different coded video sequence.

'dpb_output_delay' is used to compute the Decoded Picture Buffer (DPB) output time of the picture. It specifies how many clock ticks to wait after removal of the last decoding unit in an access unit from the CPB before the decoded picture is output from the DPB (see subclause C.2 of JCTVC-I1003).

With respect to the DPB, a picture is not removed from the DPB at its output time when it is still marked as "used for short-term reference" or "used for long-term reference". Only one dpb_output_delay is specified for a decoded picture. The length of the syntax element dpb_output_delay is given in bits by dpb_output_delay_length_minus1+1. When max_dec_pic_buffering[max_temporal_layers_minus1] is equal to 0, dpb_output_delay may be equal to 0.

The output time derived from the dpb_output_delay of any picture that is output from an output timing conforming decoder as specified in subclause C.2 of JCTVC-I1003 may precede the output time derived from the dpb_output_delay of all pictures in any subsequent coded video sequence in decoding order. The picture output order established by the values of this syntax element may be the same order as established by the values of PicOrderCnt( ) as specified by subclause. For pictures that are not output by the "bumping" process of subclause because they precede, in decoding order, an IDR picture with no_output_of_prior_pics_flag equal to 1 or inferred to be equal to 1, the output times derived from dpb_output_delay may be increasing with increasing value of PicOrderCnt( ) relative to all pictures within the same coded video sequence.

'num_decoding_units_minus1' plus 1 specifies the number of decoding units in the access unit the picture timing SEI message is associated with. The value of num_decoding_units_minus1 may be in the range of 0 to PicWidthInCtbs*PicHeightInCtbs−1, inclusive.

'common_du_cpb_removal_delay_flag' equal to 1 specifies that the syntax element common_du_cpb_removal_delay is present. common_du_cpb_removal_delay_flag equal to 0 specifies that the syntax element common_du_cpb_removal_delay is not present.

'common_du_cpb_removal_delay' specifies information as follows: If a decoding unit is the first decoding unit in the access unit associated with the picture timing SEI message then common_du_cpb_removal_delay specifies how many sub-picture clock ticks (see subclause E.2.1 of JCTVC-I1003) to wait after removal from the CPB of the last decoding unit in the access unit associated with the most recent buffering period SEI message in a preceding access unit before removing from the CPB the first decoding unit in the access unit associated with the picture timing SEI message.

Otherwise common_du_cpb_removal_delay specifies how many sub-picture clock ticks (see subclause E.2.1 of JCTVC-I1003) to wait after removal from the CPB of the preceding decoding unit in the access unit associated with the picture timing SEI message before removing from the CPB the current decoding unit in the access unit associated with the picture timing SEI message. This value is also used to calculate an earliest possible time of arrival of decoding unit data into the CPB for the HSS, as specified in Annex C. The syntax element is a fixed length code whose length in bits is given by cpb_removal_delay_length_minus1+1. The common_du_cpb_removal_delay is the remainder of a modulo $2^{(cpb\_removal\_delay\_length\_minus1+1)}$ counter.

An alternate way of specifying 'common_du_cpb_removal_delay' is as follows:

'common_du_cpb_removal_delay' specifies how many sub-picture clock ticks (see subclause E.2.1 of JCTVC-I1003) to wait after removal from the CPB of the last decoding unit before removing from the CPB the current decoding unit in the access unit associated with the picture timing SEI message. This value is also used to calculate an earliest possible time of arrival of decoding unit data into the CPB for the HSS, as specified in Annex C. The syntax element is a fixed length code whose length in bits is given by cpb_removal_delay_length_minus1+1. The common_du_cpb_removal_delay is the remainder of a modulo $2^{(cpb\_removal\_delay\_length\_minus1+1)}$ counter.

The value of cpb_removal_delay_length_minus1 that determines the length (in bits) of the syntax element common_du_cpb_removal_delay is the value of cpb_removal_delay_length_minus1 coded in the sequence parameter set that is active for the coded picture associated with the picture timing SEI message, although common_du_cpb_removal_delay specifies a number of sub-picture clock ticks relative to the removal time of the first decoding unit in the preceding access unit containing a buffering period SEI message, which may be an access unit of a different coded video sequence.

'num_nalus_in_du_minus1[i]' plus 1 specifies the number of NAL units in the i-th decoding unit of the access unit the picture timing SEI message is associated with. The value of num_nalus_in_du_minus1[i] may be in the range of 0 to PicWidthInCtbs PicHeightInCtbs−1, inclusive.

The first decoding unit of the access unit consists of the first num_nalus_in_du_minus1[0]+1 consecutive NAL units in decoding order in the access unit. The i-th (with i greater than 0) decoding unit of the access unit consists of the num_nalus_in_du_minus1[i]+1 consecutive NAL units immediately following the last NAL unit in the previous decoding unit of the access unit, in decoding order. There may be at least one VCL NAL unit in each decoding unit. All non-VCL NAL units associated with a VCL NAL unit may be included in the same decoding unit.

'du_cpb_removal_delay[i]' specifies how many sub-picture clock ticks (see subclause E.2.1 of JCTVC-I1003) to wait after removal from the CPB of the first decoding unit in the access unit associated with the most recent buffering period SEI message in a preceding access unit before removing from the CPB the i-th decoding unit in the access unit associated with the picture timing SEI message. This value is also used to calculate an earliest possible time of arrival of decoding unit data into the CPB for the HSS (e.g., as specified in Annex C of JCTVC-I1003). The syntax element is a fixed length code whose length in bits is given by cpb_removal_delay_length_minus1+1. The du_cpb_removal_delay[i] is the remainder of a modulo $2^{(cpb\_removal\_delay\_length\_minus1+1)}$ counter.

The value of cpb_removal_delay_length_minus1 that determines the length (in bits) of the syntax element du_cpb_removal_delay[i] is the value of cpb_removal_delay_length_minus1 coded in the sequence parameter set that is active for the coded picture associated with the picture timing SEI message, although du_cpb_removal_delay[i] specifies a number of sub-picture clock ticks relative to the removal time of the first decoding unit in the preceding access unit containing a buffering period SEI message, which may be an access unit of a different coded video sequence.

In one configuration, the timing of decoding unit removal and decoding of decoding units may be implemented as follows.

If SubPicCpbFlag is equal to 0, the variable CpbRemovalDelay(m) is set to the value of cpb_removal_delay in the picture timing SEI message associated with the access unit that is decoding unit m, and the variable $T_c$ is set to $t_c$. Otherwise if SubPicCpbFlag is equal to 1 and common_du_cpb_removal_delay_flag is 0 the variable CpbRemovalDelay(m) is set to the value of du_cpb_removal_delay[i] for decoding unit m (with m ranging from 0 to num_decoding_units_minus1) in the picture timing SEI message associated with the access unit that contains decoding unit m, and the variable $T_c$ is set to $t_{c\_sub}$.

In some cases, Otherwise if SubPicCpbFlag is equal to 1 and common_du_cpb_removal_delay_flag is 0 the variable CpbRemovalDelay(m) is set to the value of (m+1)*du_cpb_removal_delay[i] for decoding unit m (with m ranging from 0 to num_decoding_units_minus1) in the picture timing SEI message associated with the access unit that contains decoding unit m, and the variable $T_c$ is set to $t_{c\_sub}$.

Otherwise if SubPicCpbFlag is equal to 1 and common_du_cpb_removal_delay_flag is 1 the variable CpbRemovalDelay(m) is set to the value of common_du_cpb_removal_delay for decoding unit m in the picture timing SEI message associated with the access unit that contains decoding unit m, and the variable $T_c$ is set to $t_{c\_sub}$.

When a decoding unit m is the decoding unit with n equal to 0 (the first decoding unit of the access unit that initializes the HRD), the nominal removal time of the decoding unit from the CPB is specified by $$t_{r,n}(0) = InitCpbRemovalDelay[SchedSelIdx] \div 90000.$$

When a decoding unit m is the first decoding unit of the first access unit of a buffering period that does not initialize the HRD, the nominal removal time of the decoding unit from the CPB is specified by $t_{r,n}(m) = t_{r,n}(m_b) + T_c * CpbRemovalDelay(m)$, where $t_{r,n}(m_b)$ is the nominal removal time of the first decoding unit of the previous buffering period.

When a decoding unit m is the first decoding unit of a buffering period, $m_b$ is set equal to m at the removal time $t_{r,n}(m)$ of the decoding unit m. The nominal removal time $t_{r,n}(m)$ of a decoding unit m that is not the first decoding unit of a buffering period is given by $t_{r,n}(m) = t_{r,n}(m_b) + T_c * CpbRemovalDelay(m)$, where $t_{r,n}(m_b)$ is the nominal removal time of the first decoding unit of the current buffering period.

The removal time of decoding unit m is specified as follows. If low_delay_hrd_flag is equal to 0 or $t_{r,n}(m) >= t_{af}(m)$, the removal time of decoding unit m is specified by $t_r(m) = t_{r,n}(m)$. Otherwise (low_delay_hrd_flag is equal to 1 and $t_{r,n}(m) < t_{af}(m)$), the removal time of decoding unit m is specified by $$t_r(m) = t_{r,n}(m) + T_c * Ceil((t_{af}(m) - t_{r,n}(m)) \div T_c).$$

The latter case (low_delay_hrd_flag is equal to 1 and $t_{r,n}(m) < t_{af}(m)$) indicates that the size of decoding unit m, b(m), is so large that it prevents removal at the nominal removal time.

In another case the removal time of decoding unit m is specified as follows. If low_delay_hrd_flag is equal to 0 or $t_{r,n}(m) >, t_{af}(m)$, the removal time of decoding unit m is specified by $t_r(m) = t_{r,n}(m)$. Otherwise (low_delay_hrd_flag is equal to 1 and $t_{r,n}(m) < t_{af}(m)$), the removal time of decoding unit m which is not the last decoding unit in the access unit is specified by $t_r(m)=t_{af}(m)$, and the removal time of decoding unit m which is the last decoding unit in the access unit $$t_r(m)=t_{r,n}(m)+T_c*\text{Ceil}((t_{af}(m)-t_{r,n}(m))\div t_c).$$

The latter case (low_delay_hrd_flag is equal to 1 and $t_{r,n}(m)<t_{af}(m)$) indicates that the size of decoding unit m, b(m), is so large that it prevents removal at the nominal removal time.

In another case the removal time of decoding unit m is specified as follows. If low_delay_hrd_flag is equal to 0 or $t_{r,n}(m)>$, $t_{af}(m)$, the removal time of decoding unit m is specified by $t_r(m)=t_{r,n}(m)$. Otherwise (low_delay_hrd_flag is equal to 1 and $t_{r,n}(m)<t_{af}(m)$), the removal time of decoding unit m which is not the last decoding unit in the access unit is specified by $t_r(m)=t_{af}(m)$, and the removal time of decoding unit m which is the last decoding unit in the access unit $$t_r(m)=t_{r,n}(m)+t_c*\text{Ceil}((t_{af}(m)-t_{r,n}(m))\div t_c).$$

The latter case (low_delay_hrd_flag is equal to 1 and $t_{r,n}(m)<t_{af}(m)$) indicates that the size of decoding unit m, b(m), is so large that it prevents removal at the nominal removal time.

In another case the removal time of decoding unit m is specified as follows. If low_delay_hrd_flag is equal to 0 or $t_{r,n}(m)>$, $t_{af}(m)$, the removal time of decoding unit m is specified by $t_r(m)=t_{r,n}(m)$. Otherwise (low_delay_hrd_flag is equal to 1 and $t_{r,n}(m)<t_{af}(m)$), the removal time of decoding unit m is specified by $t_r(m)=t_{af}(m)$. The latter case (low_delay_hrd_flag is equal to 1 and $t_{r,n}(m)<t_{af}(m)$) indicates that the size of decoding unit m, b(m), is so large that it prevents removal at the nominal removal time.

When SubPicCpbFlag is equal to 1, the nominal CPB removal time of access unit n $t_{r,n}(n)$ is set to the nominal CPB removal time of the last decoding unit in access unit n, the CPB removal time of access unit n $t_r(n)$ is set to the CPB removal time of the last decoding unit in access unit n.

When SubPicCpbFlag is equal to 0, each decoding unit is an access unit, hence the nominal CPB removal time and the CPB removal time of access unit n are the nominal CPB removal time and the CPB removal time of decoding unit n.

At CPB removal time of decoding unit m, the decoding unit is instantaneously decoded.

Another example of modified syntax and semantics for a picture timing SEI message in accordance with the systems and methods disclosed herein is given in Table (2) as follows. Modifications in accordance with the systems and methods disclosed herein are denoted in bold.

TABLE 2

```
pic_timing( payloadSize ) {
    if( CpbDpbDelaysPresentFlag ) {
        cpb_removal_delay
        dpb_output_delay
        if( sub_pic_cpb_params_present_flag ) {
            num_decoding_units_minus1
            common_du_cpb_removal_delay_flag
            if(common_du_cpb_removal_delay_flag) {
                common_num_nalus_in_du_minus1
                common_du_cpb_removal_delay
            }
            for( i = 0; i <= num_decoding_units_minus1; i++ ) {
                num_nalus_in_du_minus1[ i ]
                if(!common_du_cpb_removal_delay_flag)
                    du_cpb_removal_delay[ i ]
            }
        }
```

TABLE 2-continued

```
    }
}
```

The illustrated example in Table (2) includes a syntax element common_num_nalus_in_du_minus1, which may be used to determine how much data should be removed from the CPB when removing a decoding unit. 'common_num_nalus_in_du_minus1' plus 1 specifies the number of NAL units in each decoding unit of the access unit the picture timing SEI message is associated with. The value of common_num_nalus_in_du_minus1 may be in the range of 0 to PicWidthInCtbs*PicHeightInCtbs−1, inclusive.

The first decoding unit of the access unit consists of the first common_num_nalus_in_du_minus1+1 consecutive NAL units in decoding order in the access unit. The i-th (with i greater than 0) decoding unit of the access unit consists of the common_num_nalus_in_du_minus1+1 consecutive NAL units immediately following the last NAL unit in the previous decoding unit of the access unit, in decoding order. There may be at least one VCL NAL unit in each decoding unit. All non-VCL NAL units associated with a VCL NAL unit may be included in the same decoding unit.

Another example of modified syntax and semantics for a picture timing SEI message in accordance with the systems and methods disclosed herein is given in Table (3) as follows. Modifications in accordance with the systems and methods disclosed herein are denoted in bold.

TABLE 3

```
pic_timing( payloadSize ) {
    if( CpbDpbDelaysPresentFlag ) {
        cpb_removal_delay
        dpb_output_delay
        if( sub_pic_cpb_params_present_flag ) {
            num_decoding_units_minus1
            common_num_nalus_in_du_flag
            if(common_num_nalus_in_du_flag) {
                common_num_nalus_in_du_minus1
            }
            common_du_cpb_removal_delay_flag
            if(common_du_cpb_removal_delay_flag) {
                common_du_cpb_removal_delay
            }
            for( i = 0; i <= num_decoding_units_minus1; i++ ) {
                if(!common_num_nalus_in_du _flag)
                    num_nalus_in_du_minus1[ i ]
                if(!common_du_cpb_removal_delay_flag)
                    du_cpb_removal_delay[ i ]
            }
        }
    }
}
```

The illustrated example in Table (3) includes a syntax element 'common_num_nalus_in_du_flag' that, when equal to 1, specifies that the syntax element 'common_num_nalus_in_du_minus1' is present. 'common_num_nalus_in_du_flag' equal to 0 specifies that the syntax element 'common_num_nalus_in_du_minus1' is not present.

In yet another embodiment flags common_du_cpb_removal_delay_flag common_num_nalus_in_du_minus1, may not be sent. Instead syntax elements common_num_nalus_in_du_minus1 and common_du_cpb_removal_delay could be sent every time. In this case a value of 0 (or some other) for these syntax elements could be used to indicate that these elements are not signaled.

In addition to modifications to the syntax elements and semantics of the picture timing SEI message, the present systems and methods may also implement a bitstream constraint so that sub-picture based CPB operation and access unit level CPB operation result in the same timing of decoding unit removal.

When sub_pic_cpb_params_present_flag equals to 1 that sub-picture level CPB removal delay parameters are present the CPB may operate at access unit level or sub-picture level. sub_pic_cpb_params_present_flag equal to 0 specifies that sub-picture level CPB removal delay parameters are not present and the CPB operates at access unit level. When sub_pic_cpb_params_present_flag is not present, its value is inferred to be equal to 0.

To support the operation at both access unit level or sub-picture level, the following bitstream constraints may be used: If sub_pic_cpb_params_present_flag is 1 then it is requirement of bitstream conformance that the following constraint is obeyed when signaling the values for cpb_removal_delay and du_cpb_removal_delay[i] for all i:

$$\text{cpb\_removal\_delay} = \frac{\left(\sum_{i=0}^{num\_decoding\_units\_minus1} \text{du\_cpb\_removal\_delay}[i]\right) * t_{c,sub}}{t_c}$$

where du_cpb_removal_delay[i] are the decoding unit CPB removal delay parameters, $t_c$ is a clock tick, $t_{c,sub}$ is sub-picture clock tick, num_decoding_units_minus1 is an amount of decoding units in the access unit offset by one, and i is an index. In some embodiments a tolerance parameter could be added to satisfy the above constraint.

To support the operation at both access unit level or sub-picture level, the bitstream constraints as follows may be used: Let the variable $T_{du}(k)$ be defined as:

$$T_{du}[k] = T_{du}(k-1) + t_{c\_sub} * \sum_{i=0}^{num\_decoding\_units\_minus1_k} (\text{du\_cpb\_removal\_delay\_minus1}_k[i] + 1)$$

where du_cpb_removal_delay_minus1$_k$[i] and num_decoding_units_minus1$_k$ are parameters for i'th decoding unit of k'th access unit (with k=0 for the access unit that initialized the HRD and $T_{du}(k)=0$ for k<1), and where du_cpb_removal_delay_minus1$_k$[i]+1=du_cpb_removal_delay_minus1$_k$[i] is the decoding unit CPB removal delay parameter for the I'th decoding unit of the k'th access unit, and num_decoding_units_minus1$_k$ is the number of decoding units in the k'th access unit, $t_c$ is a clock tick, $t_{c,sub}$ is a sub-picture clock tick, and i and k are an indices. Then when the picture timing flag (e.g., sub_pic_cpb_params_present_flag) is set to 1, the following constraint may be true: (au_cpb_removal_delay_minus1+1) $t_c$==$T_{du}(k)$, where (au_cpb_removal_delay_minus1+1)=cpb_removal_delay, the CPB removal delay. Thus in this case the CPB removal delay (au_cpb_removal_delay_minus1+1) is set such that the operation of sub-picture based CPB operation and access unit based CPB operation result in the same timing of access unit removal and last decoding unit of the access unit removal.

To support the operation at both access unit level or sub-picture level, the following bitstream constraints may be used: If sub_pic_cpb_params_present_flag is 1 then it is requirement of bitstream conformance that the following constraint is obeyed when signaling the values for cpb_removal_delay and du_cpb_removal_delay[i] for all i:

$$-1 \leq \left[\text{cpb\_removal\_delay} * t_c - \left(\sum_{i=0}^{num\_decoding\_units\_minus1} \text{du\_cpb\_removal\_delay}[i]\right) * t_{c,sub}\right] \leq 1$$

where du_cpb_removal_delay[i] are the decoding unit CPB removal delay parameters, $t_c$ is a clock tick, $t_{c,sub}$ is sub-picture clock tick, num_decoding_units_minus1 is an amount of decoding units in the access unit offset by one, and i is an index.

To support the operation at both access unit level or sub-picture level, the following bitstream constraints may be used: If sub_pic_cpb_params_present_flag is 1 then it is requirement of bitstream conformance that the following constraint is obeyed when signaling the values for cpb_removal_delay and du_cpb_removal_delay[num_decoding_units_minus1]:
cpb_removal_delay*$t_c$=du_cpb_removal_delay [num_decoding_units_minus1]*$t_{c,sub}$ where du_cpb_removal_delay [num_decoding_units_minus1] is the decoding unit CPB removal delay parameter for the num_decoding_units_minus1'th decoding unit, $t_c$ is a clock tick, $t_{c,sub}$ is a sub-picture clock tick, num_decoding_units_minus1 is an amount of decoding units in the access unit offset by one. In some embodiments a tolerance parameter could be added to satisfy the above constraint.

To support the operation at both access unit level or sub-picture level, the following bitstream constraints may be used: If sub_pic_cpb_params_present_flag is 1 then it is requirement of bitstream conformance that the following constraint is obeyed when signaling the values for cpb_removal_delay and du_cpb_removal_delay[i] for all i: $-1 \leq$ (cpb_removal_delay*$t_c$−du_cpb_removal_delay[num_decoding_units_minus1]*$t_{c,sub}$)$\leq 1$ where du_cpb_removal_delay[num_decoding_units_minus1] is the decoding unit CPB removal delay parameter for the num_decoding_units_minus1'th decoding unit, $t_c$ is a clock tick, $t_{c,sub}$ is a sub-picture clock tick, num_decoding_units_minus1 is an amount of decoding units in the access unit offset by one.

Additionally, the present systems and methods may modify the timing of decoding unit removal. When sub-picture level CPB removal delay parameters are present, the removal time of decoding unit for "big pictures" (when low_delay_hrd_flag is 1 and $t_{r,n}(m)<t_{af}(m)$) may be changed to compensate for difference that can arise due to clock tick counter and sub-picture clock tick counter.

When sub_pic_cpb_params_present_flag equals to 1 then sub-picture level CPB removal delay parameters are present and the CPB may operate at access unit level or sub-picture level. sub_pic_cpb_params_present_flag equal to 0 specifies that sub-picture level CPB removal delay parameters are not present and the CPB operates at access unit level. When sub_pic_cpb_params_present_flag is not present, its value is inferred to be equal to 0.

Specifically, one example of timing of decoding unit removal and decoding of decoding unit implementation is as follows. The variable SubPicCpbPreferredFlag is either specified by external means, or when not specified by external means, set to 0. The variable SubPicCpbFlag is derived as follows: SubPicCpbFlag=SubPicCpbPreferredFlag && sub_pic_cpb_params_present_flag. If SubPicCpbFlag is equal to 0, the CPB operates at access unit level and each decoding unit is an access unit. Otherwise the CPB operates at sub-picture level and each decoding unit is a subset of an access unit.

If SubPicCpbFlag is equal to 0, the variable CpbRemovalDelay(m) is set to the value of cpb_removal_delay in the picture timing SEI message associated with the access unit that is decoding unit m, and the variable $T_c$ is set to $t_c$. Otherwise the variable CpbRemovalDelay(m) is set to the value of du_cpb_removal_delay[i] for decoding unit m in the picture timing SEI message associated with the access unit that contains decoding unit m, and the variable $T_c$ is set to $t_{c\_sub}$.

When a decoding unit m is the decoding unit with n equal to 0 (the first decoding unit of the access unit that initializes the HRD), the nominal removal time of the decoding unit from the CPB is specified by $$t_{r,n}(0)=\text{InitCpbRemovalDelay}[\text{SchedSelIdx}]\div 90000.$$

When a decoding unit m is the first decoding unit of the first access unit of a buffering period that does not initialize the HRD, the nominal removal time of the decoding unit from the CPB is specified by $t_{r,n}(m)=t_{r,n}(m_b)+T_c*\text{CpbRemovalDelay}(m)$ where $t_{r,n}(m_b)$ is the nominal removal time of the first decoding unit of the previous buffering period.

When a decoding unit m is the first decoding unit of a buffering period, $m_b$ is set equal to m at the removal time $t_{r,n}(m)$ of the decoding unit m.

The nominal removal time $t_{r,n}(m)$ of a decoding unit m that is not the first decoding unit of a buffering period is given by $t_{r,n}(m)=t_{r,n}(m_b)+T_c*\text{CpbRemovalDelay}(m)$ where $t_{r,n}(m_b)$ is the nominal removal time of the first decoding unit of the current buffering period.

The removal time of decoding unit m is specified as follows. The variable ClockDiff is defined as ClockDiff=(num_units_in_tick−(num_units_in_sub_tick*(num_decoding_units_minus1+1))/time_scale). In some case it may be requirement of a bitstream conformance that the parameters num_units_in_tick, num_units_in_sub_tick, num_decoding_units_minus1 are signaled such that following equation is satisfied.

(num_units_in_tick−(num_units_in_sub_tick*(num_decoding_units_minus1+1)))>=0

In some other case it may be requirement of a bitstream conformance that the parameters num_units_in_tick, num_units_in_sub_tick, num_decoding_units_minus1 may be signaled such that following equation is satisfied.

(num_units_in_tick−(num_units_in_sub_tick*(num_decoding_units_minus1+1)))<=0

If low_delay_hrd_flag is equal to 0 or $t_{r,n}(m)>=t_{af}(m)$, the removal time of decoding unit m is specified by $t_r(m)=t_{r,n}(m)$.

Otherwise (low_delay_hrd_flag is equal to 1 and $t_{r,n}(m)<t_{af}(m)$), and when sub_pic_cpb_params_present_flag equals to 1 and the CPB is operating at sub-picture level, and if ClockDiff is greater than zero the removal time of decoding unit m when it is the last decoding unit of the access unit n is specified by $t_r(m)=t_{r,n}(m)+T_c*\text{Ceil}((t_{af}(m)-t_{r,n}(m))/T_c)+\text{ClockDiff}$.

Otherwise (low_delay_hrd_flag is equal to 1 and tr,n(m)<taf(m)), and when sub_pic_cpb_params_present_flag equals to 1 and the CPB is operating at access unit level and if ClockDiff is less than zero the removal time of access unit n is specified by $t_r(m)=t_{r,n}(m)+t_c*\text{Ceil}(t_{af}(m)-t_{r,n}(m))/t_c)-\text{ClockDiff}$.

Otherwise (low_delay_hrd_flag is equal to 1 and $t_{r,n}(m)<t_{af}(m)$), the removal time of decoding unit m is specified by $t_r(m)=t_{r,n}(m)+T_c*\text{Ceil}(t_{af}(m)-t_{r,n}(m))/T_c)$. The latter case (low_delay_hrd_flag is equal to 1 and $t_{r,n}(m)<t_{af}(m)$) indicates that the size of decoding unit m, b(m), is so large that it prevents removal at the nominal removal time.

Otherwise (low_delay_hrd_flag is equal to 1 and $t_{r,n}(m)<t_{af}(m)$) and when a picture timing flag is set to 1 and the CPB is operating at sub-picture level, the removal time for the last decoding unit m of access unit, $t_r(m)$ according to: $t_r(m)=t_{r,n}(m)+\min((t_{c\_sub}*\text{Ceil}(t_{af}(m)-t_{r,n}(m))/t_{c\_sub})),$ $(t_c*\text{Ceil}(t_{af}(n)-t_{r,n}(n))/t_c)))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

Otherwise (low_delay_hrd_flag is equal to 1 and $t_{r,n}(n)<t_{af}(n)$) and when a picture timing flag is set to 1 and the CPB is operating at access unit level, level, the removal time for access unit n, $t_r(n)$ according to: $t_r(n)=t_{r,n}(n)+\min((t_{c\_sub}*\text{Ceil}((t_{af}(m)-t_{r,n}(m))/t_{c\_sub})),$ $(t_c*\text{Ceil}((t_{af}(n)-t_{r,n}(n))/t_c)))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

Otherwise (low_delay_hrd_flag is equal to 1 and $t_{r,n}(m)<t_{af}(m)$) and a picture timing flag is set to 1 and the CPB is operating at sub-picture level, the removal time for the last decoding unit m of access unit, $t_r(m)$ according to: $t_r(m)=t_{r,n}(m)+(t_c*\text{Ceil}(t_{af}(n)-t_{r,n}(n))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

Otherwise (low_delay_hrd_flag is equal to 1 and $t_{r,n}(n)<t_{af}(n)$) and a picture timing flag is set to 1 and the CPB is operating at access unit level, the removal time for access unit n, $t_r(n)$ according to: $t_r(n)=t_{r,n}(n)+(t_c*\text{Ceil}((t_{af}(n)-t_{r,n}(n))/t_c))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

Otherwise (low_delay_hrd_flag is equal to 1 and $t_{r,n}(m)<t_{af}(m)$) and a picture timing flag is set to 1 and the CPB is operating at sub-picture level, the removal time for the decoding unit which is not the last decoding unit of the access unit is set as $t_r(m)=t_{af}(m)$, where $t_{af}(m)$ is a final arrival time of decoding unit m. And the removal time of the last decoding unit m of access unit, $t_r(m)$ is set according to: $t_r(m)=t_{r,n}(m)+(t_{c\_sub}*\text{Ceil}((t_{af}(m)-t_{r,n}(m))/t_{c\_sub}))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n and $t_{af}(m)$ is a final arrival time of the last decoding unit m in the access unit n.

Otherwise (low_delay_hrd_flag is equal to 1 and $t_{r,n}(m)$ <$t_{af}(m)$) and a picture timing flag is set to 1 and the CPB is operating at sub-picture level, the removal time for the decoding unit which is not the last decoding unit of the access unit is set as $t_r(m)=t_{af}(m)$, where $t_{af}(m)$ is a final arrival time of decoding unit m. And the removal time of the last decoding unit m of access unit, $t_r(m)$ is set according to: $t_r(m)=t_{r,n}(m)+(t_c*Ceil(t_{af}(m)-t_{r,n}(m))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n and $t_{af}(m)$ is a final arrival time of the last decoding unit m in the access unit n.

Otherwise (low_delay_hrd_flag is equal to 1 and $t_{r,n}(m)$ <$t_{af}(m)$) and a picture timing flag is set to 1 and the CPB is operating at sub-picture level, the removal time for the decoding unit is set as $t_r(m)=t_{af}(m)$ where $t_{r,n}(m)$ is the nominal removal time of the decoding unit m, $t_{c\_sub}$ is sub-picture clock tick, Ceil( ) is a ceiling function, $t_{af}(m)$ is a final arrival time of decoding unit m, $t_{r,n}(n)$ is the nominal removal time of the access unit n, $t_c$ is clock tick and $t_{af}(n)$ is a final arrival time of access unit n and $t_{af}(m)$ is a final arrival time of the decoding unit m in the access unit n.

Otherwise (low_delay_hrd_flag is equal to 1 and $t_{r,n}(n)$ <$t_{af}(n)$) and a picture timing flag is set to 1 and the CPB is operating at access unit level, the removal time for access unit n, $t_r(n)$ according to: $t_r(n)=t_{af}(n)$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When SubPicCpbFlag is equal to 1, the nominal CPB removal time of access unit n $t_{r,n}(n)$ is set to the nominal CPB removal time of the last decoding unit in access unit n, the CPB removal time of access unit n $t_r(n)$ is set to the CPB removal time of the last decoding unit in access unit n.

When SubPicCpbFlag is equal to 0, each decoding unit is an access unit, hence the nominal CPB removal time and the CPB removal time of access unit n are the nominal CPB removal time and the CPB removal time of decoding unit n. At CPB removal time of decoding unit m, the decoding unit is instantaneously decoded.

As illustrated by the foregoing, the systems and methods disclosed herein provide syntax and semantics that modify a picture timing SEI message bitstreams carrying sub-picture based parameters. In some configurations, the systems and methods disclosed herein may be applied to HEVC specifications.

For convenience, several definitions are given as follows, which may be applied to the systems and methods disclosed herein. A random access point may be any point in a stream of data (e.g., bitstream) where decoding of the bitstream does not require access to any point in a bitstream preceding the random access point to decode a current picture and all pictures subsequent to said current picture in output order.

A buffering period may be specified as a set of access units between two instances of the buffering period SEI message in decoding order. Supplemental Enhancement Information (SEI) may contain information that is not necessary to decode the samples of coded pictures from VCL NAL units. SEI messages may assist in procedures related to decoding, display or other purposes. Conforming decoders may not be required to process this information for output order conformance to HEVC specifications (Annex C of HEVC specifications (JCTVC-I1003) includes specifications for conformance, for example). Some SEI message information may be used to check bitstream conformance and for output timing decoder conformance.

A buffering period SEI message may be an SEI message related to buffering period. A picture timing SEI message may be an SEI message related to CPB removal timing. These messages may define syntax and semantics which define bitstream arrival timing and coded picture removal timing.

A Coded Picture Buffer (CPB) may be a first-in first-out buffer containing access units in decoding order specified in a hypothetical reference decoder (HRD). An access unit may be a set of Network Access Layer (NAL) units that are consecutive in decoding order and contain exactly one coded picture. In addition to the coded slice NAL units of the coded picture, the access unit may also contain other NAL units not containing slices of the coded picture. The decoding of an access unit always results in a decoded picture. A NAL unit may be a syntax structure containing an indication of the type of data to follow and bytes containing that data in the form of a raw byte sequence payload interspersed as necessary with emulation prevention bytes.

As used herein, the term "common" generally refers to a syntax element or a variable that is applicable to more than one thing. For example, in the context of syntax elements in a picture timing SEI message, the term "common" may mean that the syntax element (e.g., common_du_cpb_removal_delay) is applicable to all decoding units in an access unit associated with the picture timing SEI message. Additionally, units of data are described in terms of "n" and "m" generally refer to access units and decoding units, respectively.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1A is a block diagram illustrating an example of one or more electronic devices 102 in which systems and methods for sending a message and buffering a bitstream may be implemented. In this example, electronic device A 102a and electronic device B 102b are illustrated. However, it should be noted that one or more of the features and functionality described in relation to electronic device A 102a and electronic device B 102b may be combined into a single electronic device in some configurations.

Electronic device A 102a includes an encoder 104. The encoder 104 includes a message generation module 108. Each of the elements included within electronic device A 102a (e.g., the encoder 104 and the message generation module 108) may be implemented in hardware, software or a combination of both.

Electronic device A 102a may obtain one or more input pictures 106. In some configurations, the input picture(s) 106 may be captured on electronic device A 102a using an image sensor, may be retrieved from memory and/or may be received from another electronic device.

The encoder 104 may encode the input picture(s) 106 to produce encoded data. For example, the encoder 104 may encode a series of input pictures 106 (e.g., video). In one configuration, the encoder 104 may be a HEVC encoder. The encoded data may be digital data (e.g., part of a bitstream 114). The encoder 104 may generate overhead signaling based on the input signal.

The message generation module 108 may generate one or more messages. For example, the message generation module 108 may generate one or more SEI messages or other messages. For a CPB that supports operation on a sub-picture level, the electronic device 102 may send sub-picture parameters, (e.g., CPB removal delay parameter). Specifically, the electronic device 102 (e.g., the encoder 104) may determine whether to include a common decoding unit CPB removal delay parameter in a picture timing SEI message. For example, the electronic device may set a flag (e.g., common_du_cpb_removal_delay_flag) to one when the encoder 104 is including a common decoding unit CPB removal delay parameter (e.g., common_du_cpb_removal_delay) in the picture timing SEI message. When the common decoding unit CPB removal delay parameter is included, the electronic device may generate the common decoding unit CPB removal delay parameter that is applicable to all decoding units in an access unit. In other words, rather than including a decoding unit CPB removal delay parameter for each decoding unit in an access unit, a common parameter may apply to all decoding units in the access unit with which the picture timing SEI message is associated.

In contrast, when the common decoding unit CPB removal delay parameter is not to be included in the picture timing SEI message, the electronic device 102 may generate a separate decoding unit CPB removal delay for each decoding unit in the access unit with which the picture timing SEI message is associated. A message generation module 108 may perform one or more of the procedures described in connection with FIG. 2 and FIG. 3 below.

In some configurations, electronic device A 102*a* may send the message to electronic device B 102*b* as part of the bitstream 114. In some configurations electronic device A 102*a* may send the message to electronic device B 102*b* by a separate transmission 110. For example, the separate transmission may not be part of the bitstream 114. For instance, a picture timing SEI message or other message may be sent using some out-of-band mechanism. It should be noted that, in some configurations, the other message may include one or more of the features of a picture timing SEI message described above. Furthermore, the other message, in one or more aspects, may be utilized similarly to the SEI message described above.

The encoder 104 (and message generation module 108, for example) may produce a bitstream 114. The bitstream 114 may include encoded picture data based on the input picture(s) 106. In some configurations, the bitstream 114 may also include overhead data, such as a picture timing SEI message or other message, slice header(s), PPS(s), etc. As additional input pictures 106 are encoded, the bitstream 114 may include one or more encoded pictures. For instance, the bitstream 114 may include one or more encoded pictures with corresponding overhead data (e.g., a picture timing SEI message or other message).

The bitstream 114 may be provided to a decoder 112. In one example, the bitstream 114 may be transmitted to electronic device B 102*b* using a wired or wireless link. In some cases, this may be done over a network, such as the Internet or a Local Area Network (LAN). As illustrated in FIG. 1A, the decoder 112 may be implemented on electronic device B 102*b* separately from the encoder 104 on electronic device A 102*a*. However, it should be noted that the encoder 104 and decoder 112 may be implemented on the same electronic device in some configurations. In an implementation where the encoder 104 and decoder 112 are implemented on the same electronic device, for instance, the bitstream 114 may be provided over a bus to the decoder 112 or stored in memory for retrieval by the decoder 112.

The decoder 112 may be implemented in hardware, software or a combination of both. In one configuration, the decoder 112 may be a HEVC decoder. The decoder 112 may receive (e.g., obtain) the bitstream 114. The decoder 112 may generate one or more decoded pictures 118 based on the bitstream 114. The decoded picture(s) 118 may be displayed, played back, stored in memory and/or transmitted to another device, etc.

The decoder 112 may include a CPB 120. The CPB 120 may temporarily store encoded pictures. The CPB 120 may use parameters found in a picture timing SEI message to determine when to remove data. When the CPB 120 supports operation on a sub-picture level, individual decoding units may be removed rather than entire access units at one time. The decoder 112 may include a Decoded Picture Buffer (DPB) 122. Each decoded picture is placed in the DPB 122 for being referenced by the decoding process as well as for output and cropping. A decoded picture is removed from the DPB at the later of the DPB output time or the time that it becomes no longer needed for inter-prediction reference.

The decoder 112 may receive a message (e.g., picture timing SEI message or other message). The decoder 112 may also determine whether the received message includes a common decoding unit CPB removal delay parameter (e.g., common_du_cpb_removal_delay). This may include identifying a flag (e.g., common_du_cpb_removal_delay_flag) that is set when the common parameter is present in the picture timing SEI message. If the common parameter is present, the decoder 112 may determine the common decoding unit CPB removal delay parameter applicable to all decoding units in the access unit. If the common parameter is not present, the decoder 112 may determine a separate decoding unit CPB removal delay parameter for each decoding unit in the access unit. The decoder 112 may also remove decoding units from the CPB 120 using either the common decoding unit CPB removal delay parameter or the separate decoding unit CPB removal delay parameters. The CPB 120 may perform one or more of the procedures described in connection with FIG. 4 and FIG. 5 below.

The HRD described above may be one example of the decoder 112 illustrated in FIG. 1A. Thus, an electronic device 102 may operate in accordance with the HRD and CPB 120 and DPB 122 described above, in some configurations.

It should be noted that one or more of the elements or parts thereof included in the electronic device(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an Application-Specific Integrated Circuit (ASIC), a Large-Scale Integrated circuit (LSI) or integrated circuit, etc.

Figure 1B:
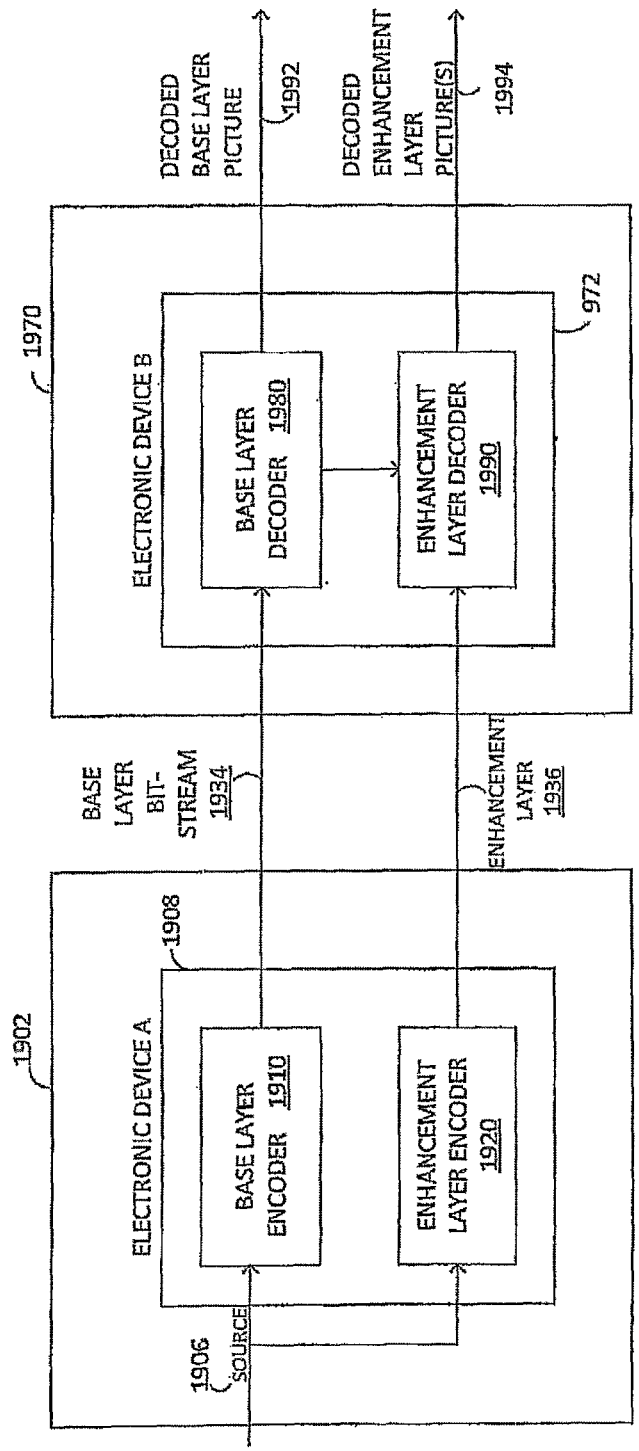
FIG. 1B is another block diagram illustrating an example of one or more electronic devices in which systems and methods for sending a message and buffering a bitstream may be implemented.

FIG. 1B is a block diagram illustrating another example of an encoder 1908 and a decoder 1972. In this example, electronic device A 1902 and electronic device B 1970 are illustrated. However, it should be noted that the features and functionality described in relation to electronic device A 1902 and electronic device B 1970 may be combined into a single electronic device in some configurations.

Electronic device A 1902 includes the encoder 1908. The encoder 1908 may include a base layer encoder 1910 and an enhancement layer encoder 1920. The video encoder 1908 is suitable for scalable video coding and multi-view video coding, as described later. The encoder 1908 may be implemented in hardware, software or a combination of both. In one configuration, the encoder 1908 may be a high-efficiency video coding (HEVC) coder, including scalable and/or multi-view. Other coders may likewise be used. Electronic device A 1902 may obtain a source 1906. In some configurations, the source 1906 may be captured on electronic device A 1902 using an image sensor, retrieved from memory or received from another electronic device.

The encoder 1908 may code the source 1906 to produce a base layer bitstream 1934 and an enhancement layer bitstream 1936. For example, the encoder 1908 may code a series of pictures (e.g., video) in the source 1906. In particular, for scalable video encoding for SNR scalability also known as quality scalability the same source 1906 may be provided to the base layer and the enhancement layer encoder. In particular, for scalable video encoding for spatial scalability a downsampled source may be used for the base layer encoder. In particular, for multi-view encoding a different view source may be used for the base layer encoder and the enhancement layer encoder. The encoder 1908 may be similar to the encoder 1782 described later in connection with FIG. 6B.

The bitstreams 1934, 1936 may include coded picture data based on the source 1906. In some configurations, the bitstreams 1934, 1936 may also include overhead data, such as slice header information, PPS information, etc. As additional pictures in the source 1906 are coded, the bitstreams 1934, 1936 may include one or more coded pictures.

The bitstreams 1934, 1936 may be provided to the decoder 1972. The decoder 1972 may include a base layer decoder 1980 and an enhancement layer decoder 1990. The video decoder 1972 is suitable for scalable video decoding and multi-view video decoding. In one example, the bitstreams 1934, 1936 may be transmitted to electronic device B 1970 using a wired or wireless link. In some cases, this may be done over a network, such as the Internet or a Local Area Network (LAN). As illustrated in FIG. 1B, the decoder 1972 may be implemented on electronic device B 1970 separately from the encoder 1908 on electronic device A 1902. However, it should be noted that the encoder 1908 and decoder 1972 may be implemented on the same electronic device in some configurations. In an implementation where the encoder 1908 and decoder 1972 are implemented on the same electronic device, for instance, the bitstreams 1934, 1936 may be provided over a bus to the decoder 1972 or stored in memory for retrieval by the decoder 1972. The decoder 1972 may provide a decoded base layer 1992 and decoded enhancement layer picture(s) 1994 as output.

The decoder 1972 may be implemented in hardware, software or a combination of both. In one configuration, the decoder 1972 may be a high-efficiency video coding (HEVC) decoder, including scalable and/or multi-view. Other decoders may likewise be used. The decoder 1972 may be similar to the decoder 1812 described later in connection with FIG. 7B. Also, the base layer encoder and/or the enhancement layer encoder may each include a message generation module, such as that described in relation to FIG. 1A. Also, the base layer decoder and/or the enhancement layer decoder may include a coded picture buffer and/or a decoded picture buffer, such as that described in relation to FIG. 1A. In addition, the electronic devices of FIG. 1B may operate in accordance with the functions of the electronic devices of FIG. 1A, as applicable.

FIG. 2 is a flow diagram illustrating one configuration of a method 200 for sending a message. The method 200 may be performed by an encoder 104 or one of its sub-parts (e.g., a message generation module 108). The encoder 104 may determine 202 a picture timing flag (e.g., sub_pic_cpb_params_present_flag) that indicates whether a CPB 120 supports operation on a sub-picture level. For example, when the picture timing flag is set to 1, the CPB 120 may operate on an access unit level or a sub-picture level. It should be noted that even when the picture timing flag is set to 1, the decision about whether to actually operate at the sub-picture level is left to the decoder 112 itself.

The encoder 104 may also determine 204 one or more removal delays for decoding units in an access unit. For example, the encoder 104 may determine a single common decoding unit CPB removal delay parameter (e.g., common_du_cpb_removal_delay) that is applicable to all decoding units in the access unit from the CPB 120. Alternatively, the encoder 104 may determine a separate decoding unit CPB removal delay (e.g., du_cpb_removal_delay[i]) for each decoding unit in the access unit.

The encoder 104 may also determine 206 one or more NAL parameters that indicate an amount, offset by one, of NAL units in each decoding unit in the access point. For example, the encoder 104 may determine a single common NAL parameter (e.g., common_num_nalus_in_du_minus1) that is applicable to all decoding units in the access unit from the CPB 120. Alternatively, the encoder 104 may determine a separate decoding unit CPB removal delay (e.g., num_nalus_in_du_minus1[i]) for each decoding unit in the access unit.

The encoder 104 may also send 208 a picture timing SEI message that includes the picture timing flag, the removal delays and the NAL parameters. The picture timing SEI message may also include other parameters (e.g., cpb_removal_delay, dpb_output_delay, etc). For example, the electronic device 102 may transmit the message via one or more of wireless transmission, wired transmission, device bus, network, etc. For instance, electronic device A 102a may transmit the message to electronic device B 102b. The message may be part of the bitstream 114, for example. In some configurations, electronic device A 102a may send 208 the message to electronic device B 102b in a separate transmission 110 (that is not part of the bitstream 114). For instance, the message may be sent using some out-of-band mechanism. In some case the information indicated in 204, 206 may be sent in a SEI message different than picture timing SEI message. In yet another case the information indicated in 204, 206 may be sent in a parameter set e.g. video parameter set and/or sequence parameter set and/or picture parameter set and/or adaptation parameter set and/or slice header.

FIG. 3 is a flow diagram illustrating one configuration of a method 300 for determining one or more removal delays for decoding units in an access unit. In other words, the method 300 illustrated in FIG. 3 may further illustrate step 204 in the method 200 illustrated in FIG. 2. The method 300 may be performed by an encoder 104. The encoder 104 may determine 302 whether to include a common decoding unit CPB removal delay parameter (e.g., common_du_cpb_removal_delay). This may include determining whether a common decoding unit CPB removal delay flag (e.g., common_du_cpb_removal_delay_flag) is set. An encoder 104 may send this common parameter in case the decoding units are removed from the CPB at regular interval. This may be the case, for example, when each decoding unit corresponds to certain number of rows of the picture or has some other regular structure.

For example, the common decoding unit CPB removal delay flag may be set to 1 when the common decoding unit CPB removal delay parameter is to be included in the picture timing SEI message and 0 when it is not to be included. If yes (e.g., flag is set to 1), the encoder 104 may determine 304 a common decoding unit CPB removal delay parameter (e.g., common_du_cpb_removal_delay) that is applicable to all decoding units in an access unit. If no (e.g., flag is set to 0), the encoder 104 may determine 306 separate decoding unit CPB removal delay parameters (e.g., du_cpb_removal_delay[i]) for each decoding unit in an access unit.

If a common decoding unit CPB removal delay parameter is present in a picture timing SEI message, it may specify an amount of sub-picture clock ticks to wait after removal from the CPB 120 of an immediately preceding decoding unit before removing from the CPB 120 a current decoding unit in the access unit associated with the picture timing SEI message.

For example, when a decoding unit is a first decoding unit in an access unit, the common decoding unit CPB 120 removal delay parameter may specify an amount of sub-picture clock ticks to wait after removal from the CPB 120 of a last decoding unit in an access unit associated with a most recent buffering period SEI message in a preceding access unit before removing from the CPB 120 the first decoding unit in the access unit associated with the picture timing SEI message.

When the decoding unit is a non-first decoding unit in an access unit, the common decoding unit CPB removal delay parameter may specify an amount of sub-picture clock ticks to wait after removal from the CPB 120 of a preceding decoding unit in the access unit associated with the picture timing SEI message before removing from the CPB a current decoding unit in the access unit associated with the picture timing SEI message.

In contrast, when a common decoding unit CPB removal delay parameter (e.g., common_du_cpb_removal_delay) is not sent in a picture timing SEI message, separate decoding unit CPB removal delay parameters (e.g., du_cpb_removal_delay[i]) may be included in the picture timing SEI message for each decoding unit in an access unit. The decoding unit CPB removal delay parameters (e.g., du_cpb_removal_delay[i]) may specify an amount of sub-picture clock ticks to wait after removal from the CPB 120 of the last decoding unit before removing from the CPB 120 an i-th decoding unit in the access unit associated with the picture timing SEI message. The decoding unit CPB removal delay parameters may be calculated according to a remainder of a modulo $2^{(cpb\_removal\_delay\_length\_minus1+1)}$ counter where cpb_removal_delay_length_minus1+1 is a length of a common decoding unit CPB removal delay parameter.

Figure 4:
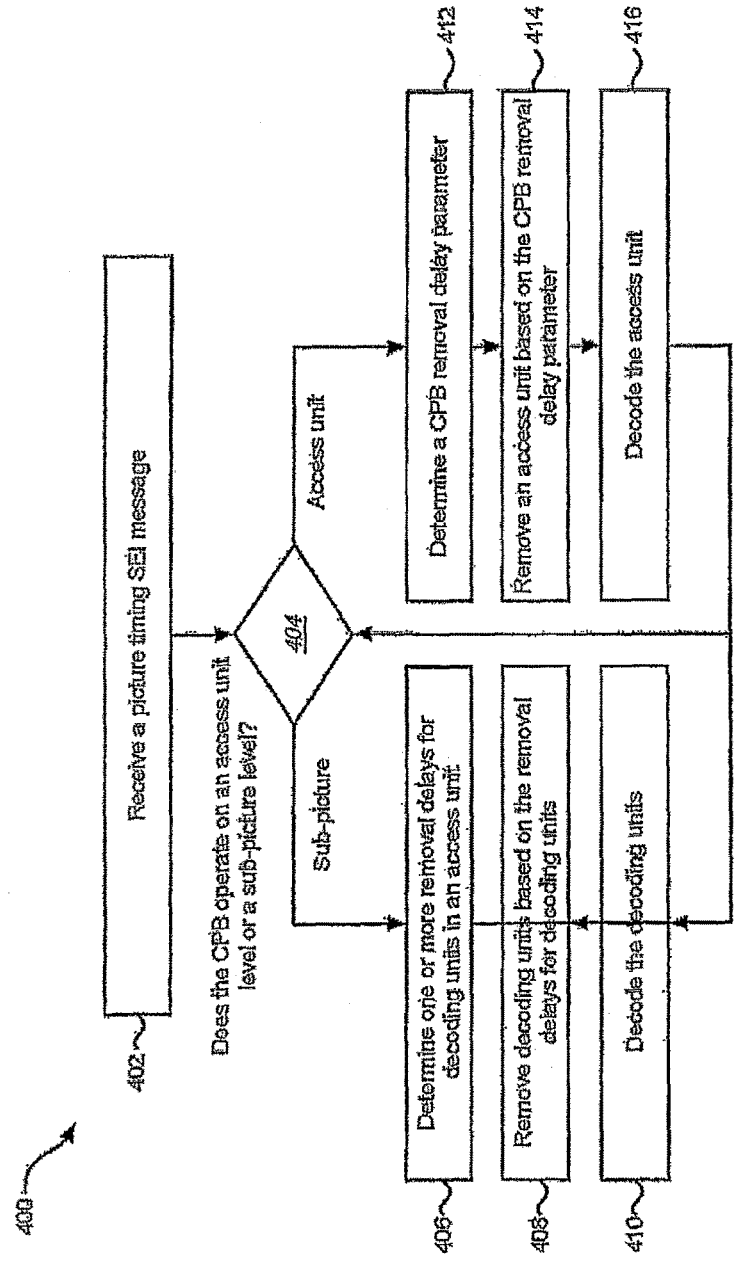
FIG. 4 is a flow diagram illustrating one configuration of a method for buffering a bitstream.

FIG. 4 is a flow diagram illustrating one configuration of a method 400 for buffering a bitstream. The method 400 may be performed by a decoder 112 in an electronic device 102 (e.g., electronic device B 102b), which may receive 402 a message (e.g., a picture timing SEI message or other message). For example, the electronic device 102 may receive 402 the message via one or more of wireless transmission, wired transmission, device bus, network, etc. For instance, electronic device B 102b may receive 402 the message from electronic device A 102a. The message may be part of the bitstream 114, for example. In another example, electronic device B 102b may receive the message from electronic device A 102a in a separate transmission 110 (that is not part of the bitstream 114, for example). For instance, the picture timing SEI message may be received using some out-of-band mechanism. In some configurations, the message may include one or more of a picture timing flag, one or more removal delays for decoding units in an access unit and one or more NAL parameters. Thus, receiving 402 the message may include receiving one or more of a picture timing flag, one or more removal delays for decoding units in an access unit and one or more NAL parameters.

The decoder 112 may determine 404 whether a CPB 120 operates on an access unit level or a sub-picture level. For example, a decoder 112 may decide to operate on sub-picture basis if it wants to achieve low latency. Alternatively, the decision may be based on whether the decoder 112 has enough resources to support sub-picture based operation. If the CPB 120 operates on a sub-picture level, the decoder may determine 406 one or more removal delays for decoding units in an access unit. For example, the decoder 112 may determine a single common decoding unit CPB removal delay parameter (e.g., common_du_cpb_removal_delay) that is applicable to all decoding units in the access unit. Alternatively, the decoder 112 may determine a separate decoding unit CPB removal delay (e.g., du_cpb_removal_delay[i]) for each decoding unit in the access unit. In other words, the picture timing SEI message may include a common parameter applicable to all decoding units in an access unit or separate parameters for every decoding unit.

The decoder 112 may also remove 408 decoding units based on the removal delays for the decoding units, i.e., using either a common parameter applicable to all decoding units in an access unit or separate parameters for every decoding unit. The decoder 112 may also decode 410 the decoding units.

The decoder 112 may use a variable ClockDiff when determining a removal time for determined from various signaled parameters. Specifically, ClockDiff may be determined according to ClockDiff (num_units_in_tick−(num_units_in_sub_tick*(num_decoding_units_minus1+1))/time_scale) where num_units_in_tick is number of time units of a clock operating at the frequency time_scale Hz that corresponds to one increment of a clock tick counter, num_units_in_sub_tick is number of time units of a clock operating at the frequency time_scale Hz that corresponds to one increment of a sub-picture clock tick counter, num_decoding_units_minus1+1 is an amount of decoding units in the access unit, and time_scale is the number of time units that pass in one second.

When a low delay hypothetical reference decoder (HRD) flag (e.g., low_delay_hrd_flag) is set to 1, $t_{r,n}(m) < t_{af}(m)$, a picture timing flag is set to 1, the CPB is operating at sub-picture level and ClockDiff is greater than zero, the removal time for decoding unit m, $t_r(m)$) is determined according to: $t_r(m) = t_{r,n}(m) + t_{c\_sub} * \text{Ceil}((t_{af}(m) - t_{r,n}(m))/t_{c\_sub})$ ClockDiff where $t_{r,n}(m)$ is the nominal removal time of the decoding unit m, $t_{c\_sub}$ is a sub-picture clock tick, Ceil( ) is a ceiling function and $t_{af}(m)$ is final arrival time of decoding unit m.

When a low delay hypothetical reference decoder (HRD) flag (e.g., low_delay_hrd_flag) is set to 1, $t_{r,n}(n) < t_{af}(n)$, a picture timing flag is set to 1, the CPB is operating at an access unit level and ClockDiff is greater than zero, the removal time for access unit n, $t_r(n)$ is determined according to: $t_r(n)=t_{r,n}(n)+t_c*\text{Ceil}((t_{af}(n)-t_{r,n}(n))/t_c)-\text{ClockDiff}$ where $t_{r,n}(n)$ is the nominal removal time of the access unit n, $t_c$ is a clock tick, Ceil( ) is a ceiling function and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the last decoding unit m of access unit, $t_r(m)$ according to: $t_r(m)=t_{r,n}(m)+\max((t_{c\_sub}*\text{Ceil}((t_{af}(m)-t_{r,n}(m))/t_{c\_sub})), (t_c*\text{Ceil}((t_{af}(n)-t_{r,n}(n))/t_c)))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{r,n}(n)+\max((t_{c\_sub}*\text{Ceil}((t_{af}(m)-t_{r,n}(m))/t_{c\_sub})), (t_c*\text{Ceil}((t_{af}(n)-t_{r,n}(n))/t_c)))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the last decoding unit m of access unit, $t_r(m)$ according to: $t_r(m)=t_{r,n}(m)+\min((t_{c\_sub}*\text{Ceil}((t_{af}(m)-t_{r,n}(m))/t_{c\_sub})), (t_c*\text{Ceil}((t_{af}(n)-t_{r,n}(n))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{r,n}(n)+\min((t_{c\_sub}*\text{Ceil}((t_{af}(m)-t_{r,n}(m))/t_{c\_sub})), (t_c*\text{Ceil}((t_{af}(n)-t_{r,n}(n))/t_c)))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the last decoding unit m of access unit, $t_r(m)$ according to: $t_r(m)=t_{r,n}(m)+(t_c*\text{Ceil}(t_{af}(n)-t_{r,n}(n))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{r,n}(n)+(t_c*\text{Ceil}(t_{af}(n)-t_{r,n}(n))/t_c))$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the decoding unit which is not the last decoding unit of the access unit is set as $t_r(m)=t_{af}(m)$, where $t_{af}(m)$ is a final arrival time of decoding unit m. And the removal time for the last decoding unit m of access unit, $t_r(m)$ according to: $t_r(m)=t_{r,n}(m)+(t_{c\_sub}*\text{Ceil}((t_{af}(m)-t_{r,n}(m))/t_{c\_sub}))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick $t_{af}(n)$ is a final arrival time of access unit n and $t_{af}(m)$ is a final arrival time of the last decoding unit in the access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the decoding unit which is not the last decoding unit of the access unit is set as $t_r(m)=t_{af}(m)$, where $t_{af}(m)$ is a final arrival time of decoding unit m. And the removal time for the last decoding unit m of access unit, $t_r(m)$ according to: $t_r(m)=t_{r,n}(m)+(t_c*\text{Ceil}((t_{af}(m)-t_{r,n}(m))/t_c))$ where $t_{r,n}(m)$ is the nominal removal time of the last decoding unit m, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick $t_{af}(n)$ is a final arrival time of access unit n and $t_{af}(m)$ is a final arrival time of the last decoding unit in the access unit n.

When a low delay hypothetical reference decoder (HRD) flag (e.g., low_delay_hrd_flag) is set to 1, $t_{r,n}(m)<t_{af}(m)$, a picture timing flag is set to 1 and the CPB is operating at sub-picture level, the removal time for the decoding unit is set as $t_r(m)=t_{af}(m)$ where $t_{r,n}(m)$ is the nominal removal time of the decoding unit m, $t_{c\_sub}$ is sub-picture clock tick, Ceil( ) is a ceiling function, $t_{af}(m)$ is a final arrival time of decoding unit m, $t_{r,n}(n)$ is the nominal removal time of the access unit n, $t_c$ is clock tick $t_{af}(n)$ is a final arrival time of access unit n and $t_{af}(m)$ is a final arrival time of the decoding unit in the access unit n.

When a low delay hypothetical reference decoder (HRD) flag is set to 1, $t_{r,n}(n)<t_{af}(n)$, a picture timing flag is set to 1 and the CPB is operating at access unit level, the removal time for access unit n, $t_r(n)$ according to: $t_r(n)=t_{af}(n)$ where $t_{r,n}(m)$ is the nominal removal time of the last decoding unit n, $t_{c\_sub}$ is sub-picture clock tick, Ceil( ) is a ceiling function, $t_{af}(m)$ is a final arrival time of last decoding unit m, $t_{r,n}(n)$ is the nominal removal time of the access unit n, $t_c$ is clock tick and $t_{af}(n)$ is a final arrival time of access unit n.

If the CPB operates on an access unit level, the decoder 112 may determine 412 a CPB removal delay parameter. This may be included in the received picture timing SEI message (e.g., cpb_removal_delay). The decoder 112 may also remove 414 an access unit based on the CPB removal delay parameter and decode 416 the access unit. In other words, the decoder 112 may decode whole access units at a time, rather than decoding units within the access unit.

Figure 5:
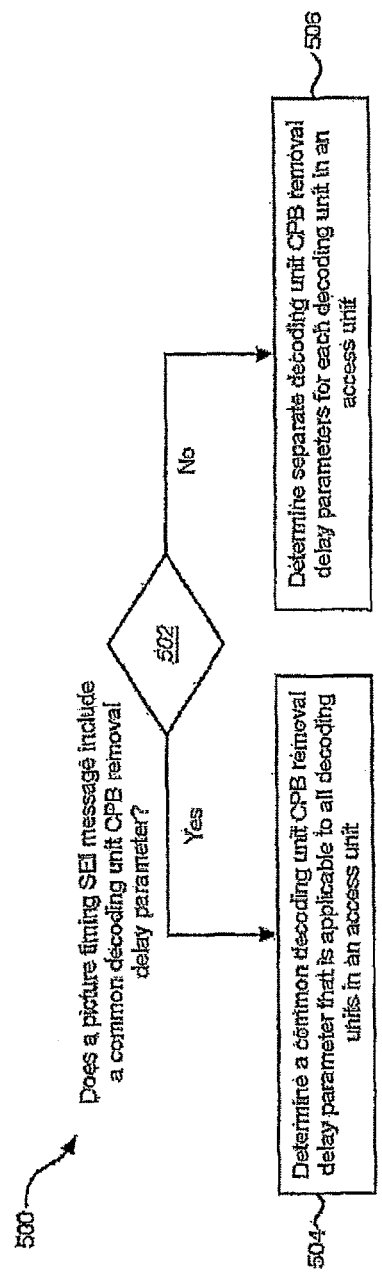
FIG. 5 is a flow diagram illustrating one configuration of a method for determining one or more removal delays for decoding units in an access unit.

FIG. 5 is a flow diagram illustrating one configuration of a method 500 for determining one or more removal delays for decoding units in an access unit. In other words, the method 500 illustrated in FIG. 5 may further illustrate step 406 in the method 400 illustrated in FIG. 4. The method 500 may be performed by a decoder 112. The decoder 112 may determine 502 whether a received picture timing SEI message includes a common decoding unit CPB removal delay parameter. This may include determining whether a common decoding unit CPB removal delay flag (e.g., common_du_cpb_removal_delay_flag) is set. If yes, the decoder 112 may determine 504 a common decoding unit CPB removal delay parameter (e.g., common_du_cpb_removal_delay) that is applicable to all decoding units in an access unit. If no, the decoder 112 may determine 506 separate decoding unit CPB removal delay parameters (e.g., du_cpb_removal_delay[i]) for each decoding unit in an access unit.

In addition to modifying the picture timing SEI message semantics, the present systems and methods may also impose a bitstream constraint so that the operation of sub-picture based CPB operation and access unit based CPB operation result in the same timing of decoding unit removal. Specifically, when the picture timing flag (e.g., sub_pic_cpb_params_present_flag) is set to 1, the CPB removal delay may be set according to $$\text{cpb\_removal\_delay} = \frac{\left( \sum_{i=0}^{num\_decoding\_units\_minus1} \text{du\_cpb\_removal\_delay}[i] \right) * t_{c,sub}}{t_c}$$

where du_cpb_removal_delay[i] are the decoding unit CPB removal delay parameters, $t_c$ is a clock tick, $t_{c,sub}$ is a sub-picture clock tick, num_decoding_units_minus1 is an amount of decoding units in the access unit offset by one, and i is an index.

Alternatively, the CPB removal delay may be set as described next: Let the variable $T_{du}(k)$ be defined as:

$$T_{du}[k] = T_{du}(k-1) + t_{c\_sub} * \sum_{i=0}^{num\_decoding\_units\_minus1_k} (\text{du\_cpb\_removal\_delay\_minus1}_k[i] + 1)$$

where du_cpb_removal_delay_minus1$_k$[i] and num_decoding_units_minus1$_k$ are parameters for i'th decoding unit of k'th access unit (with k=0 for the access unit that initialized the HRD and $T_{du}(k)=0$ for k<1), and where du_cpb_removal_delay_minus1$_k$[i]+1=du_cpb_removal_delay_minus1$_k$[i] is the decoding unit CPB removal delay parameter for the I'th decoding unit of the k'th access unit, and num_decoding_units_minus1$_k$ is the number of decoding units in the k'th access unit, $t_c$ is a clock tick, $t_{c,sub}$ is a sub-picture clock tick, and i and k are an indices. Then when the picture timing flag (e.g., sub_pic_cpb_params_present_flag) is set to 1, the following condition may be true:

(au_cpb_removal_delay_minus1+1)*$t_c$==$T_{du}$(k), where (au_cpb_removal_delay_minus1+1)=cpb_removal_delay, the CPB removal delay. Thus in this case the CPB removal delay (au_cpb_removal_delay_minus1+1) is set such that the operation of sub-picture based CPB operation and access unit based CPB operation result in the same timing of access unit removal and last decoding unit of the access unit removal.

Alternatively, the CPB removal delay may be set according to $$-1 \le \left[ \text{cpb\_removal\_delay} * t_c - \left( \sum_{i=0}^{num\_decoding\_units\_minus1} \text{du\_cpb\_removal\_delay}[i] \right) * t_{c,sub} \right] \le 1$$

where du_cpb_removal_delay[i] are the decoding unit CPB removal delay parameters, $t_c$ is a clock tick, $t_{c,sub}$ is a sub-picture clock tick, num_decoding_units_minus1 is an amount of decoding units in the access unit offset by one, and i is an index.

Alternatively, cpb_removal_delay and du_cpb_removal_delay[num_decoding_units_minus1] may be set according to: cpb_removal_delay*$t_c$=du_cpb_removal_delay[num_decoding_units_minus1]*$t_{c,sub}$ where du_cpb_removal_delay[num_decoding_units_minus1] is the decoding unit CPB removal delay parameter for the num_decoding_units_minus1'th decoding unit, $t_c$ is a clock tick, $t_{c,sub}$ is a sub-picture clock tick, num_decoding_units_minus1 is an amount of decoding units in the access unit offset by one.

In addition to modifying the picture timing SEI message semantics, the present systems and methods may also impose a bitstream constraint so that the operation of sub-picture based CPB operation and access unit based CPB operation result in the same timing of decoding unit removal. Specifically, when the picture timing flag (e.g., sub_pic_cpb_params_present_flag) is set to 1, the values for cpb_removal_delay and du_cpb_removal_delay[num_decoding_units_minus1] may be set so as to satisfy: −1<=(cpb_removal_delay*$t_c$−du_cpb_removal_delay[num_decoding_units_minus1]*$t_{c,sub}$)<=1 where du_cpb_removal_delay[num_decoding_units_minus1] is the decoding unit CPB removal delay parameter for the num_decoding_units_minus1'th decoding unit, $t_c$ is a clock tick, $t_{c,sub}$ is a sub-picture clock tick, num_decoding_units_minus1 is an amount of decoding units in the access unit offset by one.

Figure 6A:
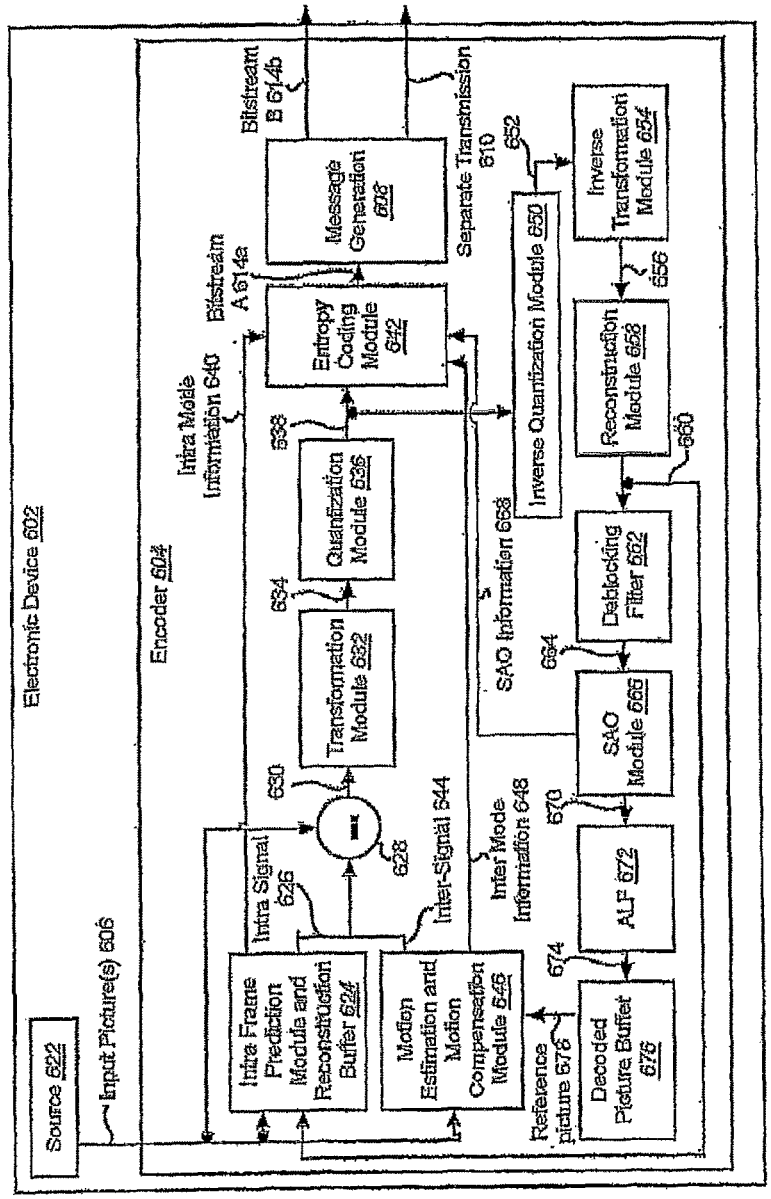
FIG. 6A is a block diagram illustrating one configuration of an encoder 604 on an electronic device.

FIG. 6A is a block diagram illustrating one configuration of an encoder 604 on an electronic device 602. It should be noted that one or more of the elements illustrated as included within the electronic device 602 may be implemented in hardware, software or a combination of both. For example, the electronic device 602 includes an encoder 604, which may be implemented in hardware, software or a combination of both. For instance, the encoder 604 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 604 may be a HEVC coder.

The electronic device 602 may include a source 622. The source 622 may provide picture or image data (e.g., video) as one or more input pictures 606 to the encoder 604. Examples of the source 622 may include image sensors, memory, communication interfaces, network interfaces, wireless receivers, ports, etc.

One or more input pictures 606 may be provided to an intra-frame prediction module and reconstruction buffer 624. An input picture 606 may also be provided to a motion estimation and motion compensation module 646 and to a subtraction module 628.

The intra-frame prediction module and reconstruction buffer 624 may generate intra mode information 640 and an intra-signal 626 based on one or more input pictures 606 and reconstructed data 660. The motion estimation and motion compensation module 646 may generate inter mode information 648 and an inter signal 644 based on one or more input pictures 606 and a reference picture 678 from decoded picture buffer 676. In some configurations, the decoded picture buffer 676 may include data from one or more reference pictures in the decoded picture buffer 676.

The encoder 604 may select between the intra signal 626 and the inter signal 644 in accordance with a mode. The intra signal 626 may be used in order to exploit spatial characteristics within a picture in an intra-coding mode. The inter signal 644 may be used in order to exploit temporal characteristics between pictures in an inter coding mode. While in the intra coding mode, the intra signal 626 may be provided to the subtraction module 628 and the intra mode information 640 may be provided to an entropy coding module 642. While in the inter coding mode, the inter signal 644 may be provided to the subtraction module 628 and the inter mode information 648 may be provided to the entropy coding module 642.

Either the intra signal 626 or the inter signal 644 (depending on the mode) is subtracted from an input picture 606 at the subtraction module 628 in order to produce a prediction residual 630. The prediction residual 630 is provided to a transformation module 632. The transformation module 632 may compress the prediction residual 630 to produce a transformed signal 634 that is provided to a quantization module 636. The quantization module 636 quantizes the transformed signal 634 to produce transformed and quantized coefficients (TQCs) 638.

The TQCs 638 are provided to an entropy coding module 642 and an inverse quantization module 650. The inverse quantization module 650 performs inverse quantization on the TQCs 638 to produce an inverse quantized signal 652 that is provided to an inverse transformation module 654. The inverse transformation module 654 decompresses the inverse quantized signal 652 to produce a decompressed signal 656 that is provided to a reconstruction module 658.

The reconstruction module 658 may produce reconstructed data 660 based on the decompressed signal 656. For example, the reconstruction module 658 may reconstruct (modified) pictures. The reconstructed data 660 may be provided to a deblocking filter 662 and to the intra prediction module and reconstruction buffer 624. The deblocking filter 662 may produce a filtered signal 664 based on the reconstructed data 660.

The filtered signal 664 may be provided to a sample adaptive offset (SAO) module 666. The SAO module 666 may produce SAO information 668 that is provided to the entropy coding module 642 and an SAO signal 670 that is provided to an adaptive loop filter (ALF) 672. The ALF 672 produces an ALF signal 674 that is provided to the decoded picture buffer 676. The ALF signal 674 may include data from one or more pictures that may be used as reference pictures.

The entropy coding module 642 may code the TQCs 638 to produce bitstream A 614a (e.g., encoded picture data). For example, the entropy coding module 642 may code the TQCs 638 using Context-Adaptive Variable Length Coding (CAVLC) or Context-Adaptive Binary Arithmetic Coding (CABAC). In particular, the entropy coding module 642 may code the TQCs 638 based on one or more of intra mode information 640, inter mode information 648 and SAO information 668. Bitstream A 614a (e.g., encoded picture data) may be provided to a message generation module 608. The message generation module 608 may be configured similarly to the message generation module 108 described in connection with FIG. 1. Additionally or alternatively, the message generation module 608 may perform one or more of the procedures described in connection with FIG. 2 and FIG. 3.

For example, the message generation module 608 may generate a message (e.g., picture timing SEI message or other message) including sub-picture parameters. The sub-picture parameters may include one or more removal delays for decoding units (e.g., common_du_cpb_removal_delay or du_cpb_removal_delay[i]) and one or more NAL parameters (e.g., common_num_nalus_in_du_minus1 or num_nalus_in_du_minus1[i]). In some configurations, the message may be inserted into bitstream A 614a to produce bitstream B 614b. Thus, the message may be generated after the entire bitstream A 614a is generated (e.g., after most of bitstream B 614b is generated), for example. In other configurations, the message may not be inserted into bitstream A 614a (in which case bitstream B 614b may be the same as bitstream A 614a), but may be provided in a separate transmission 610.

In some configurations, the electronic device 602 sends the bitstream 614 to another electronic device. For example, the bitstream 614 may be provided to a communication interface, network interface, wireless transmitter, port, etc. For instance, the bitstream 614 may be transmitted to another electronic device via LAN, the Internet, a cellular phone base station, etc. The bitstream 614 may additionally or alternatively be stored in memory or other component on the electronic device 602.

Figure 6B:
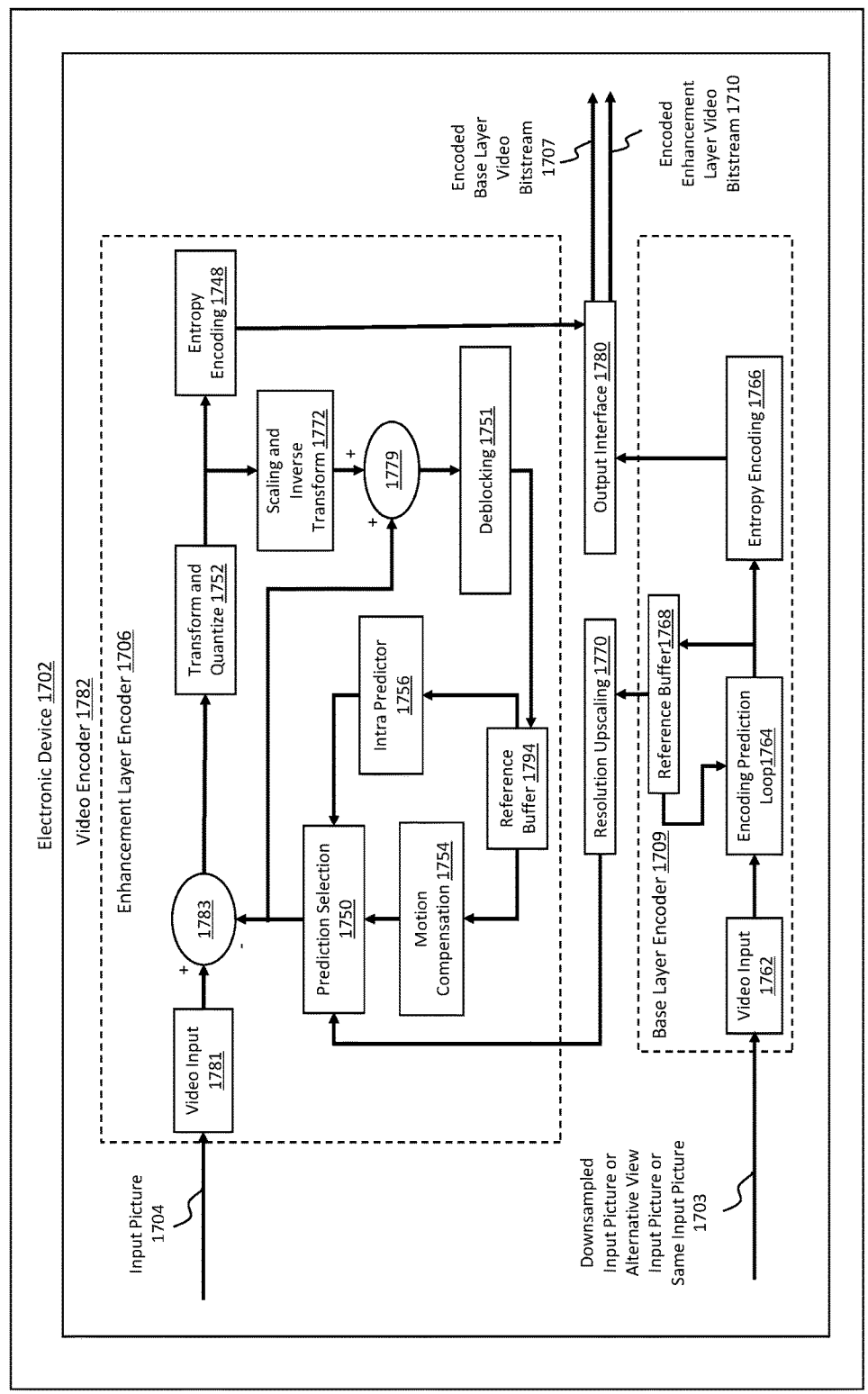
FIG. 6B is another block diagram illustrating one configuration of an encoder 604 on an electronic device.

FIG. 6B is a block diagram illustrating one configuration of a video encoder 1782 on an electronic device 1702. The video encoder 1782 may include an enhancement layer encoder 1706, a base layer encoder 1709, a resolution upscaling block 1770 and an output interface 1780. The video encoder of FIG. 6B, for example, is suitable for scalable video coding and multi-view video coding, as described herein.

The enhancement layer encoder 1706 may include a video input 1781 that receives an input picture 1704. The output of the video input 1781 may be provided to an adder/subtractor 1783 that receives an output of a prediction selection 1750. The output of the adder/subtractor 1783 may be provided to a transform and quantize block 1752. The output of the transform and quantize block 1752 may be provided to an entropy encoding 1748 block and a scaling and inverse transform block 1772. After entropy encoding 1748 is performed, the output of the entropy encoding block 1748 may be provided to the output interface 1780. The output interface 1780 may output both the encoded base layer video bitstream 1707 and the encoded enhancement layer video bitstream 1710.

The output of the scaling and inverse transform block 1772 may be provided to an adder 1779. The adder 1779 may also receive the output of the prediction selection 1750. The output of the adder 1779 may be provided to a deblocking block 1751. The output of the deblocking block 1751 may be provided to a reference buffer 1794. An output of the reference buffer 1794 may be provided to a motion compensation block 1754. The output of the motion compensation block 1754 may be provided to the prediction selection 1750. An output of the reference buffer 1794 may also be provided to an intra predictor 1756. The output of the intra predictor 1756 may be provided to the prediction selection 1750. The prediction selection 1750 may also receive an output of the resolution upscaling block 1770.

The base layer encoder 1709 may include a video input 1762 that receives a downsampled input picture, or other image content suitable for combing with another image, or an alternative view input picture or the same input picture 1703 (i.e., the same as the input picture 1704 received by the enhancement layer encoder 1706). The output of the video input 1762 may be provided to an encoding prediction loop 1764. Entropy encoding 1766 may be provided on the output of the encoding prediction loop 1764. The output of the encoding prediction loop 1764 may also be provided to a reference buffer 1768. The reference buffer 1768 may provide feedback to the encoding prediction loop 1764. The output of the reference buffer 1768 may also be provided to the resolution upscaling block 1770. Once entropy encoding 1766 has been performed, the output may be provided to the output interface 1780. The encoded base layer video bitstream 1707 and/or the encoded enhancement layer video bitstream 1710 may be provided to one or more message generation modules, as desired.

Figure 7A:
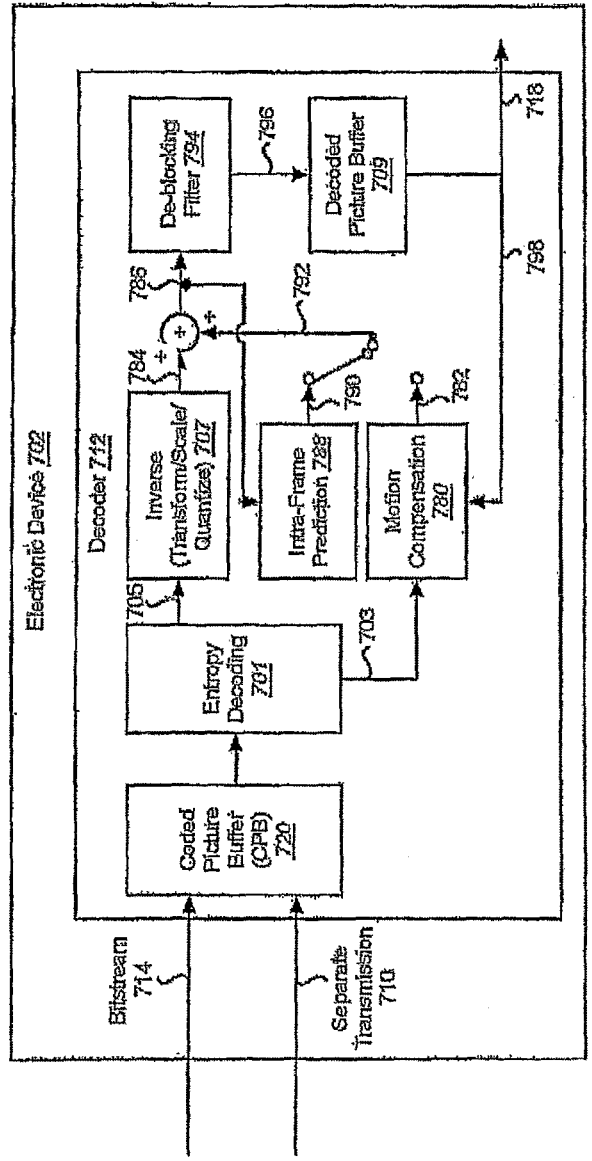
FIG. 7A is a block diagram illustrating one configuration of a decoder on an electronic device.

FIG. 7A is a block diagram illustrating one configuration of a decoder 712 on an electronic device 702. The decoder 712 may be included in an electronic device 702. For example, the decoder 712 may be a HEVC decoder. The decoder 712 and one or more of the elements illustrated as included in the decoder 712 may be implemented in hardware, software or a combination of both. The decoder 712 may receive a bitstream 714 (e.g., one or more encoded pictures and overhead data included in the bitstream 714) for decoding. In some configurations, the received bitstream 714 may include received overhead data, such as a message (e.g., picture timing SEI message or other message), slice header, PPS, etc. In some configurations, the decoder 712 may additionally receive a separate transmission 710. The separate transmission 710 may include a message (e.g., a picture timing SEI message or other message). For example, a picture timing SEI message or other message may be received in a separate transmission 710 instead of in the bitstream 714. However, it should be noted that the separate transmission 710 may be optional and may not be utilized in some configurations.

The decoder 712 includes a CPB 720. The CPB 720 may be configured similarly to the CPB 120 described in connection with FIG. 1 above. Additionally or alternatively, the decoder 712 may perform one or more of the procedures described in connection with FIG. 4 and FIG. 5. For example, the decoder 712 may receive a message (e.g., picture timing SEI message or other message) with sub-picture parameters and remove and decode decoding units in an access unit based on the sub-picture parameters. It should be noted that one or more access units may be included in the bitstream and may include one or more of encoded picture data and overhead data.

The Coded Picture Buffer (CPB) 720 may provide encoded picture data to an entropy decoding module 701. The encoded picture data may be entropy decoded by an entropy decoding module 701, thereby producing a motion information signal 703 and quantized, scaled and/or transformed coefficients 705.

The motion information signal 703 may be combined with a portion of a reference frame signal 798 from a decoded picture buffer 709 at a motion compensation module 780, which may produce an inter-frame prediction signal 782. The quantized, descaled and/or transformed coefficients 705 may be inverse quantized, scaled and inverse transformed by an inverse module 707, thereby producing a decoded residual signal 784. The decoded residual signal 784 may be added to a prediction signal 792 to produce a combined signal 786. The prediction signal 792 may be a signal selected from either the inter-frame prediction signal 782 produced by the motion compensation module 780 or an intra-frame prediction signal 790 produced by an intra-frame prediction module 788. In some configurations, this signal selection may be based on (e.g., controlled by) the bitstream 714.

The intra-frame prediction signal 790 may be predicted from previously decoded information from the combined signal 786 (in the current frame, for example). The combined signal 786 may also be filtered by a de-blocking filter 794. The resulting filtered signal 796 may be written to decoded picture buffer 709. The resulting filtered signal 796 may include a decoded picture. The decoded picture buffer 709 may provide a decoded picture which may be outputted 718. In some cases 709 may be a considered as frame memory.

Figure 7B:
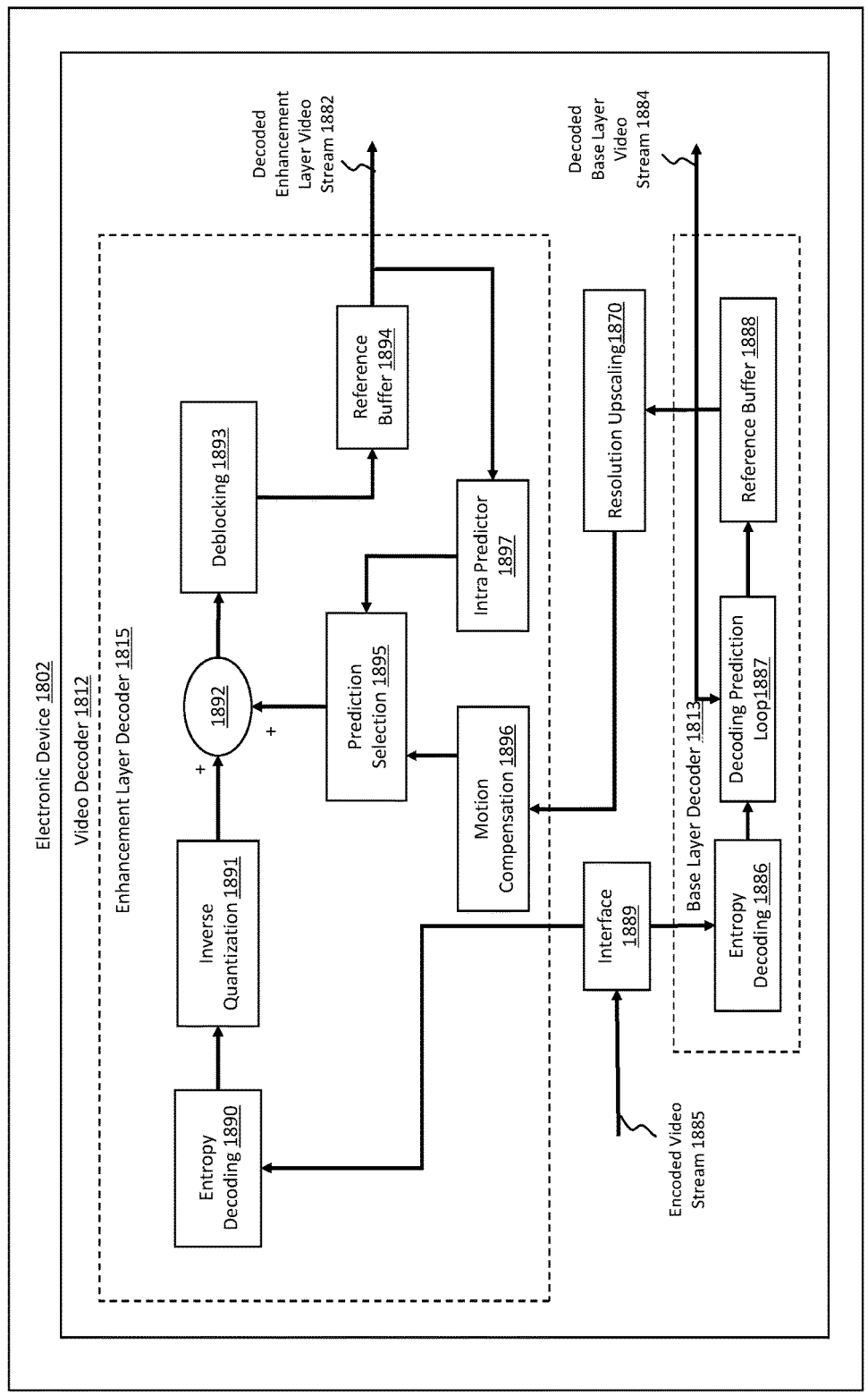
FIG. 7B is another block diagram illustrating one configuration of a decoder on an electronic device.

FIG. 7B is a block diagram illustrating one configuration of a video decoder 1812 on an electronic device 1802. The video decoder 1812 may include an enhancement layer decoder 1815 and a base layer decoder 1813. The video decoder 812 may also include an interface 1889 and resolution upscaling 1870. The video decoder of FIG. 7B, for example, is suitable for scalable video coding and multi-view video encoded, as described herein.

The interface 1889 may receive an encoded video stream 1885. The encoded video stream 1885 may consist of base layer encoded video stream and enhancement layer encoded video stream. These two streams may be sent separately or together. The interface 1889 may provide some or all of the encoded video stream 1885 to an entropy decoding block 1886 in the base layer decoder 1813. The output of the entropy decoding block 1886 may be provided to a decoding prediction loop 1887. The output of the decoding prediction loop 1887 may be provided to a reference buffer 1888. The reference buffer may provide feedback to the decoding prediction loop 1887. The reference buffer 1888 may also output the decoded base layer video stream 1884.

The interface 1889 may also provide some or all of the encoded video stream 1885 to an entropy decoding block 1890 in the enhancement layer decoder 1815. The output of the entropy decoding block 1890 may be provided to an inverse quantization block 1891. The output of the inverse quantization block 1891 may be provided to an adder 1892. The adder 1892 may add the output of the inverse quantization block 1891 and the output of a prediction selection block 1895. The output of the adder 1892 may be provided to a deblocking block 1893. The output of the deblocking block 1893 may be provided to a reference buffer 1894. The reference buffer 1894 may output the decoded enhancement layer video stream 1882. The output of the reference buffer 1894 may also be provided to an intra predictor 1897. The enhancement layer decoder 1815 may include motion compensation 1896. The motion compensation 1896 may be performed after the resolution upscaling 1870. The prediction selection block 1895 may receive the output of the intra predictor 1897 and the output of the motion compensation 1896. Also, the decoder may include one or more coded picture buffers, as desired, such as together with the interface 1889.

Figure 8:
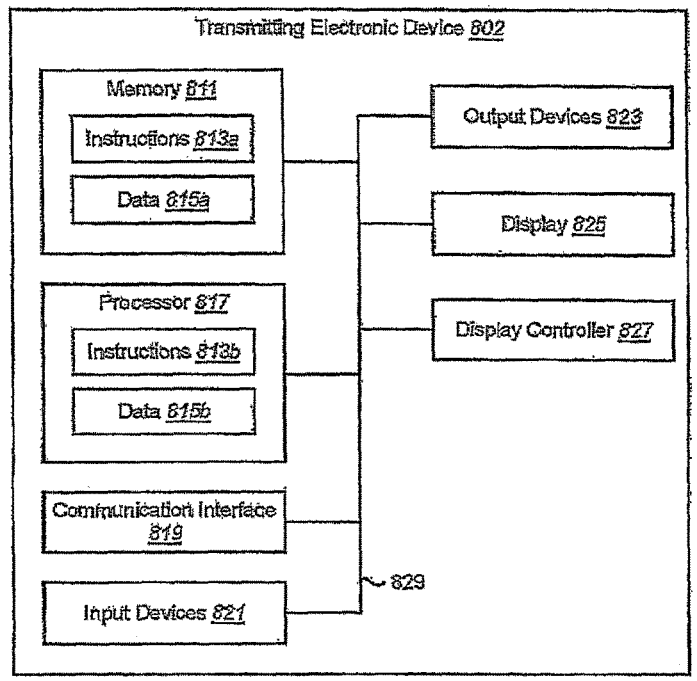
FIG. 8 illustrates various components that may be utilized in a transmitting electronic device.

FIG. 8 illustrates various components that may be utilized in a transmitting electronic device 802. One or more of the electronic devices 102, 602, 702 described herein may be implemented in accordance with the transmitting electronic device 802 illustrated in FIG. 8.

The transmitting electronic device 802 includes a processor 817 that controls operation of the electronic device 802. The processor 817 may also be referred to as a CPU. Memory 811, which may include both read-only memory (ROM), random access memory (RAM) or any type of device that may store information, provides instructions 813*a* (e.g., executable instructions) and data 815*a* to the processor 817. A portion of the memory 811 may also include non-volatile random access memory (NVRAM). The memory 811 may be in electronic communication with the processor 817.

Instructions 813*b* and data 815*b* may also reside in the processor 817. Instructions 813*b* and/or data 815*b* loaded into the processor 817 may also include instructions 813*a* and/or data 815*a* from memory 811 that were loaded for execution or processing by the processor 817. The instructions 813*b* may be executed by the processor 817 to implement the systems and methods disclosed herein. For example, the instructions 813*b* may be executable to perform one or more of the methods 200, 300, 400, 500 described above.

The transmitting electronic device 802 may include one or more communication interfaces 819 for communicating with other electronic devices (e.g., receiving electronic device). The communication interfaces 819 may be based on wired communication technology, wireless communication technology, or both. Examples of a communication interface 819 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The transmitting electronic device 802 may include one or more output devices 823 and one or more input devices 821. Examples of output devices 823 include a speaker, printer, etc. One type of output device that may be included in an electronic device 802 is a display device 825. Display devices 825 used with configurations disclosed herein may utilize any suitable image projection technology, such as a cathode ray tube (CRT), liquid crystal display (LCD), light-emitting diode (LED), gas plasma, electroluminescence or the like. A display controller 827 may be provided for converting data stored in the memory 811 into text, graphics, and/or moving images (as appropriate) shown on the display 825. Examples of input devices 821 include a keyboard, mouse, microphone, remote control device, button, joystick, trackball, touchpad, touchscreen, lightpen, etc.

The various components of the transmitting electronic device 802 are coupled together by a bus system 829, which may include a power bus, a control signal bus and a status signal bus, in addition to a data bus. However, for the sake of clarity, the various buses are illustrated in FIG. 8 as the bus system 829. The transmitting electronic device 802 illustrated in FIG. 8 is a functional block diagram rather than a listing of specific components.

Figure 9:
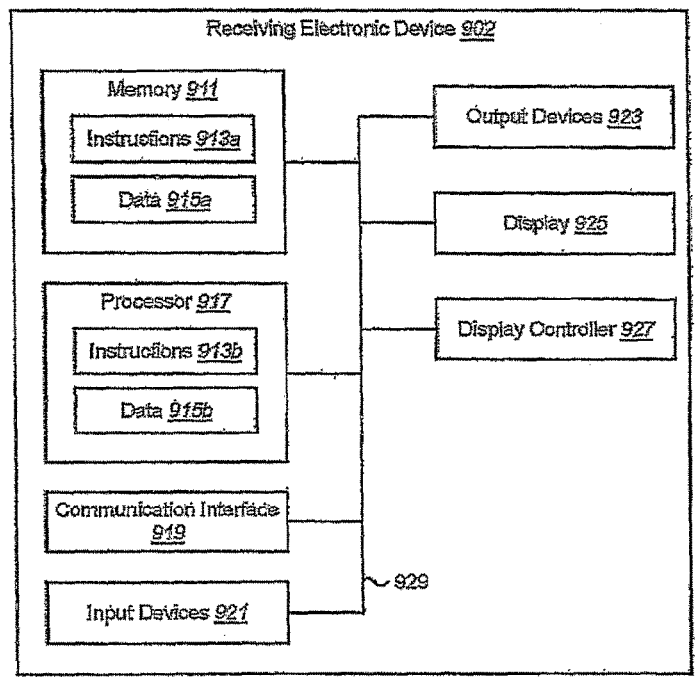
FIG. 9 is a block diagram illustrating various components that may be utilized in a receiving electronic device.

FIG. 9 is a block diagram illustrating various components that may be utilized in a receiving electronic device 902. One or more of the electronic devices 102, 602, 702 described herein may be implemented in accordance with the receiving electronic device 902 illustrated in FIG. 9.

The receiving electronic device 902 includes a processor 917 that controls operation of the electronic device 902. The processor 917 may also be referred to as a CPU. Memory 911, which may include both read-only memory (ROM), random access memory (RAM) or any type of device that may store information, provides instructions 913*a* (e.g., executable instructions) and data 915*a* to the processor 917. A portion of the memory 911 may also include non-volatile random access memory (NVRAM). The memory 911 may be in electronic communication with the processor 917.

Instructions 913*b* and data 915*b* may also reside in the processor 917. Instructions 913*b* and/or data 915*b* loaded into the processor 917 may also include instructions 913*a* and/or data 915*a* from memory 911 that were loaded for execution or processing by the processor 917. The instructions 913*b* may be executed by the processor 917 to implement the systems and methods disclosed herein. For example, the instructions 913*b* may be executable to perform one or more of the methods 200, 300, 400, 500 described above.

The receiving electronic device 902 may include one or more communication interfaces 919 for communicating with other electronic devices (e.g., a transmitting electronic device). The communication interface 919 may be based on wired communication technology, wireless communication technology, or both. Examples of a communication interface 919 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The receiving electronic device 902 may include one or more output devices 923 and one or more input devices 921. Examples of output devices 923 include a speaker, printer, etc. One type of output device that may be included in an electronic device 902 is a display device 925. Display devices 925 used with configurations disclosed herein may utilize any suitable image projection technology, such as a cathode ray tube (CRT), liquid crystal display (LCD), light-emitting diode (LED), gas plasma, electroluminescence or the like. A display controller 927 may be provided for converting data stored in the memory 911 into text, graphics, and/or moving images (as appropriate) shown on the display 925. Examples of input devices 921 include a keyboard, mouse, microphone, remote control device, button, joystick, trackball, touchpad, touchscreen, lightpen, etc.

The various components of the receiving electronic device 902 are coupled together by a bus system 929, which may include a power bus, a control signal bus and a status signal bus, in addition to a data bus. However, for the sake of clarity, the various buses are illustrated in FIG. 9 as the bus system 929. The receiving electronic device 902 illustrated in FIG. 9 is a functional block diagram rather than a listing of specific components.

Figure 10:
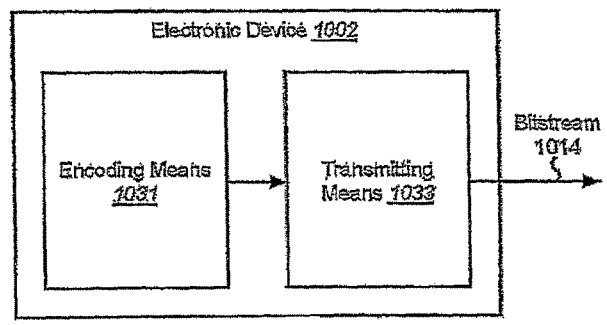
FIG. 10 is a block diagram illustrating one configuration of an electronic device in which systems and methods for sending a message may be implemented.

FIG. 10 is a block diagram illustrating one configuration of an electronic device 1002 in which systems and methods for sending a message may be implemented. The electronic device 1002 includes encoding means 1031 and transmitting means 1033. The encoding means 1031 and transmitting means 1033 may be configured to perform one or more of the functions described in connection with one or more of FIG. 1, FIG. 2, FIG. 3, FIG. 6 and FIG. 8 above. For example, the encoding means 1031 and transmitting means 1033 may generate a bitstream 1014. FIG. 8 above illustrates one example of a concrete apparatus structure of FIG. 10. Other various structures may be implemented to realize one or more of the functions of FIG. 1, FIG. 2, FIG. 3, FIG. 6 and FIG. 8. For example, a DSP may be realized by software.

Figure 11:
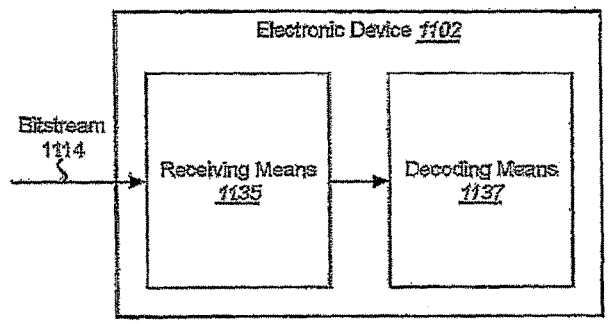
FIG. 11 is a block diagram illustrating one configuration of an electronic device in which systems and methods for buffering a bitstream may be implemented.

FIG. 11 is a block diagram illustrating one configuration of an electronic device 1102 in which systems and methods for buffering a bitstream 1114 may be implemented. The electronic device 1102 may include receiving means 1135 and decoding means 1137. The receiving means 1135 and decoding means 1137 may be configured to perform one or more of the functions described in connection with one or more of FIG. 1, FIG. 4, FIG. 5, FIG. 7 and FIG. 9 above. For example, the receiving means 1135 and decoding means 1137 may receive a bitstream 1114. FIG. 9 above illustrates one example of a concrete apparatus structure of FIG. 11. Other various structures may be implemented to realize one or more functions of FIG. 1, FIG. 4, FIG. 5, FIG. 7 and FIG. 9. For example, a DSP may be realized by software.

Figure 12:
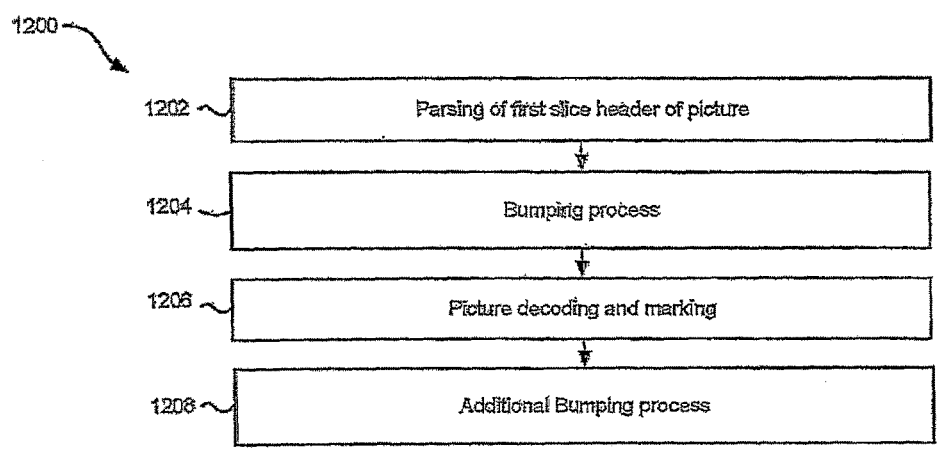
FIG. 12 is a block diagram illustrating one configuration of a method for operation of a decoded picture buffer.

FIG. 12 is a flow diagram illustrating one configuration of a method 1200 for operation of decoded picture buffer (DPB). The method 1200 may be performed by an encoder 104 or one of its sub-parts (e.g., a decoded picture buffer module 676). The method 1200 may be performed by a decoder 112 in an electronic device 102 (e.g., electronic device B 102*b*). Additionally or alternatively the method 1200 may be performed by a decoder 712 or one of its sub-parts (e.g., a decoded picture buffer module 709). The decoder may parse first slice header of a picture 1202. The output and removal of pictures from DPB before decoding of the current picture (but after parsing the slice header of the first slice of the current picture) happens instantaneously when first decoding unit of the access unit containing the current picture is removed from the CPB and proceeds as follows.

The decoding process for reference picture set (RPS) is invoked. Reference picture set is a set of reference pictures associated with a picture, consisting of all reference pictures that are prior to the associated picture in decoding order, that may be used for inter prediction of the associated picture or any picture following the associated picture in decoding order.

The bitstream of the video may include a syntax structure that is placed into logical data packets generally referred to as Network Abstraction Layer (NAL) units. Each NAL unit includes a NAL unit header, such as a two-byte NAL unit header (e.g., 16 bits), to identify the purpose of the associated data payload. For example, each coded slice (and/or picture) may be coded in one or more slice (and/or picture) NAL units. Other NAL units may be included for other categories of data, such as for example, supplemental enhancement information, coded slice of temporal sub-layer access (TSA) picture, coded slice of step-wise temporal sub-layer access (STSA) picture, coded slice a non-TSA, non-STSA trailing picture, coded slice of broken link access picture, coded slice of instantaneous decoded refresh picture, coded slice of clean random access picture, coded slice of decodable leading picture, coded slice of tagged for discard picture, video parameter set, sequence parameter set, picture parameter set, access unit delimiter, end of sequence, end of bitstream, filler data, and/or sequence enhancement information message. Table (4) illustrates one example of NAL unit codes and NAL unit type classes. Other NAL unit types may be included, as desired. It should also be understood that the NAL unit type values for the NAL units shown in the Table (4) may be reshuffled and reassigned. Also additional NAL unit types may be added. Also some NAL unit types may be removed.

An intra random access point (IRAP) picture is a coded picture for which each video coding layer NAL unit has nal_unit_type in the range of BLA_W_LP to RSV_I-RAP_VCL23, inclusive as shown in Table (4). An IRAP picture contains only Intra coded (I) slices. An instantaneous decoding refresh (IDR) picture is an IRAP picture for which each video coding layer NAL unit has nal_unit_type equal to IDR_W_RADL or IDR_N_LP as shown in Table (4). An instantaneous decoding refresh (IDR) picture contains only I slices, and may be the first picture in the bitstream in decoding order, or may appear later in the bitstream. Each IDR picture is the first picture of a coded video sequence (CVS) in decoding order. A broken link access (BLA) picture is an IRAP picture for which each video coding layer NAL unit has nal_unit_type equal to BLA_W_LP, BLA_W_RADL, or BLA_N_LP as shown in Table (4). A BLA picture contains only I slices, and may be the first picture in the bitstream in decoding order, or may appear later in the bitstream. Each BLA picture begins a new coded video sequence, and has the same effect on the decoding process as an IDR picture. However, a BLA picture contains syntax elements that specify a non-empty reference picture set.

TABLE 4

| nal_unit_type | Name of nal_unit_type | Content of NAL unit and raw byte sequence payload (RBSP) syntax structure | NAL unit type class |
|---|---|---|---|
| 0 | TRAIL_N | Coded slice segment of a non-TSA, non-STSA trailing picture slice_segment_layer_rbsp( ) | Video Coding Layer (VCL) |
| 1 | TRAIL_R | | |
| 2 | TSA_N | Coded slice segment of a temporal sub-layer access (TSA) picture slice_segment_layer_rbsp( ) | VCL |
| 3 | TSA_R | | |
| 4 | STSA_N | Coded slice segment of an Step-wise Temporal sub-layer access (STSA) picture slice_segment_layer_rbsp( ) | VCL |
| 5 | STSA_R | | |
| 6 | RADL_N | Coded slice segment of a random access decodable leading (RADL) picture slice_segment_layer_rbsp( ) | VCL |
| 7 | RADL_R | | |
| 8 | RASL_N | Coded slice segment of a | VCL |

TABLE 4-continued

| nal_unit_type | Name of nal_unit_type | Content of NAL unit and raw byte sequence payload (RBSP) syntax structure | NAL unit type class |
|---|---|---|---|
| 9 | RASL_R | random access skipped leading (RASL) picture slice_segment_layer_rbsp( ) | |
| 10 | RSV_VCL_N10 | Reserved non-IRAP sub-layer non-reference VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a broken link access (BLA) picture slice_segment_layer_rbsp( ) | VCL |
| 17 | BLA_W_RADL | | |
| 18 | BLA_N_LP | | |
| 19 | IDR_W_RADL | Coded slice segment of an instantaneous decoding refresh (IDR) picture slice_segment_layer_rbsp( ) | VCL |
| 20 | IDR_N_LP | | |
| 21 | CRA_NUT | Coded slice segment of a clean random access (CRA) picture slice_segment_layer_rbsp( ) | VCL |
| 22 | RSV_IRAP_VCL22 | Reserved IRAP VCL NAL unit types | VCL |
| 23 | RSV_IRAP_VCL23 | | |
| 24 ... 31 | RSV_VCL24 ... RSV_VCL31 | Reserved non-IRAP VCL NAL unit types | VCL |
| 32 | VPS_NUT | Video parameter set video_parameter_set_rbsp( ) | non-video coding layer (non-VCL) |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | |
| 41 ... 47 | RSV_NVCL41 ... RSV_NVCL47 | Reserved | non-VCL |
| 48 ... 63 | UNSPEC48 ... UNSPEC63 | Unspecified | non-VCL |

Referring to Table (5), the NAL unit header syntax may include two bytes of data, namely, 16 bits. The first bit is a "forbidden_zero_bit" which is always set to zero at the start of a NAL unit. The next six bits is a "nal_unit_type" which specifies the type of raw byte sequence payloads ("RBSP") data structure contained in the NAL unit as shown in Table (4). The next 6 bits is a "nuh_layer_id" which specify the identifier of the layer. In some cases these six bits may be specified as "nuh_reserved_zero_6 bits" instead. The nuh_reserved_zero_6 bits may be equal to 0 in the base specification of the standard. In a scalable video coding and/or syntax extensions nuh_layer_id may specify that this particular NAL unit belongs to the layer identified by the value of these 6 bits. The next syntax element is "nuh_temporal_id_plus1". The nuh_temporal_id_plus1 minus 1 may specify a temporal identifier for the NAL unit. The variable temporal identifier TemporalId may be specified as TemporalId=nuh_temporal_id_plus1−1. The temporal identifier TemporalId is used to identify a temporal sub-layer. The variable HighestTid identifies the highest temporal sub-layer to be decoded.

TABLE 5

| | Descriptor |
|---|---|
| nal_unit_header( ) { | |
|     forbidden_zero_bit | f(1) |
|     nal_unit_type | u(6) |
|     nuh_layer_id | u(6) |
|     nuh_temporal_id_plus1 | u(3) |
| } | |

Table (6) shows an exemplary sequence parameter set (SPS) syntax structure.

pic_width_in_luma_samples specifies the width of each decoded picture in units of luma samples. pic_width_in_luma_samples may not be equal to 0.

pic_height_in_luma_samples specifies the height of each decoded picture in units of luma samples. pic_height_in_luma_samples may not be equal to 0.

sps_max_sub_layers_minus1 plus 1 specifies the maximum number of temporal sub-layers that may be present in each CVS referring to the SPS. The value of sps_max_sub_layers_minus1 may be in the range of 0 to 6, inclusive.

sps_sub_layer_ordering_info_present_flag flag equal to 1 specifies that sps_max_dec_pic_buffering_minus1[i], sps_max_num_reorder_pics[i], and sps_max_latency_increase_plus1[i] syntax elements are present for sps_max_sub_layers_minus1+1 sub-layers. sps_sub_layer_ordering_info_present_flag equal to 0 specifies that the values of sps_max_dec_pic_buffering_minus1[sps_max_sub_layers_minus1], sps_max_num_reorder_pics[sps_max_sub_layers_minus1], and sps_max_latency_increase_plus1[sps_max_sub_layers_ minus1] apply to all sub-layers.

sps_max_dec_pic_buffering_minus1[i] plus 1 specifies the maximum required size of the decoded picture buffer for the CVS in units of picture storage buffers when HighestTid is equal to i. The value of sps_max_dec_pic_buffering_minus1[i] may be in the range of 0 to MaxDpbSize−1, inclusive where MaxDpbSize specifies the maximum decoded picture buffer size in units of picture storage buffers. When i is greater than 0, sps_max_dec_pic_buffering_minus1[i] may be greater than or equal to sps_max_dec_pic_buffering_minus1[i−1]. When sps_max_dec_pic_buffering_minus1[i] is not present for i in the range of 0 to sps_max_sub_layers_minus1−1, inclusive, due to sps_sub_layer_ordering_info_present_flag being equal to 0, it is inferred to be equal to sps_max_dec_pic_buffering_minus1[sps_max_sub_layers_minus1].

sps_max_num_reorder_pics[i] indicates the maximum allowed number of pictures that can precede any picture in the CVS in decoding order and follow that picture in output order when HighestTid is equal to i. The value of sps_max_num_reorder_pics[i] may be in the range of 0 to sps_max_dec_pic_buffering_minus1[i], inclusive. When i is greater than 0, sps_max_num_reorder_pics[i] may be greater than or equal to sps_max_num_reorder_pics[i−1]. When sps_max_num_reorder_pics[i] is not present for i in the range of 0 to sps_max_sub_layers_minus1−1, inclusive, due to sps_sub_layer_ordering_info_present_flag being equal to 0, it is inferred to be equal to sps_max_num_reorder_pics[sps_max_sub_layers_minus1].

sps_max_latency_increase_plus1[i] not equal to 0 is used to compute the value of SpsMaxLatencyPictures[i], which specifies the maximum number of pictures that can precede any picture in the CVS in output order and follow that picture in decoding order when HighestTid is equal to i.

When sps_max_latency_increase_plus1[i] is not equal to 0, the value of SpsMaxLatencyPictures[i] is specified as follows:

SpsMaxLatencyPictures[i]=sps_max_num_reorder_pics[i]+sps_max_latency_increase_plus1[i]−1

When sps_max_latency_increase_plus1[i] is equal to 0, no corresponding limit is expressed.

The value of sps_max_latency_increase_plus1[i] may be in the range of 0 to $2^{32}-2$, inclusive. When sps_max_latency_increase_plus1[i] is not present for i in the range of 0 to sps_max_sub_layers_minus1−1, inclusive, due to sps_sub_layer_ordering_info_present_flag being equal to 0, it is inferred to be equal to sps_max_latency_increase_plus1[sps_max_sub_layers_minus1].

TABLE 6

```
seq_parameter_set_rbsp( ) {
  ...
  sps_max_sub_layers_minus1
  ...
  pic_width_in_luma_samples
  pic_height_in_luma_samples
  ...
```

TABLE 6-continued

```
  for( i = ( sps_sub_layer_ordering_info_present_flag ? 0 :
    sps_max_sub_layers_minus1 );
      i <= sps_max_sub_layers_minus1; i++ ) {
    sps_max_dec_pic_buffering_minus1[ i ]
    sps_max_num_reorder_pics[ i ]
    sps_max_latency_increase_plus1[ i ]
  }
  ...
}
```

When the current picture is an IRAP picture, the following applies:
  If the current picture is an IDR picture, a BLA picture, the first picture in the bitstream in decoding order, or the first picture that follows an end of sequence NAL unit in decoding order, a variable NoRaslOutputFlag is set equal to 1.
  Otherwise, if some external means is available to set a variable HandleCraAsBlaFlag to a value for the current picture, the variable HandleCraAsBlaFlag is set equal to the value provided by that external means and the variable NoRaslOutputFlag is set equal to HandleCraAsBlaFlag.
  Otherwise, the variable HandleCraAsBlaFlag is set equal to 0 and the variable NoRaslOutputFlag is set equal to 0.

If the current picture is an IRAP picture with NoRaslOutputFlag equal to 1 that is not picture 0, the following ordered steps are applied:

1. The variable NoOutputOfPriorPicsFlag is derived for the decoder under test as follows:
  If the current picture is a CRA picture, NoOutputOfPriorPicsFlag is set equal to 1 (regardless of the value of no_output_of_prior_pics_flag).
  Otherwise, if the value of pic_width_in_luma_samples, pic_height_in_luma_samples, or sps_max_dec_pic_buffering_minus1[HighestTid] derived from the active SPS is different from the value of pic_width_in_luma_samples, pic_height_in_luma_samples, or sps_max_dec_pic_buffering_minus1[HighestTid], respectively, derived from the SPS active for the preceding picture, NoOutputOfPriorPicsFlag may (but should not) be set to 1 by the decoder under test, regardless of the value of no_output_of_prior_pics_flag.
  Otherwise, NoOutputOfPriorPicsFlag is set equal to no_output_of_prior_pics_flag.

2. The value of NoOutputOfPriorPicsFlag derived for the decoder under test is applied for the HRD as follows:
  If NoOutputOfPriorPicsFlag is equal to 1, all picture storage buffers in the DPB are emptied without output of the pictures they contain, and the DPB fullness is set equal to 0.
  Otherwise (NoOutputOfPriorPicsFlag is equal to 0), all picture storage buffers containing a picture that is marked as "not needed for output" and "unused for reference" are emptied (without output), and all non-empty picture storage buffers in the DPB are emptied by repeatedly invoking the "bumping" process 1204, and the DPB fullness is set equal to 0.
  Otherwise (the current picture is not an IRAP picture with NoRaslOutputFlag equal to 1), all picture storage buffers containing a picture which are marked as "not needed for output" and "unused for reference" are emptied (without output). For each picture storage buffer that is emptied, the DPB fullness is decremented by one. When one or more of the following conditions are true, the "bumping" process 1204 is invoked repeatedly while further decrementing the DPB fullness by one for each additional picture storage buffer that is emptied, until none of the following conditions are true:

1. The number of pictures with that particular nuh_layer_id value in the DPB that are marked as "needed for output" is greater than sps_max_num_reorder_pics[HighestTid] from the active sequence parameter set (when that particular nuh_layer_id value is equal to 0) or from the active layer sequence parameter set for that particular nuh_layer_id value.

2. If sps_max_latency_increase_plus1[HighestTid] from the active sequence parameter set (when that particular nuh_layer_id value is equal to 0) or from the active layer sequence parameter set for that particular nuh_layer_id value is not equal to 0 and there is at least one picture with that particular nuh_layer_id value in the DPB that is marked as "needed for output" for which the associated variable PicLatencyCount is greater than or equal to SpsMaxLatencyPictures[HighestTid] for that particular nuh_layer_id value.

3. The number of pictures with that particular nuh_layer_id value in the DPB is greater than or equal to sps_max_dec_pic_buffering[HighestTid]+1 from the active sequence parameter set (when that particular nuh_layer_id value is equal to 0) or from the active layer sequence parameter set for that particular nuh_layer_id value.

Picture decoding process in the block 1206 (picture decoding and marking) happens instantaneously when the last decoding unit of access unit containing the current picture is removed from the CPB.

For each picture with nuh_layer_id value equal to current picture's nuh_layer_id value in the DPB that is marked as "needed for output", the associated variable PicLatencyCount is set equal to PicLatencyCount+1.

The current picture is considered as decoded after the last decoding unit of the picture is decoded. The current decoded picture is stored in an empty picture storage buffer in the DPB, and the following applies:

If the current decoded picture has PicOutputFlag equal to 1, it is marked as "needed for output" and its associated variable PicLatencyCount is set equal to 0.

Otherwise (the current decoded picture has PicOutputFlag equal to 0), it is marked as "not needed for output".

The current decoded picture is marked as "used for short-term reference".

When one or more of the following conditions are true, the additional "bumping" process 1208 is invoked repeatedly until none of the following conditions are true:

The number of pictures with nuh_layer_id value equal to current picture's nuh_layer_id value in the DPB that are marked as "needed for output" is greater than sps_max_num_reorder_pics[HighestTid] from the active sequence parameter set (when the current picture's nuh_layer_id value is equal to 0) or from the active layer sequence parameter set for the current picture's nuh_layer_id value.

sps_max_latency_increase_plus1[HighestTid] from the active sequence parameter set (when the current picture's nuh_layer_id value is equal to 0) or from the active layer sequence parameter set for the current picture's nuh_layer_id value is not equal to 0 and there is at least one picture with that particular nuh_layer_id value in the DPB that is marked as "needed for output" for which the associated variable PicLatencyCount is greater than or equal to SpsMaxLatencyPictures[HighestTid] for that particular nuh_layer_id value.

The "bumping" process 1204 and additional bumping process 1208 are identical in terms of the steps and consists of the following ordered steps: The pictures that are first for output is selected as the ones having the smallest value of picture order count (PicOrderCntVal) of all pictures in the DPB marked as "needed for output". A picture order count is a variable that is associated with each picture, uniquely identifies the associated picture among all pictures in the CVS, and, when the associated picture is to be output from the decoded picture buffer, indicates the position of the associated picture in output order relative to the output order positions of the other pictures in the same CVS that are to be output from the decoded picture buffer.

These pictures are cropped, using the conformance cropping window specified in the active sequence parameter set for the picture with nuh_layer_id equal to 0 or in the active layer sequence parameter set for a nuh_layer_id value equal to that of the picture, the cropped pictures are output in ascending order of nuh_layer_id, and the pictures are marked as "not needed for output".

Each picture storage buffer that contains a picture marked as "unused for reference" and that included one of the pictures that was cropped and output is emptied.

Referring to FIG. 13A, as previously described the NAL unit header syntax may include two bytes of data, namely, 16 bits. The first bit is a "forbidden_zero_bit" which is always set to zero at the start of a NAL unit. The next six bits is a "nal_unit_type" which specifies the type of raw byte sequence payloads ("RBSP") data structure contained in the NAL unit. The next 6 bits is a "nuh_reserved_zero_6 bits". The nuh_reserved_zero_6 bits may be equal to 0 in the base specification of the standard. Other values of nuh_reserved_zero_6 bits may be specified as desired. Decoders may ignore (i.e., remove from the bitstream and discard) all NAL units with values of nuh_reserved_zero_6 bits not equal to 0 when handling a stream based on the base specification of the standard. In a scalable or other extension nuh_reserved_zero_6 bits may specify other values, to signal scalable video coding and/or syntax extensions. In some cases syntax element nuh_reserved_zero_6 bits may be called reserved_zero_6 bits. In some cases the syntax element nuh_reserved_zero_6 bits may be called as layer_id_plus1 or layer_id, as illustrated in FIG. 13B and FIG. 13C. In this case the element layer_id will be layer_id_plus1 minus 1. In this case it may be used to signal information related to layer of scalable coded video. The next syntax element is "nuh_temporal_id_plus1". nuh_temporal_id_plus1 minus 1 may specify a temporal identifier for the NAL unit. The variable temporal identifier TemporalId may be specified as TemporalId=nuh_temporal_id_plus1−1.

Referring to FIG. 14, a general NAL unit syntax structure is illustrated. The NAL unit header two byte syntax of FIG. 13 is included in the reference to nal_unit_header( ) of FIG. 14. The remainder of the NAL unit syntax primarily relates to the RBSP.

One existing technique for using the "nuh_reserved_zero_6 bits" is to signal scalable video coding information by partitioning the 6 bits of the nuh_reserved_zero_6 bits into distinct bit fields, namely, one or more of a dependency ID, a quality ID, a view ID, and a depth flag, each of which refers to the identification of a different layer of the scalable coded video. Accordingly, the 6 bits indicate what layer of the scalable encoding technique this particular NAL unit belongs to. Then in a data payload, such as a video parameter set ("VPS") extension syntax ("scalability_type") as illustrated in FIG. 15, the information about the layer is defined. The VPS extension syntax of FIG. 15 includes 4 bits for scalability type (syntax element scalability_type) which specifies the scalability types in use in the coded video sequence and the dimensions signaled through layer_id_plus1 (or layer_id) in the NAL unit header. When the scalability type is equal to 0, the coded video sequence conforms to the base specification, thus layer_id_plus1 of all NAL units is equal to 0 and there are no NAL units belonging to an enhancement layer or view. Higher values of the scalability type are interpreted as illustrated in FIG. 16.

The layer_id_dim_len[i] specifies the length, in bits, of the i-th scalability dimension ID. The sum of the values layer_id_dim_len[i] for all i values in the range of 0 to 7 is less than or equal to 6. The vps_extension_byte_alignment_reserved_zero_bit is zero. The vps_layer_id[i] specifies the value of layer_id of the i-th layer to which the following layer dependency information applies. The num_direct_ref_layers[i] specifies the number of layers the i-th layer directly depends on. The ref_layer_id[i][j] identifies the j-th layer the i-th layer directly depends on.

In this manner, the existing technique signals the scalability identifiers in the NAL unit and in the video parameter set to allocate the bits among the scalability types listed in FIG. 16. Then for each scalability type, FIG. 16 defines how many dimensions are supported. For example, scalability type 1 has 2 dimensions (i.e., spatial and quality). For each of the dimensions, the layer_id_dim_len[i] defines the number of bits allocated to each of these two dimensions, where the total sum of all the values of layer_id_dim_len[i] is less than or equal to 6, which is the number of bits in the nuh_reserved_zero_6 bits of the NAL unit header. Thus, in combination the technique identifies which types of scalability is in use and how the 6 bits of the NAL unit header are allocated among the scalability.

While such a fixed combination of different scalability dimensions, as illustrated in FIG. 16, is suitable for many applications there are desirable combinations which are not included. Referring to FIG. 17, a modified video parameter set extension syntax specifies a scalability type for each bit in the nuh_reserved_zero_6 bits syntax element. The vps_extension_byte_alignment_reserved_zero_bit is set to 0. The max_num_layers_minus1_bits indicates the total number of bits used for the syntax element in the first two bytes of the NAL unit header in FIG. 13 referred to as layer_id_plus1 or nuh_reserved_zero_6 bits. The scalability_map[i] specifies the scalability type for each bit in the layer_id_plus1 syntax element. In some case the layer_id_plus1 sytax element may be instead called nuh_reserved_zero_6 bits or reserved_zero_6 bits syntax element. The scalability map for all the bits of the syntax element layer_id_plus1 together specifies the scalability in use in the coded video sequence. The actual value of the identifier for each of the scalability types is signaled through those corresponding bits in the layer_id_plus1 (nuh_reserved_zero_6 bits) field in the NAL unit header. When scalability_map[i] is equal to 0 for all values of i, the coded video sequence conforms to the base specification, thus layer_id_plus1 value of NAL units is equal to 0 and there are no NAL units belonging to an enhancement layer or view. The vps_layer_id[i] specifies the value of layer_id of the i-th layer to which the following layer dependency information applies. The num_direct_ref_layers[i] specifies the number of layers the i-th layer directly depends on. The ref_layer_id[i][j] identifies the j-th layer the i-th layer directly depends on.

Higher values of scalability_map[i] are interpreted as shown in FIG. 18. The scalability map [i] includes the scalability dimensions of (0) none; (1) spatial; (2) quality; (3) depth; (4) multiview; (5) unspecified; (6) reserved; and (7) reserved.

Therefore each bit in the NAL unit header is interpreted based on the 3 bits in the video parameter set of what is the scalability dimension (e.g., none, spatial, quality, depth, multiview, unspecified, reserved). For example, to signal that all the bits in layer_id_plus1 correspond to spatial scalability, the scalability_map values in the VPS may be coded as 001 001 001 001 001 001 for the 6 bits of the NAL unit header. Also for example, to signal that 3 bits in layer_id_plus1 correspond to spatial scalability and 3 bits correspond to quality scalability, the scalability_map values in the VPS may be coded as 001 001 001 010 010 010 for the 6 bits of the NAL Unit header.

Referring to FIG. 19, another embodiment includes the video parameter set signaling the number of scalability dimensions in the 6 bits of the NAL unit header using the num_scalability_dimensions_minus1. The num_scalability_dimensions_minus1 plus 1 indicates the number of scalability dimensions signaled through the layer_id_plus1; nuh_reserved_zero_6 bits; and/or reserved_zero_6 bits syntax elements. The scalability_map[i] has the same semantics as described above in relation to FIG. 17. The num_bits_for_scalability_map[i] specifies the length in bits for the i'th scalability dimension. The sum of all of the num_bits_for_scalability_map[i] for i=0, . . . num_scalability_dimensions_minus1 is equal to six (or otherwise equal to the number of bits used for layer_id_plus1; vps_reserved_zero_6 bits; max_num_layers_minus1; reserved_zero_6 bits; nuh_reserved_zero_6 bits syntax elements).

With respect to FIG. 17 and FIG. 19 other variations may be used, if desired. In one embodiment for example, the scalability_map[i] may be signaled with u(4) (or u(n) with n>3 or n<3). In this case the higher values of scalability_map[i] may be specified as reserved for bitstreams conforming to a particular profile of the video technique. For example, scalability map values 6 . . . 15 may be specified as 'reserved' when signaling scalability_map[i] with u(4). In another embodiment for example, scalability_map[i] maybe signaled with ue(v) or some other coding scheme. In another embodiment for example, a restriction may be specified such that the scalability_map[i] values are arranged in monotonic non decreasing (or non-increasing) order. This results in various scalability dimension fields in the layer_id_plus1 field in NAL unit header being contiguous.

Another existing technique for signaling the scalable video coding using the "layer_id_plus1" or "nuh_reserved_zero_6 bits" syntax element is to map the layer_id_plus1 in the NAL unit header to a layer identification by signaling a general lookup table in the video parameter set. Referring to FIG. 20, the existing technique includes a video parameter set that specifies the number of dimension types and dimension identifications for the i-th layer of the lookup table. In particular, the vps_extension_byte_alignment_reserved_zero_bit is zero. The num_dimensions_minus1[i] plus 1 specifies the number of dimension types (dimension_type[i][j]) and dimension identifiers (dimension_id[i][j]) for the i-th layer. The dimension_type[i][j] specifies the j-th scalability dimension type of the i-th layer, which has layer_id or layer_id_plus1 equal to i, as specified in FIG. 31. As illustrated in FIG. 21, the dimensions that are identified include of (0) view order idx; (1) depth flag; (2) dependency ID; (3) quality ID; (4)-(15) reserved. The dimension_id[i][j] specifies the identifier of the j-th scalability dimension type of the i-th layer, which when not present is inferred to be 0. The num_direct_ref_layers[i] specifies the number of layers the i-th layer directly depends on. The ref_layer_id[i][j] identifies the j-th layer the i-th layer directly depends on. Unfortunately, the proposed embodiment illustrated in FIG. 20 results in an unwieldy large lookup table.

Referring to FIG. 22, a modified video parameter set extension includes a scalability mask that is used in combination with a scalability dimension. The scalability_mask signals a pattern of 0 and 1 bits with each bit corresponding to one scalability dimension as indicated by the scalability map syntax of FIG. 23. A value of 1 for a particular scalability dimension indicates that this scalability dimension is present in this layer (i'th layer). A value of 0 for a particular scalability dimension indicates that this scalability dimension is not present in this layer (i'th layer). For example, a set of bits of 00100000 refers to quality scalability. The actual identifier value of the particular scalability dimension that is present is indicated by the scalability_id[j] value signaled. The values of num_scalability_types[i] is equal to the sum of number of bits in the scalability_mask having value of 1. Thus $$\text{num\_scalability\_types}[i] = \sum_{k=0}^{7} \text{scalability\_mask}[i](k).$$

The scalability_id[j] indicates the j-th scalability dimension's identifier value for the type of scalability values that are signaled by the scalability_mask value.

Referring to FIG. 24, a modification of FIG. 22, includes the scalability mask being signaled outside the loop. This results in one common mask for each layer identification. Referring to FIG. 25, in this modification a corresponding exemplary video parameter set may include the scalable identification with the scalability mask not being included. In this case the syntax element scalable_id[j] has same interpretation as the syntax element scalability_id[j] in FIG. 22.

Referring to FIG. 26 a modification of FIG. 22 includes the scalability mask (scalability_mask) being signaled outside the loop. This results in one common mask for each layer identification. The scalability_mask signals a pattern of 0 and 1 bits with each bit corresponding to one scalability dimension as indicated by the scalability map syntax of FIG. 27. A value of 1 for a particular scalability dimension indicates that this scalability dimension is present in this layer (i'th layer). A value of 0 for a particular scalability dimension indicates that this scalability dimension is not present in this layer (i'th layer). For example, a set of bits of 00100000 refers to quality scalability. The actual identifier value of the particular scalability dimension that is present is indicated by the scalability_id[j] value signaled. The values of num_scalability_types[i] is equal to the sum of number of bits in the scalability_mask having value of 1. Thus $$\text{NumScalabilityTypes}[i] = \sum_{k=0}^{15} \text{scalability\_mask}(k).$$

In this case the scalability_id[j] variable may instead be called dimension_id[i][j] variable. dimension_id[i][j] specifies the scalability identifier of the j-th scalability dimension of the i-th layer. Then a variable ScalabilityId[i][j] is derived as follows.

```
for( i = 1; i <= vps_max_layers_minus1; i++ ) {
    for(k=0, j=0; k<=15; k++) {
        if(scalability_mask(k)==1)
            ScalabilityId [i][k]=dimension_id[i][j++]
        else
            ScalabilityId [i][k]=0;
    }
}
```

Where the ScalabilityId [i][k] signals dimension ID for the corresponding scalability type as follows.

| k | ScalabilityId [i][k] |
|---|---|
| 0 | DependencyId[i][k] |
| 1 | QualityId[i][k] |
| 2 | depthFlag[i][k] |
| 3 | ViewId[i][k] |
| 4-15 | Reserved |

Where DependencyId[i][1] is the dependency ID for the spatial scalability dimension for the i-th layer, QualityId[i][2] is the quality ID for the quality scalability dimension for the i-th layer, depthFlag[i] [3] is the depth flag/depth ID for the depth scalability dimension for the i-th layer, and ViewId[i] [4] is the view ID for the multiview scalability dimension for the i-th layer.

Also in FIG. 26 avc_base_codec_flag equal to 1 specifies that the base layer conforms to Rec. ITU-T H.264 I ISO/IEC 14496-10, and avc_base_codec_flag equal to 1 specifies to HEVC. vps_nuh_layer_id_present_flag indicates if layer_id_in_nuh[i] variable which signals the value of layer_id in NAL unit header is signaled.

In another embodiment one or more of the syntax elements scalability_mask[i], scalability_mask, scalability_id[j] may be signaled using different number of bits than u(8). For example they could be signaled with u(16) (or u(n) with n>8 or n<8). In another embodiment one or more of these syntax element could be signaled with ue(v). In another embodiment the scalability_mask may be signaled in the NAL unit header in layer_id_plus1; vps_reserved_zero_6 bits; max_num_layers_minus1; reserved_zero_6 bits; and/ or nuh_reserved_zero_6 bits syntax elements. In some embodiments the system may do this only for VPS NAL units, or only for non-VPS NAL units, or for all NAL units. In yet another embodiment scalability_mask may be signaled per picture anywhere in the bitstream. For example it may be signaled in slice header, picture parameter set, video parameter set, or any other parameter set or any other normative part of the bistream.

It should be noted that FIGS. 13, 15, 18, 20, 21, 22, 23 and corresponding description refer to 6 bits since the syntax element nuh_reserved_zero_6 bits or layer_id_plus1 in NAL unit header of FIG. 13 has 6 bits. However all the above description can be suitably modified if that syntax element used a different number of bits than 6 bits. For example if that syntax element (nuh_reserved_zero_6 bits or layer_id_plus1) instead used 9 bits then in FIG. 17 the value of max_num_layer_minus1 bits will be 9 and the scalability_map[i] will be signaled for each of the 9 bits instead of 6 bits.

Referring to FIG. 24 a modification of FIG. 22 provides syntax for signaling layer dependency information. New syntax element layer_dependency_information_pattern is defined.

layer_dependency_information_pattern signals a pattern of 0 and 1 bits with the length equal to vps_max_layers_minus1. A value of 0 for i'th bit indicates that the layer with layer_id (i+1) is an independent layer. A value of 1 for i'th bit indicates that the layer with layer_id (i+1) is a dependent layer which depends on one or more of other layers.

The values of NumDepLayers is equal to the sum of number of bits in the layer_dependency_information_pattern having value of 1. Thus $$NumDepLayers = \sum_{k=0}^{vps\_max\_layer\_minus1-1} layer\_dependency\_information\_pattern(k).$$

Referring to FIG. 29 a modification of FIG. 26 provides syntax for signaling layer dependency information. New syntax element layer_dependency_flag[i] is defined. layer_dependency_flag[i] signals if a layer depends on other layers. A value of 0 for the flag indicates that the layer with layer_id i is an independent layer. A value of 1 for i'th bit indicates that the layer with layer_id i is a dependent layer.

Referring to FIG. 30 a modification of FIG. 26 provides syntax for signaling layer dependency information. New syntax element layer_dependency_map[i] is defined. layer_dependency_map[i] signals a pattern of 0 and 1 bits with the length equal to vps_max_layers_minus1. A value of 0 for k'th bit of layer_dependency_map[i] indicates that the layer i does not depend on layer with layer_id (k+1). A value of 1 for k'th bit of layer_dependency_map[i] indicates that the layer i depends on layer with layer_id (k+1).

Referring to FIG. 31 a modification of FIG. 26 provides syntax for signaling layer dependency information. New syntax element layer_dependency_information_pattern is defined. layer_dependency_information_pattern signals a pattern of 0 and 1 bits with the length equal to vps_max_layers_minus1. A value of 0 for i'th bit indicates that the layer with layer_id (i+1) is an independent layer. A value of 1 for i'th bit indicates that the layer with layer_id (i+1) is a dependent layer which depends on one or more of other layers. The values of NumDepLayers is equal to the sum of number of bits in the layer_dependency_information_pattern having value of 1. Thus $$NumDepLayers = \sum_{k=0}^{vps\_max\_layer\_minus1-1} layer\_dependency\_information\_pattern(k).$$

layer_dependency_map[i] signals a pattern of 0 and 1 bits with the length equal to vps_max_layers_minus1. A value of 0 for k'th bit of layer_dependency_map[i] indicates that the layer i does not depend on layer with layer_id (k+1). A value of 1 for k'th bit of layer_dependency_map[i] indicates that the layer i depends on layer with layer_id (k+1).

Referring to FIG. 32 a modification of FIG. 26 provides syntax for signaling layer dependency information. FIG. 28 is a variant syntax based on syntax in FIG. 27. New syntax element layer_dependency_information_pattern is defined.

layer_dependency_information_pattern signals a pattern of 0 and 1 bits with the length equal to vps_max_layers_minus1. A value of 0 for i'th bit indicates that the layer with layer_id (i+1) is an independent layer. A value of 1 for i'th bit indicates that the layer with layer_id (i+1) is a dependent layer which depends on one or more of other layers.

The values of NumDepLayers is equal to the sum of number of bits in the layer_dependency_information_pattern having value of 1. Thus $$NumDepLayers = \sum_{k=0}^{vps\_max\_layer\_minus1-1} layer\_dependency\_information\_pattern(k).$$

Syntax elements num_direct_ref_layers[i] and ref_layer_id[i][j] are signaled only when layer_dependency_information_pattern(i) has a value of 1. Where layer_dependency_information_pattern(i) is the i'th bit of the syntax element layer_dependency_pattern.

Referring to FIG. 33 a modification of FIG. 26 provides syntax for signaling layer dependency information. FIG. 29 is a variant syntax based on syntax in FIG. 31. New syntax element layer_dependency_information_pattern is defined.

layer_dependency_information_pattern signals a pattern of 0 and 1 bits with the length equal to vps_max_layers_minus1. A value of 0 for i'th bit indicates that the layer with layer_id (i+1) is an independent layer. A value of 1 for i'th bit indicates that the layer with layer_id (i+1) is a dependent layer which depends on one or more of other layers.

The values of NumDepLayers is equal to the sum of number of bits in the layer_dependency_information_pattern having value of 1. Thus $$NumDepLayers = \sum_{k=0}^{vps\_max\_layer\_minus1-1} layer\_dependency\_information\_pattern(k).$$

layer_dependency_map[i] signals a pattern of 0 and 1 bits with the length equal to vps_max_layers_minus1. A value of 0 for k'th bit of layer_dependency_map[i] indicates that the layer i does not depend on layer with layer_id (k+1). A value of 1 for k'th bit of layer_dependency_map[i] indicates that the layer i depends on layer with layer_id (k+1). Syntax elements layer_dependency_map[i] is signaled only when layer_dependency_information_pattern(i) has a value of 1. Where layer_dependency_information_pattern(i) is the i'th bit of the syntax element layer_dependency_pattern.

In another embodiment layer_dependency_information_pattern syntax element may be signaled as a set of 1 bit flag values. In this case a total of vps_max_layers_minus1 1 bit values will be signaled as:

```
for( i = 1; i <= vps_max_layers_minus1 ; i++ )
{
    layer_dependency_information_pattern_flags[i];
}
```

In another embodiment layer_dependency_map[i] syntax element may be signaled as a set of 1 bit flag values. In this case a total of vps_max_layers_minus1 1 bit values will be signaled as:

```
for( j = 1; j<= vps_max_layers_minus1 ; j++ )
{
   layer_dependency_map_values[i][j];
}
```

In another embodiment one or more of the syntax elements layer_dependency_information_pattern, layer_dependency_map may be signaled using a known fixed number of bits instead of u(v). For example they could be signaled using u(64).

In another embodiment one or more of or more of the syntax elements layer_dependency_information_pattern, layer_dependency_map may be signaled with ue(v) or some other coding scheme.

In another embodiment the names of various syntax elements and their semantics may be altered by adding a plus1 or plus2 or by subtracting a minus1 or a minus2 compared to the described syntax and semantics.

In yet another embodiment various syntax elements such as layer_dependency_information_pattern, layer_dependency_map, layer_dependency_flag[i] etc. may be signaled per picture anywhere in the bitstream. For example it may be signaled in slice header, pps/ sps/ vps/ aps or any other parameter set or other normative part of the bitstream.

As previously described, scalable video coding is a technique of encoding a video bitstream that also contains one or more subset bitstreams. A subset video bitstream may be derived by dropping packets from the larger video to reduce the bandwidth required for the subset bitstream. The subset bitstream may represent a lower spatial resolution (smaller screen), lower temporal resolution (lower frame rate), or lower quality video signal. For example, a video bitstream may include 5 subset bitstreams, where each of the subset bitstreams adds additional content to a base bitstream. Hannuksela, et al., "Test Model for Scalable Extensions of High Efficiency Video Coding (HEVC)" JCTVC-L0453, Shanghai, October 2012, is hereby incorporated by reference herein in its entirety. Chen, et al., "SHVC Draft Text 1," JCTVC-L1008, Geneva, March, 2013, is hereby incorporated by reference herein in its entirety.

As previously described, multi-view video coding is a technique of encoding a video bitstream that also contains one or more other bitstreams representative of alternative views. For example, the multiple views may be a pair of views for stereoscopic video. For example, the multiple views may represent multiple views of the same scene from different viewpoints. The multiple views generally contain a large amount of inter-view statistical dependencies, since the images are of the same scene from different viewpoints. Therefore, combined temporal and inter-view prediction may achieve efficient multi-view encoding. For example, a frame may be efficiently predicted not only from temporally related frames, but also from the frames of neighboring viewpoints. Hannuksela, et al., "Common specification text for scalable and multi-view extensions," JCTVC-L0452, Geneva, January 2013, is hereby incorporated by reference herein in its entirety. Tech, et. al. "MV-HEVC Draft Text 3 (ISO/IEC 23008-2:201x/PDAM2)," JCT3V-C1004_d3, Geneva, January 2013, is hereby incorporated by reference herein in its entirety.

Chen, et al., "SHVC Draft Text 1," JCTVC-L1008, Geneva, January 2013; Hannuksela, et al. "Test Model for Scalable Extensions of High Efficiency Video Coding (HEVC)," JCTVC-L0453-spec-text, Shanghai, October 2012; and Hannuksela, "Draft Text for Multiview Extension of High Efficiency Video Coding (HEVC)," JCTVC-L0452-spec-text-r1, Shanghai, October 2012; each of which is incorporated by reference herein in its entirety, each have an output order decoded picture buffer (DPB) which operates based on using sps_max_num_reorder_pics[HighestTid], sps_max_latency_increase_plus1[HighestTid] and sps_max_dec_pic_buffering[HighestTid] syntax elements for the output and removal of pictures 0 from the DPB. This information is signaled in the video parameter set for the base layer, which provides buffering information for the video content including the enhancement layers, if any.

It was determined that signaling the output order decoded picture buffer (DPB) based on using sps_max_num_reorder_pics[HighestTid], sps_max_latency_increase_plus1[HighestTid] and sps_max_dec_pic_buffering[HighestTid] syntax elements for the output and removal of pictures from the DPB does not account for the buffer characteristics that may result from scalable video coding, such as when different numbers of enhancement layers are used which tends to vary after the content has been encoded based upon the user's viewing preferences, and the multi-view enhancement layers which tends to vary after the content has been encoded based upon the user's viewing preferences. Also it was determined that signaling the output order decoded picture buffer (DPB) based on using sps_max_num_reorder_pics[HighestTid], sps_max_latency_increase_plus1[HighestTid] and sps_max_dec_pic_buffering[HighestTid] syntax elements for the output and removal of pictures from the DPB may not be optimal in terms of the memory usage of the DPB when decoder operates at a certain operation point and/or is outputting selected output layer set. To accommodate such differences in the viewing preferences, the output order decoded picture buffer (DPB) may further and/or alternatively be based upon such syntax elements being included together with the video parameter set extension (VPS extension) to provide syntax elements for one or more of the enhancement layers. In this manner the syntax elements may be selected to be especially suitable for the particular operation point or output layer set, which tends to correspond to the user's viewing preferences.

The DPB buffering related parameters, vps_max_dec_pic_buffering_minus1, vps_max_num_reorder_pics, vps_max_latency_increase_plus1 may be signaled for sub-layers for the CVS for one or more operation points and/or for output layer sets in VPS extension. Similarly, the system may define the operation and bumping process for the output order DPB to use the above signalled DPB buffering parameters from the VPS extension if they are signalled for the operation point under test or for the selected output layer set. Otherwise the corresponding SPS level parameters from the active SPS (when currLayerId which corresponds to nuh_layer_id of the current picture is equal to 0) or from the active layer SPS depending upon the layer_id of the current layer are used.

Referring to FIG. 34A, an exemplary modified vps-extension is illustrated. The modified vps extension includes new syntax, namely, num_op_dpb_info_parameters and operation_point_layer_set_idx[i]. This modified vps extension may be defined in terms of the operation point which is a bitstream created from another bitstream by operation of a sub-bitstream extraction process with the another bitstream, a target highest TemporalId, and a target layer identifier list as inputs.

num_output_layer_sets specifies the number of layer sets for which output layers are specified with output_layer_set_index[i] and output_layer_flag[lsIdx][j]. When not present, the value of num_output_layer_sets is inferred to be equal to 0. A layer set describing output layers is an output layer set.

output_layer_set_idx[i] specifies the index lsIdx of the layer set for which output_layer_flag[lsIdx] [j] is present.

output_layer_flag[lsIdx][j] equal to 1 specifies that the layer with nuh_layer_id equal to j is a target output layer of the lsIdx-th layer set. A value of output_layer_flag[lsIdx][j] equal to 0 specifies that the layer with nuh_layer_id equal to j is not a target output layer of the lsIdx-th layer set.

The num_op_dpb_info_parameters specifies the number of op_dpb_parameters( ) syntax structures present in the VPS extension RBSP, defined in terms of the operation point. The num_op_dpb_info_parameters decoders is in the range of 0 to vps_num_layer_sets_minus1, inclusive.

The operation_point_layer_set_idx[i] specifies the index, into the list of layer sets defined by operation points to which the i-th op_dpb_info_parameters( ) syntax structure in the VPS extension applies. The value of operation_point_layer_set_idx[i] may be in the range of 0 to vps_num_layer_sets_minus1, inclusive. For bitstream conformance the operation_point_layer_set_idx[i] is not equal to operation_point_layer_set_idx[j] for any j not equal to i.

Referring to FIG. 35A, the op_dpb_info_parameters specifies vps_max_sub_layers_minus1 [j], vps_sub_layer_ordering_info_present_flag[j], vps_max_dec_pic_buffering_minus1[j][k], vps_max_num_reorder_pics[j] [k], and vps_max_latency_increase_plus1[j][k].

The vps_max_sub_layers_minus1[j] plus 1 indicates how many sub layers are included. The vps_max_sub_layers_minus1[j] plus 1 specifies the maximum number of temporal sub-layers that may be present in the CVS for layer with nuh_layer_id equal to j. The value of vps_max_sub_layers_minus1[j] is in the range of 0 to 6, inclusive.

The vps_sub_layer_ordering_info_present_flag[j] indicates whether the syntax is for one set including all layers or for each individual layer. The vps_sub_layer_ordering_info_present_flag[j] equal to 1 specifies that vps_max_dec_pic_buffering_minus1[j][k], vps_max_num_reorder_pics[j][k], and vps_max_latency_increase_plus1[j][k] are present for layer with nuh_layer_id equal to j for vps_max_sub_layers_minus1[j]+1 sub-layers. The vps_sub_layer_ordering_info_present_flag[j] equal to 0 specifies that the values of vps_max_dec_pic_buffering_minus1 [j][vps_max_sub_layers_minus1 [j]], vps_max_num_reorder_pics [j][vps_max_sub_layers_minus1 [j]], and vps_max_latency_increase_plus1[j][vps_max_sub_layers_minus1[j] ] apply to all sub-layers for layer with nuh_layer_id equal to j.

The vps_max_dec_pic_buffering_minus1[j][k] plus 1 specifies the maximum required size of the decoded picture buffer for the CVS for layer with nuh_layer_id equal to j in units of picture storage buffers when HighestTid is equal to k. The value of vps_max_dec_pic_buffering_minus1[j][k] may be in the range of 0 to MaxDpbSize−1 (as specified in subclause A.4), inclusive. When k is greater than 0, vps_max_dec_pic_buffering_minus1[j][k] may be greater than or equal to vps_max_dec_pic_buffering_minus1[j][k−1]. When vps_max_dec_pic_buffering_minus1[j][k] is not present for k in the range of 0 to vps_max_sub_layers_minus1[j]−1, inclusive, due to vps_sub_layer_ordering_info_present_flag[j] being equal to 0, it is inferred to be equal to vps_max_dec_pic_buffering_minus1[j] [vps_max_sub_layers_minus1[j] ].

The vps_max_num_reorder_pics[j][k] indicates the maximum allowed number of pictures that can precede any picture in the CVS for layer with nuh_layer_id equal to j in decoding order and follow that picture in output order when HighestTid is equal to k. The value of vps_max_num_reorder_pics[j][k] may be in the range of 0 to vps_max_dec_pic_buffering_minus1[j][k], inclusive. When k is greater than 0, vps_max_num_reorder_pics[j][k] is greater than or equal to vps_max_num_reorder_pics[j][k−1]. When vps_max_num_reorder_pics[j][k] is not present for k in the range of 0 to vps_max_sub_layers_minus1[j]−1, inclusive, due to vps_sub_layer_ordering_info_present_flag[j] being equal to 0, it is inferred to be equal to vps_max_num_reorder_pics[j][vps_max_sub_layers_minus1[j] ].

The vps_max_latency_increase_plus1[j][k] not equal to 0 is used to compute the value of VpsMaxLatencyPictures[j][k], which specifies the maximum number of pictures that can precede any picture in the CVS for layer with nuh_layer_id equal to j in output order and follow that picture in decoding order when HighestTid is equal to k.

When vps_max_latency_increase_plus1[j][k] is not equal to 0, the value of VpsMaxLatencyPictures[j][k] may be specified as follows:

$$\text{VpsMaxLatencyPictures}[j][k] = \text{vps\_max\_num\_reorder\_pics}[j][k] + \text{vps\_max\_latency\_increase\_plus1}[j][k] - 1$$

When vps_max_latency_increase_plus1[j][k] is equal to 0, no corresponding limit is expressed.

The value of vps_max_latency_increase_plus1[j][k] is in the range of 0 to $2^{32}-2$, inclusive. When vps_max_latency_increase_plus1[j][k] is not present for k in the range of 0 to vps_max_sub_layers_minus1[j]−1, inclusive, due to vps_sub_layer_ordering_info_present_flag[j] being equal to 0, it is inferred to be equal to vps_max_latency_increase_plus1[j][vps_max_sub_layers_minus1[j] ].

The 'vps_max_sub_layers_minus1' [id] [j] plus 1 specifies the maximum number of temporal sub-layers that may be present in the CVS for layer with nuh_layer_id equal to j for the operation point associated with index id. The value of vps_max_sub_layers_minus1[id] [j] may be in the range of 0 to 6, inclusive.

The 'vps_sub_layer_ordering_info_present_flag'[id][j] equal to 1 specifies that vps_max_dec_pic_buffering_minus1[id][j][k], vps_max_num_reorder_pics[id][j][k], and vps_max_latency_increase_plus1[id][j][k] are present for layer with nuh_layer_id equal to j for the operation point associated with index id for vps_max_sub_layers_minus1[id][j]+1 sub-layers. vps_sub_layer_ordering_info_present_flag[id][j] equal to 0 specifies that the values of vps_max_dec_pic_buffering_minus1[id][j][vps_max_sub_layers_minus1[id][j] ], vps_max_num_reorder_pics[id][j][vps_max_sub_layers_minus1[id][j]], and vps_max_latency_increase_plus1[id][j][vps_max_sub_layers_minus1[id][j] ] apply to all sub-layers for layer with nuh_layer_id equal to j for the operation point associated with index id.

The 'vps_max_dec_pic_buffering_minus1'[id][j][k] plus 1 specifies the maximum required size of the decoded picture buffer for the CVS for layer with nuh_layer_id equal to j for the operation point associated with index id in units of picture storage buffers when HighestTid is equal to k. The value of vps_max_dec_pic_buffering_minus1[id][j][k] may be in the range of 0 to MaxDpbSize−1 (as specified in subclause A.4), inclusive. When k is greater than 0, vps_max_dec_pic_buffering_minus1[id][j][k] may be greater than or equal to vps_max_dec_pic_buffering_minus1[id][j][k−1]. When vps_max_dec_pic_buffering_minus1[id][j][k] is not present for k in the range of 0 to vps_max_sub_layers_minus1[id][j]−1, inclusive, due to vps_sub_layer_ordering_info_present_flag[id][j] being equal to 0, it is inferred to be equal to vps_max_dec_pic_buffering_minus1[id][j][vps_max_sub_layers_minus1[id][j]].

The 'vps_max_num_reorder_pics'[id][j][k] indicates the maximum allowed number of pictures that can precede any picture in the CVS for layer with nuh_layer_id equal to j for the operation point associated with index id in decoding order and follow that picture in output order when HighestTid is equal to k. The value of vps_max_num_reorder_pics [id][j][k] may be in the range of 0 to vps_max_dec_pic_buffering_minus1[id][j][k], inclusive. When k is greater than 0, vps_max_num_reorder_pics[id][j][k] may be greater than or equal to vps_max_num_reorder_pics[id][j][k−1]. When vps_max_num_reorder_pics[id][j][k] is not present for k in the range of 0 to vps_max_sub_layers_minus1[id][j]−1, inclusive, due to vps_sub_layer_ordering_info_present_flag[id][j] being equal to 0, it is inferred to be equal to vps_max_num_reorder_pics[id][j][vps_max_sub_layers_minus1[id][j] ].

The 'vps_max_latency_increase_plus1'[id] [j][k] not equal to 0 is used to compute the value of VpsMaxLatencyPictures[id][j][k], which specifies the maximum number of pictures that can precede any picture in the CVS for layer with nuh_layer_id equal to j for the operation point associated with index id in output order and follow that picture in decoding order when HighestTid is equal to k.

When vps_max_latency_increase_plus1[id][j][k] is not equal to 0, the value of VpsMaxLatencyPictures[id][j][k] is specified as follows:

VpsMaxLatencyPictures[id][*j*][*k*]=vps_max_num_reorder_pics[id][*j*][*k*]+vps_max_latency_increase_plus1[id][*j*][*k*]−1

When vps_max_latency_increase_plus1[id][j][k] is equal to 0, no corresponding limit is expressed.

The value of vps_max_latency_increase_plus1[id][j][k] may be in the range of 0 to $2^{32}$−2, inclusive. When vps_max_latency_increase_plus1[id][j][k] is not present for k in the range of 0 to vps_max_sub_layers_minus1[id][j]−1, inclusive, due to vps_sub_layer_ordering_info_present_flag [id][j] being equal to 0, it is inferred to be equal to vps_max_latency_increase_plus1[id][j][vps_max_sub_layers_minus1[id][j]].

Referring to FIG. 35 B, the op_dpb_info_parameters may be further modified as shown to op_dpb_info_parameters (id,j). In this case the syntax of VPS extension may be as illustrated in FIG. 34B. The hypothetical reference decoder (HRD) is used to check bitstream and decoder conformance. Two types of bitstreams or bitstream subsets are subject to HRD conformance checking for the Joint Collaborative Team on Video Coding (JCT-VC). The first type, called a Type I bitstream, is a NAL unit stream containing only the VCL NAL units and NAL units with nal_unit_type equal to FD_NUT (filler data NAL units) for all access units in the bitstream. The second type, called a Type II bitstream, contains, in addition to the VCL NAL units and filler data NAL units for all access units in the bitstream, at least one of (a) additional non-VCL NAL units other than filler data NAL units, and (b) all leading_zero_8 bits, zero_byte, start_code_prefix_one_3 bytes, and trailing_zero_8 bits syntax elements that form a byte stream from the NAL unit stream.

The syntax elements of non-VCL NAL units (or their default values for some of the syntax elements), required for the HRD, are specified in the semantic subclauses of clause 7, Annexes D and E.

Two types of HRD parameter sets (NAL HRD parameters and VCL HRD parameters) are used. The HRD parameter sets are signalled through the hrd_parameters( ) syntax structure, which may be part of the SPS syntax structure or the VPS syntax structure.

Multiple tests may be needed for checking the conformance of a bitstream, which is referred to as the bitstream under test. For each test, the following steps apply in the order listed:

(1) An operation point under test, denoted as TargetOp, is selected. The layer identifier list OpLayerIdList of TargetOp consists of the list of nuh_layer_id values, in increasing order of nuh_layer_id values, present in the bitstream subset associated with TargetOp, which is a subset of the nuh_layer_id values present in the bitstream under test. The OpTid of TargetOp is equal to the highest TemporalId present in the bitstream subset associated with TargetOp.

(2) TargetDecLayerIdList is set equal to OpLayerIdList of TargetOp, HighestTid is set equal to OpTid of TargetOp, and the sub-bitstream extraction process as specified in clause 10 is invoked with the bitstream under test, HighestTid, and TargetDecLayerIdList as inputs, and the output is assigned to BitstreamToDecode.

(3) The hrd_parameters( ) syntax structure and the sub_layer_hrd_parameters( ) syntax structure applicable to TargetOp are selected. If TargetDecLayerIdList contains all nuh_layer_id values present in the bitstream under test, the hrd_parameters( ) syntax structure in the active SPS (or provided through an external means not specified in this Specification) is selected. Otherwise, the hrd_parameters( ) syntax structure in the active VPS (or provided through some external means not specified in this Specification) that applies to TargetOp is selected. Within the selected hrd_parameters( ) syntax structure, if BitstreamToDecode is a Type I bitstream, the sub_layer_hrd_parameters(HighestTid) syntax structure that immediately follows the condition "if (vcl_hrd_parameters_present_flag)" is selected and the variable NalHrdModeFlag is set equal to 0; otherwise (BitstreamToDecode is a Type II bitstream), the sub_layer_hrd_parameters(HighestTid) syntax structure that immediately follows either the condition "if (vcl_hrd_parameters_present_flag)" (in this case the variable NalHrdModeFlag is set equal to 0) or the condition "if (nal_hrd_parameters_present_flag)" (in this case the variable NalHrdModeFlag is set equal to 1) is selected. When BitstreamToDecode is a Type II bitstream and NalHrdModeFlag is equal to 0, all non-VCL NAL units except filler data NAL units, and all leading_zero_8 bits, zero_byte, start_code_prefix_one_3 bytes, and trailing_zero_8 bits syntax elements that form a byte stream from the NAL unit stream (as specified in Annex B), when present, are discarded from BitstreamToDecode, and the remaining bitstream is assigned to BitstreamToDecode.

In another case Multiple tests may be needed for checking the conformance of a bitstream, which is referred to as the bitstream under test. For each test, the following steps apply in the order listed:

(1) An output layer set under test, denoted as TargetOpLs is selected. The operation point referred in TargetOpLs by output_layer_set_idx[ ] identifies the operation point under test. The output layer identifier list OpLayerIdList of TargetOpLs consists of the list of nuh_layer_id values, in increasing order of nuh_layer_id values, present in the bitstream subset associated with TargetOp and TargetOpLs, which is a subset of the nuh_layer_id values present in the bitstream under test. The OpTid of TargetOp is equal to the highest TemporalId present in the bitstream subset associated with TargetOp.

(2) TargetDecLayerIdList is set equal to target decoded layer identifier list targetDLayerIdList for the selected output layer set TargetOpLs, HighestTid is set equal to OpTid of TargetOp, and the sub-bitstream extraction process as specified in clause 10 is invoked with the bitstream under test, HighestTid, and TargetDecLayerIdList as inputs, and the output is assigned to BitstreamToDecode.

(3) The hrd_parameters( ) syntax structure and the sub_layer_hrd_parameters( ) syntax structure applicable to TargetOp are selected. If TargetDecLayerIdList contains all nuh_layer_id values present in the bitstream under test, the hrd_parameters( ) syntax structure in the active SPS (or provided through an external means not specified in this Specification) is selected. Otherwise, the hrd_parameters( ) syntax structure in the active VPS (or provided through some external means not specified in this Specification) that applies to TargetOp is selected. Within the selected hrd_parameters( ) syntax structure, if BitstreamToDecode is a Type I bitstream, the sub_layer_hrd_parameters(HighestTid) syntax structure that immediately follows the condition "if (vcl_hrd_parameters_present_flag)" is selected and the variable NalHrdModeFlag is set equal to 0; otherwise (BitstreamToDecode is a Type II bitstream), the sub_layer_hrd_parameters(HighestTid) syntax structure that immediately follows either the condition "if (vcl_hrd_parameters_present_flag)" (in this case the variable NalHrdModeFlag is set equal to 0) or the condition "if (nal_hrd_parameters_present_flag)" (in this case the variable NalHrdModeFlag is set equal to 1) is selected. When BitstreamToDecode is a Type II bitstream and NalHrdModeFlag is equal to 0, all non-VCL NAL units except filler data NAL units, and all leading_zero_8 bits, zero_byte, start_code_prefix_one_3 bytes, and trailing_zero_8 bits syntax elements that form a byte stream from the NAL unit stream (as specified in Annex B), when present, are discarded from BitstreamToDecode, and the remaining bitstream is assigned to BitstreamToDecode.

A conforming decoder may fulfil all requirements specified in this subclause.

(1) A decoder claiming conformance to a specific profile, tier and level may be able to successfully decode all bitstreams that conform to the bitstream conformance requirements specified in subclause C.4, in the manner specified in Annex A, provided that all VPSs, SPSs and PPSs referred to in the VCL NAL units, and appropriate buffering period and picture timing SEI messages are conveyed to the decoder, in a timely manner, either in the bitstream (by non-VCL NAL units), or by external means not specified in this Specification.

(2) When a bitstream contains syntax elements that have values that are specified as reserved and it is specified that decoders may ignore values of the syntax elements or NAL units containing the syntax elements having the reserved values, and the bitstream is otherwise conforming to this Specification, a conforming decoder may decode the bitstream in the same manner as it would decode a conforming bitstream and may ignore the syntax elements or the NAL units containing the syntax elements having the reserved values as specified.

There are two types of conformance of a decoder: output timing conformance and output order conformance.

To check conformance of a decoder, test bitstreams conforming to the claimed profile, tier and level, as specified in subclause C.4 are delivered by a hypothetical stream scheduler (HSS) both to the HRD and to the decoder under test (DUT). All cropped decoded pictures output by the HRD may also be output by the DUT, each cropped decoded picture output by the DUT may be a picture with PicOutputFlag equal to 1, and, for each such cropped decoded picture output by the DUT, the values of all samples that are output may be equal to the values of the samples produced by the specified decoding process.

For output timing decoder conformance, the HSS operates as described above, with delivery schedules selected only from the subset of values of SchedSelIdx for which the bit rate and CPB size are restricted as specified in Annex A for the specified profile, tier and level, or with "interpolated" delivery schedules as specified below for which the bit rate and CPB size are restricted as specified in Annex A. The same delivery schedule is used for both the HRD and the DUT.

When the HRD parameters and the buffering period SEI messages are present with cpb_cnt_minus1[HighestTid] greater than 0, the decoder may be capable of decoding the bitstream as delivered from the HSS operating using an "interpolated" delivery schedule specified as having peak bit rate r, CPB size c(r), and initial CPB removal delay $$(f(r) \div r)$$

as follows:

$$\alpha = (r - BitRate[SchedSelIdx-1]) \div (BitRate[SchedSelIdx] - BitRate[SchedSelIdx-1]), \quad (C-22)$$

$$c(r) = \alpha * CpbSize[SchedSelIdx] + (1-\alpha) * CpbSize[SchedSelIdx-1], \quad (C-23)$$

$$f(r) = \alpha * InitCpbRemovalDelay[SchedSelIdx] * BitRate[SchedSelIdx] + (1-\alpha) * InitCpbRemovalDelay[SchedSelIdx-1] * BitRate[SchedSelIdx-1] \quad (C-24)$$

for any SchedSelIdx>0 and r such that BitRate[SchedSelIdx-1]<=r<=BitRate[SchedSelIdx] such that r and c(r) are within the limits as specified in Annex A for the maximum bit rate and buffer size for the specified profile, tier and level. The InitCpbRemovalDelay[SchedSelIdx] can be different from one buffering period to another and have to be re-calculated.

For output timing decoder conformance, an HRD as described above is used and the timing (relative to the delivery time of the first bit) of picture output is the same for both the HRD and the DUT up to a fixed delay.

For output order decoder conformance, the following applies:

(1) The HSS delivers the bitstream BitstreamToDecode to the DUT "by demand" from the DUT, meaning that the HSS delivers bits (in decoding order) only when the DUT requires more bits to proceed with its processing. This means that for this test, the coded picture buffer of the DUT could be as small as the size of the largest decoding unit.

(2) A modified HRD as described below is used, and the HSS delivers the bitstream to the HRD by one of the schedules specified in the bitstream BitstreamToDecode such that the bit rate and CPB size are restricted as specified in Annex A. The order of pictures output may be the same for both the HRD and the DUT.

(3) The HRD CPB size is given by CpbSize[SchedSelIdx] as specified in subclause E.2.3, where SchedSelIdx and the HRD parameters are selected as specified in subclause C.1. The DPB size is given by sps_max_dec_pic_buffering_minus1[HighestTid]+1 from the active SPS (when nuh_layer_id for the current decoded picture is equal to 0) or from the active layer SPS for the value of nuh_layer_id of the current decoded picture. In some cases, if operation point DPB information parameters op_dpb_info_parameters( ) are present for the selected output layer set, The DPB size is given by vps_max_dec_pic_buffering_minus1[HighestTid] when currLayerId is equal to 0 or is set to vps_max_ dec_pic_buffering_minus1[CurrLayerId][HighestTid] for the currLayerId for the operation point under test when currLayerId is greater than 0, where currLayerId is the nuh_layer_id of the current decoded picture. Otherwise if operation point DPB information parameters op_dpb_info_parameters( ) are not present for the operation point under test, the DPB Size is given by sps_max_dec_pic_buffering_minus1[HighestTid]+1 from the active SPS (when nuh_layer_id for the current decoded picture is equal to 0) or from the active layer SPS for the value of nuh_layer_id of the current decoded picture.

In some cases, if output layer sets DPB information parameters oop_dpb_info_parameters( ) are present for the selected output layer set, The DPB size is given by vps_max_dec_pic_buffering_minus1[HighestTid] when currLayerId is equal to 0 or is set to vps_max_dec_pic_buffering_minus1[CurrLayerId][HighestTid ] for the currLayerId for the selected output layer set, where currLayerId is the nuh_layer_id of the current decoded picture. Otherwise if output layer sets DPB information parameters oop_dpb_info_parameters( ) are not present for the selected output layer set, the DPB Size is given by sps_max_dec_pic_buffering_minus1[HighestTid]+1 from the active SPS (when nuh_layer_id for the current decoded picture is equal to 0) or from the active layer SPS for the value of nuh_layer_id of the current decoded picture.

The removal time from the CPB for the HRD is the final bit arrival time and decoding is immediate. The operation of the DPB of this HRD is as described in subclauses C.5.2 through C.5.2.3.

The decoded picture buffer contains picture storage buffers. The number of picture storage buffers for nuh_layer_id equal to 0 is derived from the active SPS. The number of picture storage buffers for each non-zero nuh_layer_id value is derived from the active layer SPS for that non-zero nuh_layer_id value. Each of the picture storage buffers contains a decoded picture that is marked as "used for reference" or is held for future output. The process for output and removal of pictures from the DPB as specified in subclause F.13.5.2.2 is invoked, followed by the invocation of the process for picture decoding, marking, additional bumping, and storage as specified in subclause F.13.5.2.3. The "bumping" process is specified in subclause F.13.5.2.4 and is invoked as specified in subclauses F.13.5.2.2 and F.13.5.2.3.

The output and removal of pictures from the DPB before the decoding of the current picture (but after parsing the slice header of the first slice of the current picture) happens instantaneously when the first decoding unit of the access unit containing the current picture is removed from the CPB and proceeds as follows.

The decoding process for RPS as specified in subclause 8.3.2 is invoked.

(1) If the current picture is an IRAP picture with NoRaslOutputFlag equal to 1 and with nuh_layer_id equal to 0 that is not picture 0, the following ordered steps are applied:

(A) The variable NoOutputOfPriorPicsFlag is derived for the decoder under test as follows:

(i) If the current picture is a CRA picture, NoOutputOfPriorPicsFlag is set equal to 1 (regardless of the value of no_output_of_prior_pics_flag).

(ii) Otherwise, if the value of pic_width_in_luma_samples, pic_height_in_luma_samples, or sps_max_dec_pic_buffering_minus1[HighestTid] derived from the active SPS is different from the value of pic_width_in_luma_samples, pic_height_in_luma_samples, or sps_max_dec_pic_buffering_minus1[HighestTid], respectively, derived from the SPS active for the preceding picture, NoOutputOfPriorPicsFlag may (but should not) be set to 1 by the decoder under test, regardless of the value of no_output_of_prior_pics_flag. Although setting NoOutputOfPriorPicsFlag equal to no_output_of_prior_pics_flag is preferred under these conditions, the decoder under test is allowed to set NoOutputOfPriorPicsFlag to 1 in this case.

(iii) Otherwise, NoOutputOfPriorPicsFlag is set equal to no_output_of_prior_pics_flag.

(B) The value of NoOutputOfPriorPicsFlag derived for the decoder under test is applied for the HRD as follows:

(i) If NoOutputOfPriorPicsFlag is equal to 1, all picture storage buffers in the DPB are emptied without output of the pictures they contain, and the DPB fullness is set equal to 0.

(ii) Otherwise (NoOutputOfPriorPicsFlag is equal to 0), all picture storage buffers containing a picture that is marked as "not needed for output" and "unused for reference" are emptied (without output), and all non-empty picture storage buffers in the DPB are emptied by repeatedly invoking the "bumping" process specified in subclause F.13.5.2.4, and the DPB fullness is set equal to 0.

(iii) Otherwise (the current picture is not an IRAP picture with NoRaslOutputFlag equal to 1 and with nuh_layer_id equal to 0), all picture storage buffers containing a picture which are marked as "not needed for output" and "unused for reference" are emptied (without output). For each picture storage buffer that is emptied, the DPB fullness is decremented by one. The variable currLayerId is set equal to nuh_layer_id of the current decoded picture.

The variables MaxNumReorderPics[TargetOp][currLayerId][HighestTid], MaxLatencyIncreasePlus1[TargetOp][currLayerId][HighestTid], MaxLatencyPictures[TargetOp][currLayerId][HighestTid], MaxDecPicBufferingMinus1[TargetOp] [currLayerId][HighestTid] are derived as follows based on the current operation point under test:

(1) If operation point DPB information parameters op_dpb_info_parameters( ) are present for the operation point under test TargetOp, MaxNumReorderPics[TargetOp] [currLayerId][HighestTid] is set to vps_max_num_reorder_pics [HighestTid] when currLayerId is equal to 0 or is set to vps_max_num_reorder_pics[TargetOp][CurrLayerId] [HighestTid] for the currLayerId for the operation point under test when currLayerId is greater than 0. Otherwise if operation point DPB information parameters op_dpb_info_parameters( ) are not present for the operation point under test MaxNumReorderPics[TargetOp][currLayerId][HighestTid] is set to sps_max_num_reorder_pics[HighestTid] from the active SPS (when currLayerId is equal to 0) or from the active layer SPS for the value of currLayerId.

(2) If operation point DPB information parameters op_dpb_info_parameters( ) are present for the operation point under test TargetOp, MaxLatencyIncreasePlus1[TargetOp] [currLayerId] [HighestTid] is set to vps_max_latency_increase_plus1[HighestTid] when currLayerId is equal to 0 or is set to vps_max_latency_increase_plus1[TargetOp][CurrLayerId] [HighestTid] for the currLayerId for the operation point under test when currLayerId is greater than 0. If operation point DPB information parameters op_dpb_info_parameters( ) are present for the operation point under test, MaxLatencyPictures[TargetOp][currLayerId][HighestTid] is set to VpsMaxLatencyPictures[HighestTid] when currLayerId is equal to 0 or is set to VpsMaxLatencyPictures[TargetOp][CurrLayerId][HighestTid] for the currLayerId for the operation point under test when currLayerId is greater than 0. Otherwise if operation point DPB information parameters op_dpb_info_parameters( ) are not present for the operation point under test, MaxLatencyIncreasePlus1 [TargetOp][currLayerId][HighestTid] is set to sps_max_latency_increase_plus1[HighestTid] of the active SPS (when currLayerId is equal to 0) or the active layer SPS for the value of currLayerId and MaxLatencyPictures[TargetOp] [currLayerId][HighestTid] is set to SpsMaxLatencyPictures [HighestTid] derived from the active SPS (when currLayerId is equal to 0) or from the active layer SPS for the value of currLayerId.

(3) If operation point DPB information parameters op_dpb_info_parameters( ) are present for the selected operation point under test TargetOp, MaxDecPicBufferingMinus1 [TargetOp] [currLayerId] [HighestTid] is set to vps_max_dec_pic_buffering_minus1[HighestTid] when currLayerId is equal to 0 or is set to vps_max_dec_pic_buffering_minus1 [TargetOp] [CurrLayerId][HighestTid] for the currLayerId for the operation point under test when currLayerId is greater than 0. Otherwise if operation point DPB information parameters op_dpb_info_parameters( ) are not present for the operation point under test, MaxDecPicBufferingMinus1[TargetOp][currLayerId] [HighestTid] is set to sps_max_dec_pic_buffering_minus1[HighestTid] from the active SPS (when currLayerId is equal to 0) or from the active layer SPS for the value of currLayerId.

When one or more of the following conditions are true, the "bumping" process specified in subclause F.13.5.2.4 is invoked repeatedly while further decrementing the DPB fullness by one for each additional picture storage buffer that is emptied, until none of the following conditions are true:

(1) The number of pictures with nuh_layer_id equal to currLayerId in the DPB that are marked as "needed for output" is greater than MaxNumReorderPics[TargetOp] [CurrLayerId][HighestTid].

(2) If MaxLatencyIncreasePlus1[TargetOp] [CurrLayerId][HighestTid] is not equal to 0 and there is at least one picture with nuh_layer_id equal to currLayerId in the DPB that is marked as "needed for output" for which the associated variable PicLatencyCount[currLayerId] is greater than or equal to MaxLatencyPictures[TargetOp] [CurrLayerId][HighestTid].

(3) The number of pictures with nuh_layer_id equal to currLayerId in the DPB is greater than or equal to MaxDecPicBuffering[TargetOp] [CurrLayerId][HighestTid].

The processes specified in this subclause happen instantaneously when the last decoding unit of access unit n containing the current picture is removed from the CPB.

The variable currLayerId is set equal to nuh_layer_id of the current decoded picture.

For each picture in the DPB that is marked as "needed for output" and that has a nuh_layer_id value equal to currLayerId, the associated variable PicLatencyCount[currLayerId] is set equal to PicLatencyCount[currLayerId]+1.

The current picture is considered as decoded after the last decoding unit of the picture is decoded. The current decoded picture is stored in an empty picture storage buffer in the DPB, and the following applies:

(A) If the current decoded picture has PicOutputFlag equal to 1, it is marked as "needed for output" and its associated variable PicLatencyCount[currLayerId] is set equal to 0.

(B) Otherwise (the current decoded picture has PicOutputFlag equal to 0), it is marked as "not needed for output".

The current decoded picture is marked as "used for short-term reference".

When one or more of the following conditions are true, the "bumping" process specified in subclause F.13.5.2.4 is invoked repeatedly until none of the following conditions are true.

(A) The number of pictures with nuh_layer_id equal to currLayerId in the DPB that are marked as "needed for output" is greater than MaxNumReorderPics[TargetOp] [CurrLayerId][HighestTid].

(B) MaxLatencyIncreasePlus1[TargetOp] [CurrLayerId] [HighestTid] is not equal to 0 and there is at least one picture with nuh_layer_id equal to currLayerId in the DPB that is marked as "needed for output" for which the associated variable PicLatencyCount[currLayerId] is greater than or equal to MaxLatencyPictures[TargetOp] [CurrLayerId] [HighestTid].

In other case The variables MaxNumReorderPics[currLayerId][HighestTid], MaxLatencyIncreasePlus1[currLayerId] [HighestTid], MaxLatencyPictures[currLayerId] [HighestTid], MaxDecPicBufferingMinus1[currLayerId] [HighestTid] may be derived as follows:

(1) If operation point DPB information parameters op_dpb_info_parameters( ) are present for the operation point under test, MaxNumReorderPics[currLayerId][HighestTid] is set to vps_max_num_reorder_pics[HighestTid] when currLayerId is equal to 0 or is set to vps_max_num_reorder_pics[CurrLayerId][HighestTid] for the currLayerId for the operation point under test when currLayerId is greater than 0. Otherwise if operation point DPB information parameters op_dpb_info_parameters( ) are not present for the operation point under test MaxNumReorderPics[currLayerId][HighestTid] is set to sps_max_num_reorder_pics[HighestTid] from the active SPS (when currLayerId is equal to 0) or from the active layer SPS for the value of currLayerId.

(2) If operation point DPB information parameters op_dpb_info_parameters( ) are present for the operation point under test, MaxLatencyIncreasePlus1[currLayerId][HighestTid] is set to vps_max_latency_increase_plus1[HighestTid] when currLayerId is equal to 0 or is set to vps_max_latency_increase_plus1[CurrLayerId][HighestTid] for the currLayerId for the operation point under test when currLayerId is greater than 0. If operation point DPB information parameters op_dpb_info_parameters( ) are present for the operation point under test, MaxLatencyPictures[currLayerId][HighestTid] is set to VpsMaxLatencyPictures [HighestTid] when currLayerId is equal to 0 or is set to VpsMaxLatencyPictures [CurrLayerId][HighestTid] for the currLayerId for the operation point under test when currLayerId is greater than 0. Otherwise if operation point DPB information parameters op_dpb_info_parameters( ) are not present for the for the operation point under test, MaxLatencyIncreasePlus1[currLayerId][HighestTid] is set to sps_max_latency_increase_plus1[HighestTid] of the active SPS (when currLayerId is equal to 0) or the active layer SPS for the value of currLayerId and MaxLatencyPictures[currLayerId][HighestTid] is set to SpsMaxLatencyPictures [HighestTid] derived from the active SPS (when currLayerId is equal to 0) or from the active layer SPS for the value of currLayerId.

(3) If operation point DPB information parameters op_dpb_info_parameters( ) are present for the selected operation point under test, MaxDecPicBufferingMinus1[currLayerId] [HighestTid] is set to vps_max_dec_pic_buffering_minus1 [HighestTid] when currLayerId is equal to 0 or is set to vps_max_dec_pic_buffering_minus1[CurrLayerId][HighestTid] for the currLayerId for the operation point under test when currLayerId is greater than 0. Otherwise if operation point DPB information parameters op_dpb_info_parameters( ) are not present for the operation point under test, MaxDecPicBufferingMinus1[currLayerId] [HighestTid] is set to sps_max_dec_pic_buffering_minus1[HighestTid] from the active SPS (when currLayerId is equal to 0) or from the active layer SPS for the value of currLayerId.

When one or more of the following conditions are true, the "bumping" process specified in subclause F.13.5.2.4 is invoked repeatedly while further decrementing the DPB fullness by one for each additional picture storage buffer that is emptied, until none of the following conditions are true:

(1) The number of pictures with nuh_layer_id equal to currLayerId in the DPB that are marked as "needed for output" is greater than MaxNumReorderPics[CurrLayerId][HighestTid].

(2) If MaxLatencyIncreasePlus1[CurrLayerId][HighestTid] is not equal to 0 and there is at least one picture with nuh_layer_id equal to currLayerId in the DPB that is marked as "needed for output" for which the associated variable PicLatencyCount[currLayerId] is greater than or equal to MaxLatencyPictures[CurrLayerId][HighestTid].

(3) The number of pictures with nuh_layer_id equal to currLayerId in the DPB is greater than or equal to MaxDecPicBuffering[CurrLayerId][HighestTid].

The processes specified in this subclause happen instantaneously when the last decoding unit of access unit n containing the current picture is removed from the CPB.

The variable currLayerId is set equal to nuh_layer_id of the current decoded picture.

For each picture in the DPB that is marked as "needed for output" and that has a nuh_layer_id value equal to currLayerId, the associated variable PicLatencyCount[currLayerId] is set equal to PicLatencyCount[currLayerId]+1.

The current picture is considered as decoded after the last decoding unit of the picture is decoded. The current decoded picture is stored in an empty picture storage buffer in the DPB, and the following applies:

(A) If the current decoded picture has PicOutputFlag equal to 1, it is marked as "needed for output" and its associated variable PicLatencyCount[currLayerId] is set equal to 0.

(B) Otherwise (the current decoded picture has PicOutputFlag equal to 0), it is marked as "not needed for output".

The current decoded picture is marked as "used for short-term reference".

When one or more of the following conditions are true, the "bumping" process specified in subclause F.13.5.2.4 is invoked repeatedly until none of the following conditions are true.

(A) The number of pictures with nuh_layer_id equal to currLayerId in the DPB that are marked as "needed for output" is greater than MaxNumReorderPics[CurrLayerId][HighestTid].

(B) MaxLatencyIncreasePlus1[CurrLayerId][HighestTid] is not equal to 0 and there is at least one picture with nuh_layer_id equal to currLayerId in the DPB that is marked as "needed for output" for which the associated variable PicLatencyCount[currLayerId] is greater than or equal to MaxLatencyPictures[CurrLayerId][HighestTid].

The "bumping" process consists of the following ordered steps:

(A) The pictures that are first for output are selected as the ones having the smallest value of PicOrderCntVal of all pictures in the DPB marked as "needed for output".

(B) These pictures are cropped, using the conformance cropping window specified in the active SPS for the picture with nuh_layer_id equal to 0 or in the active layer SPS for a nuh_layer_id value equal to that of the picture, the cropped pictures are output in ascending order of nuh_layer_id, and the pictures are marked as "not needed for output".

(C) Each picture storage buffer that contains a picture marked as "unused for reference" and that included one of the pictures that was cropped and output is emptied.

The VPS Extension may have additional modifications, if desired.

Referring to FIG. 36, an additional modification may include the DPB parameters being sent in the VPS extension for output layer sets instead of for operation points, where the oops dpb_info_parameters(j) are illustrated in FIG. 37.

The num_dpb_info_parameters specifies the number of oop_dpb_parameters( ) syntax structures present in the VPS extension RBSP. num_dpb_info_parameters decoders may be in the range of 0 to num_output_layer_sets, inclusive.

The output_point_layer_set_idx[i] specifies the index, into the list of target output layer sets to which the i-th oop_dpb_info_parameters( ) syntax structure in the VPS extension applies.

The value of output_point_layer_set_idx[i] should be in the range of 0 to num_output_layer_sets, inclusive. It is requirement of bitstream conformance that output_point_layer_set_idx [i] may not be equal to output_point_layer_set_idx [j] for any j not equal to i.

Referring to FIG. 38, the oop_dpb_info_parameters(c) may be further modified, where the syntax in the VPS extension may be as illustrated in FIG. 39.

Referring to FIG. 40, the oop_dpb_info_parameters(c) may be further modified, where the syntax in the VPS extension may be as illustrated in FIG. 41 or FIG. 42.

An exemplary alternative for the syntax in VPS extension is that
for (j=0; j<=vps_max_layer_id; j++)
  oop_dpb_info_parameters(j)
may be changed to
for (j=0; j<=vps_max_layers_minus1; j++)
  oop_dpb_info_parameters(j)

The vps_max_layer_id specifies the maximum allowed value of nuh_layer_id of all NAL units in the CVS. The vps_max_layers_minus1, specifies the maximum number of layers that may be present in the CVS, wherein a layer may e.g. be a spatial scalable layer, a quality scalable layer, a texture view or a depth view.

Another exemplary alternative for the syntax in VPS extension is that
for (j=0; j<=vps_max_layer_id; j++)
  oop_dpb_info_parameters(j)
may be changed to
for (j=0; j<numOutputLayers; j++)
  oop_dpb_info_parameters( )
where numOutputLayers for the selected output_layer_set_index oplsIdx is derived as:
for (k=0, numOutputLayers=0;k<=vps_max_layer_id; k++)
  if (output_layer_flag[opLsIdx][k])
    targetOpLayeridList [numOutputLayers++]=layer_id_in_nuh[k].

Another exemplary alternative for the syntax in VPS extension is that
for (j=0; j<=vps_max_layer_id; j++)
  oop_dpb_info_parameters(j)
may be changed to
for (j=0; j<numDecodedLayers; j++)
  oop_dpb_info_parameters(j)
where numOutputLayers for the selected oplsIdx is derived as:

```
for (k=0, numOutputLayers=0;k<=vps_max_layer_id;
        k++)
    if (output_layer_flag[opLsIdx][k])
        targetOpLayeridList     [numOutputLayers++]=lay-
            er_id_in_nuh[k].
```
Then a target decoded layer identifier list targetDLayerIdList and numDecodedLayers for the selected oplsIdx is derived as:

```
for(m=0, numDecodedLayers=0;m< numOutputLayers;m++) {
  for(n=0;n<NumDirectRefLayers[LayerIdInVps[targetOpLayerIdList[
m]]];n++) {
    rLid=RefLayerId[LayerIdInVps[targetOpLayerIdList[m]]][n]
    if(rLid not included in targetDLayerIdList[0,...,
numDecodedLayers])
        targetDLayerIdList[numDecodedLayers++]=rLId;
  }
}
```

In one embodiment an additional flag maybe signalled to indicate if oop_dpb_information parameters are signalled for the particular layer as follows:

```
for( j = 0; j <= vps_max_layer_id; j++ ) {
    vps_layer_info_present_flag[j]          u(1)
    if(vps_layer_info_present_flag)
        oop_dpb_info_parameters(j)
}
```

The vps_layer_info_present_flag[j] equal to 1 specifies that oop_dpb_info_parameters are present for the j'th layer for the particular output layer set. vps_layer_info_present_flag[j] equal to 0 specifies that oop_dpb_info_parameters are not present for the j'th layer for the particular output layer set.

In another embodiment num_dpb_info_parameters decoders may be in the range of 0 to 1024, inclusive. In yet another embodiment a different fixed number could be used in place of 1024.

In an alternative embodiment output_point_layer_set_idx [i] is in the range of 0 to 1023, inclusive.

Referring to FIG. 43, another modified VPS extension and layer_dpb_info(i) may be used if the DPB parameters are sent in the VPS extension for each layer independently of output layer sets and operation points.

Referring to FIG. 44, a modified layer_dpb_info(i) may be used where the syntax element vps_max_sub_layer_minus1 signaled from VPS is used for all the layers and is not separately signalled in oop_dpb_info_parameters(id)/op_dpb_info_parameters(id).

In another embodiment one or more of the syntax elements may be signaled using a known fixed number of bits instead of u(v) instead of ue(v). For example they could be signaled using u(8) or u(16) or u(32) or u(64), etc.

In another embodiment one or more of these syntax element could be signaled with ue(v) or some other coding scheme instead of fixed number of bits such as u(v) coding.

In another embodiment the names of various syntax elements and their semantics may be altered by adding a plus 1 or plus2 or by subtracting a minus 1 or a minus2 compared to the described syntax and semantics.

In yet another embodiment various syntax elements may be signaled per picture anywhere in the bitstream. For example they may be signaled in slice segment header, pps/ sps/ vps/or any other parameter set or other normative part of the bitstream.

In yet another embodiments all the concepts defined in this invention related to output layer sets could be applied to output operation points [2,3] and/or to operation points [1].

As previously described, sequence parameter sets ("SPS") may be used to carry data valid for an entire video sequence. Accordingly, the SPS is a syntax structure containing syntax elements that apply to zero or more entire coded video sequences as determined by the content of a syntax element found in the PPS referred to by a syntax element, such as that found in each slice segment header. Also as previously described, picture parameter sets ("PPS") carry data valid on a picture by picture basis. Accordingly, the PPS is a syntax structure containing syntax elements that apply to zero or more entire coded pictures as determined by a syntax element, such as that found in each slice segment header. By way of example, the base layer may be a 1080 p encoded video sequence while the enhancement layer(s) provides a 4K encoded video sequence.

Referring to FIG. 45, when coding scalable high efficiency coding ("SVHC") the base layer may include one or more SPS and may also include one or more PPS. Also, each enhancement layer may include one or more SPS and may also include one or more PPS. In FIG. 45 SPS+ indicates one or more SPS and PPS+ indicates one or more PPS being signaled for a particular base or enhancement layer. In this manner, for a video bitstream having both a base layer and one or more enhancement layers, the collective number of SPS and PPS data sets becomes significant together with the required bandwidth to transmit such data, which tends to be limited in many applications. With such bandwidth limitations, it is desirable to limit the data that needs to be transmitted, and locate the data in the bitstream in an effective manner. Each layer may have one SPS and/or PPS that is activate at any particular time, and may select a different active SPS and/or PPS, as desired.

An input picture may comprise a plurality of coded tree blocks (e.g., generally referred to herein as blocks) may be partitioned into one or several slices. The values of the samples in the area of the picture that a slice represents may be properly decoded without the use of data from other slices provided that the reference pictures used at the encoder and the decoder are the same and that de-blocking filtering does not use information across slice boundaries. Therefore, entropy decoding and block reconstruction for a slice does not depend on other slices. In particular, the entropy coding state may be reset at the start of each slice. The data in other slices may be marked as unavailable when defining neighborhood availability for both entropy decoding and reconstruction. The slices may be entropy decoded and reconstructed in parallel. No intra prediction and motion-vector prediction is preferably allowed across the boundary of a slice. In contrast, de-blocking filtering may use information across slice boundaries.

Figure 46:
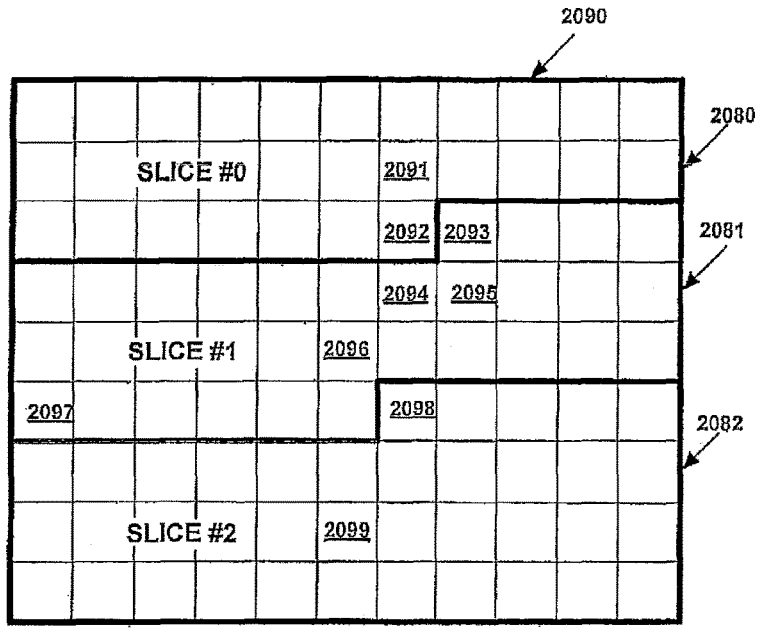
FIG. 46 illustrates an exemplary picture having multiple slices.

FIG. 46 illustrates an exemplary video picture 2090 comprising eleven blocks in the horizontal direction and nine blocks in the vertical direction (nine exemplary blocks labeled 2091-2099). FIG. 46 illustrates three exemplary slices: a first slice denoted "SLICE #0" 2080, a second slice denoted "SLICE #1" 2081 and a third slice denoted "SLICE #2" 2082. The decoder may decode and reconstruct the three slices 2080, 2081, 2082 in parallel. Each of the slices may be transmitted in scan line order in a sequential manner. At the beginning of the decoding/reconstruction process for each slice, context models are initialized or reset and blocks in other slices are marked as unavailable for both entropy decoding and block reconstruction. The context model generally represents the state of the entropy encoder and/or decoder. Thus, for a block, for example, the block labeled 2093, in "SLICE #1," blocks (for example, blocks labeled 2091 and 2092) in "SLICE #0" may not be used for context model selection or reconstruction. Whereas, for a block, for example, the block labeled 2095, in "SLICE #1," other blocks (for example, blocks labeled 2093 and 2094) in "SLICE #1" may be used for context model selection or reconstruction. Therefore, entropy decoding and block reconstruction proceeds serially within a slice. Unless slices are defined using a flexible block ordering (FMO), blocks within a slice are processed in the order of a raster scan.

Flexible block ordering defines a slice group to modify how a picture is partitioned into slices. The blocks in a slice group are defined by a block-to-slice-group map, which is signaled by the content of the picture parameter set and additional information in the slice headers. The block-to-slice-group map consists of a slice-group identification number for each block in the picture. The slice-group identification number specifies to which slice group the associated block belongs. Each slice group may be partitioned into one or more slices, wherein a slice is a sequence of blocks within the same slice group that is processed in the order of a raster scan within the set of blocks of a particular slice group. Entropy decoding and block reconstruction proceeds serially within a slice group.

Figure 47:
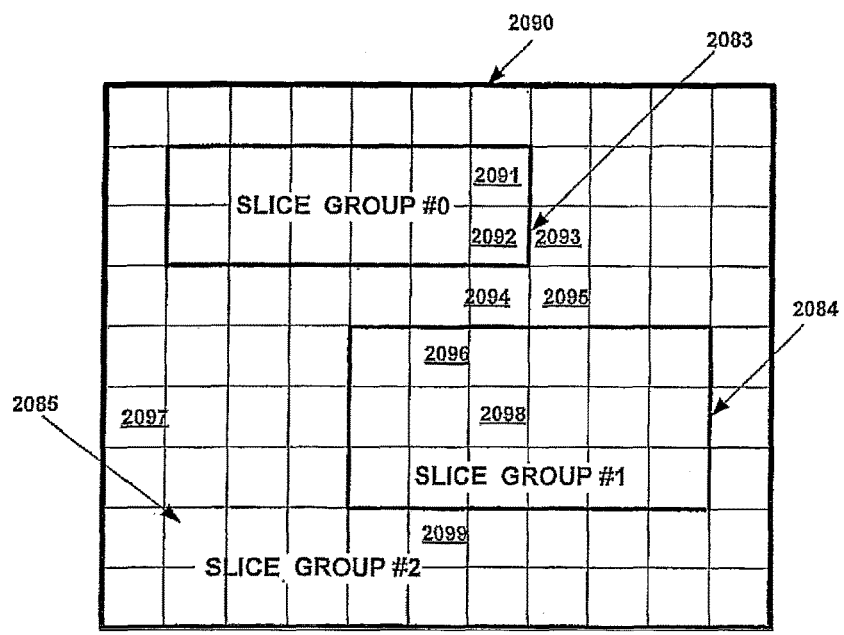
FIG. 47 illustrates another exemplary picture having multiple slices

FIG. 47 depicts an exemplary block allocation into three slice groups: a first slice group denoted "SLICE GROUP #0" 2083, a second slice group denoted "SLICE GROUP #1" 2084 and a third slice group denoted "SLICE GROUP #2" 2085. These slice groups 2083, 2084, 2085 may be associated with two foreground regions and a background region, respectively, in the picture 2090.

The arrangement of slices, as illustrated in FIG. 47, may be limited to defining each slice between a pair of blocks in the image scan order, also known as raster scan or a raster scan order. This arrangement of scan order slices is computationally efficient but does not tend to lend itself to the highly efficient parallel encoding and decoding. Moreover, this scan order definition of slices also does not tend to group smaller localized regions of the image together that are likely to have common characteristics highly suitable for coding efficiency. The arrangement of slices 2083, 2084, 2085, as illustrated in FIG. 47, is highly flexible in its arrangement but does not tend to lend itself to high efficient parallel encoding or decoding. Moreover, this highly flexible definition of slices is computationally complex to implement in a decoder.

Figure 48:
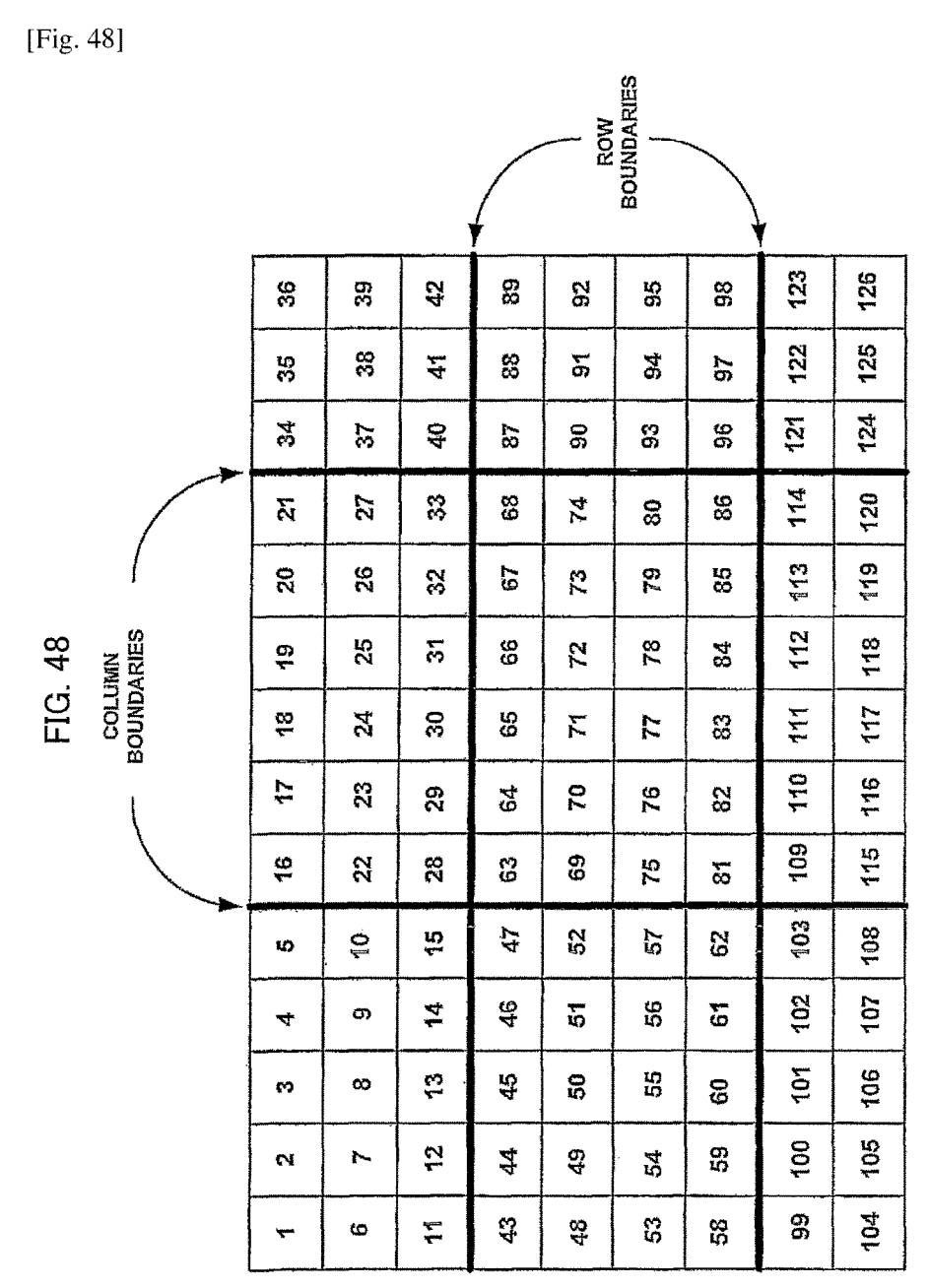

Referring to FIG. 48, a tile technique divides an image into a set of rectangular (inclusive of square) regions. The blocks (alternatively referred to as largest coding units or coded treeblocks in some systems) within each of the tiles are encoded and decoded in a raster scan order. The arrangement of tiles are likewise encoded and decoded in a raster scan order. Accordingly, there may be any suitable number of column boundaries (e.g., 0 or more) and there may be any suitable number of row boundaries (e.g., 0 or more). Thus, the frame may define one or more slices, such as the one slice illustrated in FIG. 48. In some embodiments, blocks located in different tiles are not available for intra-prediction, motion compensation, entropy coding context selection or other processes that rely on neighboring block information.

Figure 49:
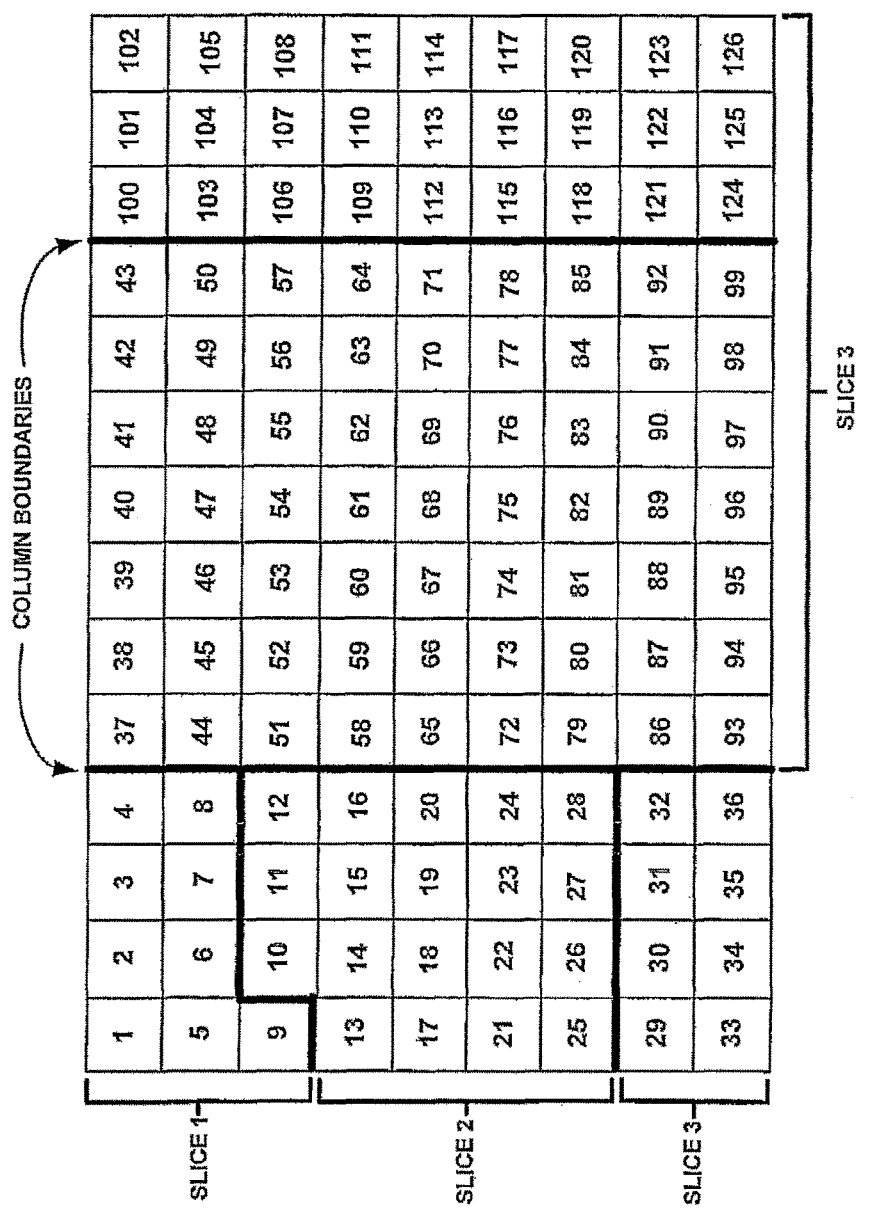

Referring to FIG. 49, the tile technique is shown dividing an image into a set of three rectangular columns. The blocks (alternatively referred to as largest coding units or coded treeblocks in some systems) within each of the tiles are encoded and decoded in a raster scan order. The tiles are likewise encoded and decoded in a raster scan order. One or more slices may be defined in the scan order of the tiles. Each of the slices are independently decodable. For example, slice 1 may be defined as including blocks 1-9, slice 2 may be defined as including blocks 10-28, and slice 3 may be defined as including blocks 29-126 which spans three tiles. The use of tiles facilitates coding efficiency by processing data in more localized regions of a frame.

Figure 50:
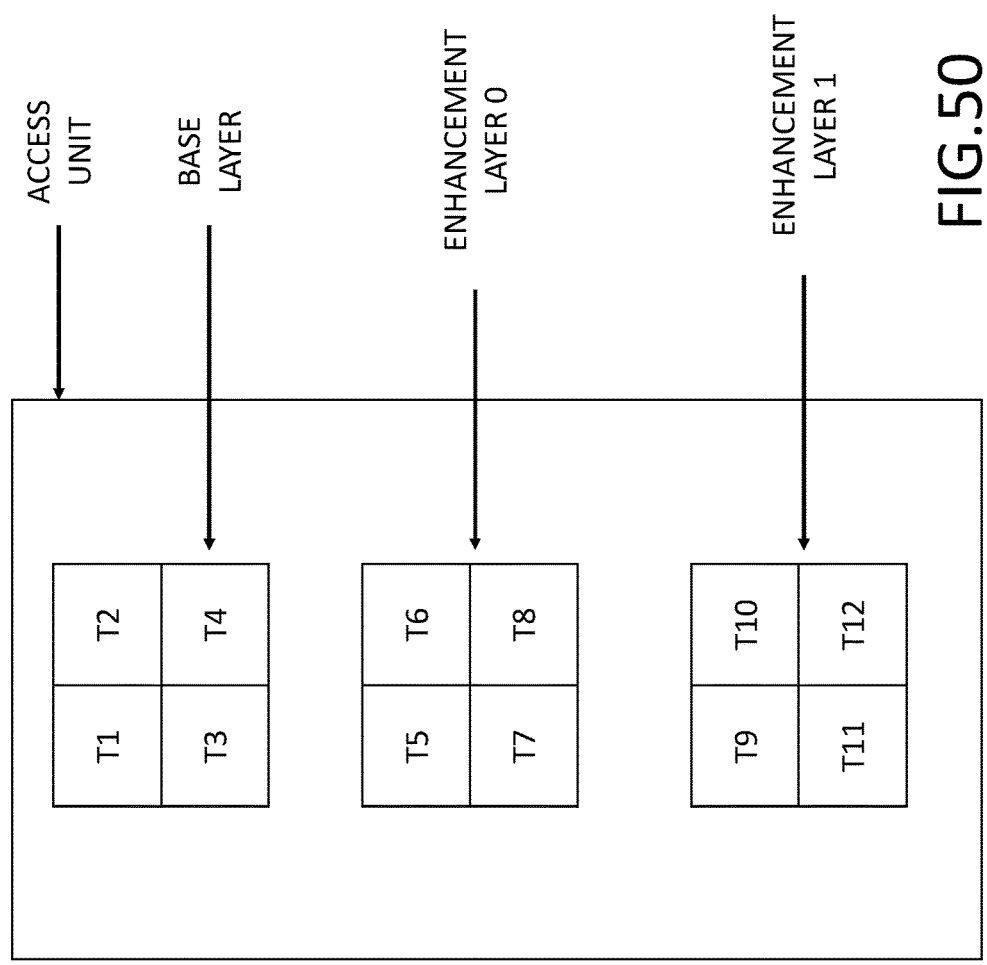
FIG. 50 illustrates an access unit with a base layer, enhancement layers, and tiles.

Referring to FIG. 50, the base layer and the enhancement layers may each include tiles which each collectively form a picture or a portion thereof. The coded pictures from the base layer and one or more enhancement layers may collectively form an access unit. The access unit may be defined as a set of NAL units that are associated with each other according to a specified classification rule, are consecutive in decoding order, and/or contain the VCL NAL units of all coded pictures associated with the same output time (picture order count or otherwise) and their associated non-VCL NAL units. The VCL NAL is the video coding layer of the network abstraction layer. Similarly, the coded picture may be defined as a coded representation of a picture comprising VCL NAL units with a particular value of nuh_layer_id within an access unit and containing all coding tree units of the picture. Additional descriptions are described in B. Bros, W-J. Han, J-R. Ohm, G. J. Sullivan, and T. Wiegand, "High efficiency video coding (HEVC) text specification draft 10," JCTVC-L1003, Geneva, January 2013; J. Chen, J. Boyce, Y. Ye, M. M. Hannuksela, "SHVC Draft Text 2," JCTVC-M1008, Incheon, May 2013; G. Tech, K. Wegner, Y. Chen, M. Hannuksela, J. Boyce, "MV-HEVC Draft Text 4 (ISO/IEC 23008-2:201x/PDAM2)," JCTVC-D1004, Incheon, May 2013; and K. Suhring, R. Skupin, G. Tech, T. Schierl, K. Rapaka, W. Pu, X. Li, J. Chen, Y.-K. Wang, M. Karczewicz, K. Ugur, M. M. Hannuksela, "Tile Boundary Alignment and Inter-layer Prediction Constraint for SHVC and MV-HEVC," JCTVC-M0464, Incheon, April 2013, each of which is incorporated by reference herein in its entirety.

Scalable extension of high efficiency video coding (SHVC) uses a multi-loop system where the sample values of the reference layer are determined using motion compensation before the decoding process for the current layer executes motion compensation to determine current layers reconstructed sample values. As a result, motion compensation may need to be executed for layers other than the target layer.

Since motion compensation is a computationally intensive activity executing it multiple times places significant memory bandwidth requirements on a scalable decoder. This is especially true when the reference layer and the current layer have the same spatial resolution. To reduce this computational burden several SVHC modifications have been attempted for SHVC which prevent the use of reference layer sample value: (a) on the basis of per slice, (b) on the basis of temporal identifiers, and/or (c) on the basis of network abstraction layer unit (NALU) type. However, none of these approaches are sufficient to ensure the reduction in the computational complexity of the system, and especially the decoder, because the amount of processing that may be required remains unbounded. Accordingly, it is desirable to include modifications to the SVHC syntax that guarantees an upper bound on the number of times and/or the frequency with which a motion compensation block is executed within the reference layer. The preferred constraint to achieve this upper bound is preferably on the arrangement and frequency of reference layer pictures based on (a) temporal identifier, (b) flags occurring in slice header/parameter sets, and/or (c) NALU types within the reference layer and/or (d) type pf pictures within the reference layer. These preferred techniques result in an upper bound on the number of times and/or the frequency with which a motion compensation block is executed within the reference layer.

Limits may be set on the maximum frequency with which motion compensation (MC) is executed within the subset of reference layer pictures needed for decoding of the current layer picture, where the frequency limit is specified at the granularity of a picture. For example, a frequency limit of 'x' MC per second would imply that only 'x' or less reference layer pictures use MC per second within the reference layer subset and whose sample values are needed for decoding current layer pictures. The use of motion compensation may correspond to the use of inter prediction decoding process.

By way of example, the reference layer MC rate may be the number of reference layer pictures per second which use inter prediction decoding process and whose sample values are needed for decoding current layer pictures. In this manner, this identifies those pictures that actually use the motion compensation.

By way of example, the reference layer MC rate may be the number of reference layer pictures per second which are allowed to use inter prediction decoding process and whose sample values are needed for decoding current layer pictures. In this manner, this identifies those pictures that may use the motion compensation. By way of example, a P slice and a B slice are both allowed to use inter prediction, however, if all the blocks are intra coded it does not use the inter prediction decoding process. In some cases for purposes of specifying a constraint it may be more efficient to consider the slice type instead of considering whether a picture actually contains one or more block(s) of samples which use the inter prediction decoding process.

By way of example, this frequency limit may be specified at the granularity of samples. For example, a frequency limit of 'x' MC per second would imply that only 'x' or less reference layer samples use MC per second within the reference layer subset and whose sample values are needed for decoding current layer pictures.

It is to be understood that the following discussion of the MC rate corresponds to picture rate but is equally applicable to sample rate or any other measure.

Figure 51:
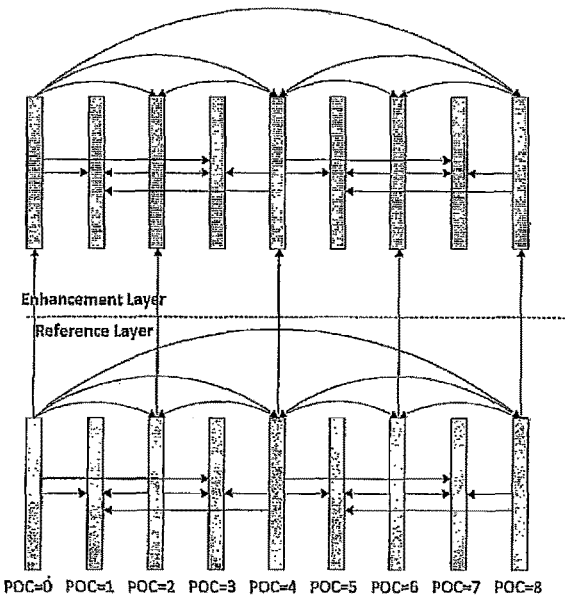
FIG. 51 illustrates a subset of reference layers for inter-layer sample value prediction.

Referring to FIG. 51, by way of example, only sample values of reference layer pictures with even picture order count (POC) values are needed for decoding of current (enhancement) layer pictures.

In an example embodiment the maximum frequency limit, say f_max, with which motion compensation (MC) is executed within the subset of reference layer pictures needed for decoding of current layer pictures is a bitstream conformance requirement. The f_max may be inferred based on past data signaled within the bitstream, for example, profile value and/or level value. In another example, f_max may be explicitly signaled within the bitstream at an appropriate location, for example, within sequence parameter set (SPS) and/or within video parameter set (VPS).

In an example embodiment, the maximum frequency limit f_max with which motion compensation (MC) is executed within the subset of reference layers needed for decoding of current layer pictures is a bitstream conformance requirement, which is the same as a portion of the previous example. Further f_max specifies a limit on the maximum number of reference layer pictures coded per second with temporal identifier less than or equal to a pre-determined value, say "t". In an example, the specified limit is equal to f_max. Accordingly, a temporal identifier identifying a set of sub-layers within a layer is similarly bounded by a rate constraint. It is noted that a temporal sub-layer with a higher temporal identifier can't be used to predict the lower temporal sub-layers of a base layer and/or an enhancement layer.

By way of example, "t" may correspond to max_tid_il_ref_pics_plus1[i] syntax element in video parameter set (VPS). Index i varies from 0 to vps_max_layers_minus1 in increments of 1.

The max_tid_il_ref_pics_plus1[i] equal to 0 specifies that within the CVS non-IRAP pictures with nuh_layer_id equal to layer_id_in_nuh[i] are not used as reference for inter-layer prediction. The max_tid_il_ref_pics_plus1[i] greater than 0 specifies that within the CVS pictures with nuh_layer_id equal to layer_id_in_nuh[i] and TemporalId greater than max_tid_il_ref_pics_plus1[i]−1 are not used as reference for inter-layer prediction. When not present, max_tid_il_ref_pics_plus1[i] is unspecified.

The layer_id_in_nuh[i] specifies the value of the nuh_layer_id syntax element in VCL NAL units of the i-th layer. For i in a range from 0 to vps_max_layers_minus1, inclusive, when not present, the value of layer_id_in_nuh[i] is inferred to be equal to i.

The nuh_layer_id specifies the identifier of the layer.

Figure 52:
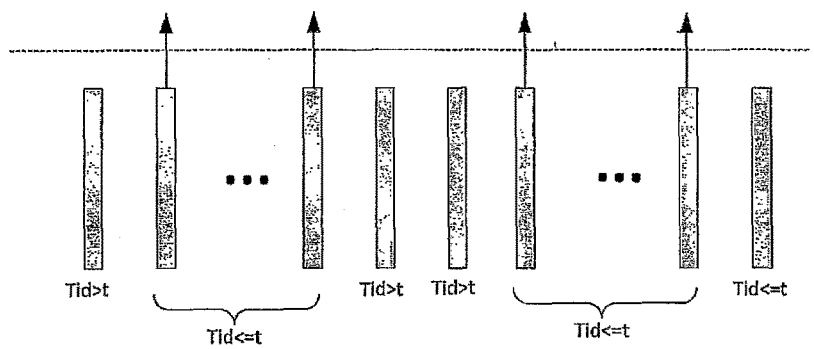
FIG. 52 illustrates a subset of reference layer pictures used for interlayer sample value prediction.

Referring to FIG. 52, by way of example, only sample values of reference layer pictures with TemporalId less than equal to t are needed for decoding of current (enhancement) layer pictures.

In an example embodiment, the maximum frequency limit f_max with which motion compensation (MC) is executed within the subset of reference layer pictures needed for decoding of current layer pictures is a bitstream conformance requirement. Further f_max specifies a limit on the maximum number of reference layer pictures coded per second with NALU type belonging to a subset of pre-determined NALU types, say "R" and available for inter-layer prediction. In an example, the specified limit is equal to f_max. NALU type refers to one of a multiple of different types of encoding.

Figure 53:
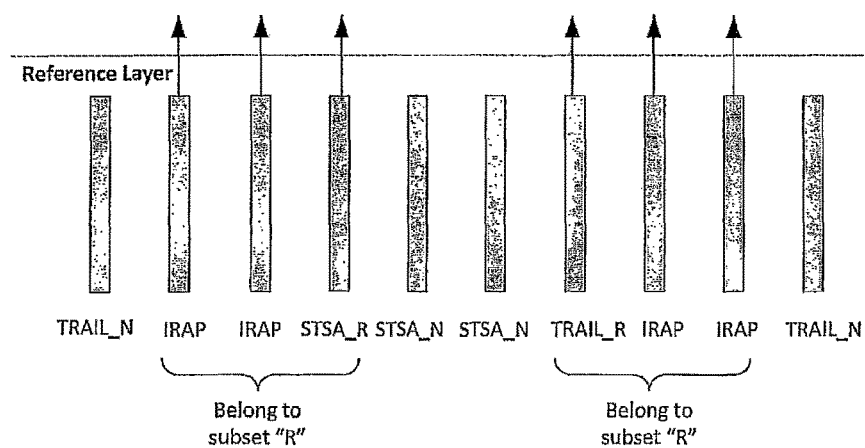
FIG. 53 illustrates a subset of reference layer pictures used for inter-layer sample value prediction.
Figures 63D, 64:
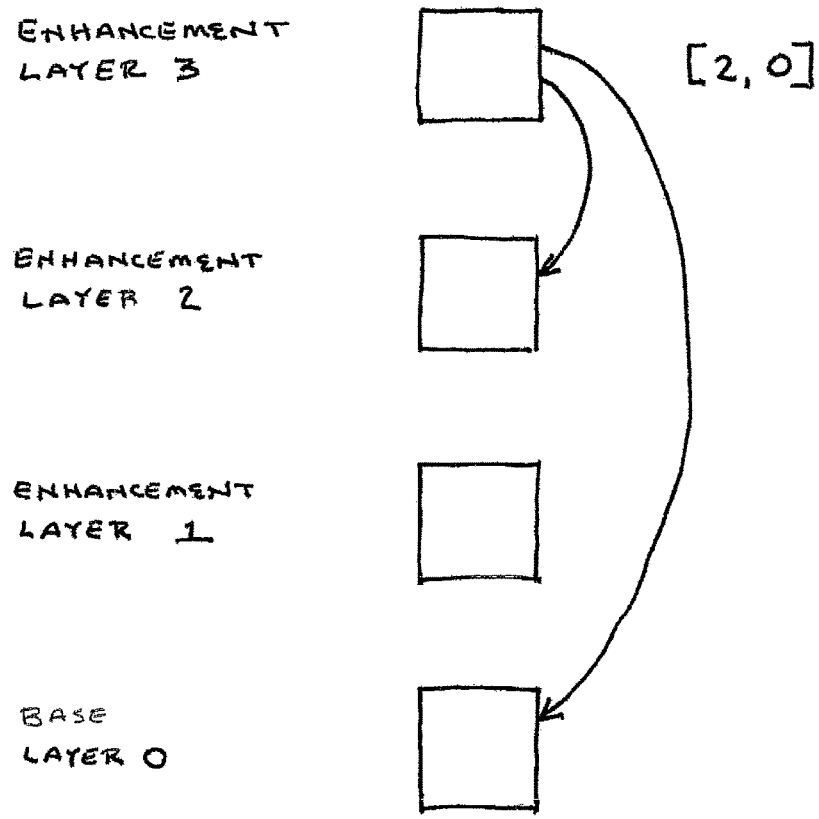
FIG. 63D illustrate an exemplary slide segment header syntax.
FIG. 64 illustrates a base layer and enhancement layers.

Referring to FIG. 53, by way of example, the sample values for reference layer pictures with NALU type belonging to a pre-determined subset "R" are used for decoding of current (enhancement) layer pictures.

In a further example, for improved coding efficiency a minimum frequency limit, say f_min, is specified on the number of reference layer pictures coded per second with NALU type belonging to a subset of pre-determined NALU types, say "R". In some cases, if the frequency is to low then it is more difficult to maintain coding efficiency.

An exemplary profile level constraint may be if R={TRAIL_R, TSA_R, RADL_R, RASL_R, BLA_W_LP, BLA_W_RADL, BLA_N_LP, IDR_W_RADL, IDR_N_LP, CRA_NUT}. It may be a requirement of bitstream conformance that the inter prediction decoding processes, for the reference layers, are only invoked if nal_unit_type is equal to TRAIL_R, TSA_R, RADL_R, RASL_R, BLA_W_LP, BLA_W_RADL, BLA_N_LP, IDR_W_RADL, IDR_N_LP, and/or CRA_NUT.

In an example embodiment, the maximum frequency limit f_max with which motion compensation (MC) is executed within the subset of reference layer pictures needed for decoding of current layer pictures is a bitstream conformance requirement. Further, f_max specifies a limit on the maximum number of current layer pictures coded per second with a slice header flag(s) indicating that inter-layer sample value prediction is used. In an example, the specified limit is equal to f_max.

In an example embodiment, the slice header flag indicating the inter-layer sample value prediction is used, such as inter_layer_sample_pred_only_flag.

The inter_layer_sample_pred_only_flag equal to 1 specifies that inter prediction is not used in decoding of the current picture. The inter_layer_sample_pred_only_flag equal to 0 specifies that inter prediction may be used in decoding of the current picture. When not present, the value of inter_layer_sample_pred_only_flag is inferred to be equal to 0.

In another embodiment, bits currently reserved in slice header may be defined to carry information which identifies whether the picture is available for inter-layer sample value prediction and the corresponding sample values are needed for decoding of higher layer pictures. The f_max specifies a limit on the maximum number of such reference layer pictures coded per second. In an example, the specified limit is equal to f_max.

In some cases, the current syntax element max_one_active_ref_layer_flag may be required to be set to 1. The goal of this constraint ensures that a maximum of one reference layer is used for inter-layer prediction for each picture thereby reducing the hardware requirements of the corresponding SHVC decoder.

The max_one_active_ref_layer_flag equal to 1 specifies that at most one picture is used for inter-layer prediction for each picture in the CVS. The max_one_active_ref_layer_flag equal to 0 specifies that more than one picture may be used for inter-layer prediction for each picture in the CVS.

In another embodiment one or more of the following constraints may be imposed on various syntax elements:

First, for each target layer num_inter_layer_ref_pics_minus1 may be equal to 0 in all the slice segment headers of all the pictures belonging to the target layer.

Second, for each target layer with layer id nuh_layer_id, NumDirectRefLayers[nuh_layer_id] is less than or equal to 1.

The num_inter_layer_ref_pics_minus1 plus 1 specifies the number of pictures that may be used in decoding of the current picture for inter-layer prediction. The length of the num_inter_layer_ref_pics_minus1 syntax element is Ceil (Log 2(NumDirectRefLayers[nuh_layer_id])) bits. The value of num_inter_layer_ref_pics_minus1 shall be in the range of 0 to NumDirectRefLayers[nuh_layer_id]−1, inclusive. Log 2(x) is the base-2 logarithm of x.

The NumDirectRefLayers for a layer may be derived based upon a direct_dependency_flag[i][j] that when equal to 0 specifies that the layer with index j is not a direct reference layer for the layer with index i. The direct_dependency_flag[i][j] equal to 1 specifies that the layer with index j may be a direct reference layer for the layer with index i. When the direct_dependency_flag[i][j] is not present for i and j in the range of 0 to vps_max_layers_minus1, it is inferred to be equal to 0.

The direct_dep_type_len_minus2 plus 2 specifies the number of bits of the direct_dependency_type[i][j] syntax element. In bitstreams conforming to this version of this Specification the value of direct_dep_type_len_minus2 shall be equal 0. Although the value of direct_dep_type_len_minus2 shall be equal to 0 in this version of this Specification, decoders shall allow other values of direct_dep_type_len_minus2 in the range of 0 to 30, inclusive, to appear in the syntax.

The direct_dependency_type[i][j] is used to derive the variables NumSamplePredRefLayers[i], NumMotionPredRefLayers[i], SamplePredEnabledFlag[i][j], and MotionPredEnabledFlag[i][j]. direct_dependency_type[i][j] shall be in the range of 0 to 2, inclusive, in bitstreams conforming to this version of this Specification. Although the value of direct_dependency_type[i][j] shall be in the range of 0 to 2, inclusive, in this version of this Specification, decoders shall allow values of direct_dependency_type[i][j] in the range of 3 to 232-2, inclusive, to appear in the syntax.

The variables NumSamplePredRefLayers[i], NumMotionPredRefLayers[i], SamplePredEnabledFlag[i][j], MotionPredEnabledFlag[i][j], NumDirectRefLayers[i], DirectRefLayerIdx[i][j], RefLayerId[i][j], MotionPredRefLayerId[i][j], and SamplePredRefLayerId[i][j] are derived as follows:

```
for( i = 0; i < 64; i++ ) {
    NumSamplePredRefLayers[ i ] = 0
    NumMotionPredRefLayers[ i ] = 0
    NumDirectRefLayers[ i ] = 0
    for( j = 0; j < 64; j++ ) {
        SamplePredEnabledFlag[ i ][ j ] = 0
        MotionPredEnabledFlag[ i ][ j ] = 0
        RefLayerId[ i ][ j ] = 0
        SamplePredRefLayerId[ i ][ j ] = 0
        MotionPredRefLayerId[ i ][ j ] = 0
    }
}
for( i = 1; i <= vps_max_layers_minus1; i++ ) {
    iNuhLId = layer_id_in_nuh[ i ]
    for( j = 0; j < i; j++ )
        if( direct_dependency_flag[ i ][ j ] ) {
            DirectRefLayerIdx[ iNuhLId ][ layer_id_in_nuh[ j ] ] =
NumDirectRefLayers[ iNuhLId ]
            RefLayerId[ iNuhLId ][ NumDirectRefLayers[ iNuhLId ]++ ] =
layer_id_in_nuh[ j ]
            SamplePredEnabledFlag[ iNuhLId ][ j ] = ( (
direct_dependency_type[ i ][ j ] + 1 ) & 1 )
            NumSamplePredRefLayers[ iNuhLId ] +=
SamplePredEnabledFlag[ iNuhLId ][ j ]
            MotionPredEnabledFlag[ iNuhLId ][ j ] = ( ( (
direct_dependency_type[ i ][ j ] + 1 ) & 2 ) >> 1 )
            NumMotionPredRefLayers[ iNuhLId ] +=
MotionPredEnabledFlag[ iNuhLId ][ j ]
        }
}
for( i = 1, mIdx = 0, sIdx = 0; i <= vps_max_layers_minus1; i++ ) {
    iNuhLId = layer_id_in_nuh[ i ]
    for( j = 0, j < i; j++ ) {
        if( MotionPredEnabledFlag[ iNuhLId ][ j ] )
            MotionPredRefLayerId[ iNuhLId ][ mIdx++ ] =
layer_id_in_nuh[ j ]
        if( SamplePredEnabledFlag[ lNuhLid ][ j ] )
            SamplePredRefLayerId[ iNuhLId ][ sIdx++ ] =
layer_id_in_nuh[ j ]
    }
}
```

The direct_dependency_flag[i][j], direct_dep_type_len_minus2, direct_dependency_type[i][j] are included in the vps_extension syntax illustrated in FIG. 53A and FIG. 53B, which is included by reference in the VPS syntax which provides syntax for the coded video sequence The other syntax elements signaled in the bitstream may include inter_layer_pred_enabled_flag, num_inter_layer_ref_pics_minus1, and/or inter_layer_pred_layer_idc[i]. These syntax elements may be signaled in slice segment header. An example of this is shown FIG. 53C.

The inter_layer_pred_enabled_flag equal to 1 specifies that inter-layer prediction may be used in decoding of the current picture. The inter_layer_pred_enabled_flag equal to 0 specifies that inter-layer prediction is not used in decoding of the current picture. When not present, the value of inter_layer_pred_enabled_flag is inferred to be equal to 0.

The num_inter_layer_ref_pics_minus1 plus 1 specifies the number of pictures that may be used in decoding of the current picture for inter-layer prediction. The length of the num_inter_layer_ref_pics_minus1 syntax element is Ceil (Log 2(NumDirectRefLayers[nuh_layer_id])) bits. The value of num_inter_layer_ref_pics_minus1 shall be in the range of 0 to NumDirectRefLayers[nuh_layer_id]−1, inclusive.

The variable NumActiveRefLayerPics is derived as follows:

```
if( nuh_layer_id == 0 | | NumDirectRefLayers[ nuh_layer_id ] = = 0
| | linter_layer_pred_enabled_flag )
    NumActiveRefLayerPics = 0
else if( max_one_active_ref_layer_flag | |
NumDirectRefLayers[ nuh_layer_id ] = = 1 )
    NumActiveRefLayerPics = 1
else
    NumActiveRefLayerPics = num_inter_layer_ref_pics_minus1 + 1
All slices of a coded picture shall have the same value of
NumActiveRefLayerPics.
```

The inter_layer_pred_layer_idc[i] specifies the variable, RefPicLayerId[i], representing the nuh_layer_id of the i-th picture that may be used by the current picture for inter-layer prediction. The length of the syntax element inter_layer_pred_layer_idc[i] is Ceil(Log 2(NumDirectRefLayers [nuh_layer_id])) bits. The value of inter_layer_pred_layer_idc[i] may be in the range of 0 to NumDirectRefLayers [nuh_layer_id]−1, inclusive. When not present, the value of inter_layer_pred_layer_idc[i] is inferred to be equal to 0.

When i is greater than 0, inter_layer_pred_layer_idc[i] shall be greater than inter_layer_pred_layer_idc[i−1].

The variables RefPicLayerId[i] for each value of i in the range of 0 to NumActiveRefLayerPics−1, inclusive, NumActiveMotionPredRefLayers, and ActiveMotionPredRefLayerId[j] for each value of j in the range of 0 to NumActiveMotionPredRefLayers−1, inclusive, are derived as follows:

```
for( i = 0, j = 0; i < NumActiveRefLayerPics; i++)
    RefPicLayerId[ i ] =
    RefLayerId[ nuh_layer_id ][ inter_layer_pred_layer_idc[ i ] ]
        if(MotionPredEnabledFlag[ nuh_layer_id ]
        [ inter_layer_pred_layer_idc[ i ] ]
            ActiveMotionPredRefLayerId[ j++ ] =
            RefLayerId[ nuh_layer_id ][ inter_layer_pred_layer_idc[ i ] ]
}
NumActiveMotionPredRefLayers = j
```

All slices of a picture shall have the same value of inter_layer_pred_layer_idc[i] for each value of i in the range of 0 to NumActiveRefLayerPics−1, inclusive.

In some cases, the current set of syntax element max_tid_il_ref_pics_plus1[i] is required to be set to 0. Such a constraint would ensure that non-IRAP pictures with nuh_layer_id equal to layer_id_in_nuh[i] are not used as reference for inter-layer prediction.

In another embodiment, the constraint that max_tid_il_ref_pics_plus1[i] is required to be set to 0 may be inferred based on past data signaled within the bitstream, such as for example, profile value and/or level value. The constraint may be a bitstream conformance requirement. Thus only the lowest sub-layer of a layer is used.

In some cases, a limit, such as c_max, may also be set on the maximum number of consecutive reference layer pictures which may use motion compensation (due to inter-layer sample value prediction) within the reference layer subset of pictures needed for decoding current layer pictures. This constraint limits the amount of "clumping" that may occur which relaxes the constraints on the complexity of the decoder.

In another embodiment, the value of c_max may be inferred based on past data signaled within the bitstream, such as for example, profile value and/or level value. In another example c_max may be explicitly signaled within the bitstream at an appropriate location, such as for example, within the sequence parameter set (SPS) and/or within the video parameter set (VPS).

In a typical case, a layer may set temporal identifier values for all NAL units to 0. For example in this case nuh_temporal_id_plus1 may be set to 1 for all the pictures belonging to the layer. This type of assignment is used for the HEVC common test conditions. In this case the TemporalId based constraints may not be specified or may not be effective.

In this case the following constraint may be imposed, namely, it is a requirement of bitstream conformance that sub-layer non-reference pictures are not used for inter-layer prediction. A sub-layer non-reference picture may be a picture that contains samples that cannot be used for inter prediction in the decoding process of subsequent pictures of the same sub-layer in decoding order.

Samples of a sub-layer non-reference picture may be used for inter prediction in the decoding process of subsequent pictures of higher sub-layers in decoding order.

A sub-layer reference picture maybe a picture that contains samples that may be used for inter prediction in the decoding process of subsequent pictures of the same sub-layer in decoding order. Samples of a sub-layer reference picture may also be used for inter prediction in the decoding process of subsequent pictures of higher sub-layers in decoding order.

In an alternative embodiment an additional constraint may be imposed as follows, namely, (1) it is a requirement of bitstream conformance that there can be at most s_max sub-layer reference pictures per second in a reference layer available for inter-layer prediction, and/or (2) it is a requirement of bitstream conformance that there must be at least s_min sub-layer non-reference pictures per second in a reference layer available for inter-layer prediction.

In another embodiment following additional constraints may be imposed as follows, namely, (1) it is a requirement of bitstream conformance that there can be at most s_max sub-layer reference pictures per second in a layer with nuh_layer_id equal to layer_id_in_nuh[i] with TemporalId equal to max_tid_il_ref_pics_plus1[i], (2) and/or it is a requirement of bitstream conformance that there must be at least s_min sub-layer non-reference pictures per second in a layer with nuh_layer_id equal to layer_id_in_nuh[i] with TemporalId equal to max_tid_il_ref_pics_plus1[i].

In another embodiment following constraints may be imposed as follows, namely, (1) it is a requirement of bitstream conformance that nuh_temporal_id_plus1 is set to 1 for all the pictures and sub-layer non-reference pictures are not used for inter-layer prediction and that there can be at most s_max sub-layer reference pictures per second in a layer, and/or (2) it is a requirement of bitstream conformance that nuh_temporal_id_plus1 is set to 1 for all the pictures and sub-layer non-reference pictures are not used for inter-layer prediction and that there must be at least s_min sub-layer non-reference pictures per second in a layer.

The motivation for the aforementioned constraint(s) is that sub-layer non-reference pictures are preferably not used for inter prediction in the decoding process of subsequent pictures of the same sub-layer in decoding order. Thus when decoding a target layer, those pictures from the reference layer could be discarded without need for decoding and performing motion compensation on them.

There are several different techniques that may be used to signal the sub-layer non-reference pictures related indications for inter-layer prediction.

Referring to FIG. 54, in one embodiment a flag may be signaled in VPS for each reference layer to indicate that sub-layer non-reference pictures are not used for inter-layer prediction, using a first syntax variant. If no_sub_layer_non_ref_inter_layer_sample_pred_flag[i] is signalled as 1 for a layer then the sub-layer non-reference pictures from that layer are not used for inter layer prediction between the layers.

The no_sub_layer_non_ref_inter_layer_sample_pred_flag[i] equal to 1 specifies that within the CVS sub-layer non-reference pictures with nuh_layer_id equal to layer_id_in_nuh[i] are not used as reference for inter-layer prediction. no_sub_layer_non_ref_inter_layer_sample_pred_flag[i] equal to 0 specifies that within the CVS sub-layer non-reference pictures with nuh_layer_id equal to layer_id_in_nuh[i] may be used as reference for inter-layer prediction. When not present, no_sub_layer_non_ref_inter_layer_sample_pred_flag i 1 is inferred to be equal to 0.

Another variant of the syntax of FIG. 54, a flag may be signaled per TemporalId to indicate if the sub-layer non-reference pictures of that TemporalId are used for inter-layer prediction. A first variant for this is the flag is signaled for each layer for each TemporalId value up to but not including max_tid_il_ref_pics_plus1[i]. In another case the flag may be signaled for TemporalId values less than, including and more than max_tid_il_ref_pics_plus1[i]. A second variant for this is the flag is signaled for each for each TemporalId value up to and including the maximum TemporalId value. In some case the maximum TemporalId value may be 6.

Referring to FIG. 55, in another embodiment a flag may be signaled in VPS for each reference layer to indicate that sub-layer non-reference pictures are not used for inter-layer prediction, using a second syntax variant. If no_sub_layer_non_ref_inter_layer_sample_pred_flag[i][j] is signalled as 1 for a reference layer then the sub-layer non-reference pictures from that layer are not used for inter layer prediction between the layers. In this manner, the system can avoid decoding sub-layers that do not need to be decoded, and avoid decoding non-reference pictures, which reduces the motion compensation processing that is performed while also reducing the size of the decoded picture buffer.

For FIG. 55, the no_sub_layer_non_ref_inter_layer_sample_pred_tid_flag[i][j] equal to 1 specifies that within the CVS sub-layer non-reference pictures with nuh_layer_id equal to layer_id_in_nuh[i] and TemporalId equal to j are not used as reference for inter-layer prediction. The no_sub_layer_non_ref_inter_layer_sample_pred_flag[i][j] equal to 0 specifies that within the CVS sub-layer non-reference pictures with nuh_layer_id equal to layer_id_in_nuh[i] and TemporalId equal to j may be used as reference for inter-layer prediction. When not present, no_sub_layer_non_ref_inter_layer_sample_pred_flag[i][j] is inferred to be equal to 0.

Moreover, when max_tid_il_ref_pics_plus1[i] is 0 non-IRAP pictures with nuh_layer_id equal to layer_id_in_nuh[i] may not be used as reference for inter-layer reference prediction. In this case no_sub_layer_non_ref_inter_layer_sample_pred_tid_flag[i][j] may not be not signaled and inferred to be 0.

Referring to FIG. 56, in yet another embodiment a flag may be signaled in VPS for each reference layer to indicate that sub-layer non-reference pictures are not used for inter-layer prediction, using a third syntax variant. The no_sub_layer_non_ref_inter_layer_sample_pred_flag[i][j] is signalled as 1 for a layer corresponding a sub-layer non-reference pictures from that layer are not used for inter layer prediction between the layers. It is noted that the maximum temporal ID may be set to 7 ["for (j=0; j<7;i++)"]. In this manner, the system can avoid decoding sub-layers and non-reference pictures of a sublayer that do not need to be decoded, which reduces the motion compensation processing that is performed while also reducing the size of the decoded picture buffer.

For FIG. 56, the no_sub_layer_non_ref_inter_layer_sample_pred_tid_flag[i][j] equal to 1 specifies that within the CVS sub-layer non-reference pictures with nuh_layer_id equal to layer_id_in_nuh[i] and TemporalId equal to j are not used as reference for inter-layer prediction. no_sub_layer_non_ref_inter_layer_sample_pred_flag[i] equal to 0 specifies that within the CVS sub-layer non-reference pictures with nuh_layer_id equal to layer_id_in_nuh[i] and TemporalId equal to j may be used as reference for inter-layer prediction. When not present, no_sub_layer_non_ref_inter_layer_sample_pred_flag[i][j] is inferred to be equal to 0.

Moreover, when max_tid_il_ref_pics_plus1[i] is 0 non-IRAP pictures with nuh_layer_id equal to layer_id_in_nuh[i] are not used as reference for inter-layer reference prediction. In this case no_sub_layer_non_ref_inter_layer_sample_pred_tid_flag[i][j] is not signaled and inferred to be 0.

Referring to FIG. 57, in yet another embodiment a flag may be signaled in VPS for each layer to indicate the limitations on the use of layers and sub-layers, using a fourth syntax variant. The no_sub_layer_non_ref_inter_layer_sample_pred_tid_flag[i] is equal to 1 specifies that within the CVS sub-layer non-reference pictures with nuh_layer_id equal to layer_id_in_nuh[i] and TemporalId equal to max_tid_il_ref_pics_plus1[i]−1 are not used as reference for inter-layer prediction. The no_sub_layer_non_ref_inter_layer_sample_pred_flag[i] equal to 0 specifies that within the CVS sub-layer non-reference pictures with nuh_layer_id equal to layer_id_in_nuh[i] and TemporalId equal to max_tid_il_ref_pics_plus1[i]−1 may be used as reference for inter-layer prediction. When not present, no_sub_layer_non_ref_inter_layer_sample_pred_flag[i][j] is inferred to be equal to 0.

When max_tid_il_ref_pics_plus1[i] is 0 non-IRAP pictures with nuh_layer_id equal to layer_id_in_nuh[i] are not used as reference for inter-layer reference prediction. In this case no_sub_layer_non_ref_inter_layer_sample_pred_tid_flag[i][j] is not signaled and inferred to be 0.

Referring to FIG. 58, and another embodiment illustrated in FIG. 58A in yet another embodiment a flag may be signaled in VPS for each layer to indicate the limitations on the use of layers and sub-layers, using a fifth syntax variant. If no_sub_layer_non_ref_inter_layer_sample_pred_tid_flag[i] is equal to 1 specifies that within the CVS sub-layer non-reference pictures with nuh_layer_id equal to layer_id_in_nuh[i] and TemporalId equal to max_tid_il_ref_pics_plus1[i]−1 if max_tid_il_ref_pics_plus1[i] is less than 7 or vps_max_sub_layers_minus1+1 otherwise are not used as reference for inter-layer prediction. The no_sub_layer_non_ref_inter_layer_sample_pred_flag[i] equal to 0 specifies that within the CVS sub-layer non-reference pictures with nuh_layer_id equal to layer_id_in_nuh[i] and TemporalId equal to max_tid_il_ref_pics_plus1[i]−1 if max_tid_il_ref_pics_plus1[i] is less than 7 or vps_max_sub_layers_minus1+1 otherwise may be used as reference for inter-layer prediction. When not present, no_sub_layer_non_ref_inter_layer_sample_pred_flag[i][j] is inferred to be equal to 0.

When max_tid_il_ref_pics_plus1[i] is 0 non-IRAP pictures with nuh_layer_id equal to layer_id_in_nuh[i] are not used as reference for inter-layer reference prediction. In this case no_sub_layer_non_ref_inter_layer_sample_pred_tid_flag[i] is not signaled and inferred to be 0.

Referring to FIG. 58, and another embodiment illustrated in FIG. 58A in yet another embodiment a flag may be signaled in VPS for each layer to indicate the limitations on the use of layers and sub-layers, using a fifth syntax variant. If no_sub_layer_non_ref_inter_layer_sample_pred_tid_flag[i] is equal to 1 specifies that within the CVS sub-layer non-reference pictures with nuh_layer_id equal to layer_id_in_nuh[i] and TemporalId equal to max_tid_il_ref_pics_plus1[i]−1 if max_tid_il_ref_pics_plus1[i] is less than 7 or vps_max_sub_layers_minus1 otherwise are not used as reference for inter-layer prediction. The no_sub_layer_non_ref_inter_layer_sample_pred_flag[i] equal to 0 specifies that within the CVS sub-layer non-reference pictures with nuh_layer_id equal to layer_id_in_nuh[i] and TemporalId equal to max_tid_il_ref_pics_plus1[i]−1 if max_tid_il_ref_pics_plus1[i] is less than 7 or vps_max_sub_layers_minus1 otherwise may be used as reference for inter-layer prediction. When not present, no_sub_layer_non_ref_inter_layer_sample_pred_flag[i][j] is inferred to be equal to 0.

When max_tid_il_ref_pics_plus1[i] is 0 non-IRAP pictures with nuh_layer_id equal to layer_id_in_nuh[i] are not used as reference for inter-layer reference prediction. In this case no_sub_layer_non_ref_inter_layer_sample_pred_tid_flag[i] is not signaled and inferred to be 0.

Referring to FIG. 58, and another embodiment illustrated in FIG. 58A in yet another embodiment a flag may be signaled in VPS for each layer to indicate the limitations on the use of layers and sub-layers, using a fifth syntax variant. If no_sub_layer_non_ref_inter_layer_sample_pred_tid_flag[i] is equal to 1 specifies that within the CVS sub-layer non-reference pictures with nuh_layer_id equal to layer_id_in_nuh[i] and TemporalId equal to max_tid_il_ref_pics_plus1[i]−1 if max_tid_il_ref_pics_plus1[i] is less than 7 or equal to sps_max_sub_layers_minus1 from active SPS of layer with index i otherwise are not used as reference for inter-layer prediction. The no_sub_layer_non_ref_inter_layer_sample_pred_flag[i] equal to 0 specifies that within the CVS sub-layer non-reference pictures with nuh_layer_id equal to layer_id_in_nuh[i] and TemporalId equal to max_tid_il_ref_pics_plus1[i]−1 if max_tid_il_ref_pics_plus1[i] is less than 7 or equal to sps_max_sub_layers_minus1 from active SPS of layer with index i otherwise may be used as reference for inter-layer prediction. When not present, no_sub_layer_non_ref_inter_layer_sample_pred_flag[i][j] is inferred to be equal to 0.

When max_tid_il_ref_pics_plus1[i] is 0 non-IRAP pictures with nuh_layer_id equal to layer_id_in_nuh[i] are not used as reference for inter-layer reference prediction. In this case no_sub_layer_non_ref_inter_layer_sample_pred_tid_flag[i] is not signaled and inferred to be 0.

Referring to FIG. 58, and another embodiment illustrated in FIG. 58A in yet another embodiment a flag may be signaled in VPS for each layer to indicate the limitations on the use of layers and sub-layers, using a fifth syntax variant. If no_sub_layer_non_ref_inter_layer_sample_pred_tid_flag[i] is equal to 1 specifies that within the CVS sub-layer non-reference pictures with nuh_layer_id equal to layer_id_in_nuh[i] and TemporalId equal to max_tid_il_ref_pics_plus1[i]−1 if max_tid_il_ref_pics_plus1[i] is less than 7 or equal to maximum number of temporal sub-layers in the layer with index i otherwise are not used as reference for inter-layer prediction. The no_sub_layer_non_ref_inter_layer_sample_pred_flag[i] equal to 0 specifies that within the CVS sub-layer non-reference pictures with nuh_layer_id equal to layer_id_in_nuh[i] and TemporalId equal to max_tid_il_ref_pics_plus1[i]−1 if max_tid_il_ref_pics_plus1[i] is less than 7 or equal to maximum number of temporal sub-layers in the layer with index i otherwise may be used as reference for inter-layer prediction. When not present, no_sub_layer_non_ref_inter_layer_sample_pred_flag[i][j] is inferred to be equal to 0.

When max_tid_il_ref_pics_plus1[i] is 0 non-IRAP pictures with nuh_layer_id equal to layer_id_in_nuh[i] are not used as reference for inter-layer reference prediction. In this case no_sub_layer_non_ref_inter_layer_sample_pred_tid_flag[i] is not signaled and inferred to be 0.

In yet another embodiment a flag may be signaled in VPS for each layer to indicate the limitations on the use of layers and sub-layers, using a fifth syntax variant. If no_sub_layer_non_ref_inter_layer_sample_pred_tid_flag[i] is equal to 1 specifies that within the CVS sub-layer non-reference pictures with nuh_layer_id equal to layer_id_in_nuh[i] and TemporalId equal to max_tid_il_ref_pics_plus1[i]−1 if max_tid_il_ref_pics_plus1[i] is less than 7 or vps_max_sub_layers_minus1 otherwise are not used as reference for inter-layer prediction. The no_sub_layer_non_ref_inter_layer_sample_pred_flag[i] equal to 0 specifies that within the CVS sub-layer non-reference pictures with nuh_layer_id equal to layer_id_in_nuh[i] and TemporalId equal to max_tid_il_ref_pics_plus1[i]−1 if max_tid_il_ref_pics_plus1[i] is less than 7 or vps_max_sub_layers_minus1 otherwise may be used as reference for inter-layer prediction. When not present, no_sub_layer_non_ref_inter_layer_sample_pred_flag[i][j] is inferred to be equal to 0.

The vps_max_sub_layers_minus1 may be defined in VPS. The vps_max_sub_layers_minus1 plus 1 may specify the maximum number of temporal sub-layers that may be present in the bitstream. The value of vps_max_sub_layers_minus1 may be in the range of 0 to 6, inclusive.

Referring to FIG. 59, in yet another embodiment a flag may be signaled in VPS for each layer to indicate the limitations on the use of layers and sub-layers, using a sixth syntax variant. If no_sub_layer_non_ref_inter_layer_sample_pred_tid_flag[i][j] is equal to 1 specifies that within the CVS sub-layer non-reference pictures with nuh_layer_id equal to layer_id_in_nuh[i] and TemporalId equal to j are not used as reference for inter-layer prediction. The no_sub_layer_non_ref_inter_layer_sample_pred_flag[i] equal to 0 specifies that within the CVS sub-layer non-reference pictures with nuh_layer_id equal to layer_id_in_nuh[i] and TemporalId equal to j may be used as reference for inter-layer prediction. When not present, no_sub_layer_non_ref_inter_layer_sample_pred_flag[i ][j] is inferred to be equal to 0.

When max_tid_il_ref_pics_plus1[i] is 0 non-IRAP pictures with nuh_layer_id equal to layer_id_in_nuh[i] they are not used as reference for inter-layer reference prediction. In this case no_sub_layer_non_ref_inter_layer_sample_pred_tid_flag[i][j] is not signaled and inferred to be 0.

The decoding process for scalable video coded video and for multi-view coded video may be modified, as desired, to accommodate the modified syntax structure and the marking process for sub-layer non-reference pictures not needed for inter-layer prediction.

The decoding process for the example signaling illustrated in FIG. 54, FIG. 57, FIG. 58 and FIG. 58 A may be modified, for example, as follows. It may be a requirement of bitstream conformance that for any value of i in the range of 0 to NumActiveRefLayerPics−1, inclusive, no_sub_layer_non_ref_inter_layer_sample_pred_flag[LayerIdxInVps [RefPicLayerId[i]] is not equal to 1.

The decoding process for the examples signaling illustrated in FIG. 54, FIG. 57, FIG. 58 and FIG. 58 A may be modified, for example, as follows. It may be a requirement of bitstream conformance that for any value of i in the range of 0 to NumActiveRefLayerPics−1, inclusive, no_sub_layer_non_ref_inter_layer_sample_pred_flag[LayerIdxInVps [RefPicLayerId[i]] is not equal to 1 if the picture in the current access unit with nuh_layer_id value equal to RefPicLayerId[i] is a sub-layer non-reference picture.

The decoding process for the examples signaling illustrated in FIG. 54, FIG. 57, FIG. 58 and FIG. 58 A may be modified, for example, as follows. It may be a requirement of bitstream conformance that for any value of i in the range of 0 to NumActiveRefLayerPics−1, inclusive, no_sub_layer_non_ref_inter_layer_sample_pred_flag[LayerIdxInVps [RefPicLayerId[i]] is not equal to 1 if the picture in the current access unit with nuh_layer_id value equal to RefLayerId[nuh_layer_id][inter_layer_pred_layer_idc[i]] is a sub-layer non-reference picture.

The decoding process for the examples signaling illustrated in FIG. 54, FIG. 57, FIG. 58 and FIG. 58 A may be modified, for example, as follows. It may be a requirement of bitstream conformance that for each value of i in the range of 0 to NumActiveRefLayerPics−1, inclusive, no_sub_layer_non_ref_inter_layer_sample_pred_flag[LayerIdxInVps [RefPicLayerId[i]] is not equal to 1 if the picture in the current access unit with nuh_layer_id value equal to RefPicLayerId[i] is a sub-layer non-reference picture and TemporalId of the picture in the current access unit with nuh_layer_id equal to RefPicLayerId[i] is equal to max_tid_il_ref_pics_plus1[LayerIdxInVps[RefPicLayerId [i]]−1 if max_tid_il_ref_pics_plus1[LayerIdxInVps[RefPicLayerId[i]] is less than 7 or equal to sps_max_sub_layers_minus1 from active SPS of layer of the picture RefPicLayerId[i] otherwise.

The decoding process for the examples signaling illustrated in FIG. 54, FIG. 57, FIG. 58 and FIG. 58 A may be modified, for example, as follows. It may be a requirement of bitstream conformance that for each value of i in the range of 0 to NumActiveRefLayerPics−1, inclusive, no_sub_layer_non_ref_inter_layer_sample_pred_flag[LayerIdxInVps [RefPicLayerId[i]] is not equal to 1 if the picture in the current access unit with nuh_layer_id value equal to RefPicLayerId[i] is a sub-layer non-reference picture and TemporalId of the picture in the current access unit with nuh_layer_id equal to RefPicLayerId[i] is equal to max_tid_il_ref_pics_plus1[LayerIdxInVps[RefPicLayerId [i]]−1 if max_tid_il_ref_pics_plus1[LayerIdxInVps[RefPicLayerId[i]] is less than 7 or equal to vps_max_sub_layers_minus1 otherwise.

The decoding process for the examples signaling illustrated in FIG. 54, FIG. 57, FIG. 58 and FIG. 58 A may be modified, for example, as follows. It may be a requirement of bitstream conformance that for each value of i in the range of 0 to NumActiveRefLayerPics−1, inclusive, no_sub_layer_non_ref_inter_layer_sample_pred_flag[LayerIdxInVps [RefPicLayerId[i]] is not equal to 1 if the picture in the current access unit with nuh_layer_id value equal to RefPicLayerId[i] is a sub-layer non-reference picture and TemporalId of the picture in the current access unit with nuh_layer_id equal to RefPicLayerId[i] is equal to max_tid_il_ref_pics_plus1[LayerIdxInVps[RefPicLayerId [i]]−1 if max_tid_il_ref_pics_plus1[LayerIdxInVps[RefPicLayerId[i]] is less than 7 or equal to vps_max_sub_layers_minus1+1 otherwise.

The decoding process for the examples signaling illustrated in FIG. 54, FIG. 57, FIG. 58 and FIG. 58 A may be modified, for example, as follows. It may be a requirement of bitstream conformance that for each value of i in the range of 0 to NumActiveRefLayerPics−1, inclusive, no_sub_layer_non_ref_inter_layer_sample_pred_flag[LayerIdxInVps [RefPicLayerId[i]] is not equal to 1 if the picture in the current access unit with nuh_layer_id value equal to RefPicLayerId[i] is a sub-layer non-reference picture and TemporalId of the picture in the current access unit with nuh_layer_id equal to RefPicLayerId[i] is equal to max_tid_il_ref_pics_plus1[LayerIdxInVps[RefPicLayerId [i]]−1 if max_tid_il_ref_pics_plus1[LayerIdxInVps[RefPicLayerId[i]] is less than 7 or equal to maximum number of temporal sub-layers in the layer of the picture RefPicLayerId[i] otherwise.

The marking process for the examples signaling illustrated in FIG. 54, FIG. 57, FIG. 58 and FIG. 58 A may be modified, for example, as follows.

The Input to this process may be a nuh_layer_id value latestDecLayerId. The output of this process may be potentially updated marking as "unused for reference" for some decoded pictures. It is noted that this process marks pictures that are not needed for inter or inter-layer prediction as "unused for reference". When TemporalId is less than HighestTid, the current picture may be used for reference in inter prediction and this process is not invoked.

The variables numTargetDecLayers, and latestDecIdx may be derived as follows. The numTargetDecLayers is set equal to the number of entries in TargetDecLayerIdList.

The latestDecIdx is set equal to the value of i for which TargetDecLayerIdList[i] is equal to latestDecLayerId.

For i in the range of 0 to latestDecIdx, inclusive, the following may be applied for marking of pictures as "unused for reference". Let currPic be the picture in the current access unit with nuh_layer_id equal to TargetDecLayerIdList[i]. When currPic is marked as "unused for reference" and is a sub-layer non-reference picture, the following may be applied:

The variable currTid is set equal to the value of TemporalId of currPic.

The variable remainingInterLayerReferencesFlag is derived as specified in the following:

```
remainingInterLayerReferencesFlag = 0
  if ( ( currTid <= (
max_tid_il_ref_pics_plus1[ LayerIdxInVps
[ TargetDecLayerIdList[ i ] ] ] −1 ) ) && !
no_sub_layer_non_ref_inter_layer_sample_pred_flag
[ LayerIdxInVps
[ TargetDecLayerIdList[ i ] ] ] )
    for( j = latestDecIdx + 1; j < numTargetDecLayers; j++ )
      for( k = 0; k <
NumDirectRefLayers[ TargetDecLayerIdList[ j ] ]; k++ )
      if( TargetDecLayerIdList[ i ] = =
RefLayerId[ TargetDecLayerIdList[ j ] ][ k ] )
        remainingInterLayerReferencesFlag = 1
```

When remainingInterLayerReferenceFlag is equal to 0, currPic is marked as "unused for reference".

In another embodiment the marking process for the examples signaling illustrated in FIG. 54, FIG. 57, FIG. 58 and FIG. 58 A may be modified, for example, as follows.

The Input to this process may be a nuh_layer_id value latestDecLayerId. The output of this process may be potentially updated marking as "unused for reference" for some decoded pictures. It is noted that this process marks pictures that are not needed for inter or inter-layer prediction as "unused for reference". When TemporalId is less than HighestTid, the current picture may be used for reference in inter prediction and this process is not invoked.

The variables numTargetDecLayers, and latestDecIdx may be derived as follows. The numTargetDecLayers is set equal to the number of entries in TargetDecLayerIdList.

The latestDecIdx is set equal to the value of i for which TargetDecLayerIdList[i] is equal to latestDecLayerId.

For i in the range of 0 to latestDecIdx, inclusive, the following may be applied for marking of pictures as "unused for reference". Let currPic be the picture in the current access unit with nuh_layer_id equal to TargetDecLayerIdList[i]. When currPic is marked as "unused for reference" and is a sub-layer non-reference picture, the following may be applied:

The variable currTid is set equal to the value of TemporalId of currPic.

The variable remainingInterLayerReferencesFlag is derived as specified in the following:

```
remainingInterLayerReferencesFlag = 0
if ( ( currTid < (
max_tid_il_ref_pics_plus1[ LayerIdxInVps
[ TargetDecLayerIdList[ i ] ] ] −1 ) ) ||
(currTid == (
max_tid_il_ref_pics_plus1[ LayerIdxInVps
[ TargetDecLayerIdList[ i ] ] ] −1 ) && !
no_sub_layer_non_ref_inter_layer_sample_pred_flag
[ LayerIdxInVps[ TargetDec
LayerIdList[ i ] ] ]) )
    for( j = latestDecIdx + 1; j < numTargetDecLayers; j++ )
        for( k = 0; k <
NumDirectRefLayers[ TargetDecLayerIdList[ j ] ]; k++ )
            if( TargetDecLayerIdList[ i ] = =
RefLayerId[ TargetDecLayerIdList[ j ] ][ k ] )
                remainingInterLayerReferencesFlag = 1
```

When remainingInterLayerReferenceFlag is equal to 0, currPic is marked as "unused for reference".

The decoding process for the examples signaling illustrated in FIG. 55, FIG. 56, and FIG. 59 may be modified, for example, as follows. It is a requirement of bitstream conformance that for any value of i in the range of 0 to NumActiveRefLayerPics−1, inclusive, no_sub_layer_non_ref_inter_layer_sample_pred_flag LayerIdxInVps[RefPicLayerId[i]][TemporalId] is not equal to 1.

The decoding process for the examples illustrated in FIG. 55, FIG. 56, and FIG. 59 may be modified, for example, as follows. It is a requirement of bitstream conformance that for any value of i in the range of 0 to NumActiveRefLayerPics−1, inclusive, no_sub_layer_non_ref_inter_layer_sample_pred_flag[LayerIdxInVps[RefPicLayerId[i]][TemporalId] is not equal to 1 if the picture in the current access unit with nuh_layer_id value equal to RefPicLayerId[i] is a sub-layer non-reference picture.

The decoding process for the examples illustrated in FIG. 55, FIG. 56, and FIG. 59 may be modified, for example, as follows. It is a requirement of bitstream conformance that for any value of i in the range of 0 to NumActiveRefLayerPics−1, inclusive, no_sub_layer_non_ref_inter_layer_sample_pred_flag[LayerIdxInVps[RefPicLayerId[i]][TemporalId] is not equal to 1 if the picture in the current access unit with nuh_layer_id value equal to RefLayerId[nuh_layer_id][inter_layer_pred_layer_idc[i]] is a sub-layer non-reference picture.

The decoding process for the examples illustrated in FIG. 55, FIG. 56, and FIG. 59 may be modified, for example, as follows. It is a requirement of bitstream conformance that for any value of i in the range of 0 to NumActiveRefLayerPics−1, inclusive, no_sub_layer_non_ref_inter_layer_sample_pred_flag[LayerIdxInVps[RefPicLayerId[i]][TemporalIdx] is not equal to 1 if the picture in the current access unit with nuh_layer_id value equal to RefPicLayerId[i] is a sub-layer non-reference picture and TemporalId TemporalIdx of the picture in the current access unit with nuh_layer_id equal to RefPicLayerId[i] is equal to max_tid_il_ref_pics_plus1[LayerIdxInVps[RefPicLayerId[i]]−1 if max_tid_il_ref_pics_plus1[LayerIdxInVps[RefPicLayerId[i]] is less than 7 or equal to sps_max_sub_layers_minus1 from active SPS of layer of the picture RefPicLayerId[i] otherwise.

The decoding process for the examples illustrated in FIG. 55, FIG. 56, and FIG. 59 may be modified, for example, as follows. It is a requirement of bitstream conformance that for any value of i in the range of 0 to NumActiveRefLayerPics−1, inclusive, no_sub_layer_non_ref_inter_layer_sample_pred_flag[LayerIdxInVps[RefPicLayerId[i]][TemporalIdx] is not equal to 1 if the picture in the current access unit with nuh_layer_id value equal to RefPicLayerId[i] is a sub-layer non-reference picture and TemporalId TemporalIdx of the picture in the current access unit with nuh_layer_id equal to RefPicLayerId[i] is equal to max_tid_il_ref_pics_plus1[LayerIdxInVps[RefPicLayerId[i]]−1 if max_tid_il_ref_pics_plus1[LayerIdxInVps[RefPicLayerId[i]] is less than 7 or equal to vps_max_sub_layers_minus1 otherwise.

The decoding process for the examples illustrated in FIG. 55, FIG. 56, and FIG. 59 may be modified, for example, as follows. It is a requirement of bitstream conformance that for any value of i in the range of 0 to NumActiveRefLayerPics−1, inclusive, no_sub_layer_non_ref_inter_layer_sample_pred_flag[LayerIdxInVps[RefPicLayerId[i]][TemporalIdx] is not equal to 1 if the picture in the current access unit with nuh_layer_id value equal to RefPicLayerId[i] is a sub-layer non-reference picture and TemporalId TemporalIdx of the picture in the current access unit with nuh_layer_id equal to RefPicLayerId[i] is equal to max_tid_il_ref_pics_plus1[LayerIdxInVps[RefPicLayerId[i]]−1 if max_tid_il_ref_pics_plus1[LayerIdxInVps[RefPicLayerId[i]] is less than 7 or equal to vps_max_sub_layers_minus1+1 otherwise.

The decoding process for the examples illustrated in FIG. 55, FIG. 56, and FIG. 59 may be modified, for example, as follows. It is a requirement of bitstream conformance that for any value of i in the range of 0 to NumActiveRefLayerPics−1, inclusive, no_sub_layer_non_ref_inter_layer_sample_pred_flag[LayerIdxInVps[RefPicLayerId[i]][TemporalIdx] is not equal to 1 if the picture in the current access unit with nuh_layer_id value equal to RefPicLayerId[i] is a sub-layer non-reference picture and TemporalId TemporalIdx of the picture in the current access unit with nuh_layer_id equal to RefPicLayerId[i] is equal to max_tid_il_ref_pics_plus1[LayerIdxInVps[RefPicLayerId[i]]−1 if max_tid_il_ref_pics_plus1[LayerIdxInVps[RefPicLayerId[i]] is less than 7 or equal to maximum number of temporal sub-layers in the layer of the picture RefPicLayerId[i] otherwise.

The marking process for the examples signaling illustrated in FIG. 55, FIG. 56, and FIG. 59 may be modified, for example, as follows.

The input to this process may be a nuh_layer_id value latestDecLayerId. The output of this process may potentially updated marking as "unused for reference" for some decoded pictures. It is noted that this process marks pictures that are not needed for inter or inter-layer prediction as "unused for reference". When TemporalId is less than HighestTid, the current picture may be used for reference in inter prediction and this process is not invoked.

The variables numTargetDecLayers, and latestDecIdx may be derived as follows. The numTargetDecLayers is set equal to the number of entries in TargetDecLayerIdList. The latestDecIdx is set equal to the value of i for which TargetDecLayerIdList[i] is equal to latestDecLayerId.

For i in the range of 0 to latestDecIdx, inclusive, the following may be applied for marking of pictures as "unused for reference":

Let currPic be the picture in the current access unit with nuh_layer_id equal to TargetDecLayerIdList[i].
When currPic is marked as "unused for reference" and is a sub-layer non-reference picture, the following applies:
The variable currTid is set equal to the value of TemporalId of currPic.
The variable remainingInterLayerReferencesFlag may be derived as specified in the following:

```
remainingInterLayerReferences Flag = 0
if ( ( currTid <= (
max_tid_il_ref_pics_plus1[ LayerIdxInVps
[ TargetDecLayerIdList[ i ] ] ] −1 ) ) && !
no_sub_layer_non_ref_inter_layer_sample_pred_tid_flag
[ LayerIdxInVps[ Target
DecLayerIdList[ i ] ] ][currTid] )
    for( j = latestDecIdx + 1; j < numTargetDecLayers; j++
)
        for( k = 0; k <
NumDirectRefLayers[ TargetDecLayerIdList[ j ] ] ]; k++ )
            if( TargetDecLayerIdList[ i ] = =
RefLayerId[ TargetDecLayerIdList[ j ] ][ k ] )
                remainingInterLayerReferencesFlag = 1
```

When remainingInterLayerReferenceFlag is equal to 0, currPic is marked as "unused for reference".

In another embodiment the marking process for the examples signaling illustrated in FIG. 55, FIG. 56, and FIG. 59 may be modified, for example, as follows.

The input to this process may be a nuh_layer_id value latestDecLayerId. The output of this process may potentially updated marking as "unused for reference" for some decoded pictures. It is noted that this process marks pictures that are not needed for inter or inter-layer prediction as "unused for reference". When TemporalId is less than HighestTid, the current picture may be used for reference in inter prediction and this process is not invoked.

The variables numTargetDecLayers, and latestDecIdx may be derived as follows. The numTargetDecLayers is set equal to the number of entries in TargetDecLayerIdList. The latestDecIdx is set equal to the value of i for which TargetDecLayerIdList[i] is equal to latestDecLayerId.

For i in the range of 0 to latestDecIdx, inclusive, the following may be applied for marking of pictures as "unused for reference":

Let currPic be the picture in the current access unit with nuh_layer_id equal to TargetDecLayerIdList[i].
When currPic is marked as "unused for reference" and is a sub-layer non-reference picture, the following applies:
The variable currTid is set equal to the value of TemporalId of currPic.
The variable remainingInterLayerReferencesFlag may be derived as specified in the following:

```
remainingInterLayerReferencesFlag = 0
if ( ( currTid < (
max_tid_il_ref_pics_plus1[ LayerIdxInVps
[ TargetDecLayerIdList[ i ] ] ] −1 ) ) ||
(currTid == (
max_tid_il_ref_pics_plus1[ LayerIdxInVps
[ TargetDecLayerIdList[ i ] ] ] −1 ) && !
no_sub_layer_non_ref_inter_layer_sample_pred_tid_flag
[ LayerIdxInVps[ Target
DecLayerIdList[ i ] ] ][currTid] ))
    for( j = latestDecIdx + 1; j < numTargetDecLayers; j++
)
        for( k = 0; k <
NumDirectRefLayers[ TargetDecLayerIdList[ j ] ] ]; k++ )
            if( TargetDecLayerIdList[ i ] = =
RefLayerId[ TargetDecLayerIdList[ j ] ][ k ] )
                remainingInterLayerReferencesFlag = 1
```

When remainingInterLayerReferenceFlag is equal to 0, currPic is marked as "unused for reference".

Any combination of the aforementioned embodiments, or portions thereof, may be used to impose constraints on the bitstreams.

Referring to FIG. 60, considering a source with a frame (picture) rate of 300 fps, a MaxRefLyrMCLumaSr specifies the maximum reference layer MC rate of the current operation point in samples per second. The max luma reference layer MC sample rate represents example maximum reference layer MC sample rate for various levels. In another embodiment, different maximum reference layer MC sample rate may be specified for different tiers within a profile. In another embodiment a different set of maximum reference layer MC sampling rate values may be used to specify appropriate constraints.

Referring to FIG. 61, the values of f_max corresponding to the maximum reference layer MC rate of the current operation point in pictures per second is illustrated. The table represents example maximum reference layer MC picture rate for various levels. In another embodiment, different maximum reference layer MC picture rate may be specified for different tiers within a profile. In another embodiment a different set of maximum reference layer MC picture rate values may be used to specify appropriate constraints.

Referring to FIG. 62, the maximum reference layer MC picture rate f_max (pictures per second) at level 5 to 6.2 for example picture sizes when MinCbSizeY is equal to 64 is illustrated.

In an example the following is a bitstream conformance requirement. Let the variable fR be set equal to $$1 \div 300.$$

For each reference layer with layer id nuh_layer_id, the difference between consecutive CPB removal times of access units n and $$n-(1 \div fR)-1,$$

inclusive, (with n greater than equal to $$(1 \div fR)-1$$

) shall satisfy the constraint that the summation of $(nCbS_L)*(nCbS_L)$ for every invocation of subclause corresponding to inter prediction decoding process within sublayers with TemporalId less than equal to (max_tid_il_ref_pics_plus1[nuh_layer_id]−1) and access units ranging from n to $$n-(1 \div fR)-1,$$

inclusive, shall be less than equal to the values MaxRefLyrMCLumaSr specified in FIG. 60. nCbS$_L$ corresponds to the coding unit height and width of inter prediction luma predicted samples. In an example, MaxRefLyrMCLumaSr may be labeled MaxRefLyrInterPredLumaSr. In an example embodiment, the summation counting the number of predicted sample values above is replaced by the total number of sample values accessed for generating the predicted sample values. This alternate summation is then similarly bounded based on level specifications.

It is to be understood that the term "available" refers to an item being capable of being, such as reference layer pictures, and the term "used" refers to an item being used, such as reference layer pictures, although they may be generally also be used interchangeably.

Referring to FIG. 53A and FIG. 53B a splitting_flag may be signaled inside VPS extension inside VPS.

Splitting_flag equal to 1 may indicate that the bits of the nuh_layer_id syntax element in the NAL unit header are split into n segments with a length, in bits, according to the values of the dimension_id_len_minus1[i] syntax element and that the n segments are associated with the n scalability dimensions indicated in scalability_mask_flag[i]. When splitting_flag is equal to 1, the value of the j-th segment of the nuh_layer_id of i-th layer may be equal to the value of dimension_id[i][j]. splitting_flag equal to 0 may not indicate the above constraint.

When splitting_flag is equal to 1, i.e. the restriction reported in the semantics of the dimension_id[i][j] syntax element described below may be obeyed, scalable identifiers can be derived from the nuh_layer_id syntax element in the NAL unit header by a bit masked copy as an alternative to the derivation as reported in the semantics of the dimension_id[i][j] syntax element. The respective bit mask for the i-th scalable dimension is defined by the value of the dimension_id_len_minus1[i] syntax element and dimBitOffset[i] as specified in the semantics of dimension_id_len_minus1[j].

scalability_mask[i] equal to 1 may indicate that dimension_id syntax elements corresponding to the i-th scalability dimension in Table F-1 are present. scalability_mask[i] equal to 0 may indicate that dimension_id syntax elements corresponding to the i-th scalability dimension are not present.

In one embodiment scalability_mask index 0 may indicate scalability dimension "multiview" and may map to ScalabilityId of "ViewId". In one embodiment scalability_mask index 1 may indicate scalability dimension "spatial/SNR scalability" and may map to ScalabilityId of "DependencyId". In one embodiment scalability_mask index int the range 2 to 15 inclusive may indicate a reserved scalability which may be defined in future.

dimension_id_len_minus1[j] plus 1 may specify the length, in bits, of the dimension_id[i][j] syntax element. The variable dimBitOffset[0] is set equal to 0 and for j in the range of 1 to (NumScalabilityTypes−splitting_flag), inclusive, dimBitOffset[j] is derived as follows.

$$dimBitOffset[j] = \sum_{dimIdx=0}^{j-1} (\text{dimension\_id\_len\_minus1}[dimIdx] + 1) \quad (F-1)$$

When dimension_id_len_minus1[NumScalabilityTypes−1] is not present, the following may apply:

The value of dimension_id_len_minus1[NumScalabilityTypes−1] is inferred to be equal to 5−dimBitOffset[NumScalabilityTypes−1].

The value of dimBitOffset[NumScalabilityTypes] is set equal to 6.

vps_nuh_layer_id_present_flag may specify whether the layer_id_in_null[i] syntax is present.

layer_id_in_null[i] may specify the value of the nuh_layer_id syntax element in VCL NAL units of the i-th layer. For i in a range from 0 to vps_max_layers_minus1, inclusive, when not present, the value of layer_id_in_null[i] is inferred to be equal to i.

When i is greater than 0, layer_id_in_nuh[i] shall be greater than layer_id_in_nuh[i−1].

For i in a range from 0 to vps_max_layers_minus1, inclusive, the variable LayerIdxInVps[layer_id_in_nuh[i]] is set equal to i.

dimension_id[i][j] may specify the identifier of the j-th present scalability dimension type of the i-th layer. The number of bits used for the representation of dimension_id[i][j] is dimension_id_len_minus1[j]+1 bits. When dimension_id[i][j] is not present for j in the range of 0 to NumScalabilityTypes−1, inclusive, dimension_id[i][j] is inferred to be equal to ((layer_id_in_nuh[i] & ((1<<dimBitOffset[j+1])−1))>>dimBitOffset[j]).

The variable ScalabilityId[i][smIdx] specifying the identifier of the smIdx-th scalability dimension type of the i-th layer, the variable ViewId[layer_id_in_nuh[i]] specifying the view identifier of the i-th layer, the variable ViewScalExtLayerFlag specifying whether the i-th layer is a view scalability extension layer and DependencyId[layer_id_in_nuh[i]] specifying the spatial/SNR scalability identifier of the i-th layer are derived as follows:

```
for (i = 0; i <= vps_max_layers_minus1; i++) {
    lId = layer_id_in_nuh[ i ]
    for( smIdx= 0, j =0; smIdx< 16; smIdx ++ ) {
        if(scalability_mask[ smIdx ] )
            ScalabilityId[ i ][ smIdx ] = dimension_id[ i ][ j++ ]
            ViewId[ lId ] = ScalabilityId[ i ][ 0 ]
            ViewScalExtLayerFlag[ lId ] = ( ViewId[ lId ] !=
ViewId[ 0 ])
            DependencyId [ lId ] = ScalabilityId[ i ][ 1 ]
    }
}
```

In one embodiment a bitstream constraint on dimension_id_len_minus1[i] syntax elements may be required to be obeyed when splitting_flag is equal to 1.

The constraint may be enforced and required because when splitting_flag is equal to 1 the bits in nuh_layer_id syntax element in the NAL unit header are split into n segments with length in bits according to the values of the dimension_id_len_minus1[i] syntax elements and that the n segments are associated with the n scalability dimensions indicated in scalability_mask_flag[i]. As the nuh_layer_id is coded as u(6) in the NAL unit header the bitstream constraints described below make sure that the values signaled for dimension_id_len_minus1[i] are meaningful when splitting_flag is equal to 1.

In one embodiment it is a requirement of the bitstream conformance that when splitting_flag is equal to 1 sum of values of all (dimension_id_len_minus1[j]+1) elements is less than or equal to 6.

In another embodiment it is a requirement of the bitstream conformance that when splitting_flag is equal to 1 sum of all (dimension_id_len_minus1[j]+1) elements is less than or equal to 6.

A few additional variants of the above bitstream constraint are described below.

It is a requirement of the bitstream conformance that when splitting_flag is equal to 1 sum of all (dimension_id_len_minus1[j]+1) elements for j ranging from 0 to NumScalabilityTypes−1 inclusive is less than or equal to 6.

In one embodiment it is a requirement of the bitstream conformance that when splitting_flag is equal to 1 sum of all dimension_id_len_minus1[j] syntax elements is less than or equal to (6-NumScalabilityTypes).

In one embodiment It is a requirement of the bitstream conformance that when splitting_flag is equal to 1 sum of all (dimension_id_len_minus1[j]+1) elements is less than or equal to 6. Thus it is required that:

$$\sum_{j=0}^{NumScalabilityTypes} (\text{dimension\_id\_len\_minus1}[j] + 1) \leq 6$$

In one embodiment It is a requirement of the bitstream conformance that when splitting_flag is equal to 1 sum of all (dimension_id_len_minus1[j]+1) elements is less than or equal to 6. Thus it is required that:

$$\sum_{j=0}^{NumScalabilityTypes-1} (\text{dimension\_id\_len\_minus1}[j] + 1) \leq 6$$

In yet another embodiment it is a requirement of the bitstream conformance that when splitting_flag is equal to 1 sum of all (dimension_id_len_minus1[j]+1) elements is less than or equal to the number of bits used to signal nuh_layer_id syntax element. In some embodiments this nuh_layer_id syntax element may be signaled in the NAL unit header.

In yet another In yet another embodiment it is a requirement of the bitstream conformance that when splitting_flag is equal to 1 sum of all (dimension_id_len_minus1[j]+1) elements is less than or equal to size in bits used to code some other syntax element which may be transmitted in some normative or non-normative part of the bitstream.

Referring to FIG. 63A-D, each slice may include a slice segment header. In some cases a slice segment header may be called slice header. Within the slice segment header there includes syntax elements that are used for inter-layer prediction. This inter-layer prediction defines what other layers the slice may depend upon. In other words this inter-layer prediction defines what other layers the slice may use as its reference layers. The reference layers may be used for sample prediction and/or for motion filed prediction. Referring to FIG. 64 by way of example, enhancement layer 3 may depend upon enhancement layer 2, and base layer 0. This dependency relationship may be expressed in the form of a list, such as, [2, 0].

The NumDirectRefLayers for a layer may be derived based upon a direct_dependency_flag[i][j] that when equal to 0 specifies that the layer with index j is not a direct reference layer for the layer with index i. The direct_dependency_flag[i][j] equal to 1 specifies that the layer with index j may be a direct reference layer for the layer with index i. When the direct_dependency_flag[i][j] is not present for i and j in the range of 0 to vps_max_layers_minus1, it is inferred to be equal to 0.

The direct_dep_type_len_minus2 plus 2 specifies the number of bits of the direct_dependency_type[i][j] syntax element. In bitstreams conforming to this version of this Specification the value of direct_dep_type_len_minus2 shall be equal 0. Although the value of direct_dep_type_len_minus2 shall be equal to 0 in this version of this Specification, decoders shall allow other values of direct_dep_type_len_minus2 in the range of 0 to 30, inclusive, to appear in the syntax.

The direct_dependency_type[i][j] is used to derive the variables NumSamplePredRefLayers[i], NumMotionPredRefLayers[i], SamplePredEnabledFlag[i][j], and MotionPredEnabledFlag[i][j]. direct_dependency_type[i][j] shall be in the range of 0 to 2, inclusive, in bitstreams conforming to this version of this Specification. Although the value of direct_dependency_type[i][j] shall be in the range of 0 to 2, inclusive, in this version of this Specification, decoders shall allow values of direct_dependency_type[i][j] in the range of 3 to $2^{32}-2$, inclusive, to appear in the syntax.

The variables NumSamplePredRefLayers[i], NumMotionPredRefLayers[i], SamplePredEnabledFlag[i][j], MotionPredEnabledFlag[i][j], NumDirectRefLayers[i], DirectRefLayerIdx[i][j], RefLayerId[i][j], MotionPredRefLayerId[i][j], and SamplePredRefLayerId[i][j] are derived as follows:

```
for( i = 0; i < 64; i++ ) {
    NumSamplePredRefLayers[ i ] = 0
    NumMotionPredRefLayers[ i ] = 0
    NumDirectRefLayers[ i ] = 0
    for( j = 0; j < 64; j++ ) {
        SamplePredEnabledFlag[ i ][ j ] = 0
        MotionPredEnabledFlag[ i ][ j ] = 0
        RefLayerId[ i ][ j ] = 0
        SamplePredRefLayerId[ i ][ j ] = 0
        MotionPredRefLayerId[ i ][ j ] = 0
    }
}
for( i = 1; i <= vps_max_layers_minus1; i++ ) {
    iNuhLId = layer_id_in_nuh[ i ]
    for( j = 0; j < i; j++ )
        if( direct_dependency_flag[ i ][ j ] ) {
            DirectRefLayerIdx[ iNuhLid ][ layer_id_in_nuh[ j ] = NumDirectRefLayers[ iNuhLId ]
            RefLayerId[ iNuhLid ][ NumDirectRefLayers
                [ iNuhLId ]++ ] = layer_id_in_nuh[ j ]
            SamplePredEnabledFlag[ iNuhLId ][ j ] = ( ( direct_dependency_type[ i ][ j ] + 1 ) & 1 )
            NumSamplePredRefLayers[ iNuhLId ] += SamplePredEnabledFlag[ iNuhLId ][ j ]
            MotionPredEnabledFlag[ iNuhLId ][ j ] = ( ( ( direct_dependency_type[ i ][ j ] + 1 ) & 2 ) >> 1 )
            NumMotionPredRefLayers[ iNuhLId ] += MotionPredEnabledFlag[ iNuhLId ][ j ]
        }
}
for( i = 1, mIdx = 0, sIdx = 0; i <= vps_max_layers_minus1; i++ ) {
    iNuhLId = layer_id_in_nuh[ i ]
    for( j = 0, j < i; j++ ) {
        if( MotionPredEnabledFlag[ iNuhLId ][ j ] )
            MotionPredRefLayerId[ iNuhLId ][ mIdx++ ] = layer_id_in_nuh[ j ]
        if( SamplePredEnabledFlag[ INuhLid ][ j ] )
            SamplePredRefLayerId[ iNuhLid ][ sIdx++ ] = layer_id_in_nuh[ j ]
    }
}
```

The direct_dependency_flag[i][j], direct_dep_type_len_minus2, direct_dependency_type[i][j] are included in the vps_extension syntax illustrated in FIG. 65A and FIG. 65B, which is included by reference in the VPS syntax which provides syntax for the coded video sequence.

It is typically desirable to reduce the number of referenced layers that need to be signaled within the bitstream, and other syntax elements within the slice segment header may be used to effectuate such a reduction. The other syntax elements may include inter_layer_pred_enabled_flag, num_inter_layer_ref_pics_minus1, and/or inter_layer_pred_layer_idc[i]. These syntax elements may be signaled in slice segment header.

The inter_layer_pred_enabled_flag equal to 1 specifies that inter-layer prediction may be used in decoding of the current picture. The inter_layer_pred_enabled_flag equal to 0 specifies that inter-layer prediction is not used in decoding of the current picture. When not present, the value of inter_layer_pred_enabled_flag is inferred to be equal to 0.

The num_inter_layer_ref_pics_minus1 plus 1 specifies the number of pictures that may be used in decoding of the current picture for inter-layer prediction. The length of the num_inter_layer_ref_pics_minus1 syntax element is Ceil (Log 2(NumDirectRefLayers[nuh_layer_id])) bits. The value of num_inter_layer_ref_pics_minus1 shall be in the range of 0 to NumDirectRefLayers[nuh_layer_id]−1, inclusive.

The variable NumActiveRefLayerPics is derived as follows:

```
if( nuh_layer_id = = 0 | | NumDirectRefLayers[ nuh_layer_id ] = = 0
| | !inter_layer_pred_enabled_flag )
    NumActiveRefLayerPics = 0
else if( max_one_active_ref_layer_flag | |
NumDirectRefLayers[ nuh_layer_id ] = = 1 )
    NumActiveRefLayerPics = 1
else
    NumActiveRefLayerPics = num_inter_layer_ref_pics_minus1 + 1
```

All slices of a coded picture shall have the same value of NumActiveRefLayerPics.

The inter_layer_pred_layer_idc[i] specifies the variable, RefPicLayerId[i], representing the nuh_layer_id of the i-th picture that may be used by the current picture for inter-layer prediction. The length of the syntax element inter_layer_pred_layer_idc[i] is Ceil(Log 2(NumDirectRefLayers [nuh_layer_id])) bits. The value of inter_layer_pred_layer_idc[i] may be in the range of 0 to NumDirectRefLayers [nuh_layer_id]−1, inclusive. When not present, the value of inter_layer_pred_layer_idc[i] is inferred to be equal to 0.

By way of example, the system may signal various syntax elements especially the direct_dependency_flag[i][j] in VPS which results in the inter-layer reference picture set for layer 3 to be [2, 0]. Then the system may refine further the inter-layer reference picture set with the use of the additional syntax elements for example syntax elements in slice segment header as [2], may refine further the inter-layer reference picture set with the use of the additional syntax elements as [0], or may refine further the inter-layer reference picture set with the use of the additional syntax elements as [ ] which is the null set. However, depending on the design of the encoder, the reference picture set of [2, 0] may be signaled as [2, 0].

Referring to FIG. 66, the slice segment header may be modified to include a comparison between the number of direct reference layers for a particular layer (NumDirectRefLayers[num_layer_id] in the syntax) and the number of active reference layers for the same particular layer (NumActiveRefLayerPics in the syntax). In particular, this may be signaled as "if (NumActiveRefLayerPics!=NumDirectRefLayers[nuh_layer_id])". Thus, if both of these indicate the same number of layers, then there is no need to signal inter_layer_pred_layer_idc[i] in the bitstream, but may rather determine/infer such values based on other syntax elements already signaled.

Referring to FIG. 67, the slice segment header signalling may be modified in a similar manner to FIG. 66 to infer the values for the inter_layer_pred_layer_idc[i] by not signalling them.

If NumActiveRefLayerPics is equal to NumDirectRefLayers[nuh_layer_id], then the value of inter_layer_pred_layer_idc[i] may be inferred as follows.

for (i=0; i<NumActiveRefLayerPics; i++)
    inter_layer_pred_layer_idc[i]=i;

When not present and when NumActiveRefLayerPics is not equal to NumDirectRefLayers[nuh_layer_id], the value of inter_layer_pred_layer_idc[i] is inferred to be equal to 0.

When i is greater than 0, inter_layer_pred_layer_idc[i] may be greater than inter_layer_pred_layer_idc[i−1].

The variables RefPicLayerId[i] for each value of i in the range of 0 to NumActiveRefLayerPics−1, inclusive, NumActiveMotionPredRefLayers, and ActiveMotionPredRefLayerId[j] for each value of j in the range of 0 to NumActiveMotionPredRefLayers−1, inclusive, maybe derived as follows:

```
for( i = 0, j = 0; i < NumActiveRefLayerPics; i++ )
    RefPicLayerId[ i ] = RefLayerId[ nuh_layer_id ][
inter_layer_pred_layer_idc[ i ] ]
        if( MotionPredEnabledFlag[ nuh_layer_id ][
inter_layer_pred_layer_idc[ i ] ] )
            ActiveMotionPredRefLayerId[ j++ ] = RefLayerId[
nuh_layer_id ][ inter_layer_pred_layer_idc[ i ] ]
    }
    NumActiveMotionPredRefLayers = j
```

All slices of a picture may have the same value of inter_layer_pred_layer_idc[i] for each value of i in the range of 0 to NumActiveRefLayerPics−1, inclusive.

The max_tid_il_ref_pics_plus1[i] is signaled in VPS extension. max_tid_il_ref_pics_plus1[i] equal to 0 specifies that within the CVS non-IRAP pictures with nuh_layer_id equal to layer_id_in_nuh[i] are not used as reference for inter-layer prediction. max_tid_il_ref_pics_plus1[i] greater than 0 specifies that within the CVS pictures with nuh_layer_id equal to layer_id_in_nuh[i] and TemporalId greater than max_tid_il_ref_pics_plus1[i]−1 are not used as reference for inter-layer prediction. When not present, max_tid_il_ref_pics_plus1[i] is unspecified.

It may be a requirement of bitstream conformance that for each value of i in the range of 0 to NumActiveRefLayerPics−1, inclusive, either of the following two conditions may be true:

The value of max_tid_il_ref_pics_plus1[LayerIdxInVps [RefPicLayerId[i] ] ] is greater than TemporalId.

The values of max_tid_il_ref_pics_plus1[LayerIdxInVps [RefPicLayerId[i] ] ] and TemporalId are both equal to 0 and the picture in the current access unit with nuh_layer_id equal to RefPicLayerId[i] is an IRAP picture.

In another embodiment It may be a requirement of bitstream conformance that for each value of i in the range of 0 to NumActiveRefLayerPics−1, inclusive, either of the following two conditions may be true:

The value of max_tid_il_ref_pics_plus1[LayerIdxInVps [RefPicLayerId[i] ] ] is greater than TemporalId of the picture in the current access unit with nuh_layer_id equal to RefPicLayerId[i].

The values of max_tid_il_ref_pics_plus1[LayerIdxInVps [RefPicLayerId[i] ] ] is equal to 0 and the picture in the current access unit with nuh_layer_id equal to RefPicLayerId[i] is an IRAP picture.

It may be a requirement of bitstream conformance that for each value of i in the range of 0 to NumActiveRefLayerPics−1, inclusive, the value of SamplePredEnabledFlag [nuh_layer_id] [RefPicLayerId[i] ] or MotionPredEnabledFlag[nuh_layer_id] [RefPicLayerId[i] ] shall be equal to 1.

Referring to FIG. 68, another embodiment for signaling slice segment header is illustrated.

For the embodiment illustrated in FIG. 68, an inter_layer_pred_layer mask[i] equal to 1 specifies that layer RefLayerId[nuh_layer_id][i], may be used by the current picture for inter-layer prediction. The inter_layer_pred_layer mask[i] equal to 0 specifies that layer RefLayerId[nuh_layer_id][i], is not used by the current picture for inter-layer prediction.

When not present the value of inter_layer_pred_layer mask [i] is inferred to be equal to 0.

The variables RefPicLayerId[i] for each value of i in the range of 0 to NumActiveRefLayerPics−1, inclusive, NumActiveMotionPredRefLayers, and ActiveMotionPredRefLayerId[j] for each value of j in the range of 0 to NumActiveMotionPredRefLayers−1, inclusive, are derived as follows:

```
for( i = 0, j = 0, k=0; i < NumDirectRefLayers[ nuh_layer_id ]; i++)
    if(inter_layer_pred_layer_mask[ i ])
        RefPicLayerId[ k++ ] = RefLayerId[ nuh_layer_id ][ i ]
    if( MotionPredEnabledFlag[ nuh_layer_id ][ i ] )
        ActiveMotionPredRefLayerId[ j++ ]= RefLayerId[
nuh_layer_id ][ i ]
}
NumActiveMotionPredRefLayers = j
```

All slices of a picture may have the same value of inter_layer_pred_layer mask[i] for each value of i in the range of 0 to NumDirectRefLayers[nuh_layer_id]−1, inclusive.

It may be a requirement of bitstream conformance that for each value of i in the range of 0 to NumActiveRefLayerPics−1, inclusive, either of the following two conditions shall be true:

The value of max_tid_il_ref_pics_plus1[LayerIdxInVps [RefPicLayerId[i] ] ] is greater than TemporalId.

The values of max_tid_il_ref_pics_plus1[LayerIdxInVps [RefPicLayerId[i] ] ] and TemporalId are both equal to 0 and the picture in the current access unit with nuh_layer_id equal to RefPicLayerId[i] is an IRAP picture.

It may be a requirement of bitstream conformance that for each value of i in the range of 0 to NumActiveRefLayerPics−1, inclusive, the value of SamplePredEnabledFlag [nuh_layer_id] [RefPicLayerId[i] ] or MotionPredEnabledFlag[nuh_layer_id] [RefPicLayerId[i] ] may be equal to 1.

It is shown in FIG. 68 that the inter_layer_pred_layer mask[i] may be signed with u(1) which uses 1 bit, and FIG. 67 which signals inter_layer_pred_layer_idc[i] may be signed with u(v) which may use multiple bits. In an embodiment inter_layer_pred_layer mask[i] is signaled instead of intra_layer_pred_idc[i]

Referring to FIG. 69, it is desirable to define profiles where the complexity of the system is reduced by limiting the permitted referencing interrelationships between the different layers (e.g., base layer and/or enhancement layers). In general, the sytanx structure permits one layer to reference multiple other layers, which results in a relatively high decoder complexity and also high encoder complexity. If desired, a modified syntax structure may be used for profiles of a reduced complexity where the syntax structure permits one layer to reference at most only one other layer. This limitation on the syntax structure may be signaled by setting a max_one_active_ref_layer_flag being set to 1.

The max_one_active_ref_layer_flag is signaled in VPS extension. max_one_active_ref_layer_flag equal to 1 specifies that at most one picture is used for inter-layer prediction for each picture in the CVS. max_one_active_ref_layer_flag equal to 0 specifies that more than one picture may be used for inter-layer prediction for each picture in the CVS.

The layer_id_in_nuh[i] is signaled in VPS extension. layer_id_in_nuh[i] specifies the value of the nuh_layer_id syntax element in VCL NAL units of the i-th layer. For i in a range from 0 to vps_max_layers_minus1, inclusive, when not present, the value of layer_id_in_nuh[i] is inferred to be equal to i. When i is greater than 0, layer_id_in_nuh[i] shall be greater than layer_id_in_nuh[i−1].

A bitstream constraint may be included in the case where only one direct reference layer for a layer is used or at most one picture is used for inter-layer prediction for each picture in CVS, such as follows:

In one choice, it may be a requirement of the bitstream conformance that if NumDirectRefLayers[layer_id_in_nuh [i]] is equal to 1 for each layer i=1, . . . vps_max_layers_minus1 then max_one_active_ref_layer_flag is equal to 1.

In another choice,
Let
for (i=1;i<=vps_max_layers_minus1,i++)
    for (j=0,NumDirDepFlags[i]=0;j<i;j++)
        NumDirDepFlags[i]+=direct_dependency_flag[i][j];

It may be a requirement of the bitstream conformance that if NumDirDepFlags[i] is equal to 1 for each layer i=1, . . . vps_max_layers_minus1 then max_one_active_ref_layer_flag is equal to 1.

In another embodiment, it is desirable to not support the ability to signal an inter-layer reference picture from different direct dependent layers for each picture when max_one_active_ref_layer_flag is set equal to 1. This embodiment results in lower complexity for decoding an output layer set. In this embodiment the bitstream constraint proposed below related to NumDirectRefLayers being equal to 1 may be required to be obeyed:

In one choice, it is a requirement of the bitstream conformance that if max_one_active_ref_layer_flag is equal to 1 then NumDirectRefLayers[layer_id_in_nuh[i]] is equal to 1 for each layer i=1, . . . vps_max_layers_minus1.

In another choice,
let
for (i=1;i<=vps_max_layers_minus1, i++)
    for (j=0,NumDirDepFlags[i]=0;j<i;j++)
        NumDirDepFlags[i]+=direct_dependency_flag[i][j];

It may be a requirement of the bitstream conformance that if max_one_active_ref_layer_flag is equal to 1 then NumDirDepFlags[i] is equal to 1 for i=1, . . . vps_max_layers_minus1.

Another embodiment may include a gating flag controlled in a parameter set (e.g. pps, sps, and/or vps) to conditionally signal selected syntax elements in the slice header related to inter-layer prediction signalling.

Referring to FIG. 70, for example, the syntax elements inter_layer_pred_enabled_flag, num_inter_layer_ref_pics_minus1, and/or inter_layer_pred_layer_idc[i] are signaled in slice segment header only if a ilp_slice_signaling_enabled_flag is equal to 1. Thus ilp_slice_signaling_enabled_flag is a gating flag.

Referring to FIG. 71, and FIG. 71A the ilp_slice_signaling_enabled_flag may be signaled in a parameter set such as in video parameter set. Referring to FIG. 72, the ilp_slice_signaling_enabled_flag may be signaled in a parameter set such as in sequence parameter set. Referring to FIG. 73, the ilp_slice_signaling_enabled_flag may be signaled in a parameter set such as in the picture parameter set. The ilp_slice_signaling_enabled_flag may be signaled in another location of the bitstream, as desired. In each of these parameters sets the ilp_slice_signaling_enabled_flag may be sent in any location different than that shown in that illustrated.

The ilp_slice_signaling_enabled_flag equal to 1 specifies that inter_layer_pred_enabled_flag, num_inter_layer_ref_pics_minus1, inter_layer_pred_layer_idc[i] are present in the slice segment headers. ilp_slice_signaling_enabled_flag equal to 0 specifies that inter_layer_pred_enabled_flag, num_inter_layer_ref_pics_minus1, inter_layer_pred_layer_idc[i] are not present in the slice segment header.

In some embodiments ilp_slice_signaling_enabled_flag may be instead called ilp_slice_signaling_present_flag.

When ilp_slice_signaling_enabled_flag is equal to 1 inter_layer_pred_enabled_flag, num_inter_layer_ref_pics_minus1, inter_layer_pred_layer_idc[i] and NumActiveRefLayersPics values are inferred as follows:
NumActiveRefLayerPics is inferred as follows:
NumActiveRefLayerPics=NumDirectRefLayers[nuh_layer_id]
inter_layer_pred_layer_idc[i] is inferred as follows:
for (i=0; i<NumActiveRefLayerPics; i++)
   inter_layer_pred_layer_idc[i]=i;
num_inter_layer_ref_pics_minus1 is inferred to be equal to NumDirectRefLayers[nuh_layer_id]−1.
inter_layer_pred_enabled_flag is inferred to be equal to 1.

In another embodiment one or more of the syntax elements may be signaled using a known fixed number of bits instead of u(v) instead of ue(v). For example they could be signaled using u(8) or u(16) or u(32) or u(64), etc.

In another embodiment one or more of these syntax element could be signaled with ue(v) or some other coding scheme instead of fixed number of bits such as u(v) coding.

In another embodiment the names of various syntax elements and their semantics may be altered by adding a plus 1 or plus2 or by subtracting a minus1 or a minus2 compared to the described syntax and semantics.

In yet another embodiment various syntax elements may be signaled per picture anywhere in the bitstream. For example they may be signaled in slice segment header, pps/ sps/ vps/ or any other parameter set or other normative part of the bitstream.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray (registered trademark) disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an ASIC, a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for decoding video from a bitstream comprising:
(a) receiving a video parameter set extension syntax including a flag that specifies whether or not a layer is a direct reference layer of a current layer;
(b) deriving the number of direct reference layers for the current layer using the flag;
(c) receiving a slice segment header syntax of a current picture including a parameter, wherein the parameter plus 1 specifies the number of pictures that may be used in decoding of the current picture for inter layer prediction;
(d) deriving the number of active reference layer pictures for the current picture using the number of the direct reference layers or the parameter; and
(e) decoding an inter layer prediction layer indicator if the number of the active reference layer pictures for the current pictures is different from the number of the direct reference layers for the current layer; wherein the inter layer prediction layer indicator specifies a variable representing an identifier of an i-th picture that may be used by the current picture for inter-layer prediction and a value of the inter layer prediction layer indicator is in a range of 0 to the number of the direct reference layers for the current layer minus 1.

2. A device for decoding video from a bitstream comprising:
circuitry that:
(a) receives a video parameter set extension syntax including a flag that specifies whether or not a layer is a direct reference layer of a current layer;
(b) derives the number of direct reference layers for the current layer using the flag;
(c) receives a slice segment header syntax of a current picture including a parameter, wherein the parameter plus 1 specifies the number of pictures that may be used in decoding of the current picture for inter layer prediction;
(d) derives the number of active reference layer pictures for the current picture using the number of the direct reference layers or the parameter; and
(e) decodes an inter layer prediction layer indicator if the number of the active reference layer pictures for the current pictures is different from the number of the direct reference layers for said current layer; wherein the inter layer prediction layer indicator specifies a variable representing an identifier of an i-th picture that may be used by the current picture for inter-layer prediction and a value of the inter layer prediction layer indicator is in a range of 0 to the number of direct reference layers for the current layer minus 1.

* * * * *